April 18, 1961  H. G. TASKER ET AL  2,980,902
AUTOMATIC GROUND CONTROLLED APPROACH SYSTEMS
Filed Dec. 15, 1953  41 Sheets-Sheet 4
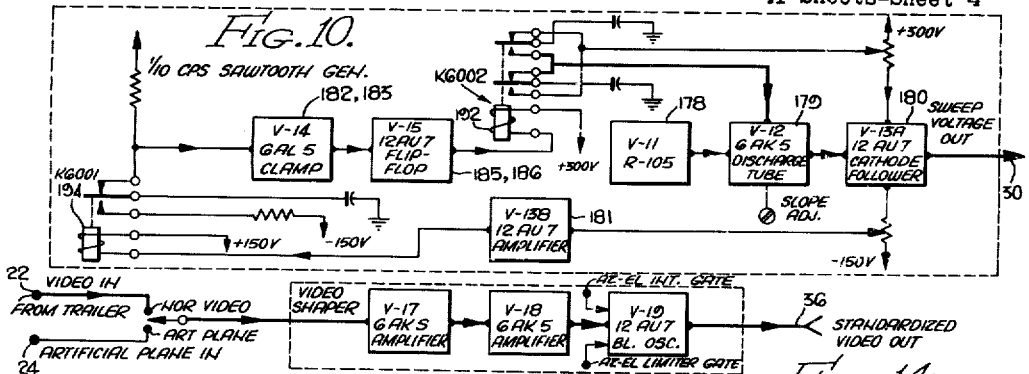
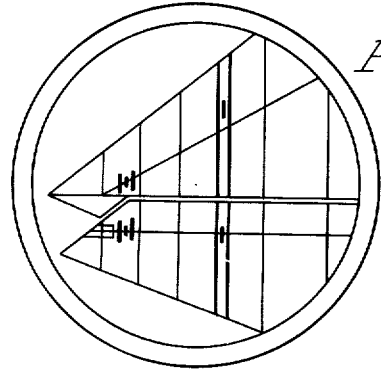
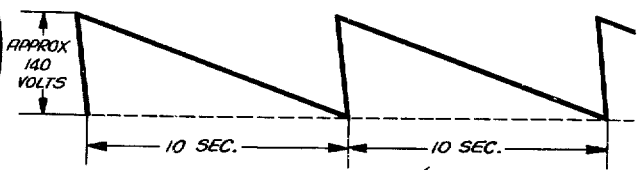
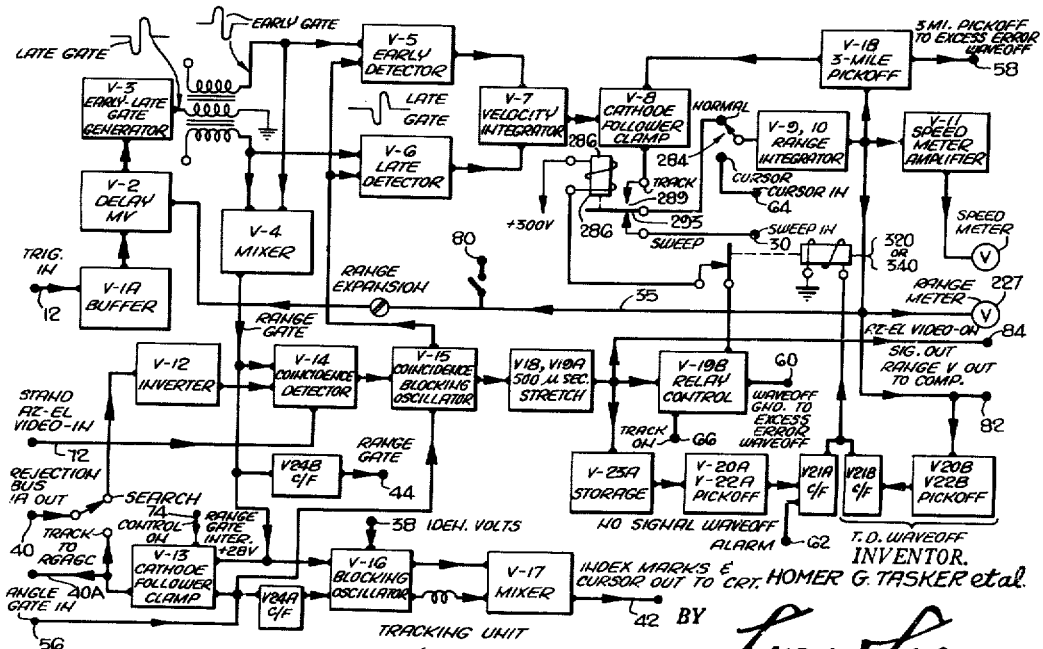
INVENTOR.
HOMER G. TASKER et al.
BY
ATTORNEYS

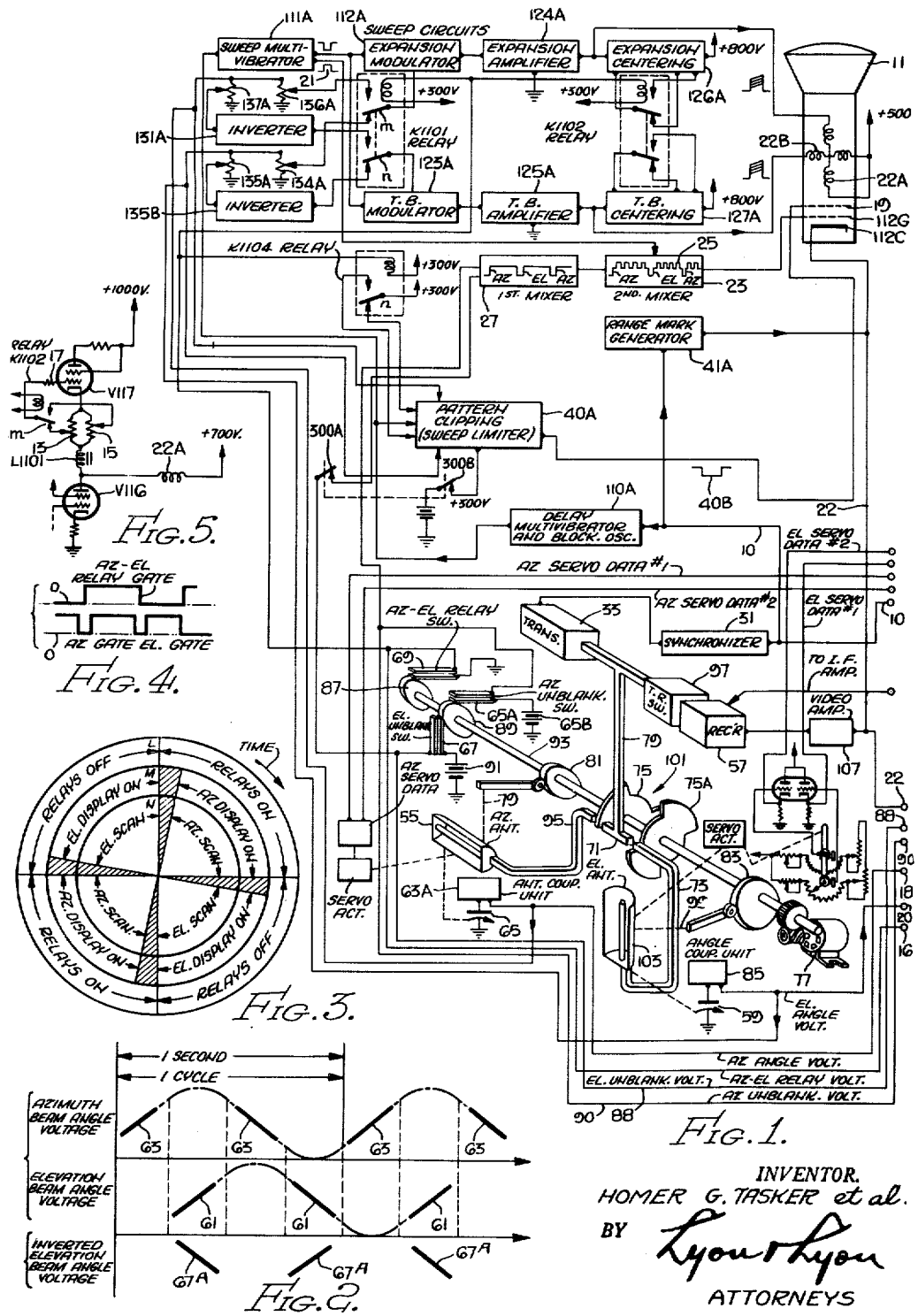

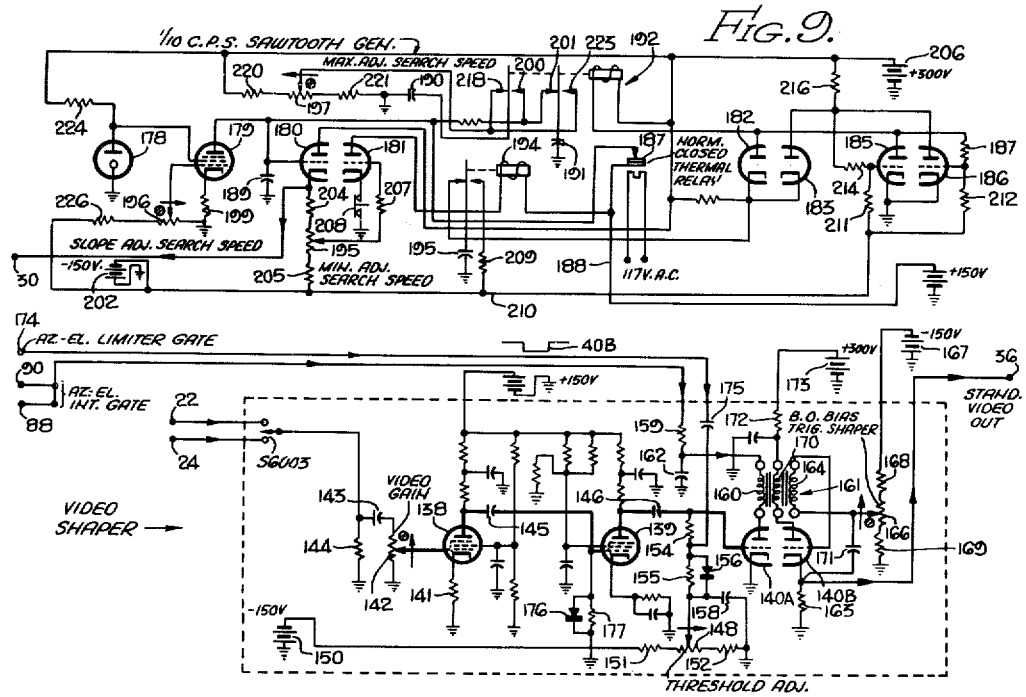
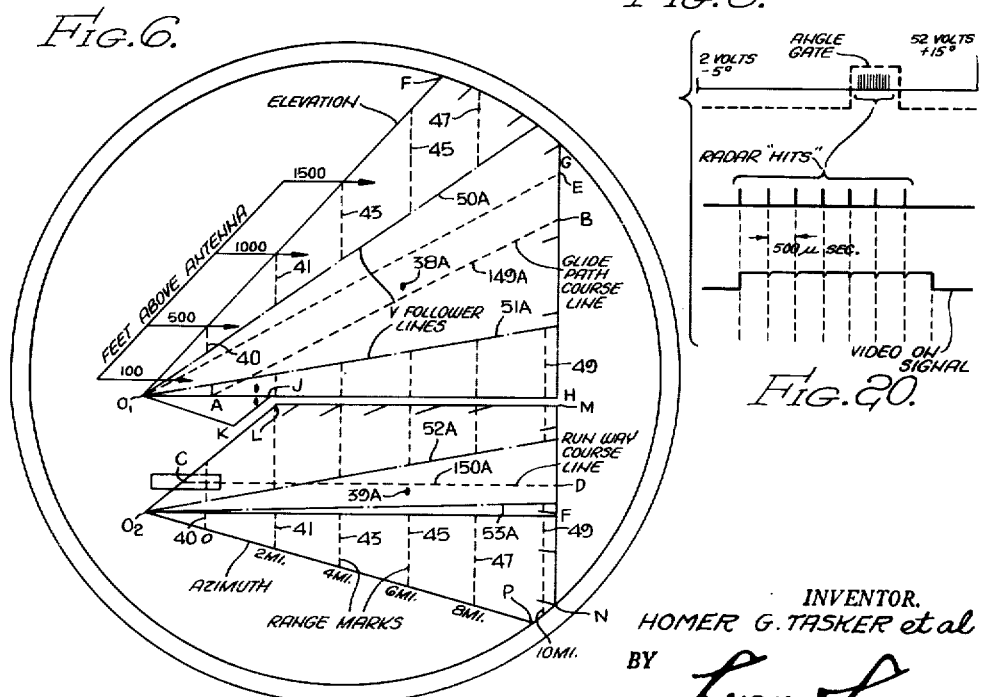

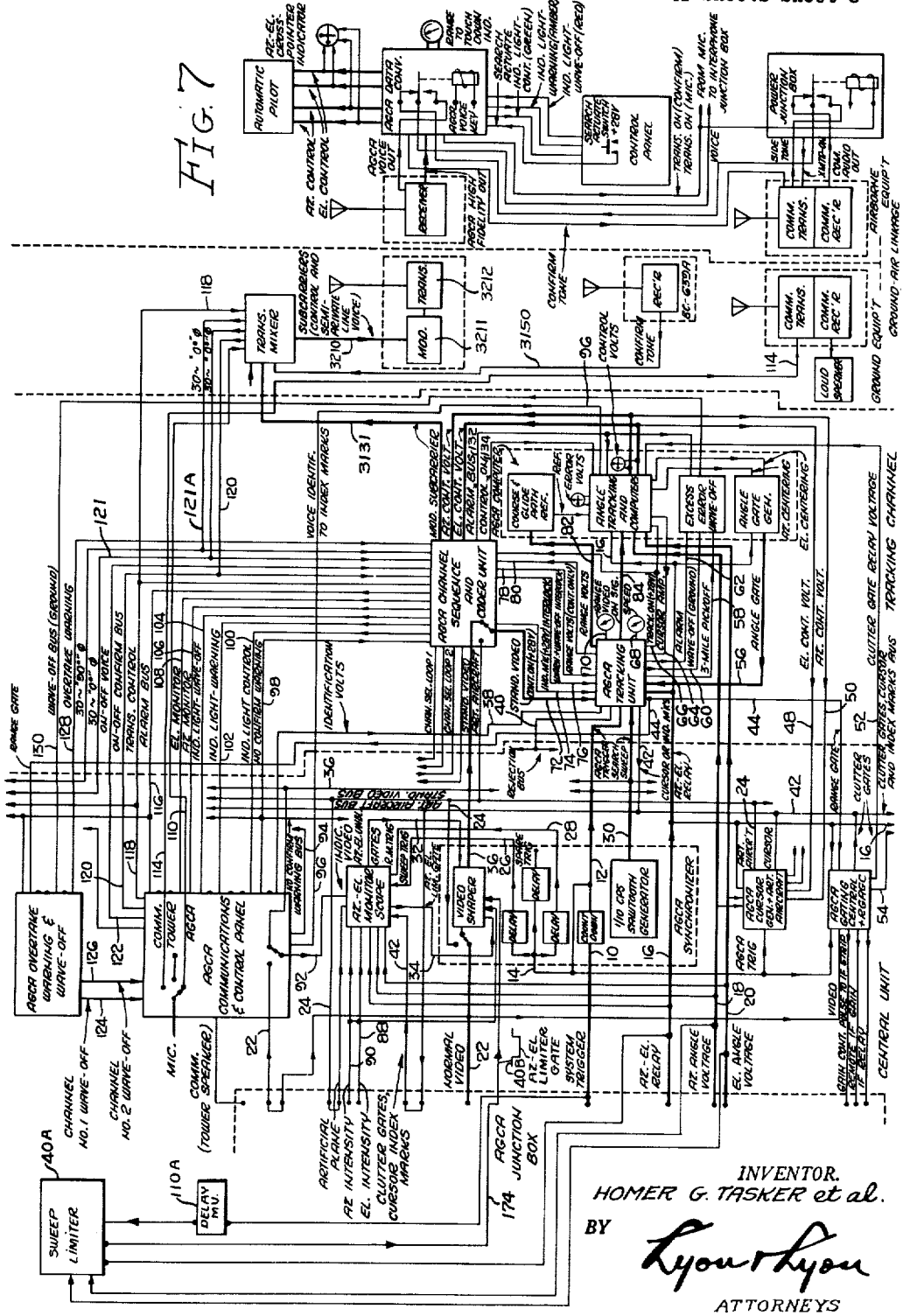

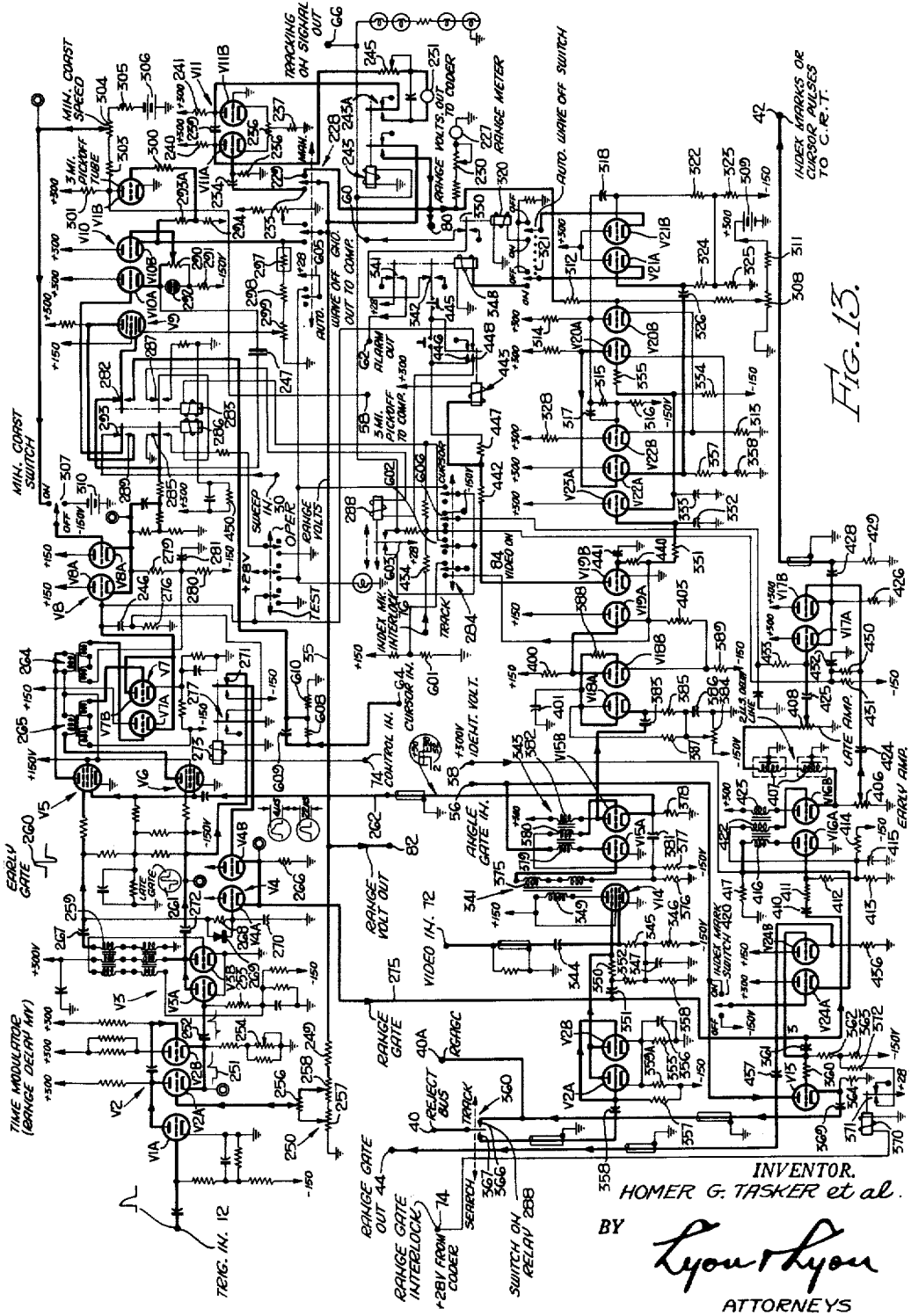

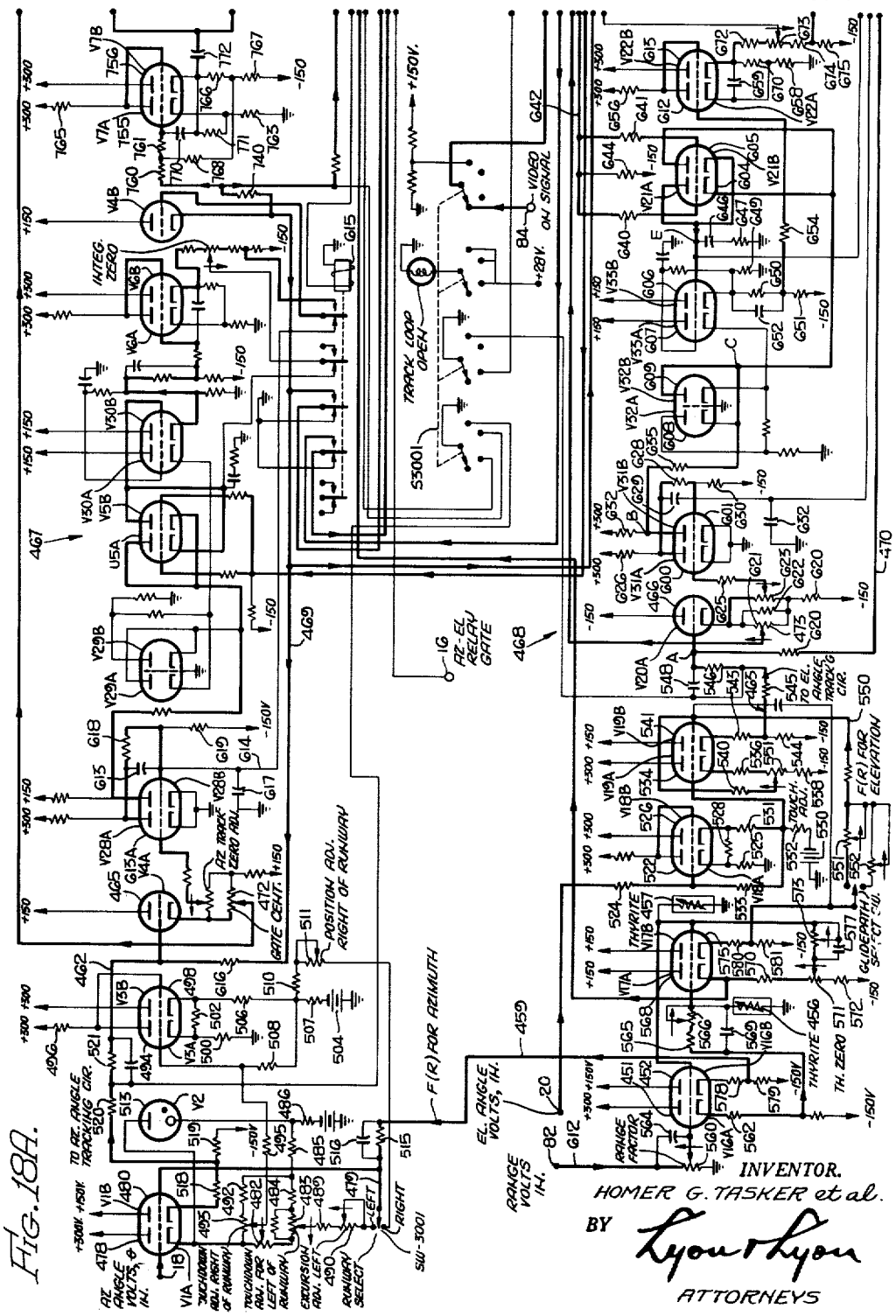

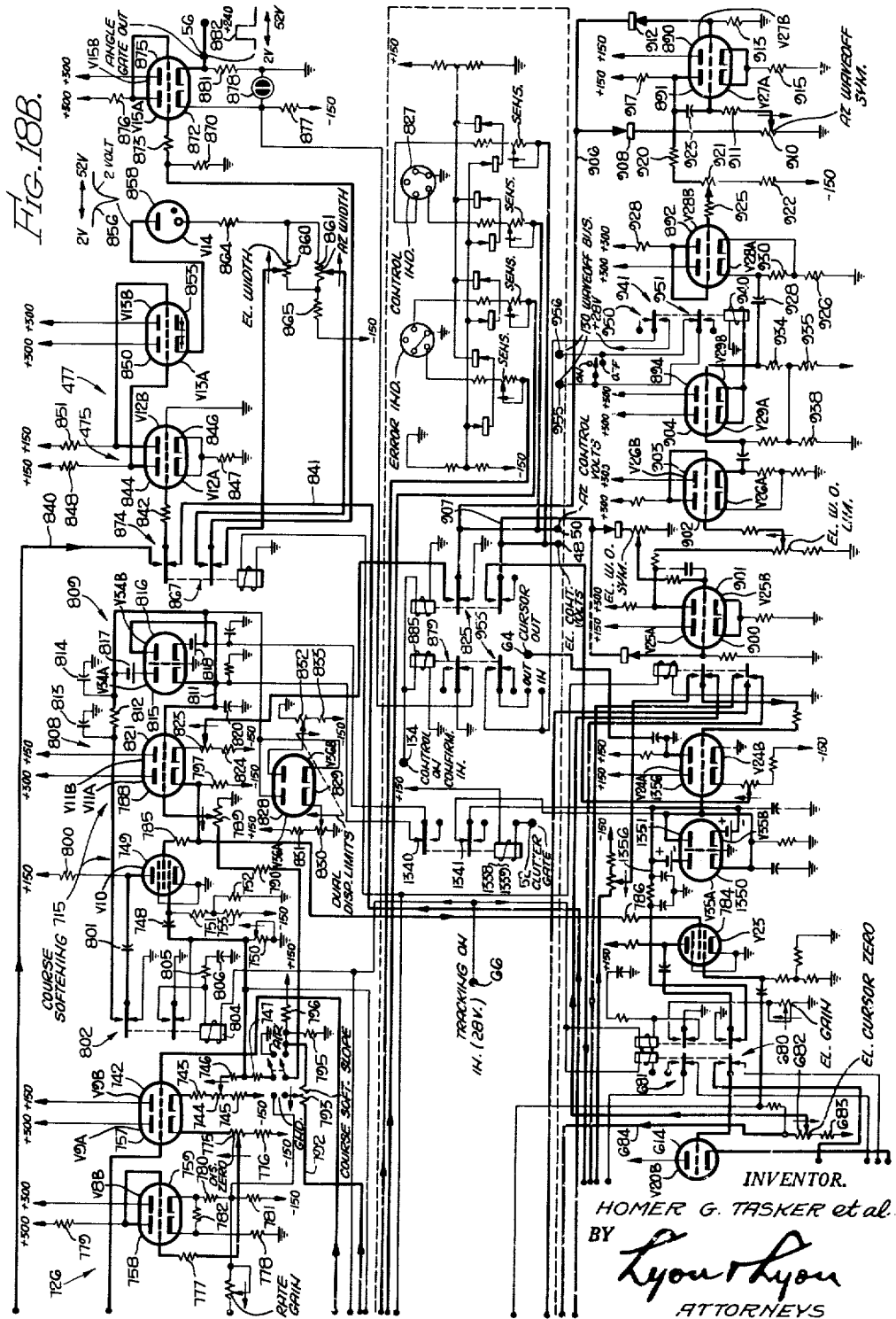

INVENTOR.
HOMER G. TASKER et al.
BY Lyon & Lyon
ATTORNEYS

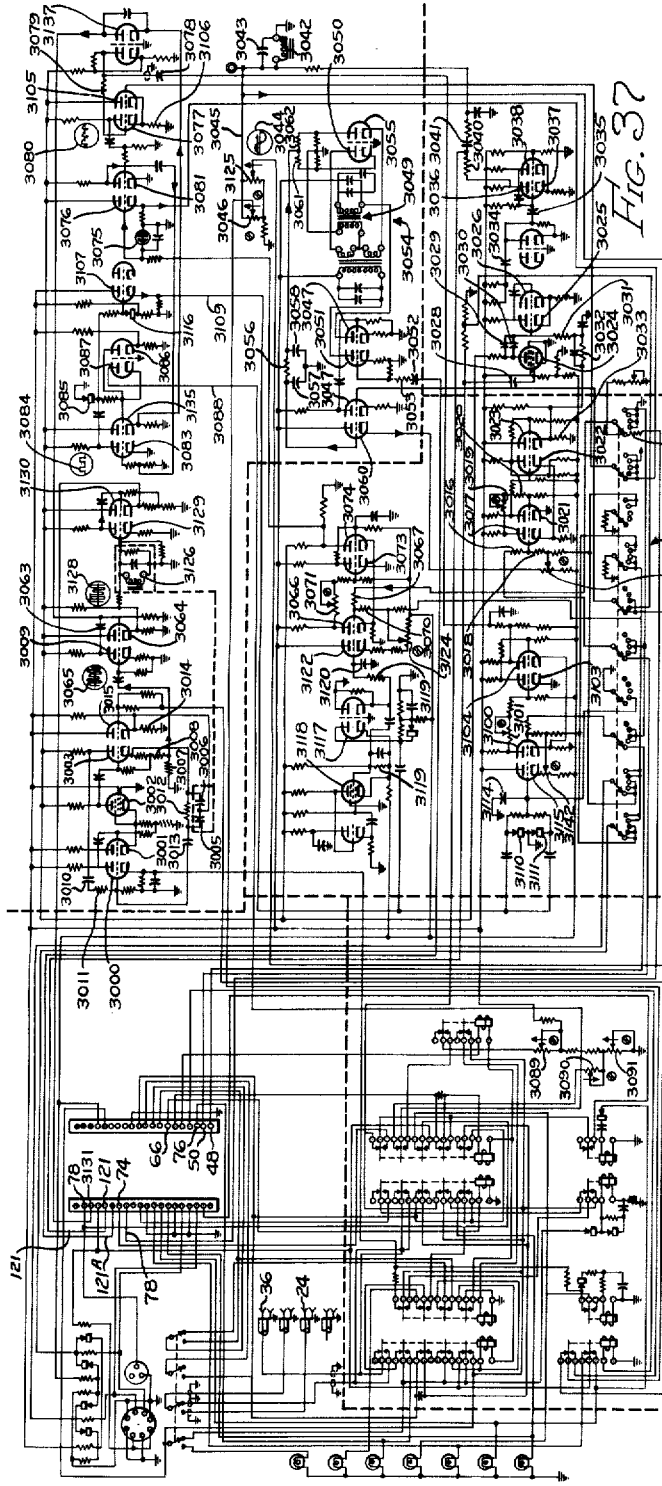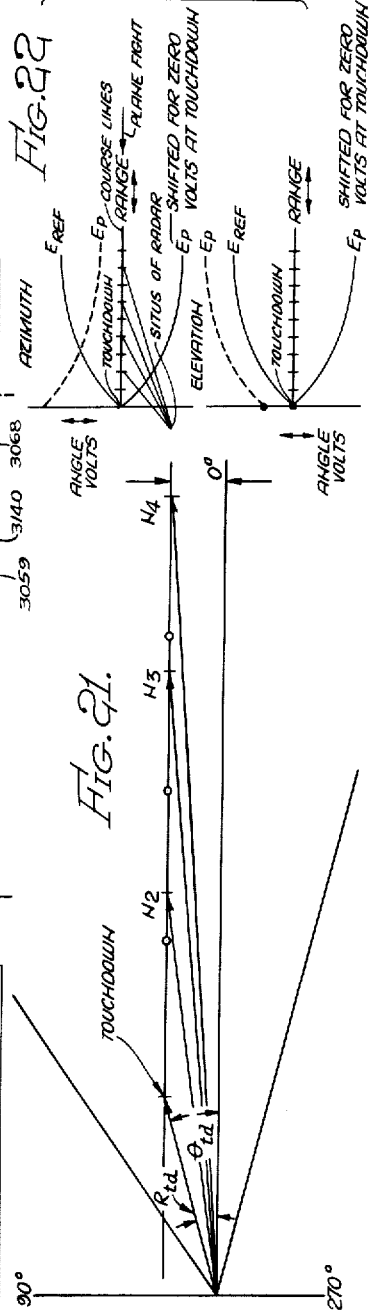

April 18, 1961  H. G. TASKER ET AL  2,980,902
AUTOMATIC GROUND CONTROLLED APPROACH SYSTEMS
Filed Dec. 15, 1953  41 Sheets-Sheet 11
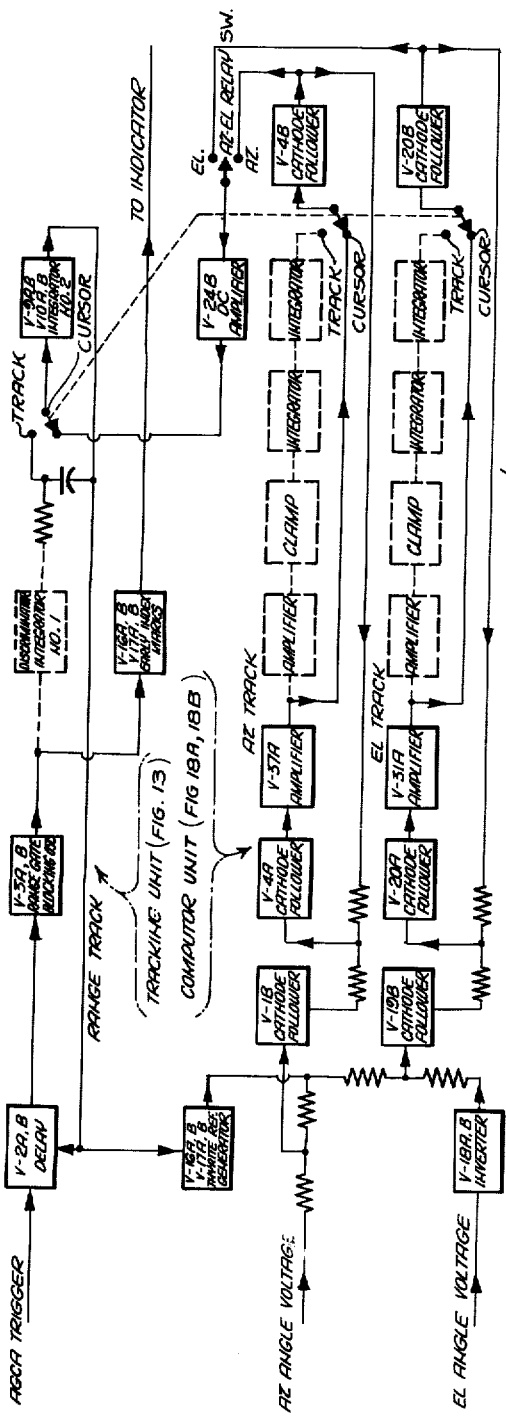
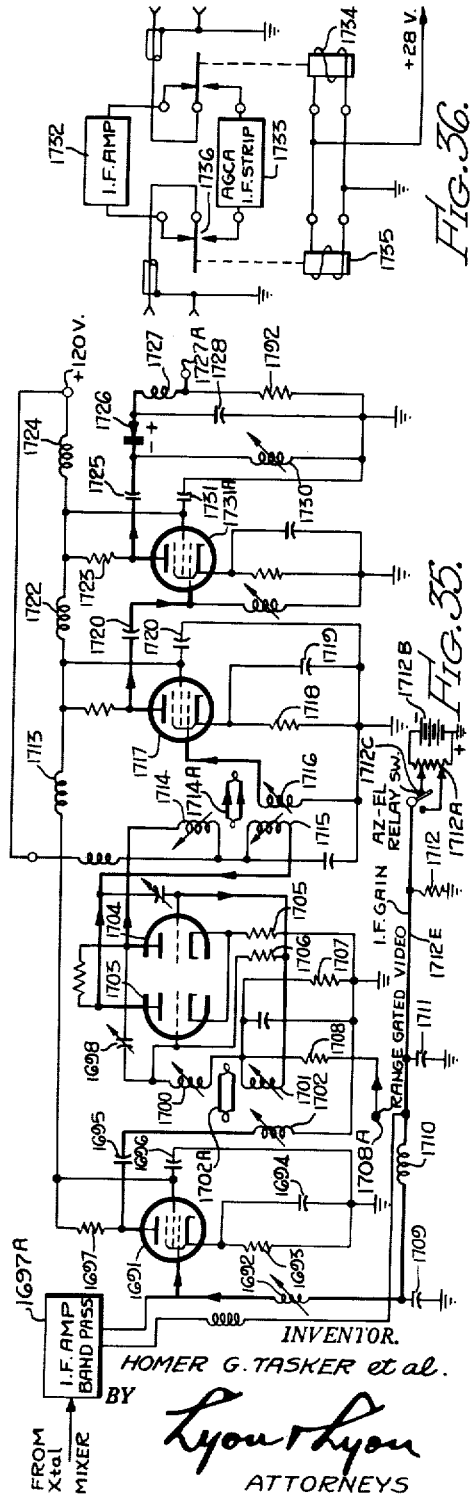
INVENTOR.
HOMER G. TASKER et al.
BY
Lyon & Lyon
ATTORNEYS

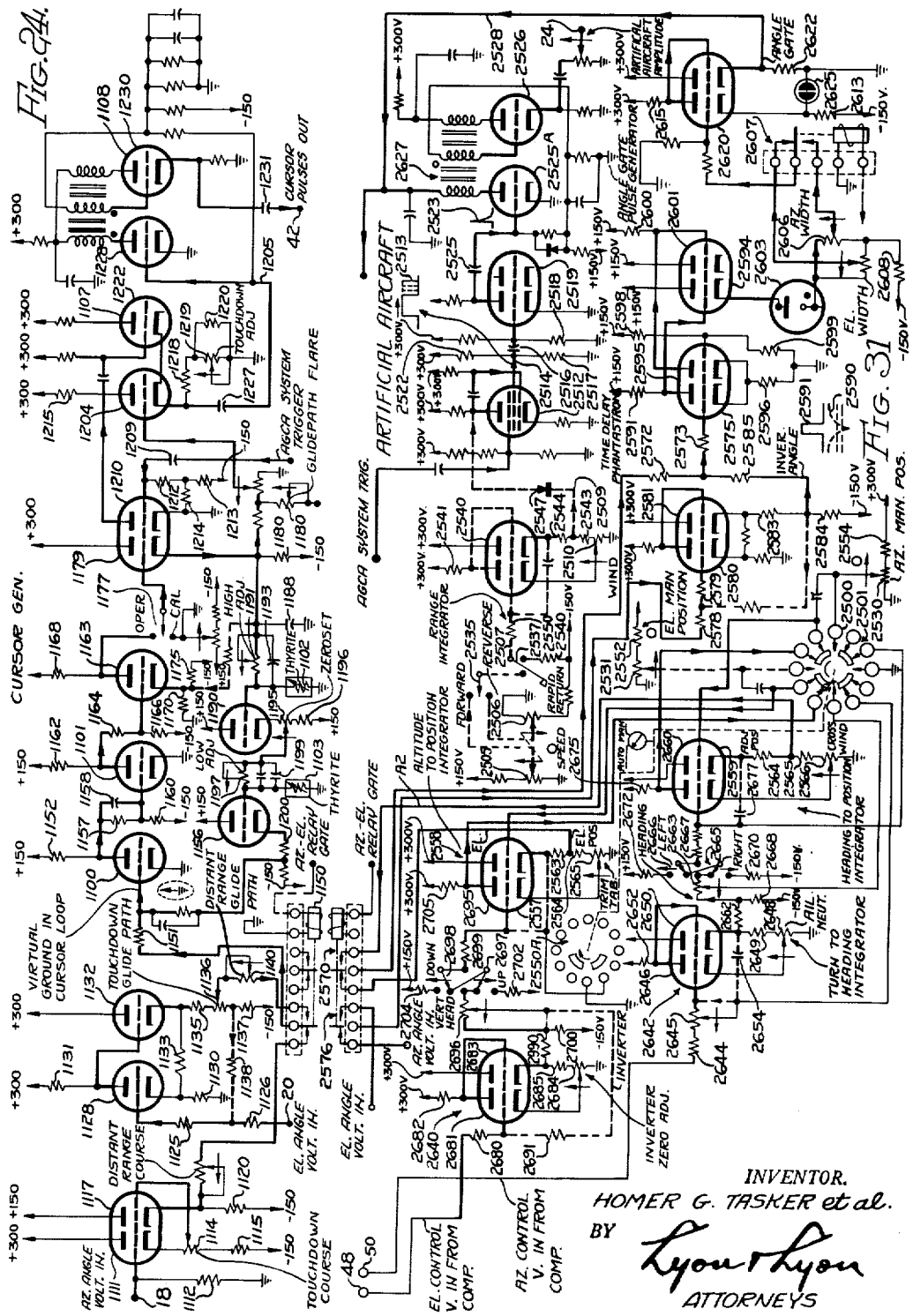

April 18, 1961  H. G. TASKER ET AL  2,980,902
AUTOMATIC GROUND CONTROLLED APPROACH SYSTEMS
Filed Dec. 15, 1953  41 Sheets-Sheet 13
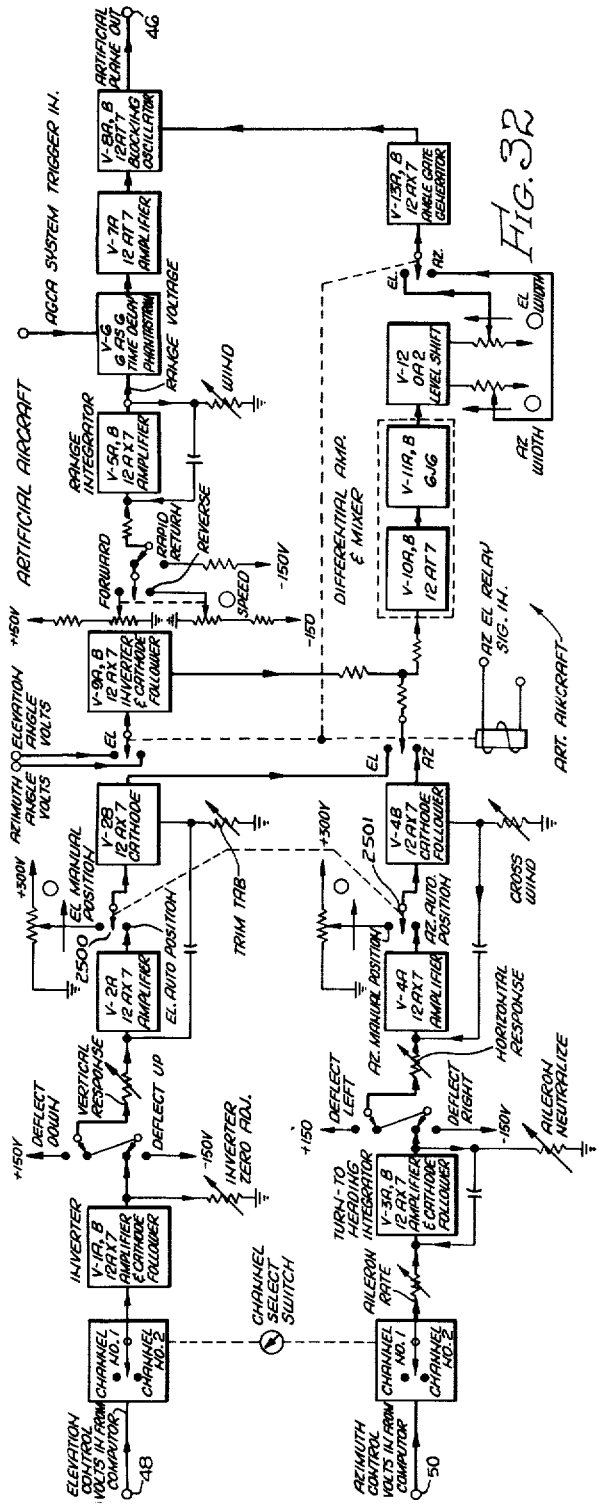
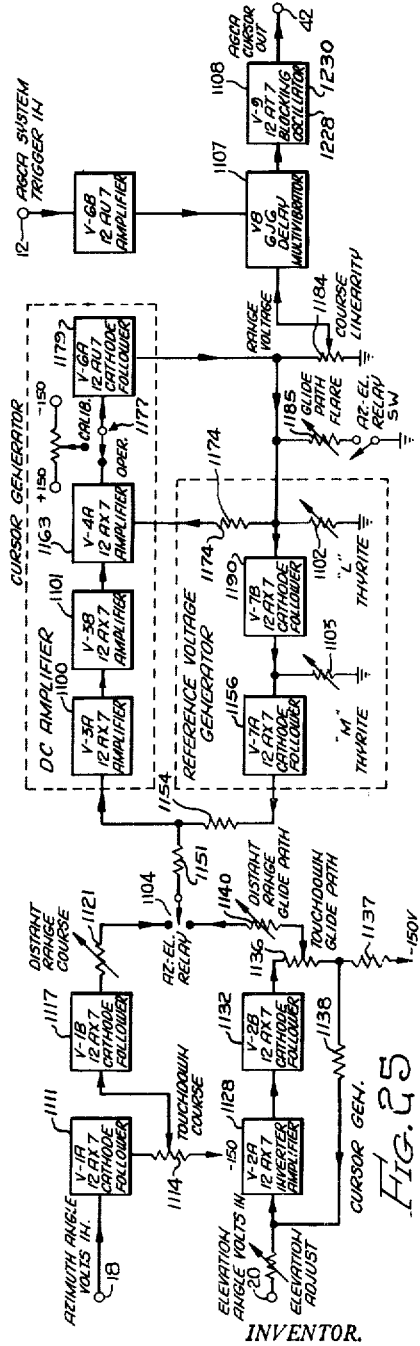
INVENTOR.
HOMER G. TASKER et al.
BY
*Lyon + Lyon*
ATTORNEYS

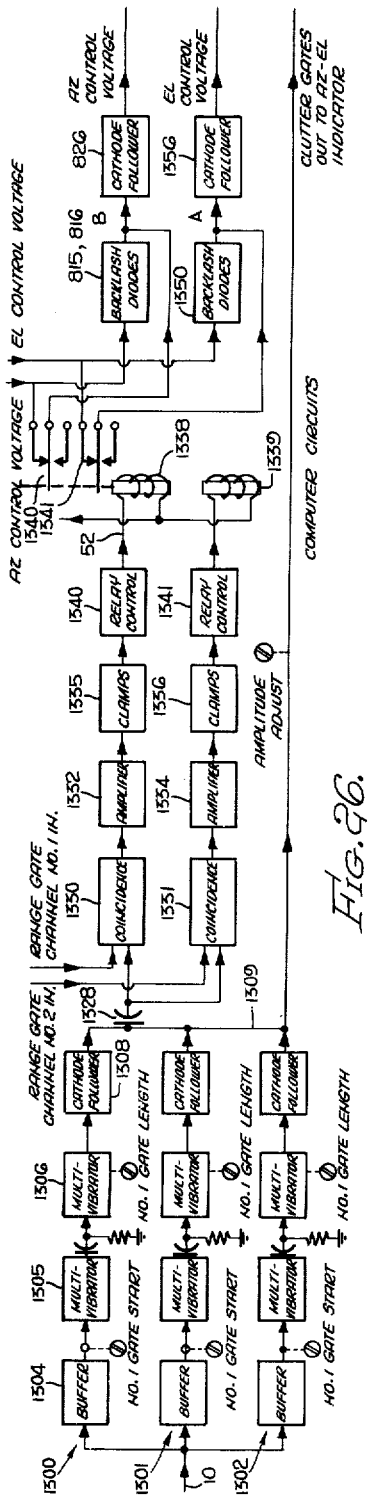
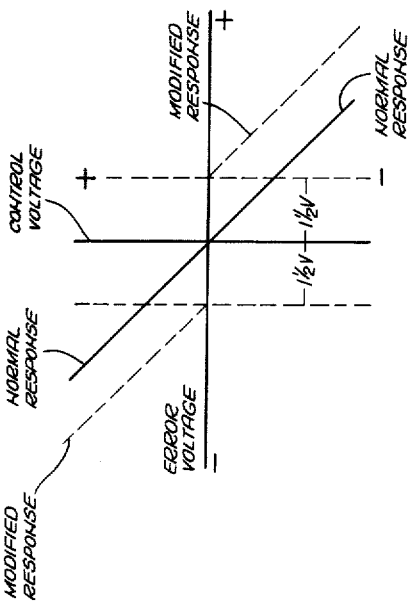
Fig. 28.
B CONTROL SIGNAL MODIFICATION
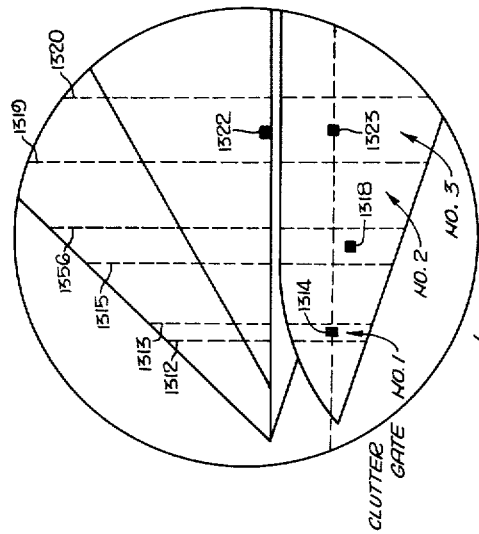
Fig. 27.
AZ-EL DISPLAY OF CLUTTER GATES
INVENTOR.
HOMER G. TASKER et al.
BY
ATTORNEYS

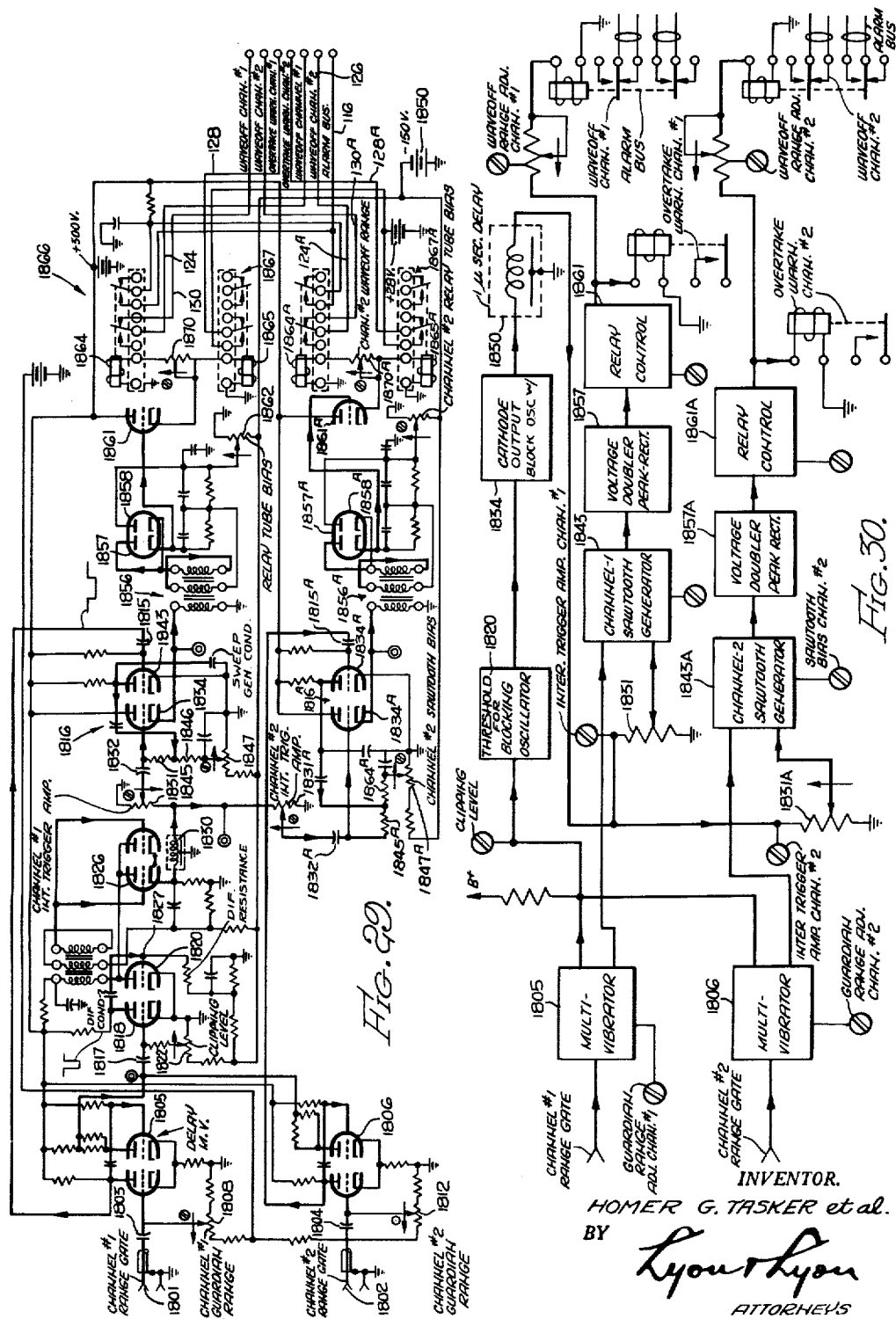

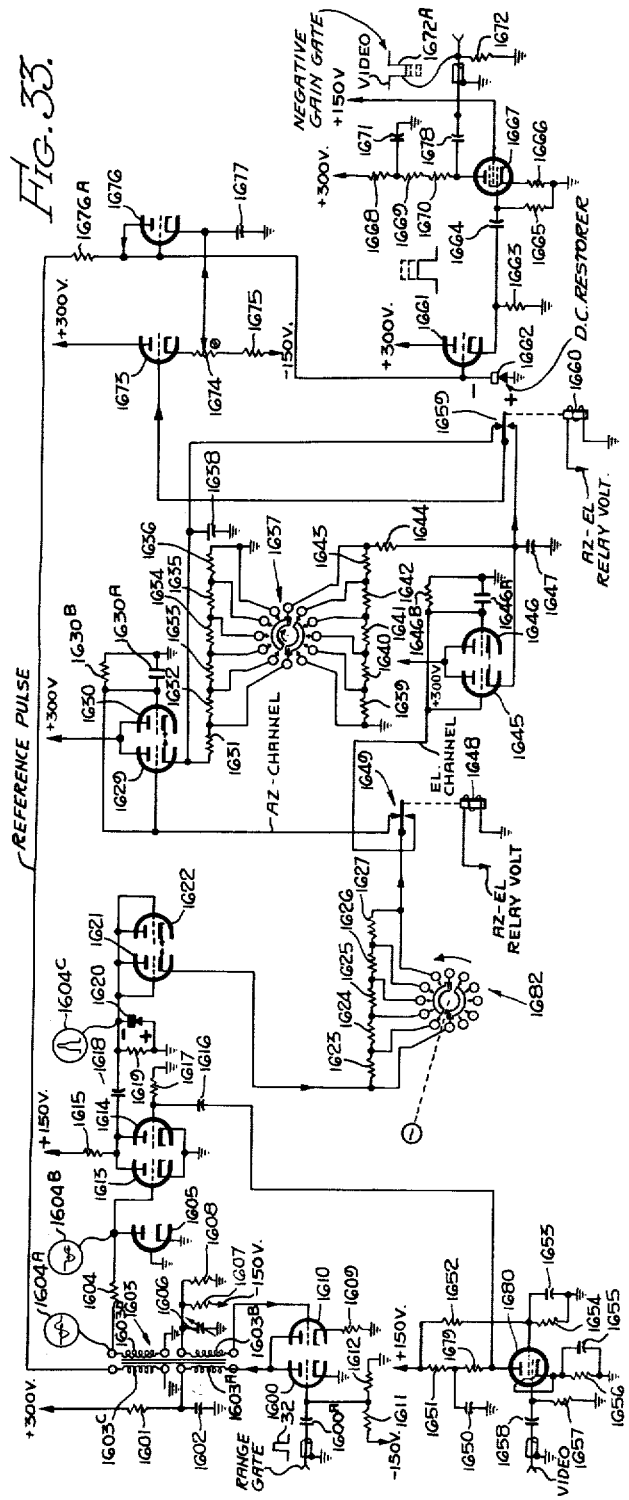
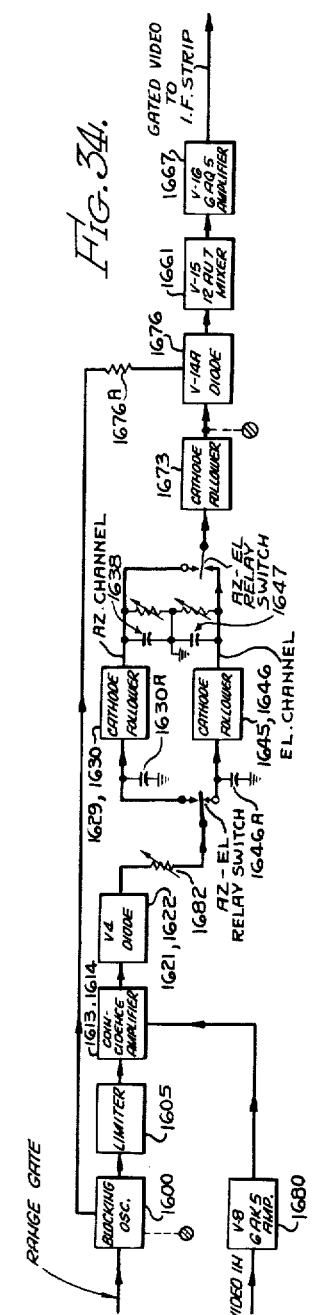

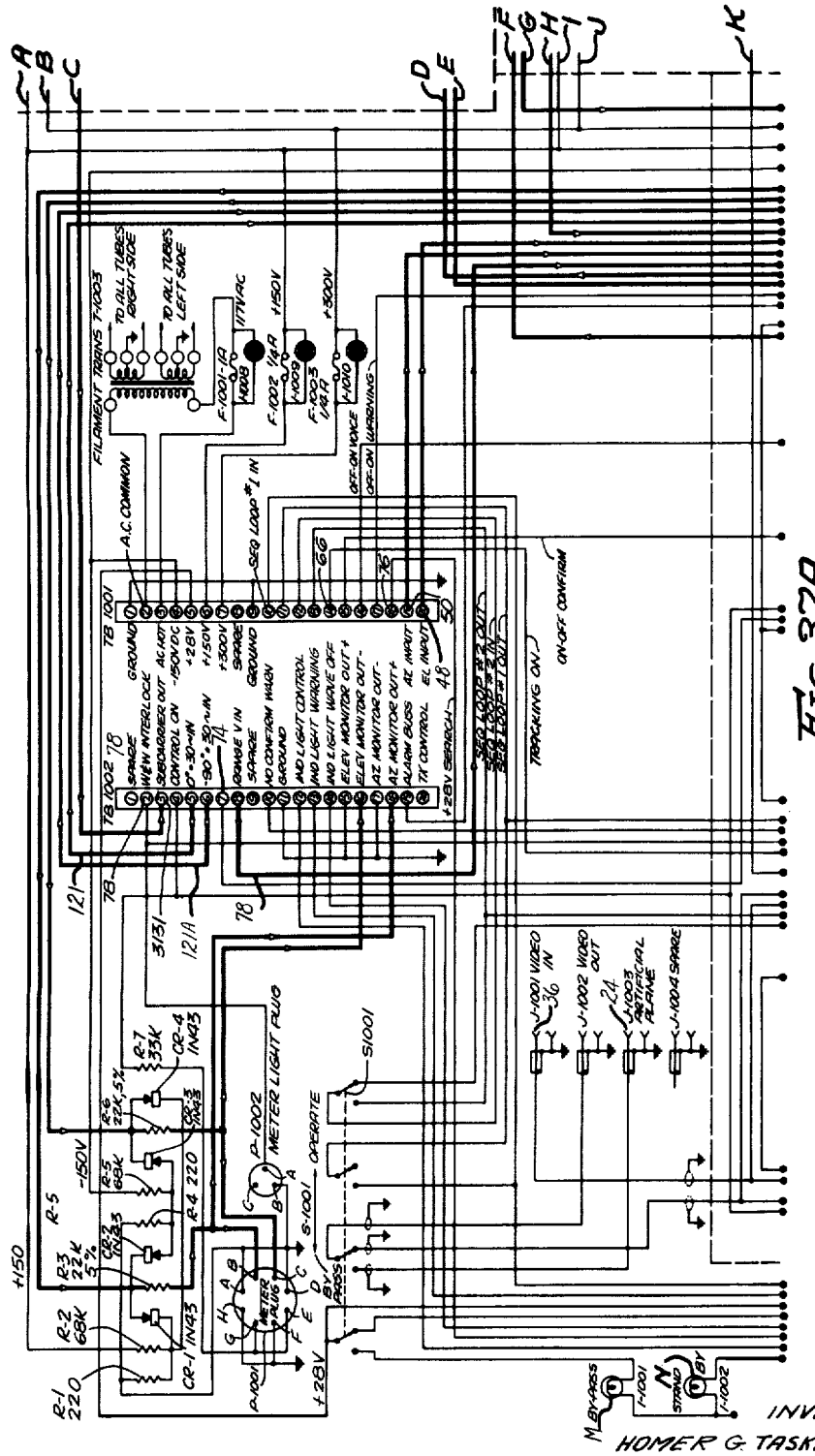

April 18, 1961

H. G. TASKER ET AL 2,980,902

AUTOMATIC GROUND CONTROLLED APPROACH SYSTEMS

Filed Dec. 15, 1953

INVENTORS
HOMER G. TASKER et al
By Lyon Lyon
ATTORNEYS

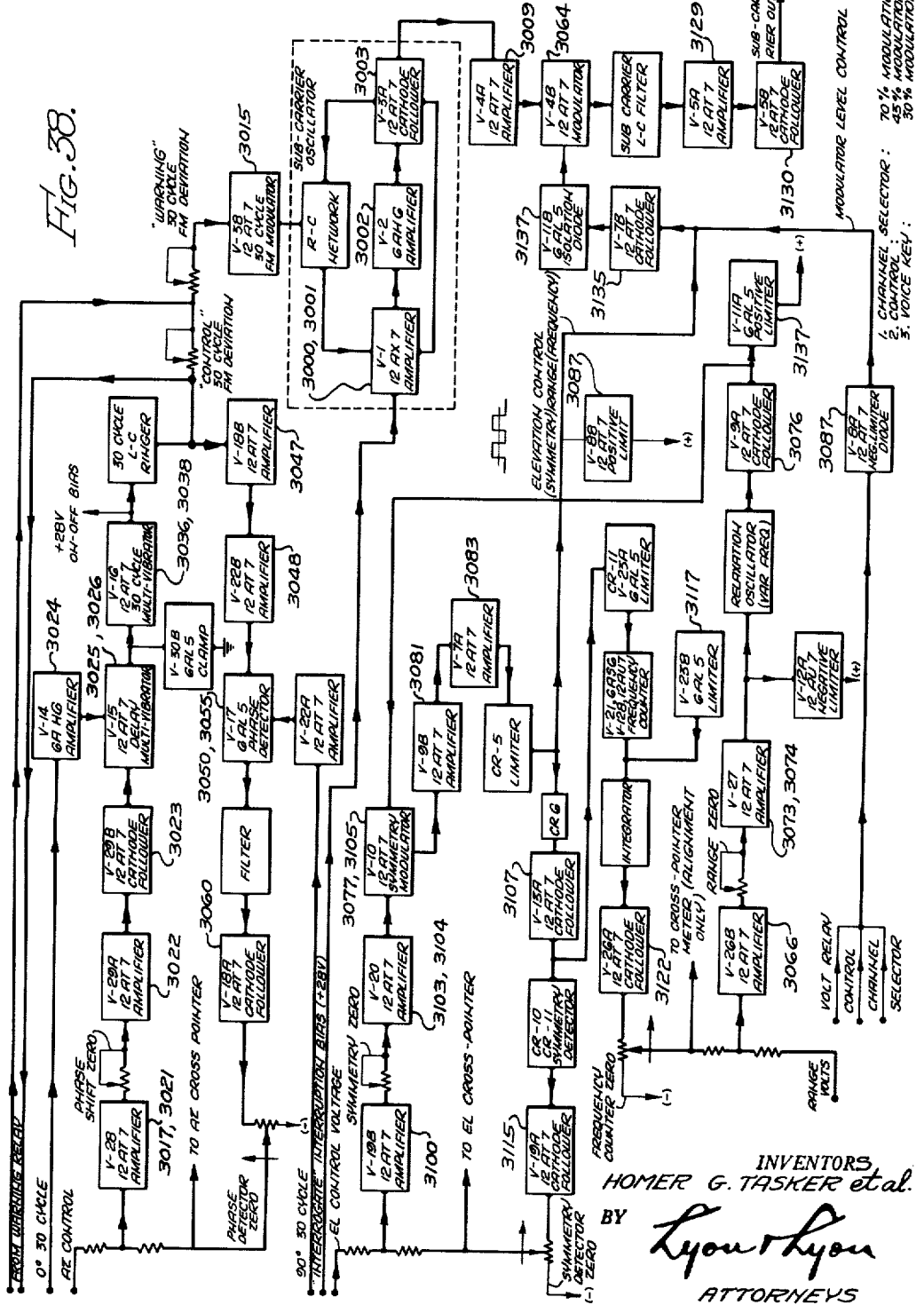

April 18, 1961  H. G. TASKER ET AL  2,980,902
AUTOMATIC GROUND CONTROLLED APPROACH SYSTEMS
Filed Dec. 15, 1953  41 Sheets-Sheet 22

NOTE: SIDEBANDS SHOWN ON ONE SIDE OF CARRIER ONLY $t_1$ = RANGE FUNCTION
$t_2 - t_3$ = ELEVATION FUNCTION
$A_1/A_2$ = VOICE RELAY AND CHANNEL SELECT $f_1 - f_2$ = WARNING AND WAVEOFF FUNCTION
30~ FM PHASE = AZIMUTH FUNCTION

INVENTORS
HOMER G. TASKER et al.
BY
Lyon & Lyon
ATTORNEYS

Fig. 41A
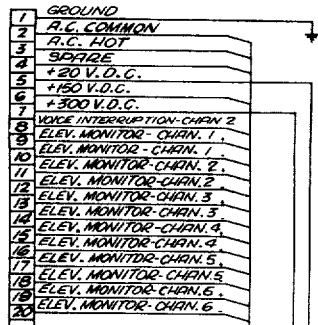
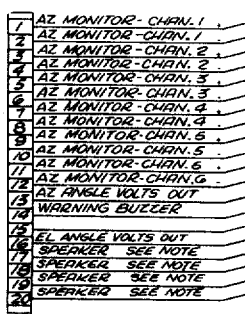
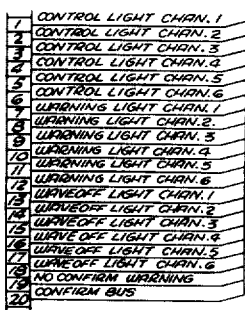
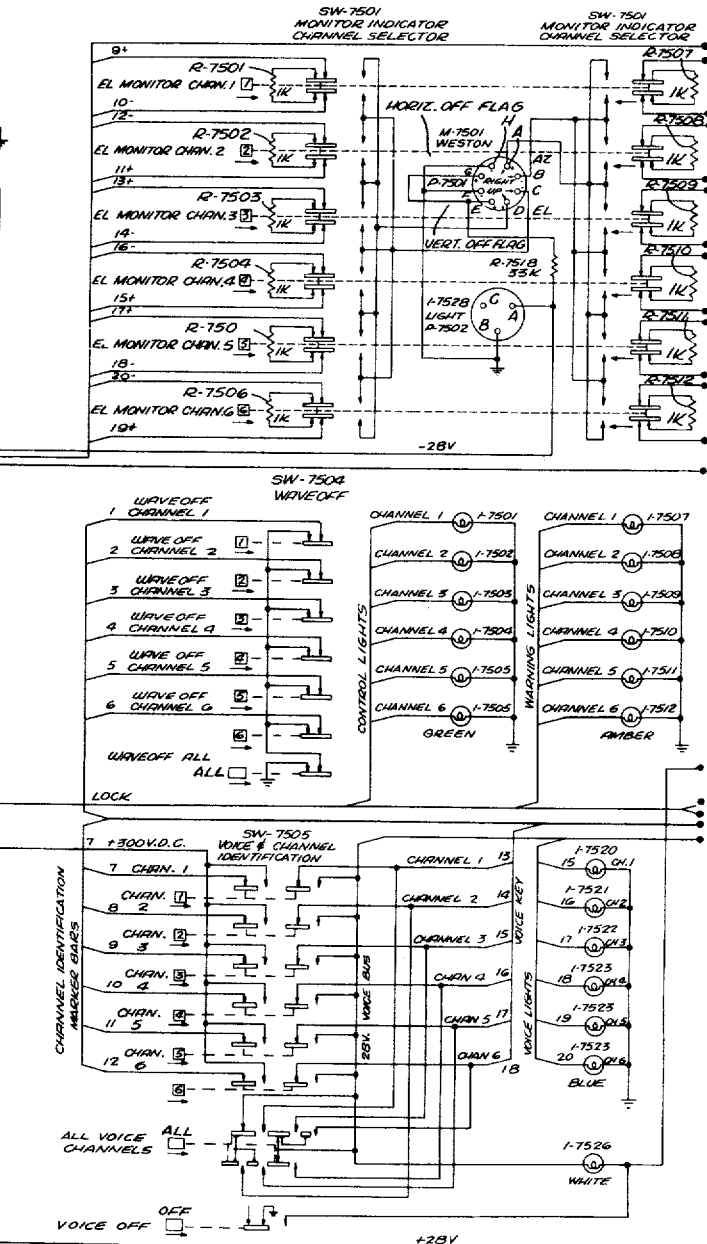

April 18, 1961 H. G. TASKER ET AL 2,980,902
AUTOMATIC GROUND CONTROLLED APPROACH SYSTEMS
Filed Dec. 15, 1953 41 Sheets-Sheet 25

INVENTORS
HOMER G. TASKER et al.
BY
Lyon & Lyon
ATTORNEYS

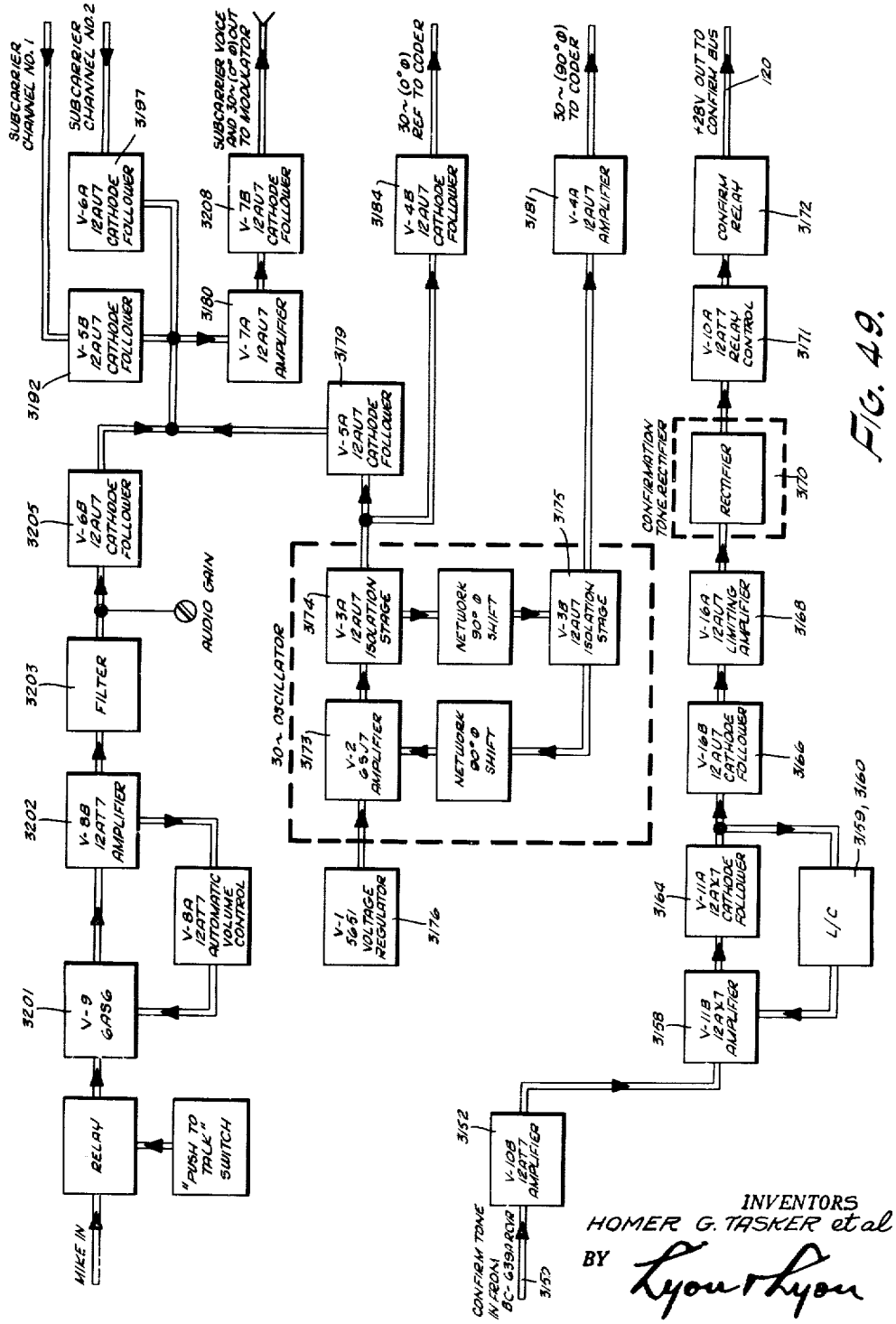

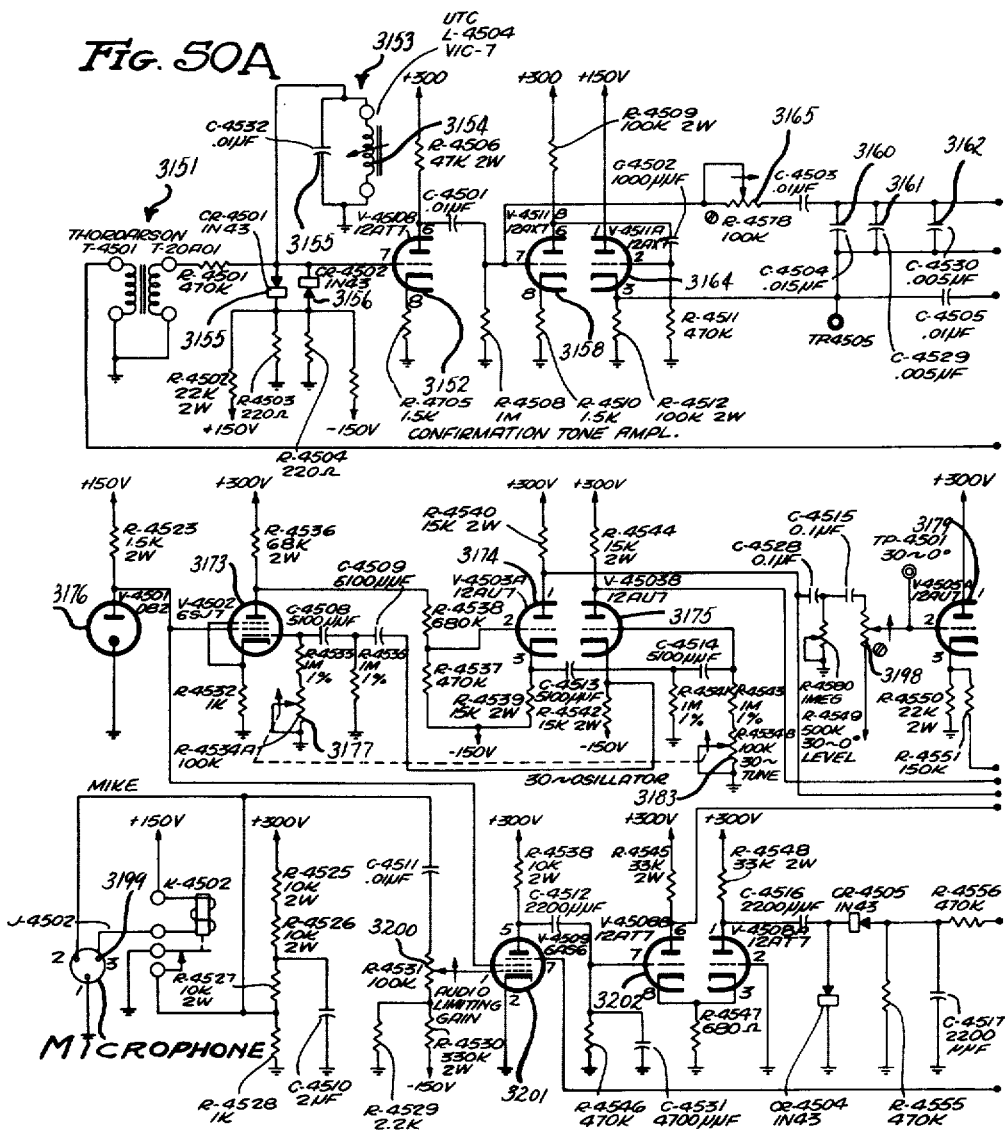

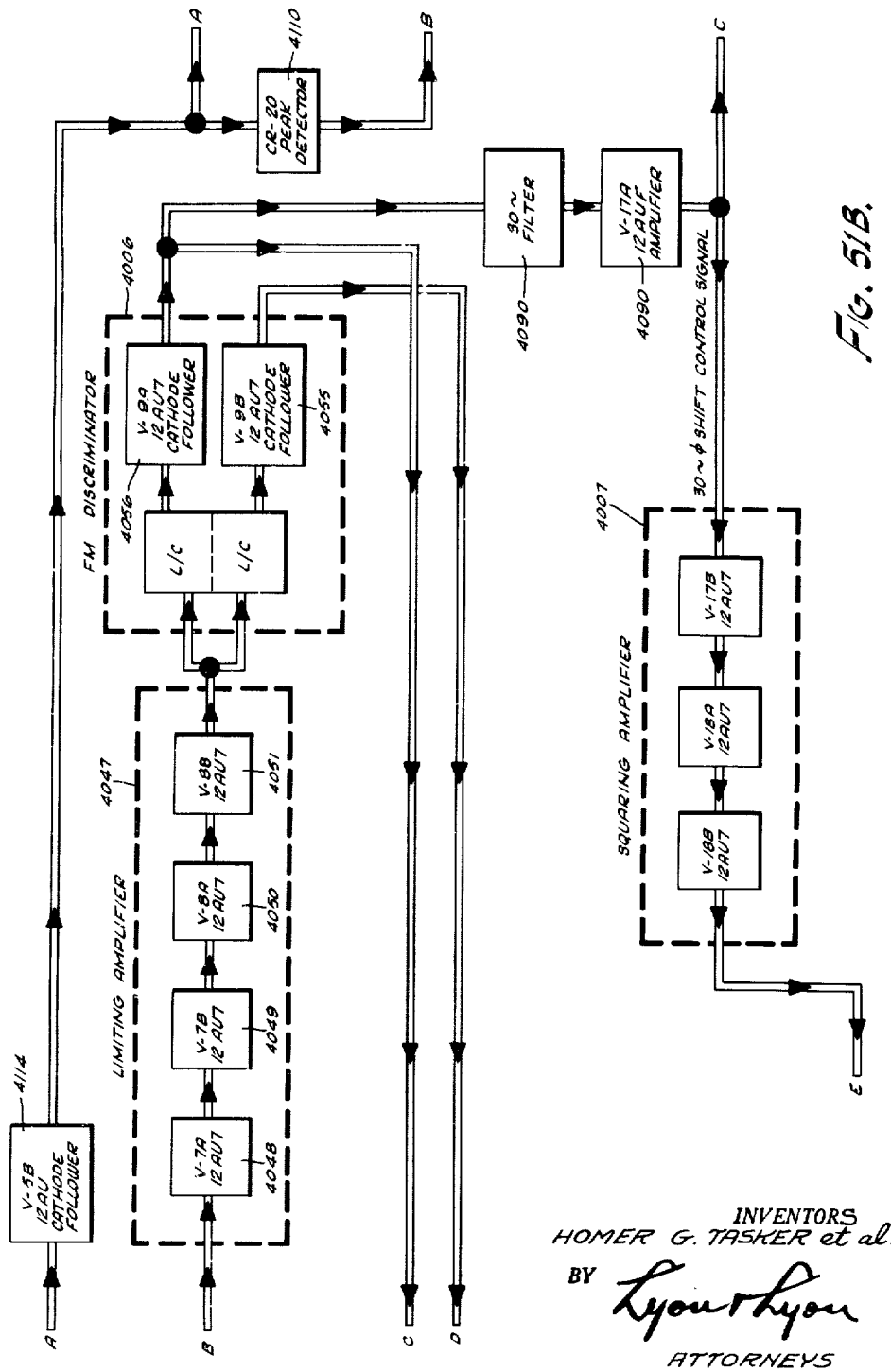

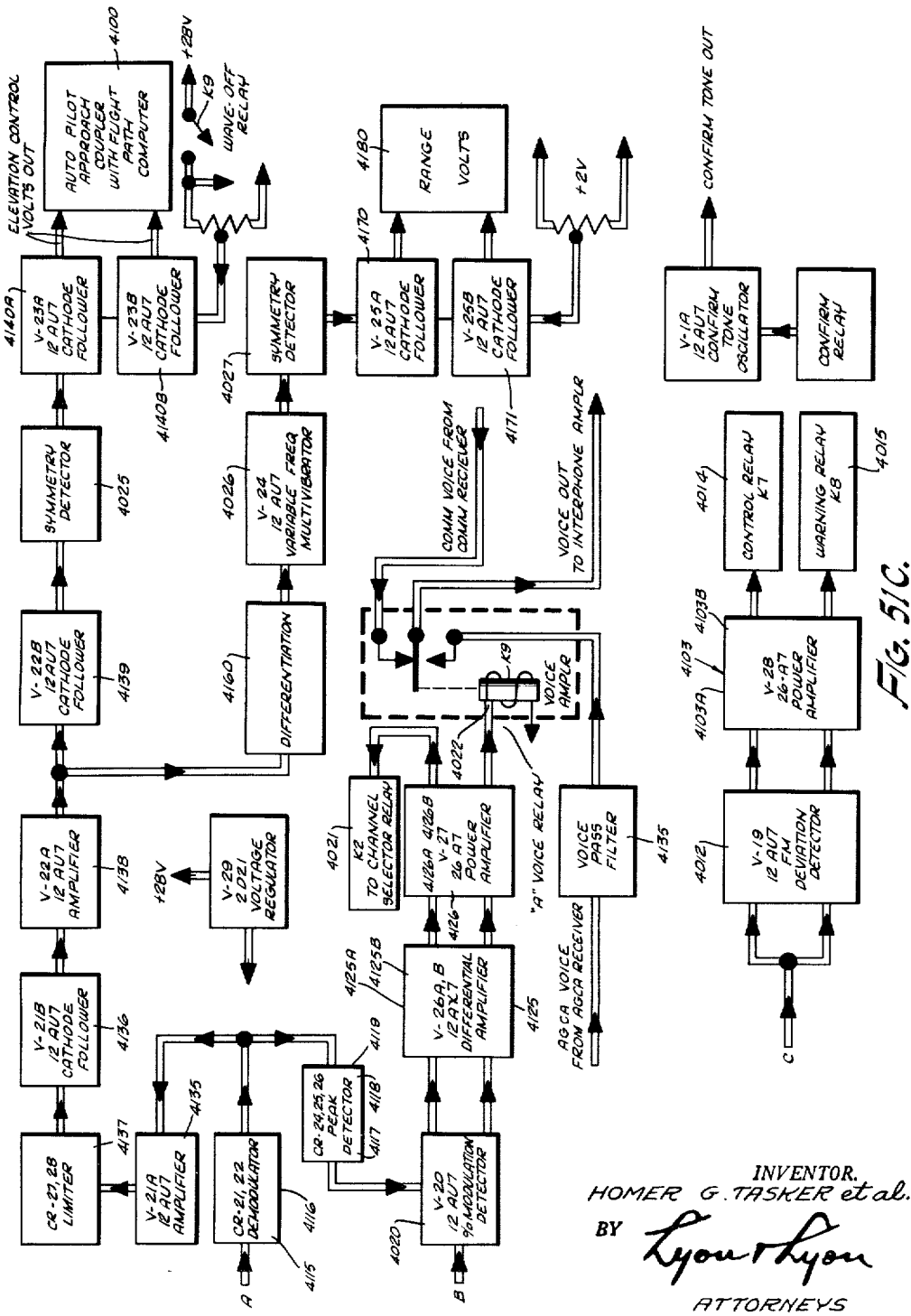

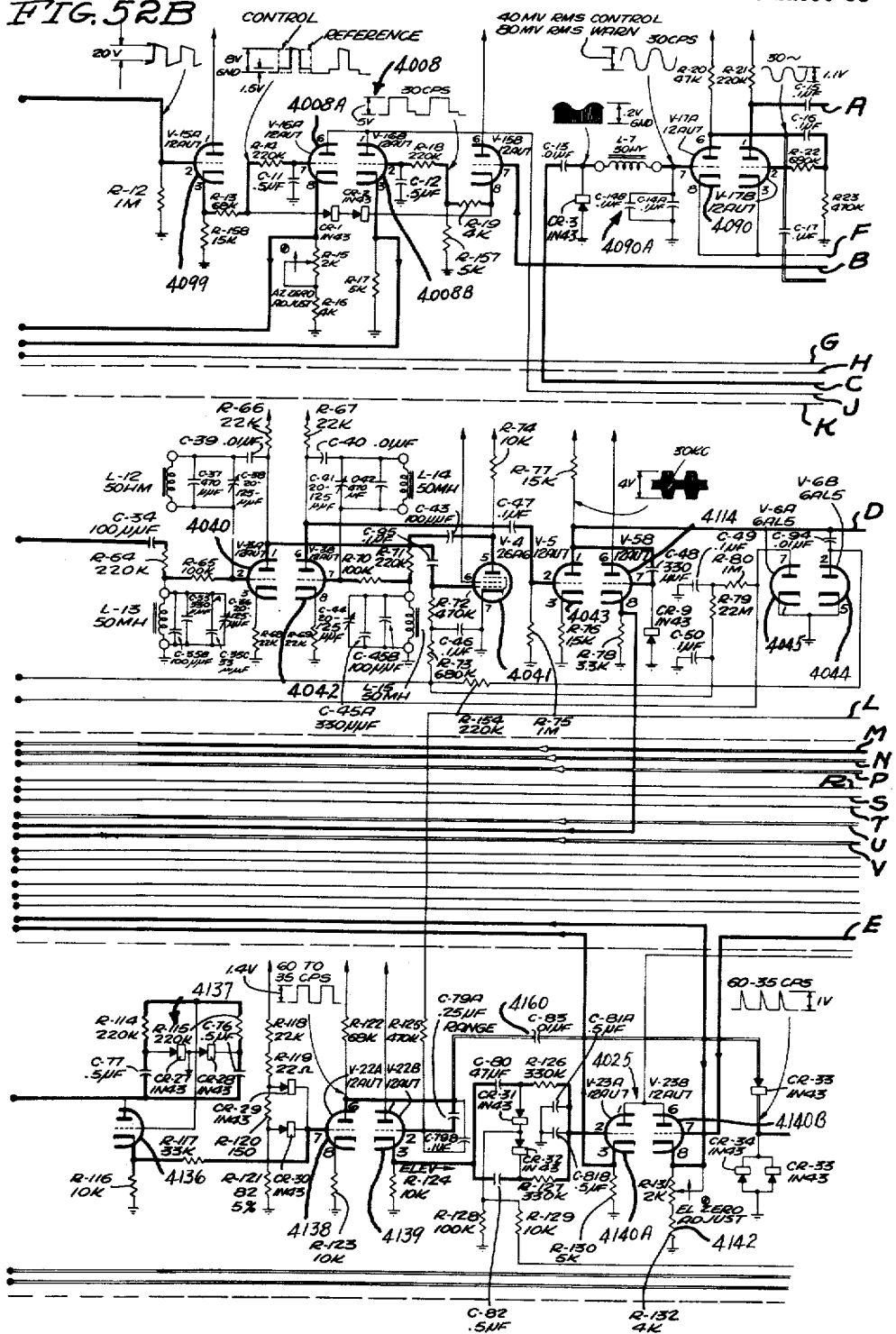

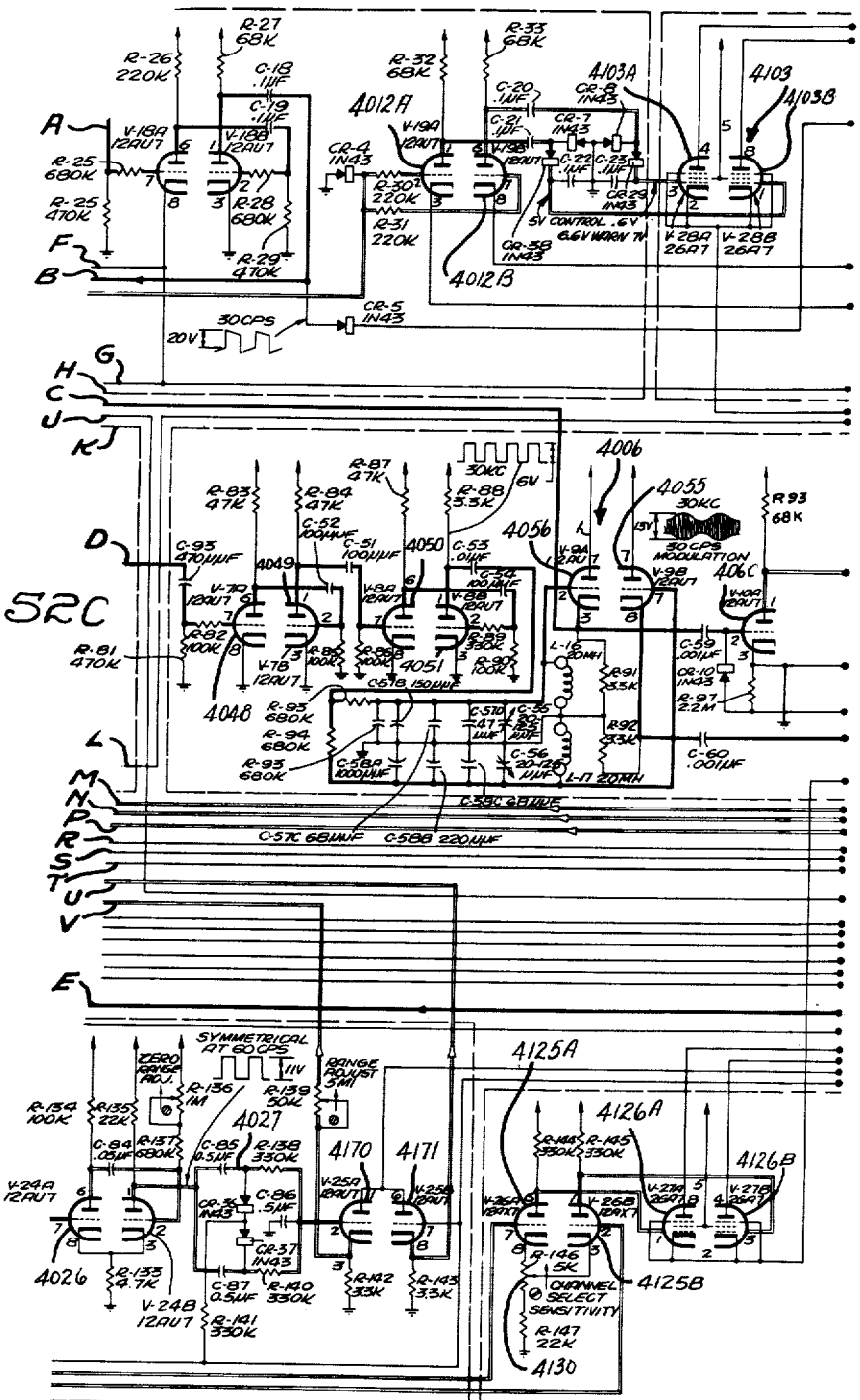

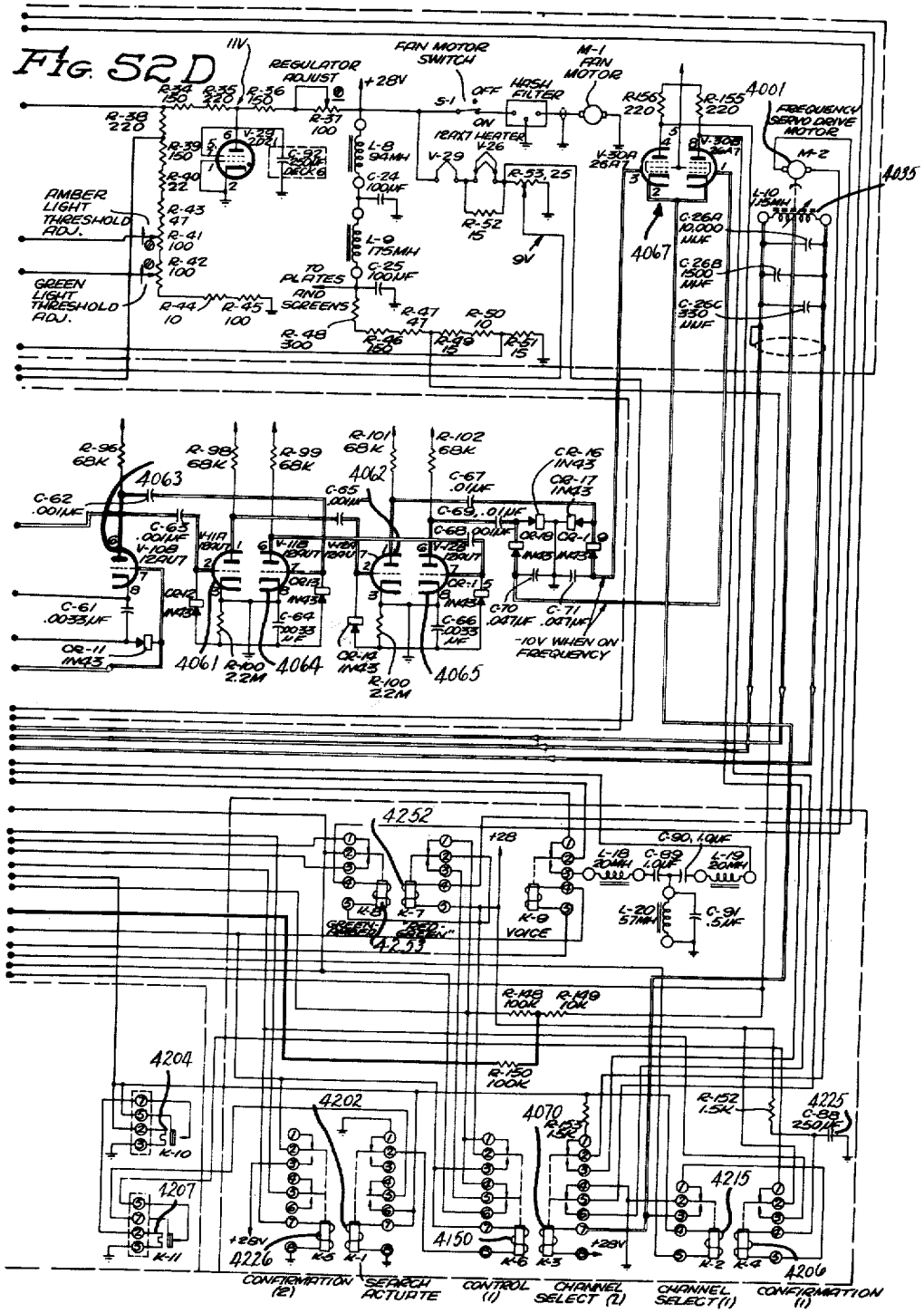

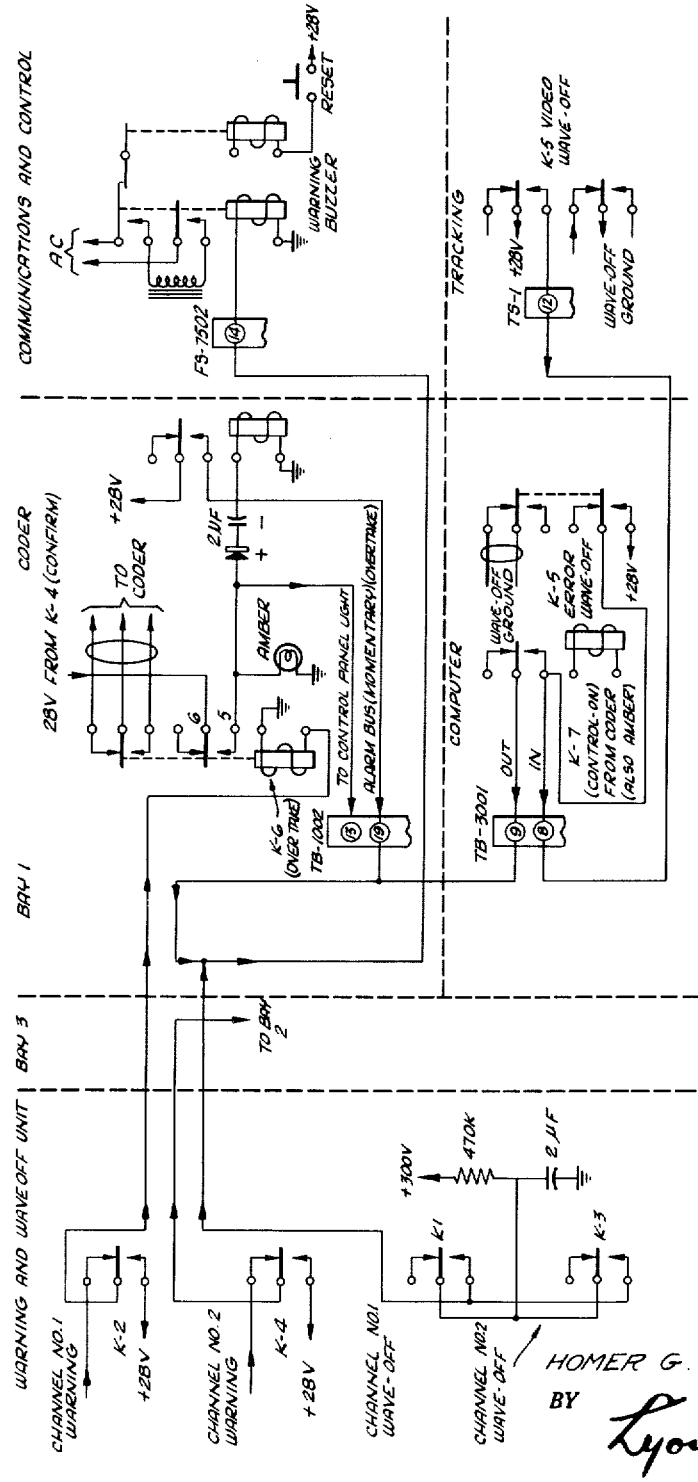

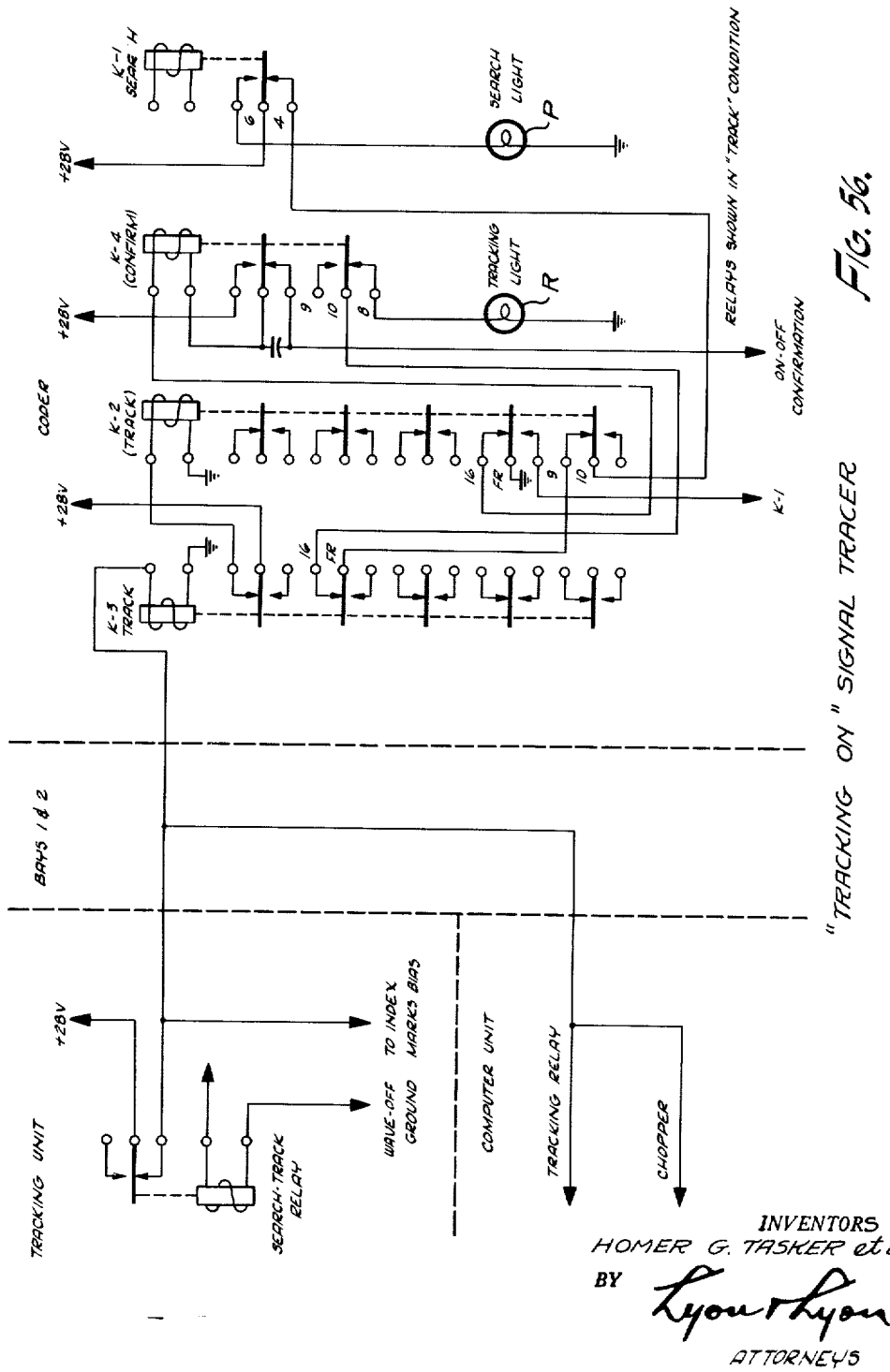

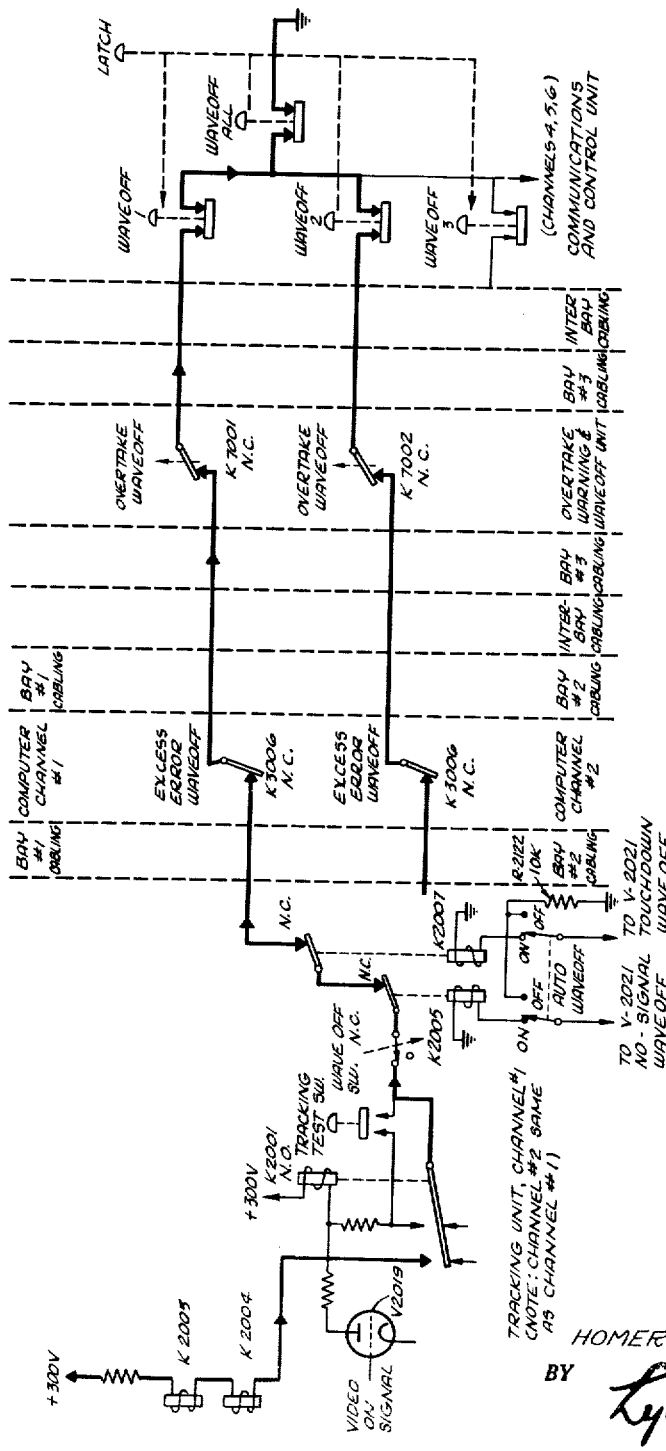

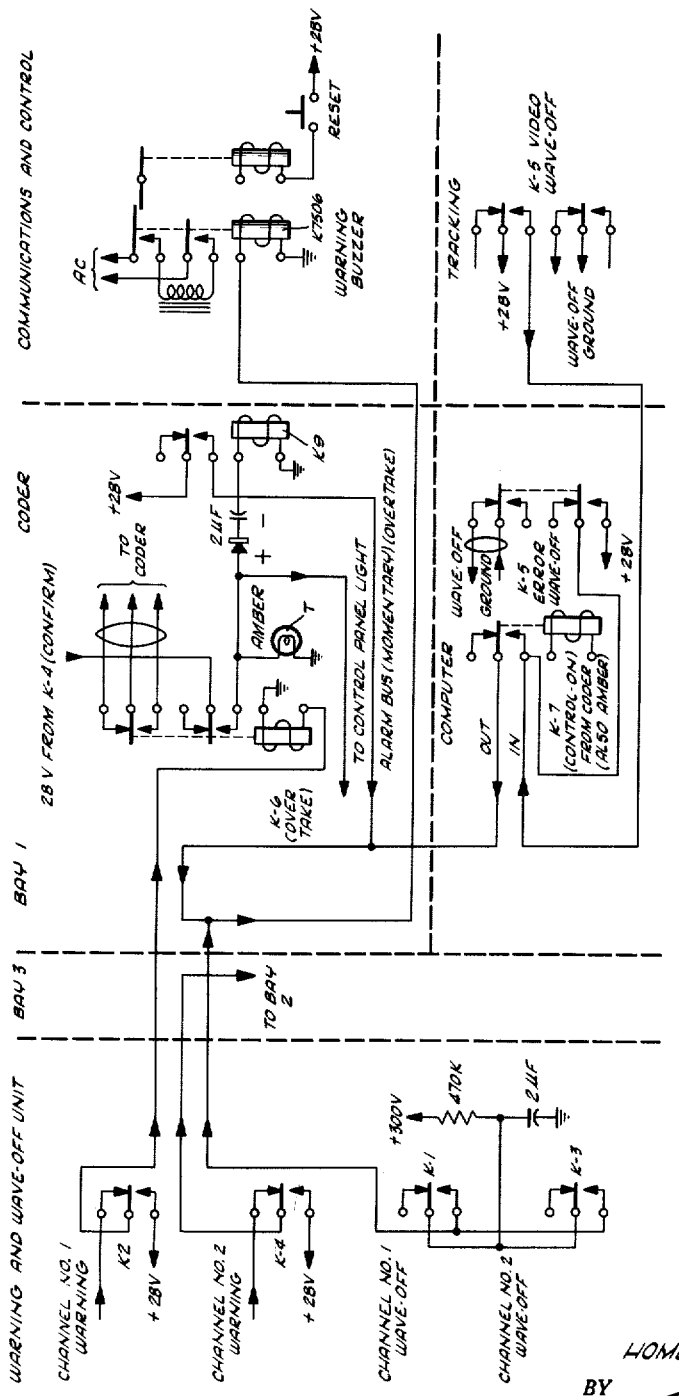

United States Patent Office

2,980,902
Patented Apr. 18, 1961

2,980,902

AUTOMATIC GROUND CONTROLLED APPROACH SYSTEMS

Homer G. Tasker, Van Nuys, Alvin Guy Van Alstyne, Los Angeles, David J. Green, Pacific Palisades, Dallas V. Franke, Redondo Beach, William T. O'Neil, La Crescenta, Raymond Cecil Dye, Los Angeles, Robert W. Landee, Santa Monica, Robert H. Cother, Fullerton, and James R. Deen, Los Angeles, Calif., and David Clement Arnold, Cedar Rapids, Iowa, assignors to Gilfillan Bros. Inc., Los Angeles, Calif., a corporation of California Filed Dec. 15, 1953, Ser. No. 398,288

9 Claims. (Cl. 343—7)

The present invention relates to an improved automatic ground controlled approach (AGCA) system in which the flight of an aircraft through an approach zone to an aircraft landing field is automatically controlled so as to cause the aircraft to fly along a predetermined course line (in the azimuth or horizontal plane) and along a predetermined glide path (in the vertical plane).

Heretofore ground controlled approach (GCA) systems have been devised and used in which prior art systems radar equipment located adjacent to the aircraft landing field is used to obtain information as to the position of the aircraft with respect to a predetermined course line (in the horizontal plane) and a predetermined glidepath (in the elevation or vertical plane), and such information is conveyed to the pilot of the aircraft via oral communication and the pilot uses such information to control the orientation of his aircraft. In the present system, instead of the pilot being "talked down," as is commonly referred to in the GCA system, control signals are developed and transmitted from the ground based radar equipment to the approach coupler of the autopilot of the aircraft, such control signals being such that the aircraft is caused or tends to fly on such course line and glidepath without manual effort on the part of the pilot except that the pilot still controls the speed at which the aircraft flies. However, in controlling the flight of two aircraft entering the approach zone simultaneously, the present AGCA system is provided with a so-called "overtake warning and wave off" means whereby the pilot of the second aircraft is warned in the event that his aircraft is too close to a preceding aircraft; and in the event that this warning is not heeded and the aircraft approaches still closer to the preceding aircraft, a wave off signal is transmitted to the aircraft to cause it to be released from ground control and to fly upwards. Other safety features are provided in this system as described hereinafter.

For accomplishing these general purposes, an approaching aircraft is tracked in range, i.e., range tracked, to develop an electrical characteristic representative of the range of the aircraft from the ground based radar equipment. The range tracking equipment for this purpose is such that a plurality of aircraft may be tracked simultaneously with associated interlocking means arranged so that two of the range tracking units are incapable of range tracking the same aircraft simultaneously. A characteristic feature of the present AGCA system is that such range tracking of a plurality of aircraft occurs while an antenna beam is caused to scan through the approach zone, i.e., the antenna beam is not servoed to lock onto any one particular aircraft but continues to scan the approach zone at a uniform rate regardless of the number of aircraft in such approach zone. This feature is commonly referred to as "tracking while scanning."

In general, the AGCA system, like the GCA system, incorporates two antenna beams, i.e., a so-called azimuth antenna beam and an elevation antenna beam, which scan, on a time sharing basis, the approach zone in a horizontal plane and a vertical plane respectively. These two antenna beams are sharply directed beams, especially "tailored" for that purpose. These antenna beams are preferably produced using a variable wave guide type of antenna, and a pair of voltages is derived, i.e., a so-called azimuth antenna beam angle voltage and an elevation antenna beam angle voltage, the instantaneous magnitudes of which are representative of the positions of the azimuth and elevation antenna beams in space.

Using the aforementioned three voltages, i.e., the electrical characteristic representative of the range of the tracked aircraft, the azimuth antenna beam angle voltage, and the elevation antenna beam angle voltage, a predetermined course line and a predetermined glidepath are automatically computed by the AGCA system; and deviations in the positions of the aircraft from such course line and glidepath, as determined from the returning video echo signals, are converted into control signals, such control signals being transmitted to the aircraft to control the flight of the same in both the horizontal and vertical planes, i.e., with respect to said course line and with respect to said glidepath.

Since tracking occurs while an antenna beam is scanning, as mentioned previously, a servo loop with memory is used in range tracking an aircraft; and likewise, servo loops having memory are used in developing the aforementioned control signals.

The present AGCA system is adaptable for use with autopilots using either ground rate or air rate control signals.

Also, the present AGCA system includes the feature of so-called "clutter gating," the use of which results in minimizing, in general, the intensity of a control signal which otherwise would be transmitted to an aircraft while flying through a clutter area.

As mentioned previously, an aircraft is automatically tracked, and, for that purpose, the AGCA system incorporates means whereby an aircraft is automatically "acquired." Thus, the AGCA equipment, in general, combines the functions of (1) aircraft acquisition, (2) automatic tracking, (3) error computation, and (4) the transmission of control signals to the aircraft. Also as mentioned previously, the general purpose of the equipment is the provision of an automatic ground controlled approach system for the guidance of two aircraft during their approach to a given aircraft landing field, and, for this general purpose, certain portions of the equipment are duplicated with associated means for automatically placing different units in operation depending on the number of aircraft in the approach zone. In the process of acquiring an aircraft, a conventional plan position indicator (PPI) is initially used, such PPI equipment scanning outwardly from the radar installation with a 360° rotation. The azimuth antenna of the precision section of the AGCA system, as described herein, however, scans a fixed horizontal angle of 20° and is so placed as to include the approach course or zone to the particular airfield runway. Vertical scan produced by the elevation antenna is from −1° to +6°. An approaching aircraft is first located by the search radar, i.e., PPI, and is directed by radio communication to the correct position for entry along a predetermined course line (horizontal plane) and ideal glidepath (vertical plane). The final approach along such course line and glidepath is indicated upon the cathode ray tube display in both azimuth and elevation, and the actual course of the aircraft may be visually compared with that of an ideal approach. The range of automatically controlled approach, or the approach zone, is from approximately 8 miles from the given landing field to the point of release from the system, known as "touchdown." This point of release or touchdown is at an altitude of approximately 50 feet above the given landing strip and at such a position and altitude that the pilot may assume control for the actual landing operation during the last few seconds of the landing.

Prior to the establishment of flight control of an approaching aircraft, communication between the ground based AGCA installation and the pilot of the incoming aircraft may be effected via conventional radio link in the region of 140 megacycles.

Upon the establishment of control (confirmation to the ground by the aircraft as described hereinafter), communication may also be carried out between the ground operator and the aircraft pilot by means of the AGCA semiprivate voice line. This communication is effected by the modulation of the effective AGCA carrier transmitted to the aircraft by the AGCA transmitter.

In general, an aircraft is acquired and controlled in the following manner: Upon initial energization of the ground based radar equipment, and in the absence of an approaching aircraft, the radar equipment "searches." Coincidence of a radar echo with a slow search sweep voltage generated within the AGCA synchronizer notifies the system of an approaching aircraft. In such case, the tracking unit switches from a "search" to a "track" function at this time, and displays range and speed information. At the same time, the AGCA transmitter operating in the region of 140 megacycles is "turned on" and a subcarrier, containing a "channel select" key is transmitted to the approaching aircraft. At a given range, or upon directions from the ground via radio transmission, the pilot of the approaching aircraft actuates the airborne decoder, i.e., the so-called signal data converter, by pressing a push-button type of switch, whereupon the search drive motor of the airborne decoder is started and the output of the AGCA airborne receiver is searched for an AGCA subcarrier. At intervals of 25 seconds, the ground based AGCA transmitter is automatically interrupted for a one second period. This interruption constitutes "interrogation." If, upon the interrogation, the air-borne decoder has located the transmitter subcarrier, the signal interruption causes the decoder to send a 4500-cycle per second "confirmation" signal to the ground via the airborne transmitter also operating in a region of 140 megacycles. This confirmation signal is received by the ground based AGCA receiver and is used to actuate relays which serve to apply a +28 volt "control" signal to a common bus of the ground equipment. This control signal serves to apply a "tracking on" signal, developed in the tracking unit, to a computer unit so that the computer unit passes on to the coder unit information consisting of the azimuth and elevation control signals of the tracked aircraft and, in addition, the instantaneous range of the aircraft. This information is used to modulate the sub-carrier transmitted to the aircraft, providing the autopilot with correction signals for "on course" approach, and providing the pilot with visually displayed, instantaneous range touchdown information.

For purposes of transmitting various information from the ground to the pilot, one of a plurality of available subcarriers is modulated in different manners. The subcarrier is transmitted on the AGCA carrier, such carrier being transmitted in the region of 109 megacycles and including a 30-cycle reference tone, a 3800-cycle voice band, and 6 positions for subcarriers, equally spaced from 5 to 15 kilocycles upon the basic carrier.

The aforementioned 30-cycle reference tone originates in the AGCA transmitter mixer and is used as a reference signal by all airborne decoders entering AGCA control. This reference tone serves as a comparison for a 30-cycle phase-shifted tone, included in all of the subcarriers. The aforementioned voice band, from 300 cycles to approximately 3800 cycles, is included upon the basic carrier. This band is used to pass voice frequencies over the AGCA semiprivate voice line. Through a holding relay in the AGCA coder, voice communication between the ground installation and the aircraft's pilot is automatically available for a period of one minute after a "wave off" signal (release of ground control) is transmitted from the ground; or, communication may be held for an indefinite period by the ground operator upon acquisition of a control panel switch.

The aforementioned subcarriers, 6 in number and equally spaced, are included in the modulation of the basic carrier at frequencies of from 5 to 15 kilocycles above and below the basic frequency. The control functions modulating each subcarrier and the methods of modulation are as follows: (1) Azimuth control of the aircraft is effected upon frequency modulation by a 30-cycle phase-shifted signal. The phase is compared to that of the aforementioned 30-cycle reference tone. (2) Elevation control of the aircraft is effected upon amplitude modulation by symmetry variation of a square wave. (3) Range information is effected upon amplitude modulation by frequency variation of the aforementioned square wave. (4) The so-called voice relay actuation is accomplished by amplitude modulation using 30% modulation of the aforementioned square wave. (5) Channel select information is obtained by amplitude modulation using 70% modulation of the aforementioned square wave. (6) A warning signal is transmitted to the aircraft by frequency modulation using variable deviation of 30-cycle signals and in this respect, a deviation of 180 cycles constitutes a warning signal. (7) A wave off signal to the aircraft constitutes an absence of 30-cycle modulation. These seven types of control signals are described in more detail hereinafter.

Also, as mentioned previously, the AGCA system, being capable of tracking a plurality of aircraft simultaneously, is provided with automatic channel sequencing. While the AGCA equipment is specifically designed for controlling as many as six aircraft, for illustrative purposes only two control channels are referred to herein, i.e., Control Channel No. 1 and Control Channel No. 2. The channel sequencing relays are located in the coder units described in detail hereinafter.

Upon actuation, the AGCA equipment in Channel No. 1 automatically goes into a "search" condition, awaiting, as mentioned previously, the incidence of an aircraft's radar echo within the glidepath approach area. The incidence of such an echo causes the equipment to change from a search to a track condition and also institutes a "ground-air" data transmission link. While tracking the aircraft, the AGCA system displays the instantaneous range and speed of the aircraft being tracked and transmits signals of interrogation to the aircraft. Confirmation of the ground-air data transmission link by the incoming aircraft causes the equipment to change from the "track" to the "control" function. Upon switch to control, correction signals are sent to the aircraft by Control Channel No. 1, and Control Channel No. 2 is automatically switched from a "standby" condition to a "search" condition.

The AGCA system is provided with certain safety features which are now described briefly. The first of these features involves so-called "control with warning." During the final approach to the landing field, either of two AGCA safety features may be brought into operation. The first of these, "control with warning," results when the separation between any two tracks aircraft falls below a minimum preset distance. This control with warning signal may be observed visually by warning lights at the ground equipment and is also transmitted to the pilot of the overtaking aircraft.

A second safety feature, that of "wave off," may be initiated through the failure of an aircraft either (1) to respond to AGA control signals, or (2) by an excessive "overtake" condition. This error wave off signal which is transmitted to the aircraft releases the autopilot from AGCA control and transmits a maximum "fly up" signal to the aircraft. Briefly, the aforementioned control with warning and overtake wave off signals are developed in the so-called overtake warning and wave off unit, while the aforementioned wave off signal initiated through the failure of an aircraft to respond to AGCA control signals is developed in the so-called computer unit. The circuitry for this purpose in the computer unit measures the amount of position error, and the rate at which correction signals issued by the ground equipment are effective in correcting the original flight error. An error exceeding a preset value for a predetermined time results in the origination of the aforementioned wave off signal and the consequent cessation of automatic ground controlled flight. The condition of wave off is displayed at both the ground and airborne installations by suitable visual signals. It is observed that this excess error wave off circuitry in the computer unit is activated at the time a controlled aircraft reaches a point 3 miles from touchdown by the so-called "3-mile pick off" signal developed in the tracking unit. This pick off signal constitutes an enabling voltage applied to the anodes of certain tubes in the computer unit.

In a normal approach at the end of controlled flight, i.e., near the touchdown point, an automatic wave off signal is transmitted to the aircraft, indicating the return of flight control to the pilot for the final landing operation. One minute after the transmission of a wave off signal, the control channel automatically returns to a "standby" condition and re-enters the AGCA channel sequence cycling as indicated above.

The equipment identified as that of Control Channel No. 1 consists of a so-called AGCA coder and sequencing unit, an AGCA tracking unit, an AGCA computer unit, and an AGCA power supply. The equipment identified as that of Control Channel No. 2 is identical in circuitry and physical arrangement to that of Control Channel No. 1. Both Control Channel No. 1 and Control Channel No. 2 have associated therewith certain so-called central components. These central components include the AGCA overtake warning and wave off unit, the AGCA synchronizer, the AGCA gating central unit, the AGCA power supply, the so-called AGCA artificial aircraft unit and cursor generator, the AGCA transmitter mixer, and the AGCA receiver.

In producing an automatic control, the video echoes from aircraft are standardized, i.e., the video pulses are made of uniform amplitude and duration. Also, the gain of the radar receiver is controlled in a unique manner using what is termed as range gated automatic gain control.

The circuitry of the range tacking units and computer units may be reformed, upon a switching operation, so that the course line and glidepath, which are electronically computed, may be observed visually on a cathode ray tube for test and alignment purposes and for comparison with a course line and glidepath, developed in a unique manner by the cursor generator. Also for test and alignment purposes, the so-called artificial aircraft unit develops control signals for simulating the flight of aircraft either under non-controlled or controlled conditions.

It is therefore an object of the present invention to provide an automatic ground controlled approach system of the character indicated hereinbefore.

A specific object of the present invention is to provide means and techniques for tracking objects in the course of their flights; and, in particular, this invention relates to means and techniques for tracking the flight of an aircraft through an approach zone to a landing field while a radar antenna beam scans such zone for purposes of developing control signals for transmission to such aircraft.

An other specific object of the present invention is to provide apparatus for range tracking a plurality of aircraft simultaneously so as to obtain information as to their instantaneous ranges and speeds.

Another specific object of the present invention is to provide apparatus of this character which automatically "acquires" an aircraft in its range tracking circuitry, when and as such aircraft flies into the approach zone.

Another specific object of the present invention is to provide apparatus of this character operating in conjunction with other identical apparatus for (1) range tracking two or more aircraft simultaneously while a single radar antenna beam scans through space, and (2) for producing control signals for transmission to the aircraft so that such aircraft tends to fly along a predetermined glidepath and course line.

Another specific object of the present invention is to provide apparatus of this character which depends heavily for its operation on velocity memory means, with associated means functioning so as to anticipate the position of the aircraft thereby to reduce the tendency of the tracking circuitry to lock on ground clutter.

Another specific object of the present invention is to provide apparatus of this character which incorporates range tracking apparatus capable of range tracking a plurality of aircraft simultaneously, with associated means arranged so that the same aircraft may not be tracked by different tracking units.

Another specific object of the present invention is to provide apparatus of this character for developing tracking gates which are delayed in an amount representative of the range of a tracked aircraft, and for visually indicating the position of such tracking gates without seriously detracting from the conspicuousness of the associated radar signals, also visually indicated on the same cathode ray tube.

Another specific object of the present invention is to provide apparatus of this character wherein a control is provided in each range tracking channel, such control functioning to remove the related tracking gate from the visual displays without affecting the tracking operation.

Another specific object of the present invention is to provide apparatus of this character which incorporates velocity memory means, such memory means functioning so that the related tracking gates travel between radar "hits" at a previously determined velocity of the tracked aircraft.

Another specific object of the present invention is to provide apparatus of this character in which memory means is sensitive to a minimum memorized velocity of a tracked aircraft so as to reduce the tendency of the tracking circuit to lock on ground clutter, the minimum velocity of the tracked aircraft being approximately 50 knots or 50 miles per hour.

Another specific object of the present invention is to provide a tracking circuit which functions as such even though the video signals supplied thereto are "interrupted" as a result of the antenna beam not being constantly trained or aimed at the target, i.e., aircraft, but with the antenna beam scanning a relatively large zone in which other aircraft may be present, such video signals being used to develop control signals which are transmitted to the tracked aircraft for controlling its flight.

Another object of the present invention is to provide a system of this character wherein an electrical quantity representative of an ideal glide-path in the elevation plane and simultaneously a predetermined course line for the same object in the horizontal or azimuthal plane is accomplished in a simple and expeditious manner.

Another specific object of the present invention is to provide an arrangement of the character indicated in the preceding paragraph in which the electronic computer uses a nonlinear circuit parameter, such as thyrite, the computer, however, being dependent to a small degree on the nonlinear characteristic of the thyrite when the aircraft is close to touchdown so that a much more reliable and stable circuit is produced than would otherwise be the case.

Another specific object of the present invention is to provide a system of this character in which there is incorporated circuitry for computing electronically predetermined ideal glidepaths and course lines for controlling the flight of an aircraft to the point of touchdown, even though the data for such purpose is obtained from radar equipment noncoincident from the touchdown point.

Another specific object of the present invention is to provide a system of this character which incorporates circuitry for accepting data as to the orientation and range of an aircraft assumed to be flying along an ideal glidepath and course line, and developing from such data an electrical characteristic representative of such ideal glidepath and course line so that such electrical characteristic may be used in developing control signals for transmission to an actual aircraft, the flight of which deviates from such ideal glidepath or course line.

Another specific object of the present invention is to provide a system of this character which includes computer circuitry characterized by its increased stability at or near touchdown, such circuitry being characterized by its relatively small number of circuit components and by its simplicity and its flexibility for purposes of meeting different conditions, i.e., curve fitting.

Another specific object of the present invention is to provide a system of this character incorporating apparatus for both range and angle tracking of an object, such as an aircraft, in its flight, so as to obtain information as to its instantaneous range, speed and angular deviation from a predetermined glidepath (extending in the vertical plane) and course line (extending in the horizontal plane).

Another specific object of the present invention is to provide a system of this character incorporating apparatus in which angle tracking is performed by weighing the number of pulses, i.e., radar "hits," in the angle envelope and selecting the area bisecting angle, so that random pulses amounting to, for example, 30% of the radar hits or echoes within the angle envelope do not seriously affect the tracking performance.

Another specific object of the present invention is to provide a system of this character incorporating improved range tracking apparatus featured by the fact that such range tracking apparatus is sensitive only to video, i.e., radar, echoes returning from objects very close to an aircraft being tracked; a subsidiary feature being that a so-called angle gate, developed for that purpose, is made as small as consistent with accurate angle tracking.

Another specific object of the present invention is to provide a system of this character incorporating apparatus which serves to be relatively immune to clutter effects, thereby depending for that result, less on the moving target indicating (MTI) means usually associated with the radar echo receiving equipment, than is otherwise the case.

Another specific object of the present invention is to provide a system of this character incorporating apparatus suitable for angle tracking aircraft of diverse sizes and ranges, by associating the obtainance of data representative of the center of the series of radar hits, i.e., echoes developed on such aircraft.

Another specific object of the present invention is to provide a system of this character incorporating range tracking means which, to aid in discrimination against clutter, is "tightened," i.e., made less sensitive to echoes from other sources, so that a specific number of antenna beam scans are required before an observed error is corrected, the number of scans being established by adjustment of the time constant of the error and velocity integration circuits.

Another specific object of the present invention is to provide a system of this character incorporating apparatus in which a so-called angle gate is developed substantially at the time radar echoes are expected from aircraft being tracked, such angle gate being used in the range tracking circuitry to prevent the tracking of undesired targets at the same range but at varying angles from desired video.

Another specific object of the present invention is to provide a system of this character incorporating range and angle tracking apparatus in which a plurality of aircraft may be range tracked simultaneously and signals developed which represent the deviation of such aircraft from a predetermined glidepath and predetermined course line.

Another specific object of the present invention is to provide a system of this character incorporating range tracking apparatus in which, during the "search" condition or function, a range gate is developed having a width of approximately 4 microseconds, such range gate, however, being automatically decreased to a width of approximately 2.2 microseconds upon confirmation of ground control by an incoming aircraft, so that a wide gate is available for "acquiring" an aircraft in a reasonable time and so that a relatively narrow gate is available in tracking, for purposes of accuracy and exclusion of effects of clutter.

Another specific object of the present invention is to provide a system of this character incorporating apparatus which functions (1) to acquire aircraft, (2) to provide automatic range tracking of the aircraft once it has been acquired, (3) to compute the deviation of error of the aircraft with respect to a predetermined glidepath and course line and with respect to the "center" of the series of radar hits or echoes developed by the radar equipment, and (4) to develop an angle gate of the character mentioned previously, for rendering the range tracking circuit effective or acceptable for control by incoming video during desired periods only.

Another specific object of the present invention is to provide a system of this character incorporating apparatus for range tracking aircraft and for developing a video "on" signal, such apparatus incorporating also means for angle tracking the aircraft, which is responsive to information only during the occurrence of the video on signal; and in turn, the angle tracking means develops an angle gate which renders the range tracking means responsive to incoming information only during the time echoes are expected from an aircraft being tracked.

Another specific object of the present invention is to provide a system of this character in which the video envelope of an aircraft is compared with the antenna beam angle voltage so as to derive a continuous voltage which, at any one particular time, represents the angular position of the aircraft with respect to the situs of the radar equipment, whereby such continuous voltage is used for steering the aircraft automatically on a predetermined glidepath or course line.

Another specific object of the present invention is to provide a system of this character which incorporates a closed electronic servo loop for the general purposes mentioned in the preceding paragraph, such servo loop including a unique configuration of samplers and integrators.

Another specific object of the present invention is to provide a system of this character which incorporates a servo loop of the character mentioned in the preceding paragraph, such servo loop serving to generate a step function at the time the antenna beam angle voltage (which serves as a measure of the position of the radiated antenna beam) corresponds to the position of an aircraft being tracked, the video envelope of the aircraft being applied to the servo loop so as to effect operation of a sampler, such sampler admitting a positive charge to a first integrator during the time that the video envelope occurs on the high side of the step and a negative charge during the time that the video envelope occurs on the low side of the step. The first integrator in such case integrates the areas under the positive and negative portions of the video envelope, and if any asymmetry exists, the output of such first integrator is other than zero, causing the other integrator to act in such a way as to center the aforementioned step on the video envelope.

Another specific object of the present invention is to provide a system of this character whereby a glidepath and course line, as electronically computed in the normal functions of the equipment, are rendered visible on a cathode ray tube by a simple switching operating requiring essentially no other circuit elements than those used in the normal functioning of the AGCA system.

Another specific object of the present invention is to provide a system of this character incorporating novel means and techniques useful in effecting a visible representation of a course line and glidepath which are computed electronically.

Another specific object of the present invention is to provide a system of this character incorporating apparatus for visually presenting an ideal glidepath and course line using, as a controlling element of the circuitry, the nonlinear thyrite, which is essential in computation of the ideal course line and glidepath in the normal functioning of the AGCA equipment.

Another specific object of the present invention is to provide a system of this character incorporating circuitry for visually presenting a glidepath and course line as computed electronically, for automatically controlling the flight of an aircraft to a point of touchdown, even though the data for such purpose is obtained from radar equipment located at a point which is noncoincident with the touchdown point.

Another specific object of the present invention is to provide a system of this character which incorporates novel means and techniques for simulating an actual aircraft in its flight through the approach zone of an aircraft landing field and to control the simulated or artificial aircraft in accordance with control signals which would be developed by an actual aircraft assimilated by the artificial aircraft.

Another specific object of the present invention is to provide a system of this character incorporating novel means and techniques for testing and aligning the AGCA equipment.

Another specific object of the present invention is to provide a system of this character which incorporates improved means and techniques whereby a triggering voltage is developed with increasing or decreasing time delays for application to an intensity controlled electrode of a cathode ray tube to simulate the progress of the flight of an aircraft.

Another specific object of the present invention is to provide a system of this character which incorporates means and techniques whereby (1) artificial aircraft is visually reproduced, (2) such artificial aircraft is manually shifted in apparent "elevation" and "azimuth" and in angular position, (3) such artificial aircraft is caused to pursue a rapid "return" in range, and (4) it is caused to "fly" either backward or forward.

Another specific object of the present invention is to provide a system of this character incorporating artificial aircraft producing means, such means being connectible as a portion of a servo alignment loop in which a channel of automatically controlled flight tracks and controls the artificial aircraft; and wherein control signals developed in the computer unit of the AGCA equipment are integrated and used to control the elevation and azimuth positions of the artificial aircraft.

Another specific object of the present invention is to provide a system of this character incorporating apparatus mentioned in the preceding paragraph in which the effect of such correction and control signals may be observed in relationship to an ideal glidepath and course line, each of which is displayed visually, together with the artificial aircraft controlled by such control signals.

Another specific object of the present invention is to provide a system of this character incorporating novel receiving means, such receiving means including an improved automatic gain control circuit serving to measure the amplitude of radar echoes and to control the gain of such receiving means in an inverse relationship.

Another specific object of the present invention is to provide a system of this character incorporating novel receiving means, such receiving means including a gain control circuit in which a control signal developed in accordance with the amplitude of the radar echoes for controlling the gain of the receiving means is gated at the time radar echoes are being expected from desired targets.

Another specific object of the present invention is to provide a system of this character which includes novel receiving means, such receiving means incorporating an improved gain control circuit which serves to develop a control voltage for controlling the gain of such receiving means, such control voltage being developed only as a result of echoes from desired targets so that echoes from undesired targets, such as clutter areas through which the antenna beam scans, have substantially no effect on the gain of the receiver.

Another specific object of the present invention is to provide a system of this character incorporating novel receiving means, such receiving means including an automatic gain control circuit serving to develop substantially simultaneous data regarding a plurality of aircraft in an approach zone to an aircraft landing field as a related antenna beam scans through such approach zone, the gain of such radar receiving means being controlled cyclically in a degree dependent upon the particular echo which is received at that particular instant so that relatively large echo signals, in general, have larger control effects than smaller echo signals.

Another specific object of the present invention is to provide a system of this character in which means are provided for producing control signals should the radial spacing between successive tracked aircraft become less than, for example, a value adjustable between 1 and 4 miles.

Another specific object of the present invention is to provide a system of this character which incorporates an improved cursor generator utilizing the characteristics of nonlinear circuit parameters, such as thyrite, to develop range voltages, such range voltages being applied to a multivibrator for producing correspondingly delayed pips for cathode ray tube presentation.

Another specific object of the present invention is to provide a system of this character which includes an improved cursor generator to which are fed radar system triggers and a voltage representing the instantaneous position of the antenna beam, azimuth or elevation, as the case may be, in its scanning function, the cursor generator receiving such data and automatically producing a series of pips, such pips being applied to an intensity control electrode of a cathode ray tube to produce the aforementioned glidepath and course line.

Another specific object of the present invention is to provide a system of this character which incorporates clutter gating means, such clutter gating means being effective to modify the character of the control signals transmitted to the aircraft during that time when the aircraft is flying through the clutter area.

Another specific object of the present invention is to provide a system of this character which includes course softening means functioning to render the aircraft less sensitive to control signals when such aircraft approaches the touchdown point.

Another specific object of the present invention is to provide a system of this character which incorporates novel means for transmitting control signals and other information to one or more aircraft simultaneously.

Another specific object of the present invention is to provide a system of this character which includes novel airborne circuitry for receiving control signals and other information transmitted to the aircraft from the ground based radar installation.

Another specific object of the present invention is to provide a system of this character in which means are provided for automatically cycling different units thereof depending upon the location of aircraft in the approach zone, i.e., each of the units is automatically switched from a standby condition, to a search condition, to a track condition, to a control condition, and to a wave off condition, in sequence, in normal operation of the units, there being provided also means for preventing more than one unit developing control signals for the same aircraft.

Another specific object of the present invention is to provide a system of this character in which novel means are incorporated for standardizing the video supplied to the AGCA system.

Another specific object of the present invention is to provide a system of this character wherein novel means are provided for mixing different control signals and other signals representative of information, prior to transmission on a subcarrier to an aircraft.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1 shows in schematic form apparatus for scanning the approach zone to an aircraft landing field with related circuitry for producing a visual indication of the character illustrated in Figure 6; also, this apparatus serves to develop information such as azimuth angle voltage, elevation angle voltage, video, blanking voltages and az-el relay voltages used in the automatic ground controlled approach (AGCA) system illustrated in Figure 7.

Figure 2 shows azimuth beam angle voltage, elevation beam angle voltage, as well as inverted elevation beam angle voltage, and their variations with respect to time as developed by the apparatus shown in Figure 1.

Figure 3 shows a cycle of operation of the radar scanning and indicating arrangements in Figure 1 and serves to illustrate the period during which the az-el relay voltage is available.

Figure 4 illustrates other voltages developed during cyclical operation of the apparatus illustrated in Figure 1.

Figure 5 illustrates more detail of the cathode beam centering means shown in block form in Figure 1, such circuitry being effective to shift the displays in Figure 6 sequentially from one origin position O–1 to the other origin position O–2 and from O–2 to O–1, etc.

Figure 6 illustrates the display obtained using the apparatus illustrated in Figure 1, the elevation and azimuth displays being produced sequentially on a time sharing basis.

Figure 7 is a block diagram of an AGCA system embodying features of the present invention which is supplied with certain information developed by the apparatus illustrated in Figure 1.

Figure 8 illustrates in schematic form circuitry of the video shaper which is indicated as such in Figure 7 and which is indicated in block diagram form in Figure 14.

Figure 9 illustrates the circuitry of the one-tenth cycle per second saw-tooth generator which is also illustrated as such in block form in Figure 7, such saw-tooth generator producing a saw-tooth voltage wave of the character illustrated in Figure 11, which is used during the so-called "search" function of the AGCA equipment, it being noted that the circuitry of Figure 9 is illustrated in block form in Figure 10.

Figure 10 illustrates in block diagram form the circuitry illustrated in Figure 9.

Figure 11 illustrates the saw-tooth wave form developed by the apparatus illustrated in Figures 9 and 10.

Figures 12 illustrates in block diagram form the circuitry of the AGCA tracking unit indicated as such in Figure 7, such circuitry being illustrated in detail in Figure 13.

Figure 13 represents in schematic form the circuitry of the AGCA tracking unit illustrated in Figures 7 and 12.

Figure 14 illustrates in block diagram form the circuitry of the video shaper, the circuitry of which is illustrated in Figure 8, the video shaper also being indicated as such in Figure 7.

Figure 15 serves to illustrate the visual indication obtained of an aircraft being tracked, with the bracketing index marks in one instance being limited by angle gating, while in the other instance being extended in the absence of angle gating.

Figure 16:
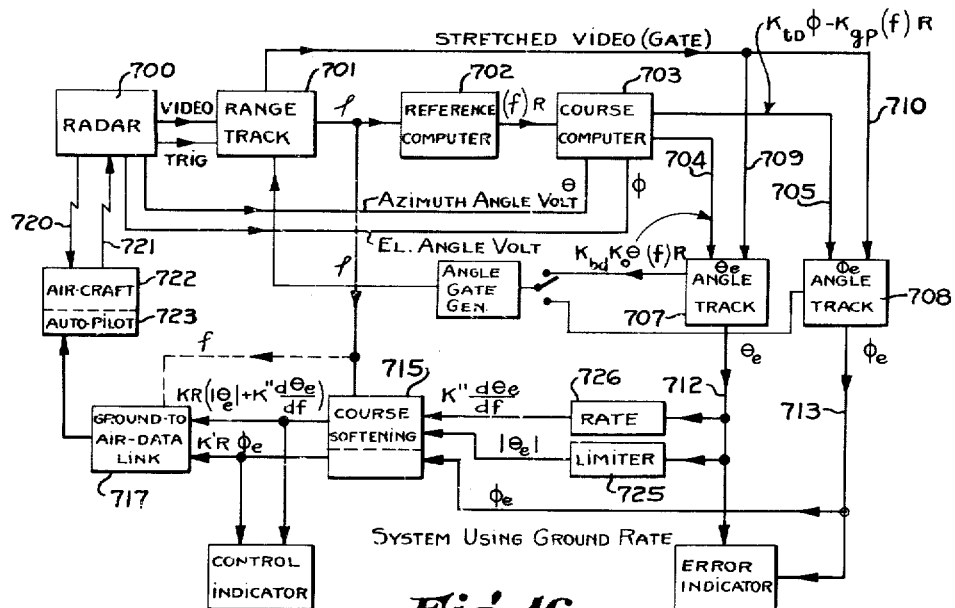
Figure 17:
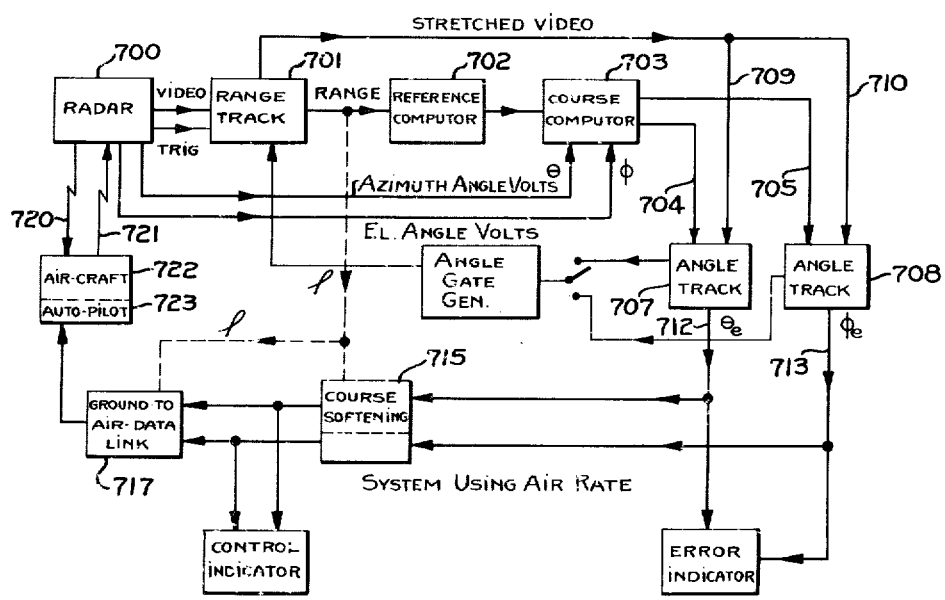

Figures 16 and 17 illustrate in block diagram form different elements of the AGCA system and their functional inter-relationship when the system is adjusted respectively to use ground rate and air rate information.

Figure 19:
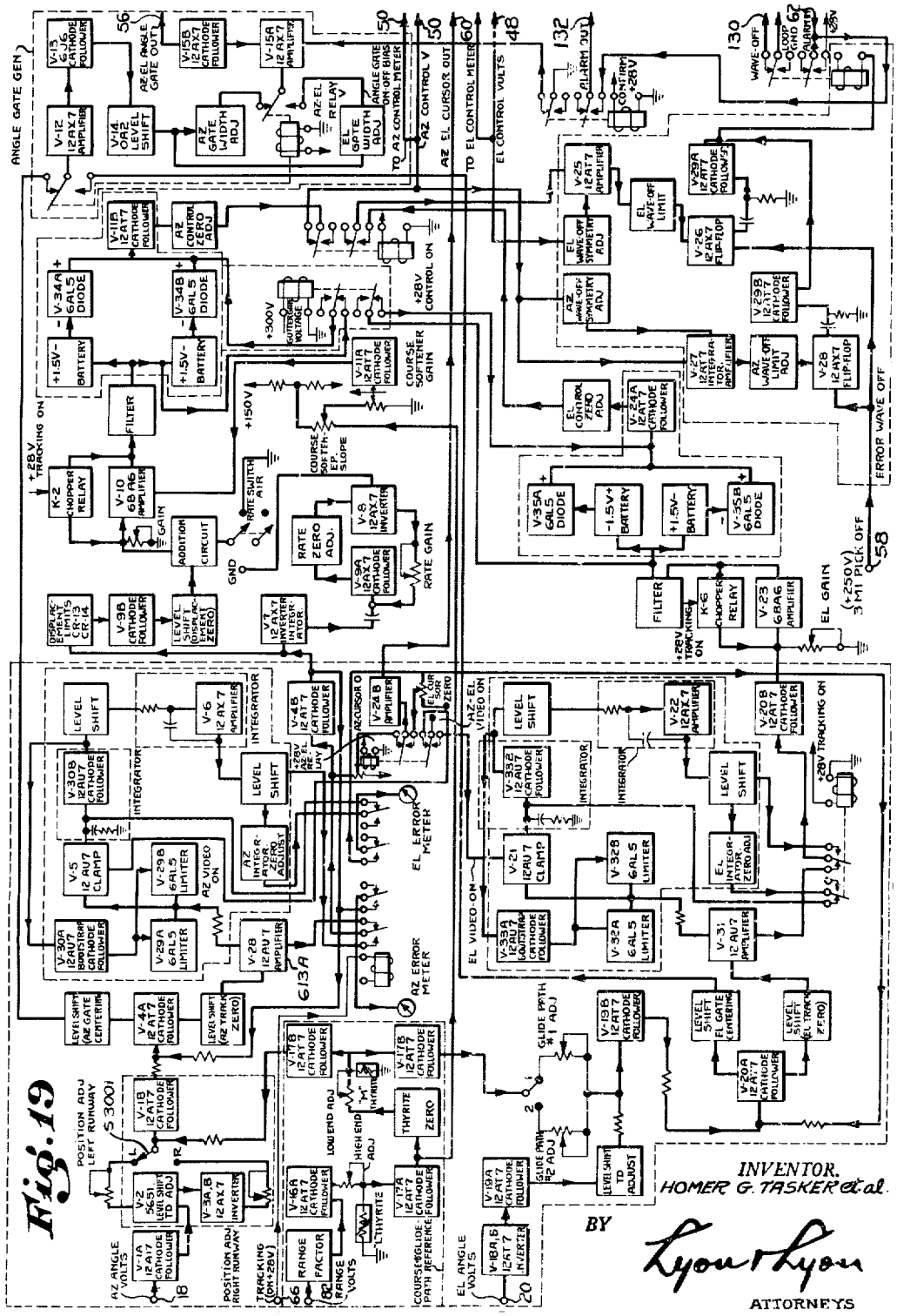

Figures 18A and 18B interconnected as illustrated constitute Figure 18, which is a schematic representation of the apparatus in the angle tracking and computer unit illustrated as such in Figure 7, such circuitry of Figures 18A, 18B being illustrated also in block diagram form in Figure 19.

Figure 20 illustrates the character of the "stretched" video or video "on" signal, such signal constituting in general an elongated wave having a time duration equal to the time during which radar "hits" are being made on an aircraft plus a fixed time interval in the order of 500 microseconds.

Figure 21 illustrates the geometrical conditions existing in the azimuth plane, with the radar equipment located adjacent the runway center line and in relationship to the touchdown point, such figure being useful in appreciating features of the computer illustrated in Figures 18A, 18B, and Figure 19.

Figure 22 is useful in explaining the manner in which the azimuth and elevation beam angle voltages are modified as a function of range for purposes of comparison with a reference voltage developed in the computer unit.

Figure 23 illustrates the manner in which the circuitry in the tracking unit and computer unit is modified so as to provide a visual reproduction on the cathode ray tube of both the azimuth course line and elevation glidepath, which are computed by using thyrite elements in the normal operation of the computer unit.

Figure 24 illustrates in schematic form the circuitry of a cursor generator useful in the production of the glidepath course line and runway course line illustrated as such in Figure 6, such circuitry being illustrated in block diagram form in Figure 25.

Figure 25 represents in block diagram form circuitry of the cursor generator illustrated in schematic form in Figure 24 and incorporated in the unit designated "AGCA Cursor Generator and Artificial Aircraft" unit in Figure 7.

Figure 26 represents the means for obtaining so-called clutter gating, such circuitry in general being effective to desensitize the function of the computer unit during that period of time while a track aircraft is in a clutter area, the gates produced by the apparatus of Figure 26 being illustrated in Figure 27 and the desensitizing effect produced on the control signals developed in the computer unit being illustrated in Figure 28.

Figure 27 serves to illustrate the positioning of the clutter gates developed by the apparatus of Figure 26 in relationship to clutter areas.

Figure 28 illustrates in graphical form the manner in which the aircraft control signals developed in the computer unit are modified as a result of the function of the apparatus illustrated in Figure 26.

Figures 29 and 30 represent respectively in schematic and block diagram forms the circuitry of the overtake warning and wave-off unit, which is indicated as such in Figure 7.

Figures 31 and 32 represent respectively in schematic and block diagram forms circuitry of the so-called "artificial" aircraft unit indicated as such in Figure 7 in the unit designated, "AGCA Cursor Generator and Artificial Aircraft."

Figures 33 and 34 represent respectively in schematic and block diagram forms apparatus for obtaining so-called range gated automatic gain control and in general is used to control the gain of an intermediate frequency amplifier illustrated in Figure 35.

Figure 35 illustrates the manner in which the gain of the intermediate frequency amplifier stage of a super-heterodyne radar receiver is controlled by a function developed by the apparatus illustrated in Figures 33 and 34.

Figure 36 illustrates in block diagram the manner in which the radar receiver is converted from the normal operation to range gated AGCA operation.

Figure 37B:
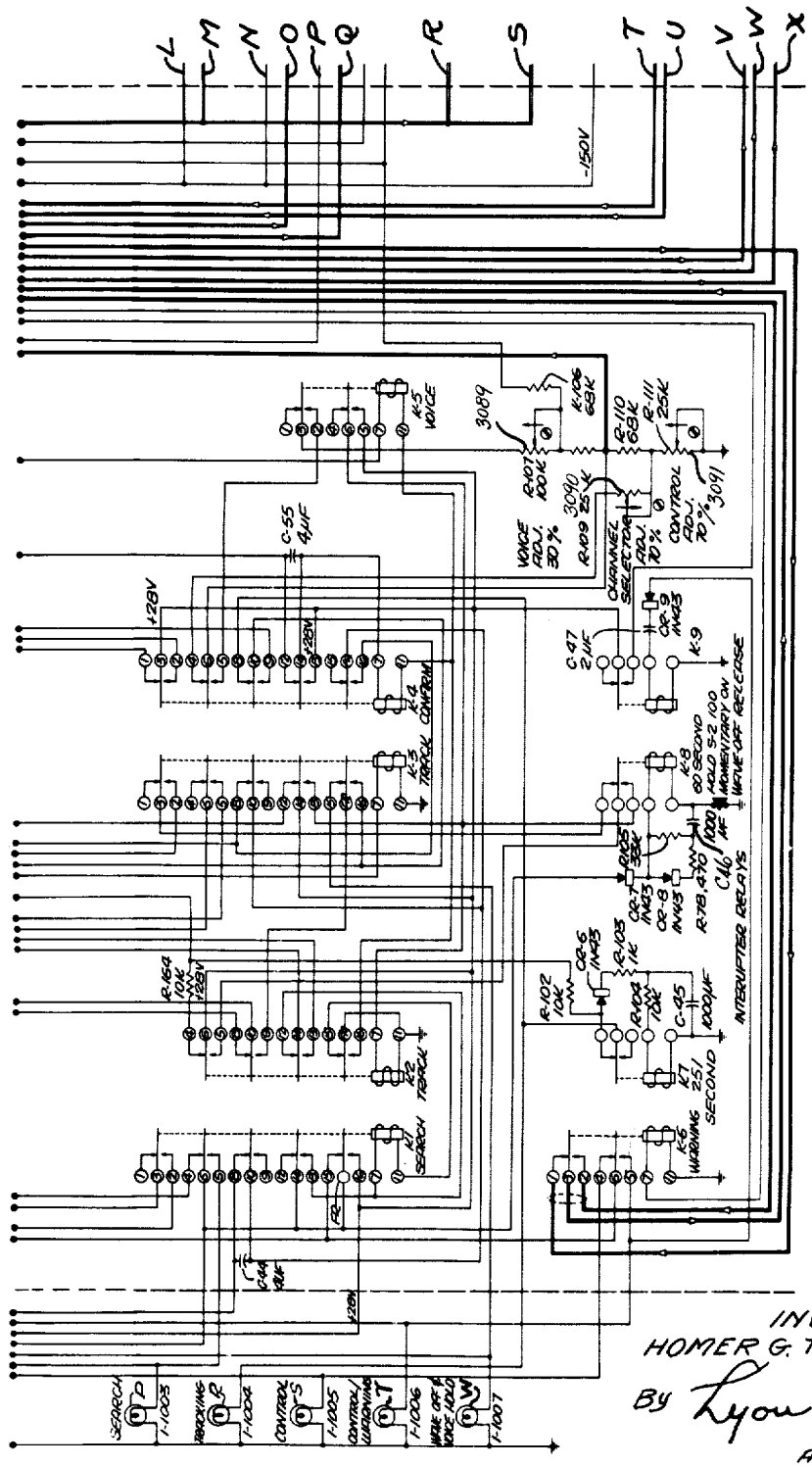
Figure 37C:
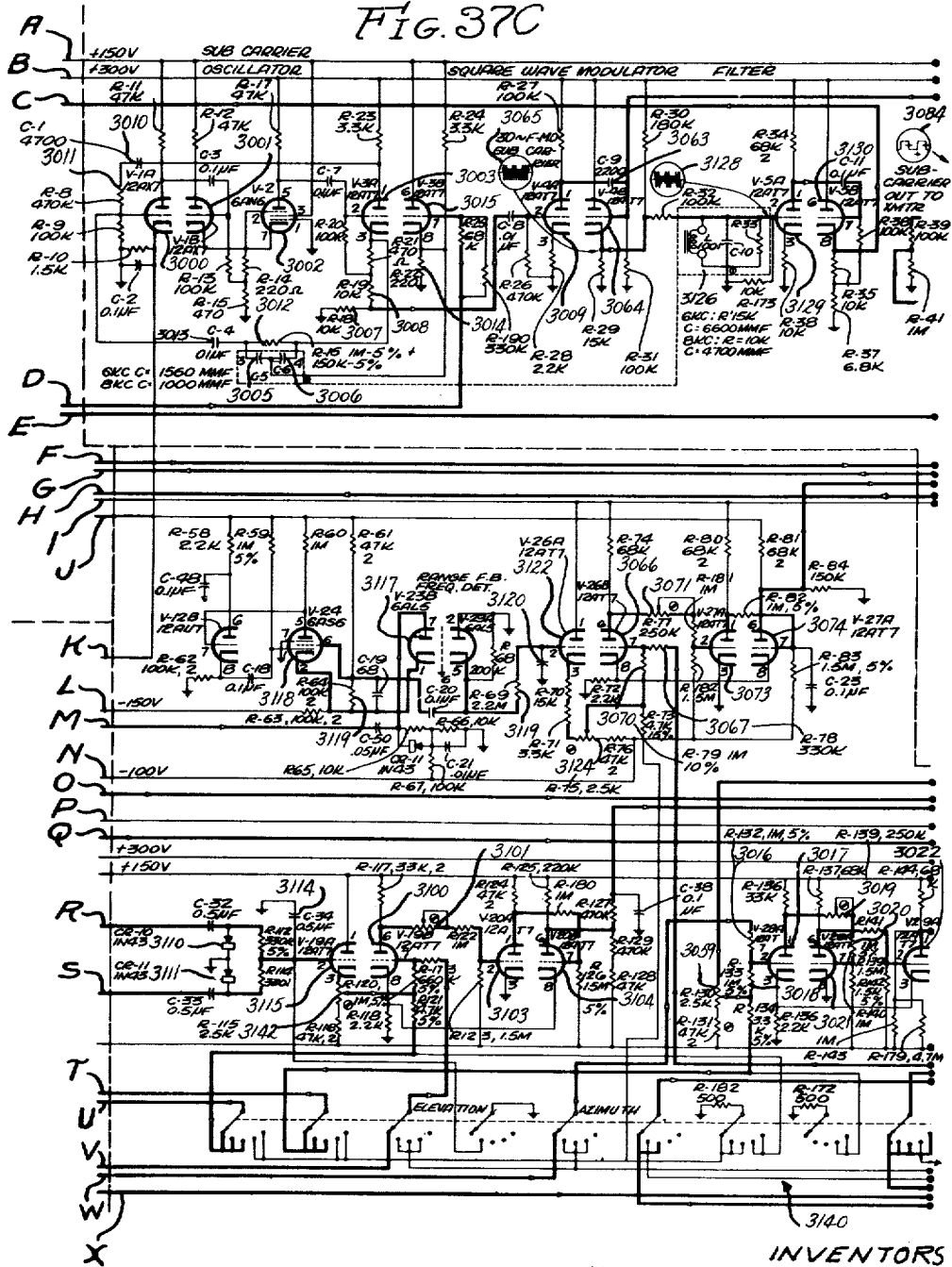
Figure 37D:
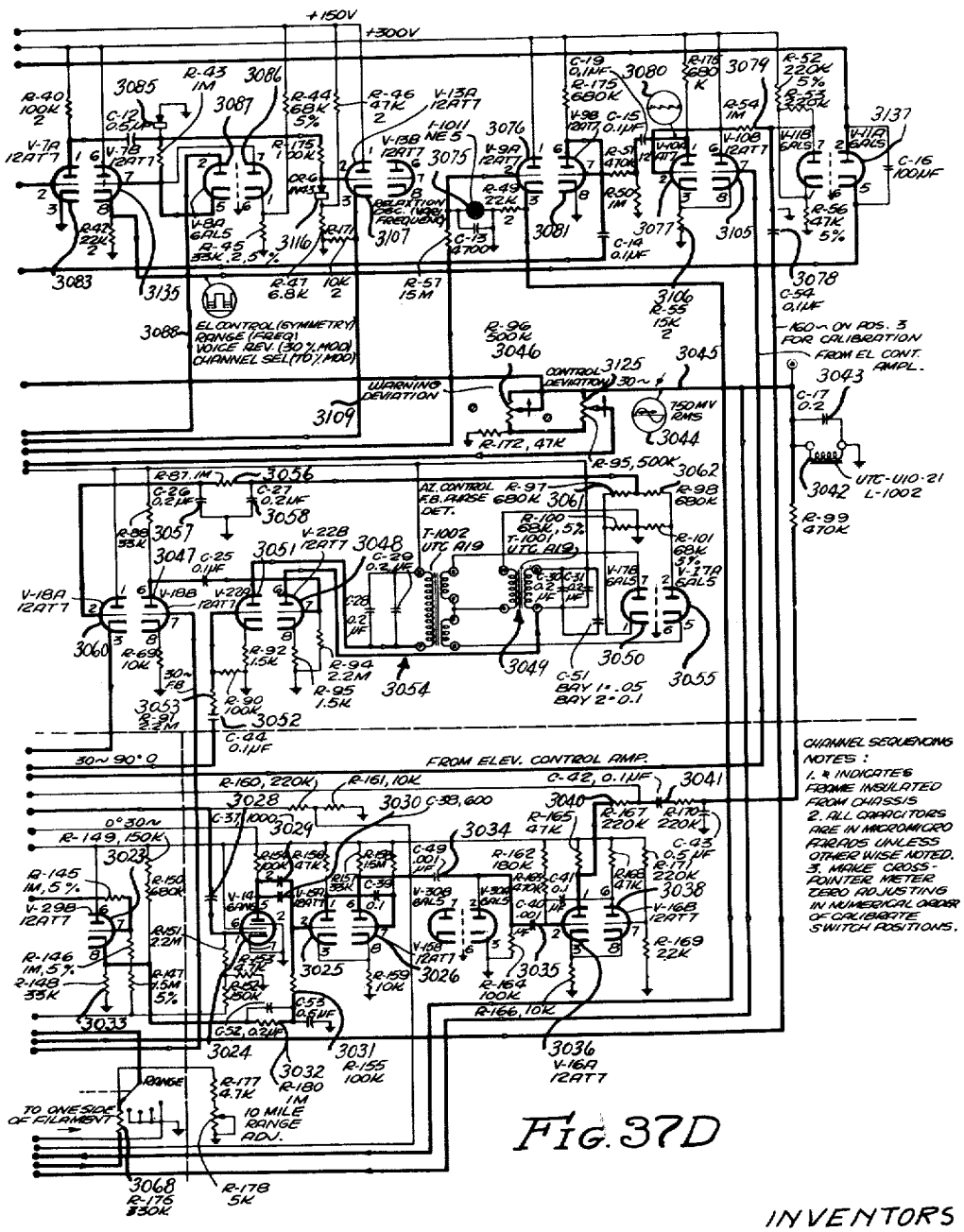

Figures 37 and 38 represent respectively in schematic and block diagram form circuitry in the coder and channel sequencing unit, which is illustrated as such in Figure 7. Figure 37 actually comprises Figures 37, 37A, 37B, 37C and 37D each on a separate sheet of drawings which are to be positioned with Figure 37B below Figure 37A, with Figure 37C immediately to the right of Figures 37A and 37B and with Figure 37D immediately to the right of Figure 37C with the understanding that aligned adjacent lines each terminating in a dot in Figures 37A and 37B are interconnected, that identically lettered terminals in Figures 37A, 37B and 37C are interconnected and that aligned adjacent lines terminating in a dot in Figures 37C and 37D are interconnected.

Figure 39:
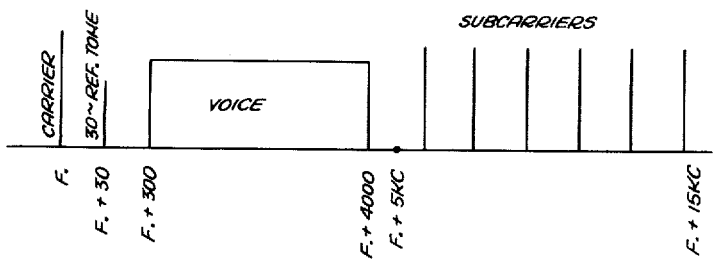

Figure 39 serves to illustrate the side bands on one side of the AGCA carrier wave transmitted from the ground based radar installation to the aircraft and shows essentially the frequency spectrum.

Figure 40:
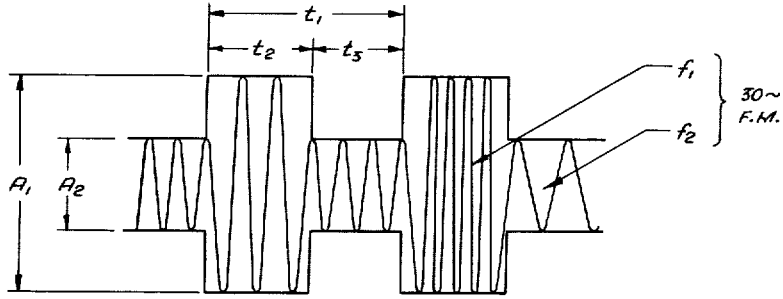

Figure 40 serves to illustrate the manner in which each of the subcarriers illustrated in Figure 39 may be modulated to convey certain information and control signals to the aircraft.

Figure 41B:
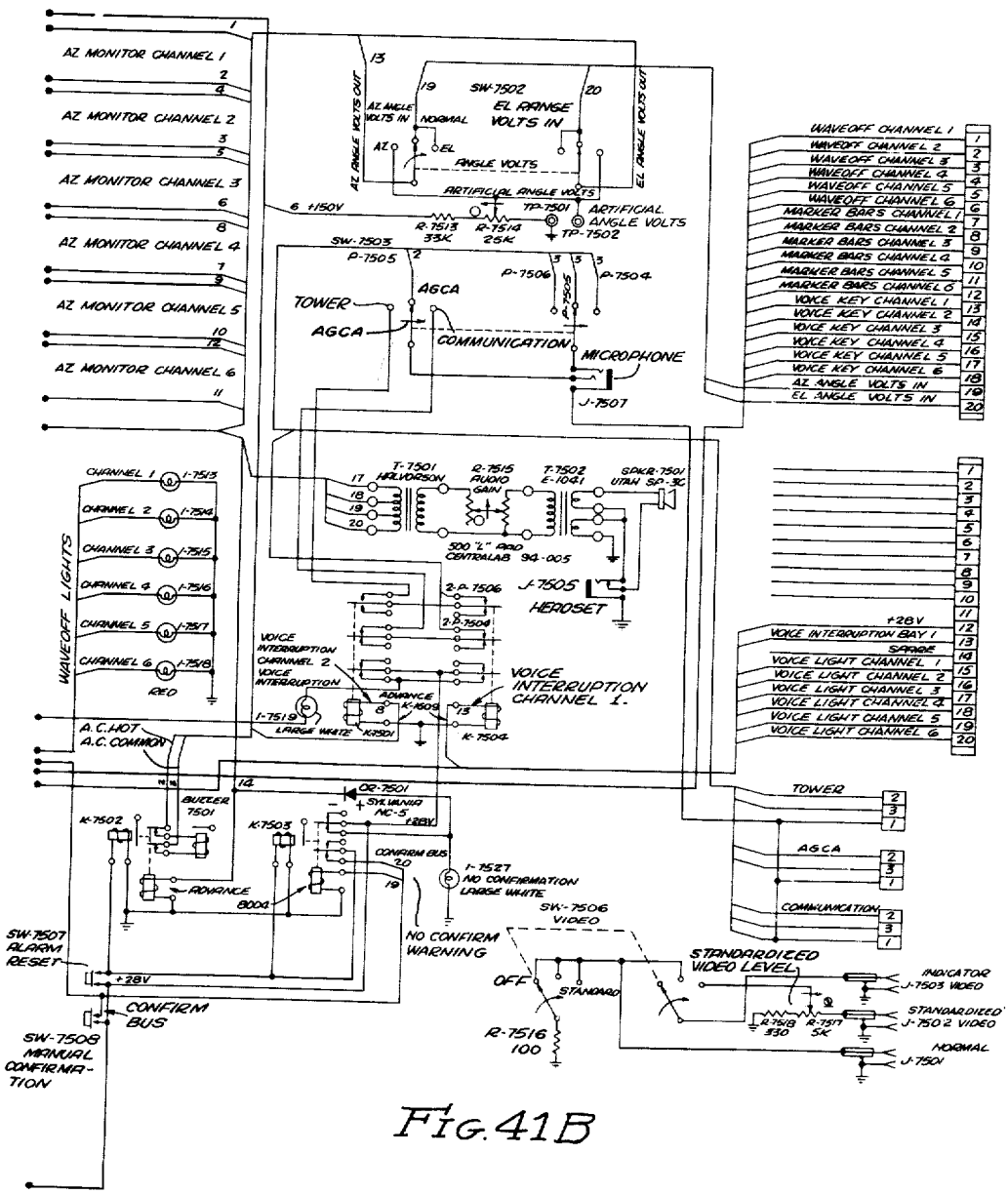

Figure 41 illustrates the AGCA communications and control panel which is illustrated as such in Figure 7. Figure 41 actually comprises two sheets of drawings containing Figure 41A and Figure 41B respectively, it being understood that Figure 41A is to be positioned to the left of Figure 41B and that the aligned lines each terminating in dots in Figures 41A and 41B are interconnected.

Figure 42:
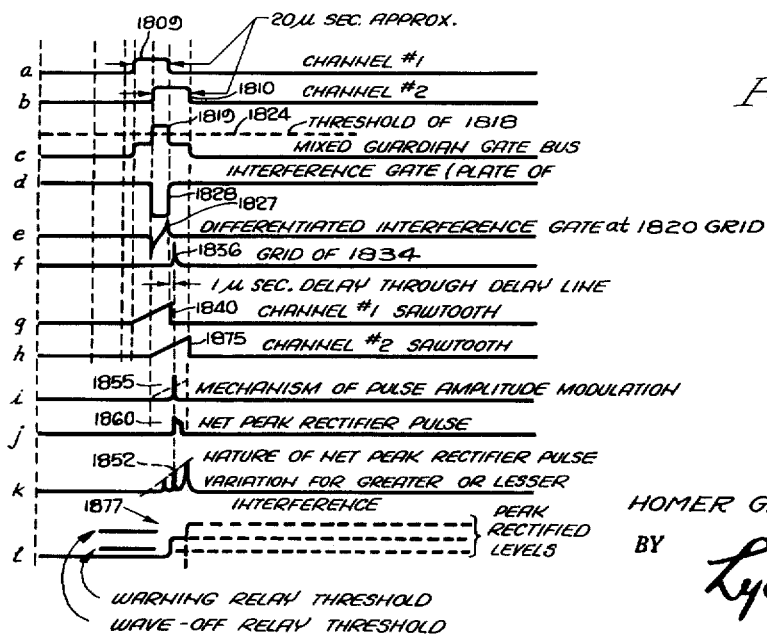

Figure 42 serves to illustrate certain conditions present in the overtake warning and wave-off unit illustrated as such in Figure 7 and shown in detail with respect to Figures 29 and 30.

Figure 43:
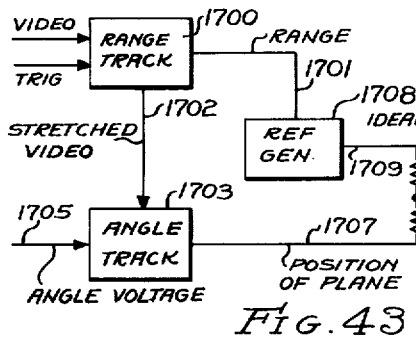

Figure 43 illustrates a modified arrangement and is useful in illustrating certain concepts present in the AGCA system.

Figure 44:
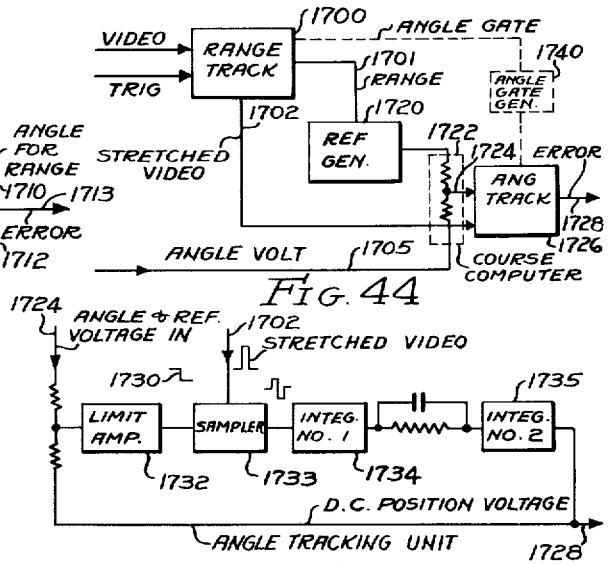

Figure 44 is a block diagram similar to Figure 43 and serves to illustrate the functional relationship of certain units of the AGCA equipment.

Figure 45:
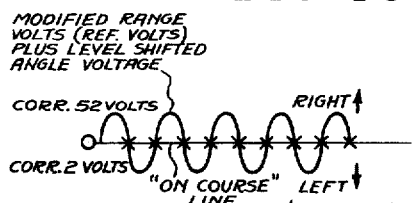

Figure 45 illustrates the type of voltage variation produced in the computing unit, the cross-over points of which represent an ideal glidepath and course line.

Figure 46:
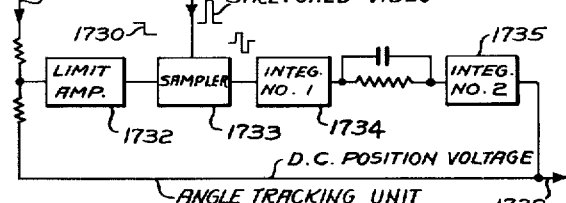

Figure 46 shows in block diagram form certain circuitry of the computer unit illustrated in Figure 18B and is useful in illustrating the manner in which error tracking is accomplished, using a servo loop.

Figure 47:
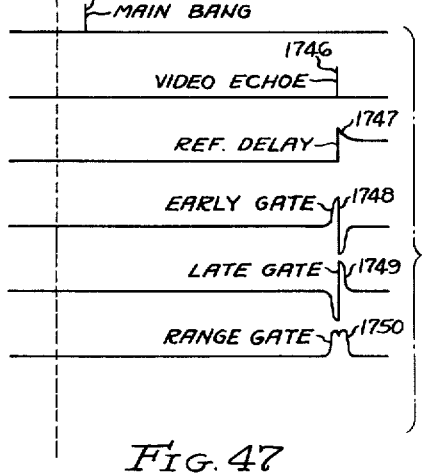

Figure 47 is useful in illustrating the time sequence of certain control signals and gates and echoes in relationship to the main bang or transmitted pulse in the range tracking unit.

Figure 48:
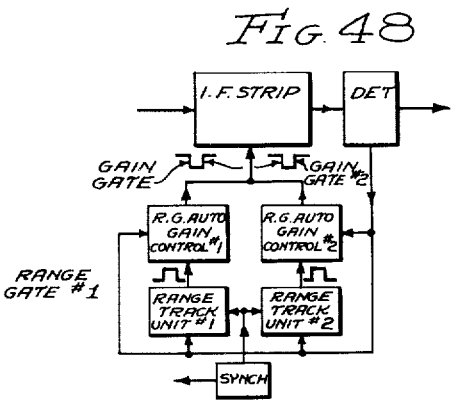

Figure 48 is a block diagram for purposes of illustrating the functional relationship of certain elements in obtaining range gated automatic ground control and includes the circuitry illustrated in connection with Figures 33, 34, 35 and 36.

Figure 50B:
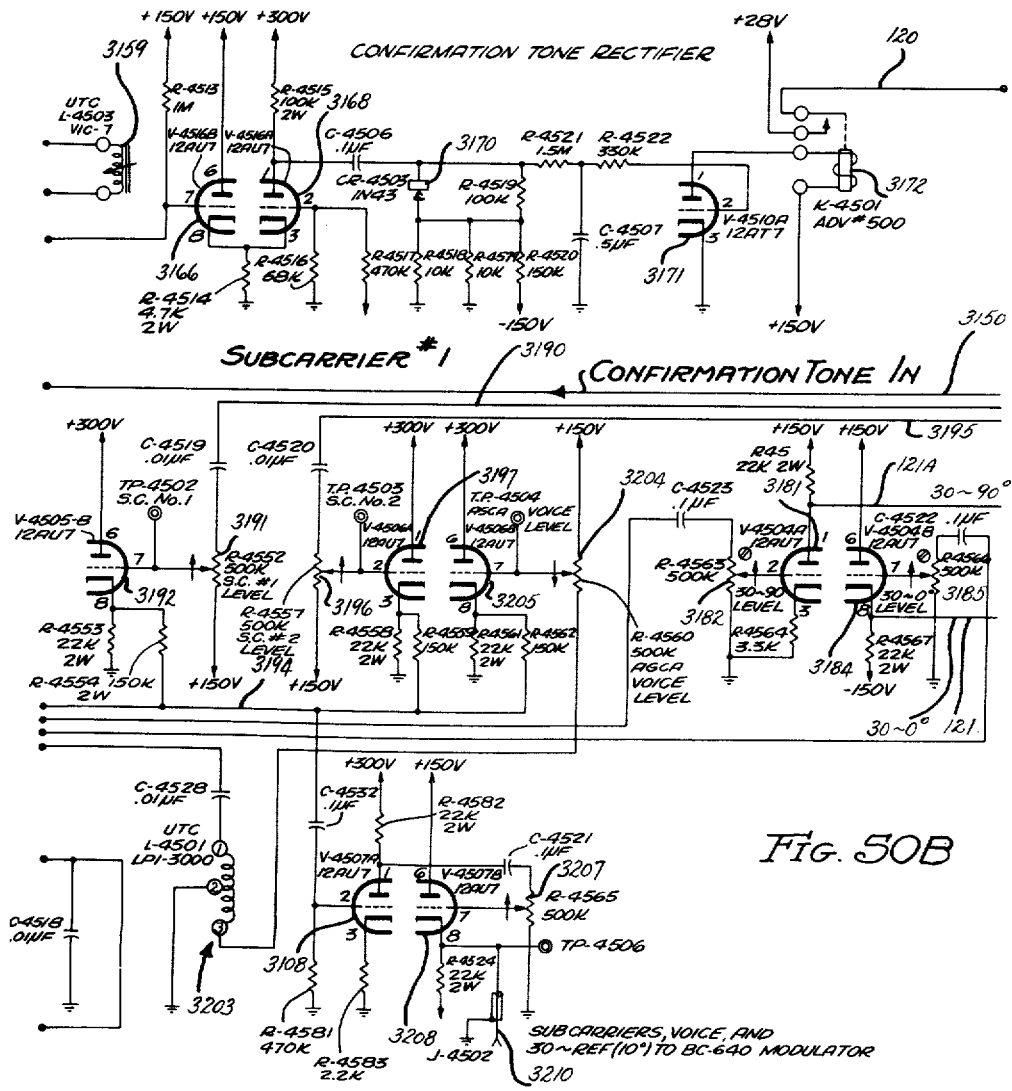

Figures 49 and 50 represent respectively in block diagram and schematic form, the circuitry of the ground based mixing unit which serves to produce certain voltages for modulation of the AGCA carrier wave which is transmitted from the ground based radar installation to the aircraft. Figure 50 actually comprises two sheets of drawings containing Figures 50A and 50B respectively, it being understood that Figure 50A is to be positioned to the left of Figure 50B with the aligned adjacent lines each terminating in a dot being interconnected.

Figure 51A:
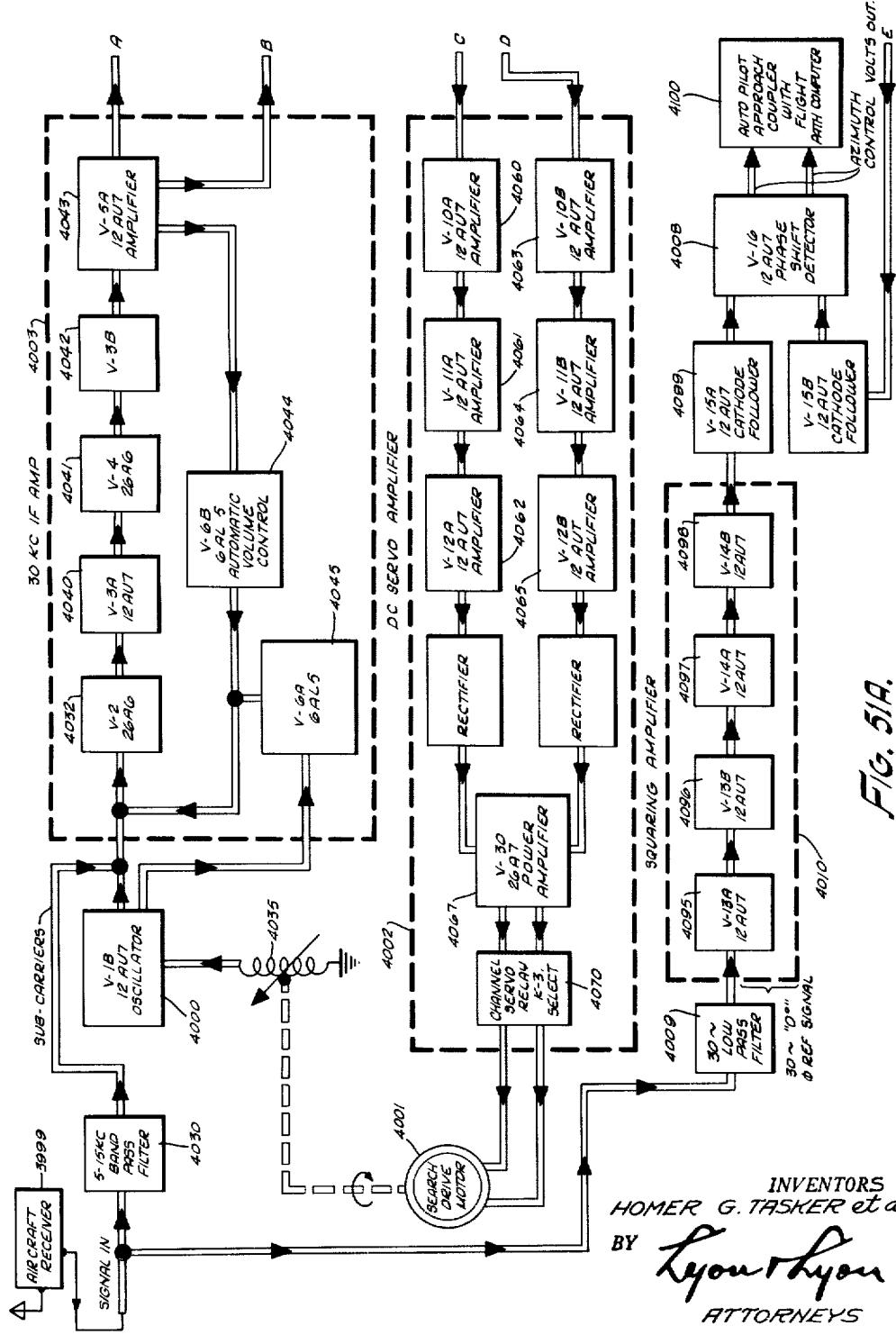

Figures 51A, 51B, and 51C, on separate sheets of drawings, constitute Figure 51 which, when connected as indicated therein, illustrates in block diagram form certain portions of the airborne equipment in the controlled aircraft.

Figure 52A:
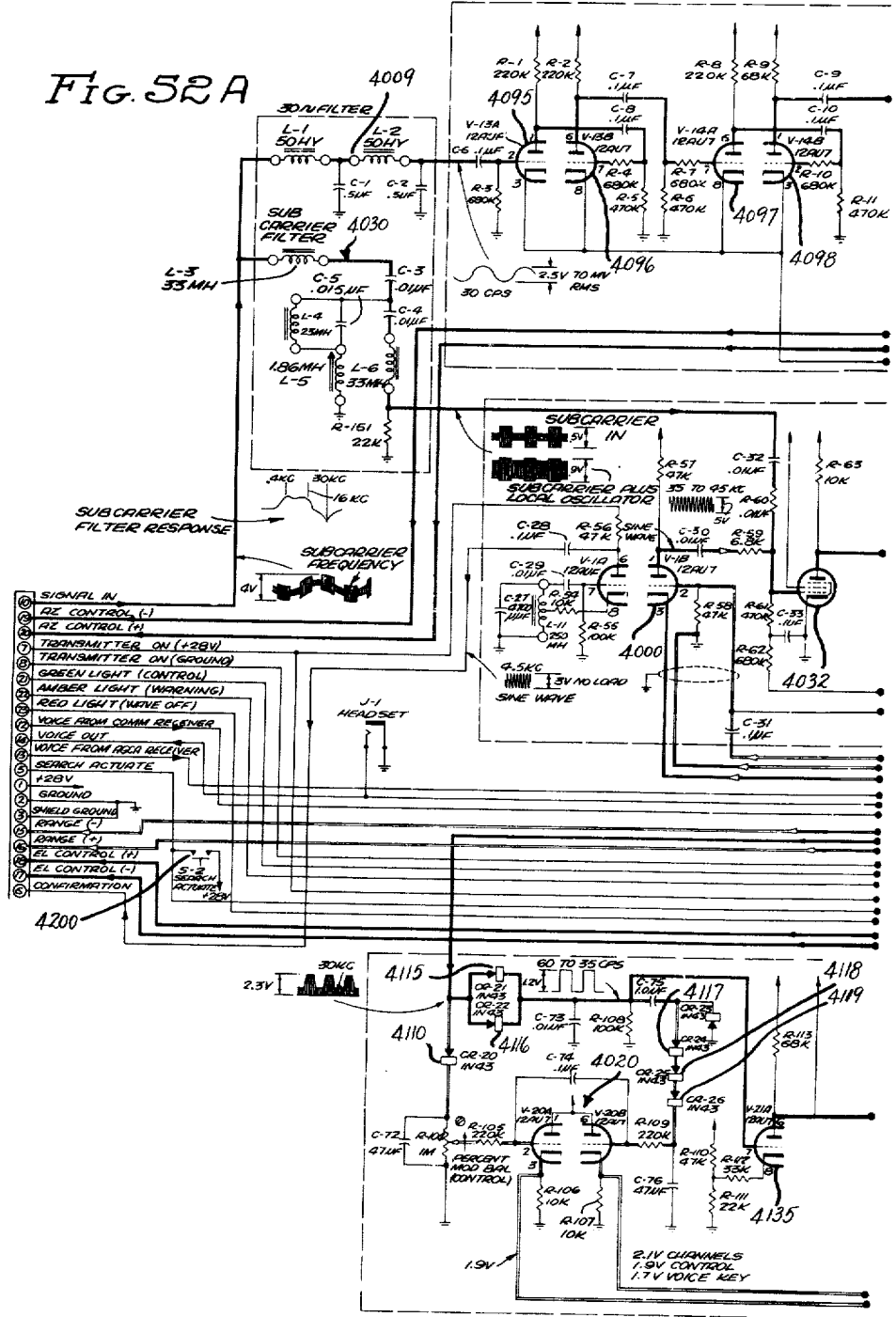

Figure 52 serves to illustrate the circuitry of certain portions of the airborne equipment shown in block diagram form in Figure 51. Figure 52 actually comprises four sheets of drawings containing Figures 52A, 52B, 52C and 52D respectively, it being understood that these four sheets are to be positioned so that Figure 52A is immediately to the left of Figure 52B, Figure 52B is between Figure 52A and Figure 52C, and Figure 52C is between Figure 52B and Figure 52D and that aligned adjacent lines each terminating in a dot in adjacent figures are interconnected.

Figure 53:
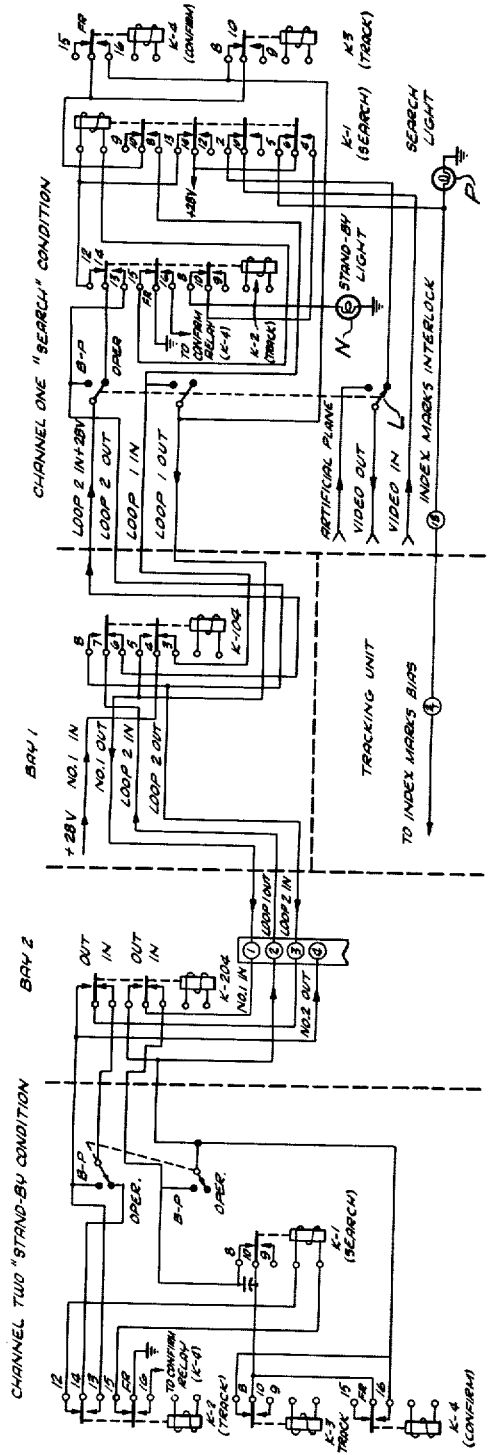

Figure 53 shows circuitry interconnecting different channels for producing automatic channel sequencing; more specifically, Figure 53 serves to illustrate the manner in which the coder units illustrated in Figure 37 are interconnected for producing channel sequencing of the different channels.

Figure 54:
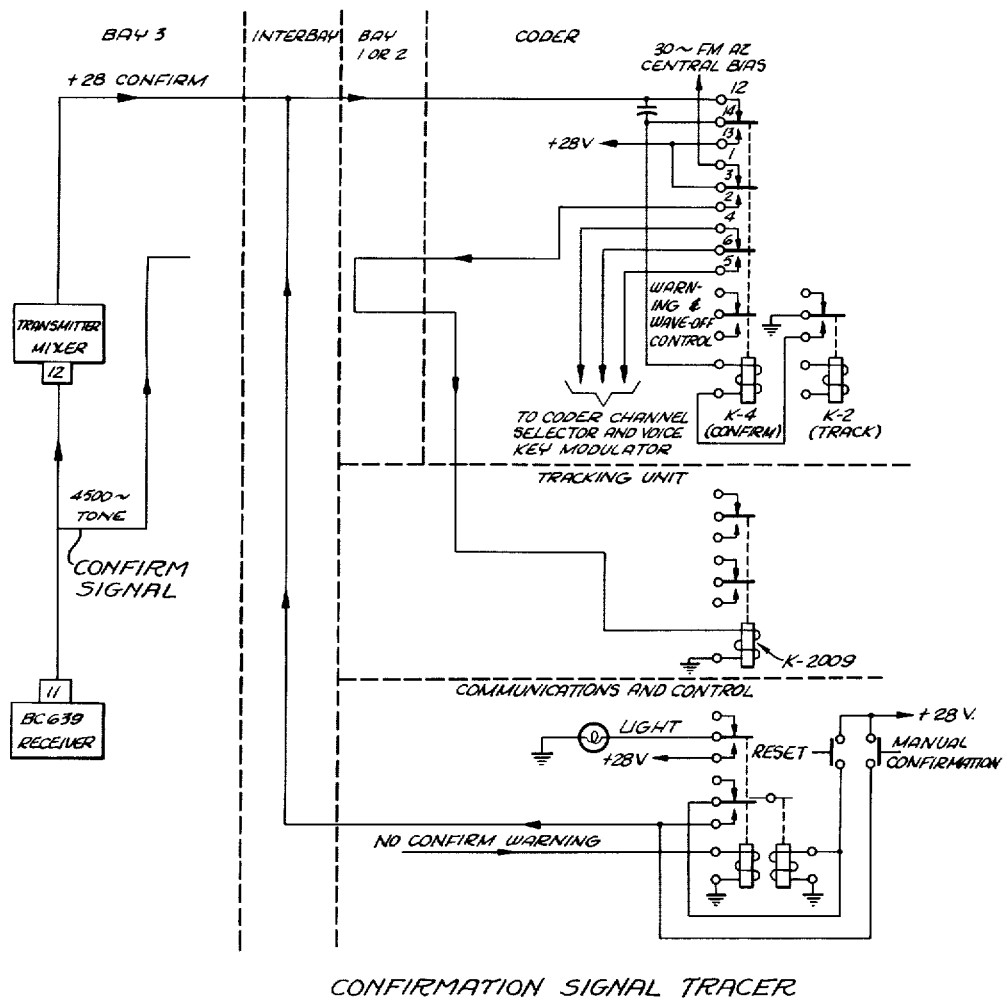

Figure 54 illustrates parts of circuitry in the Coder Tracking Unit and Communications and Control Unit to which the confirmation signal received from the aircraft is applied for purposes of controlling different relays in these three units.

Figure 55 illustrates interconnected circuitry in the various units of the AGCA system which is common to the warning and wave-off alarm bus.

Figure 56 serves to show certain portions of the computer range, tracking unit and coder unit for purposes of illustrating the application of the "tracking on" voltage.

Figure 57 illustrates a portion of the circuitry in the tracking unit in Channels No. 1 and No. 2, the computer Channels No. 1 and No. 2, overtake warning and wave-off unit, and communications and control unit for purposes of tracing the wave-off circuit and more specifically the tracking relay holding circuit.

Figure 58 illustrates electrical interconnection between the warning and wave off unit, bay 1, bay 3, the computer, the tracking unit, the coder, and communications and control.

*Means shown in Figures 1–5 for producing information useful in producing both visual indications and tracking*

The apparatus shown in Figure 1 is connected both to the apparatus shown therein for producing visual indications on the face of a cathode ray tube 11 of the character shown in Figure 6 and for also supplying certain data to the automatic tracking apparatus shown in block diagram in Figure 7.

In Figure 1, the synchronizer 31 serves to generate timing pulses which are used to time the application of pulses to the transmitter 33 to intiate its operation. The transmitter stage 33, pulsed at a constant repetition rate of, for example, 2000 or 5500 pulses per second consists of, for example, a magnetron oscillator with a characteristic frequency of about 10,000 megacycles. The output of the transmitter stage 33 is transferred to either the elevation (el) antenna 103 or the azimuth (az) antenna 55, depending upon the position of the motor driven interrupter or radio frequency switch 101. The transmit-receive (T–R) switch 97 prevents power from the transmitter 33 from being applied directly to the receiver 57. This transmit-receive switch 97, as is well known in the art, allows low intensity signals, such as a train of resulting echo signals received on the antennas 103, 55, to be transferred to the input terminals of the receiver 57. This deflection of energy from the transmitter 33 to the antennas 55, 103, accomplished by operation of switch 101, occurs at a rate of approximately two per second so that in effect the component antennas obtain four "looks" per second of the space scanned.

The resulting antenna beams are caused to move angularly, i.e., to scan upon rotation of the shaft 93. The switch 101 is rotated twice per second, and while energy is being transmitted to one of the antennas 55, 103, the resulting electromagnetic beam projected into space is caused to scan such space. The means whereby such scanning movement of the projected electromagnetic beam is obtained may be of the type described in the copending application of Karl A. Allebach, Serial No. 49,910, filed September 18, 1948, now U.S. Patent 2,596,113, for Bridge Type Precision Antenna Structure, which depends for its operation on the use of a variable wave guide type of antenna. This particular means, per se, forms no part of the present invention, and so far as the aspects of the present invention are concerned the antenna scanning beam may be produced by moving the entire antenna through a relatively small arc of a circle. Actually, in fact the azimuth antenna beam may scan first in one direction and then in the other, waiting after each scan while the elevation beam completes a scan in elevation. The azimuth antenna 55 scans a fixed horizontal angle of 20°, and is so placed as to include the approach course to a given airfield runway. Vertical scan of the elevation antenna 103 is from minus one degree to plus 6 degrees.

While in any position during the part of the cycle in which the relay frequency switch 101 allows the flow of energy into the elevation antenna 103, the elevation antenna beam is electrically scanned in elevation. The position of the elevation antenna beam is measured by means of a variable capacitor 59, one plate of which is attached to the beam scanner of elevation antenna 103 and varied in accordance therewith, such capacitor 59 comprising one part of a capacitative potentiometer and contained in the angle coupling unit 85 which may be of the type described and claimed in the copending patent application of Clarence V. Crane, Serial No. 212,114, filed February 21, 1951, now U.S. Patent 2,650,358. The angle coupling unit 85 thus used with capacitor 59 is useful in developing the elevation beam voltage represented as 61 in Figure 2.

Similarly, the angle in azimuth of the radiated azimuth antenna beam is measured by the angle capacitor 65 in the azimuth angle coupling unit 63A, operating synchronously with the scanner of the azimuth antenna 55. Such variation in azimuth angle voltage as a function of the particular angular position of the azimuth antenna beam is represented by cyclically varying voltage 63 shown in Figure 2. It is observed that these voltage variations Nos. 61 and 63, have portions thereof shown in heavy lines, and it is these portions which are used to effect control operations and which are selected by means mentioned later. Figure 2 also shows inverted azimuth elevation beam angle voltage as represented by the oblique lines 67.

Also coupled to the scanner of the elevation antenna 103 is the elevation unblanking switch 67, which has one of its terminals connected to the continuous voltage source 91 for purposes of developing an elevation unblanking voltage gate, shown in Figure 4, so timed that its positive value corresponds to the time of effective scanning of the elevation antenna beam. The azimuth unblanking switch 65A is similarly coupled to the scanner of azimuth antenna 55 with one of its terminals connected to the continuous voltage source 65B for purposes of developing azimuth unblanking voltage (Fig. 4) so timed that the positive portions of such voltage corresponds to the time of effective scanning of the azimuth antenna beam. Relay switch 69 operates at substantially the same time as switch 65A, and synchronously therewith and serves to generate the so-called az-el relay voltage or gate (Fig. 4), which is so timed that its positive portion begins at a time just prior to the beginning of the azimuth unblanking voltage and just after the end of elevation unblanking voltage, and which ends at a time just after the ending of the azimuth unblanking voltage and just prior to the beginning of the elevation unblanking voltage, all as seen in Figure 4.

Figure 3 shows a schematic diagram of the time relations involved in a scanning action which, typically, occupies a time in the order of one second. Forward progress of time is represented by clockwise motion about this diagram. The central circular region of Figure 3 marked N shows the time schedule of the scanning operations of the two systems, opposite quadratures being scanned by the same system but carried out in opposite directions. The shaded areas (each comprising approximately 10 degrees of the complete 360 degree cycle) represent the periods during which the transmitter 33 is switched by the switch 101 in Figure 1 from one antenna to the other antenna. Unshaded areas of region N represent the time periods during which one or the other of the antennas is in use, sending out radio frequency pulses and receiving reflected echo signals from objects within the field of coverage of the beam. Shaded areas indicate inactive periods during which switching takes place, both antennas being momentarily isolated from the transmitter and receiver.

The inner annular region M of Figure 3 represents the time schedule of the related azimuth and elevation displays, subject however to pattern clipping described later, and corresponds to the cyclical variations of azimuth and elevation voltages represented in Figure 2.

The outer annular region of Figure 3, marked L, shows the time schedule of currents through the various coils of a number of so-called az-el switching relays for effecting time sharing. The relay actuating current is obtained by the switch 69 (Fig. 2) operating in synchronism with the mechanism producing azimuth antenna beam scanning.

More specifically, in Figure 1, the wave guide transmission line 79 leads from the transmitter 33 and receiving system 97, 57. A T-joint 71 divides this transmission line into two branches 73 and 95, leading through switch assembly 101 to the elevation and azimuth assemblies 103 and 55, respectively. These branches have suitably placed shutter slots which receive the rotating shutters 75 and 75A, respectively. These are mounted on the common drive shaft 93, driven by the motor 77, and have two blades each arranged in opposite fashion, so that when one antenna transmission branch is opened, the other will be blocked by its shutter. The shutter blades cover angles of approximately 100 degrees, leaving openings of 80 degrees as required by region N of Figure 3.

As mentioned previously, the same drive shaft 93 operates the two antenna beam scanning mechanisms represented by the dotted lines 99, 79, and assumed to be of the same construction as in the abovementioned Allebach application and built into the antenna assemblies. In the arrangement shown in Figure 1, the eccentric cams 83, 81 on shaft 93 operate the same scanning mechanism. Since each of the cams 83, 81 has one lobe, while its associated shutter 75A or 75 has two lobes, one opening in the shutter will find the antenna scanning in one direction, the other in the opposite direction. The azimuth and elevation unblanking switches 75A and 67 are shown schematically in Figure 1 as being cam actuated, being operated by the two-lobed cam 89, for purposes of establishing the unblanking or intensifying voltages represented in Figure 4.

The az-el relay switch 69 is operated by the cam 87 on shaft 93 to control current to the circuit switching relays, the junction of which is described hereinafter.

Radar echo signals, when received at the elevation antenna 103 or the azimuth antenna 55, as the case may be, are fed back into the switch 101 and passed through the T-R switch 97 into the receiver 57. Receiver 57 serves to detect the video and after the video is amplified in the video amplifier stage 107, it is applied as so-called normal video to the correspondingly designated leads 22 in both Figures 2 and 7. Such video, i.e., radar video, derived from echo signals may be applied directly to the cathode of the cathode ray tube 11 shown in Figure 1 for purposes of producing visual indications; or, such normal video may first be "standardized" by applying the same to the video shaper indicated as such in the block diagram shown in Figure 7 and described in greater detail with respect to Figure 8. It is understood that other means may be used for applying the video to an intensity control electrode of a cathode ray tube and, for example, the means and techniques described and claimed in the copending application of Landee et al., Serial No. 247,616, filed September 21, 1951, now U.S. Patent 2,796,603, and assigned to the same assignee, may be used for this purpose.

The cathode ray tube 11 in Figure 1 has a pair of magnetic deflection coils 22B, 22A, so arranged as to deflect the associated electronic beam substantially parallel to two mutually perpendicular axes, i.e., the so-called "time base" axis which is generally, although not exactly horizontal as viewed by the operator, and the so-called "expansion" axis which is generally vertical. In general, each basic trigger pulse developed in synchronizer 31 (Figure 2) is made to initiate a current wave of sawtooth form through the time base deflection coil 22B and a current wave of similar form through the associated expansion deflection coil 22A, the current in each coil expanding approximately linearly with time and then returning rapidly to zero. Instead of a linear variation, this variation may be logarithmic in character as described in the copending application of Homer G. Tasker, Serial No. 175,168, filed July 21, 1950, now U.S. Patent 2,737,654, and assigned to the same assignee as the present application.

The resulting rate of such sawtoothed current is of course the same as, or a fractional multiple of, the pulse repetition rate of the transmitted radar pulses and occurs during the expectant period of resulting echo signals. It will be understood that electrostatic deflection of the cathode ray beam may be used instead of electromagnetic deflection, appropriate modification being made in other parts of the equipment.

Such sawtooth currents applied to the deflection coils 22B, 22A, however, are "modulated" at a much lower rate by currents of much lower periodicity which are produced by the aforementioned beam angle voltages shown in Figure 2. Those portions of the voltage indicated in heavy lines in Figure 2 only are used to modulate the voltages on a time sharing basis.

These voltages as represented by the curves 61, 63, may vary from plus 2 volts at one extreme of the scanning range to plus 52 volts at the other end. These particular antenna beam angle voltages as mentioned previously are used in effect to "modulate" an amplitude of the saw tooth voltage waves developed at the sweep amplifier shown in Figure 2 and applied at a much higher repetition rate to the expansion coil 22A, for purposes of obtaining so-called unidirectional or uni-dimensional magnitudes in the cathode ray display, in accordance with the principles set forth in the copending application of Homer G. Tasker, Serial No. 680,604, filed July 1, 1946, now abandoned, and assigned to the same assignee as the present application. On the other hand, the amplitude of the saw tooth voltage waves developed at the sweep amplifier and applied to the other quadraturely acting timing based coil 22B is likewise modulated to a much smaller degree and in a different manner, for purposes of orientation. Thus the amplitude of the currents applied to coil 22A is automatically varied in accordance with antenna beam angle voltage, so that the angle which any particular cathode ray beam makes, corresponds, on an expanded scale, to the antenna beam voltage.

The tube 11 is rendered fully operative for producing visible indications only when a suitable intensifying voltage is applied to its grid 112G, bringing the tube approximately to cut off condition. A relatively small additional video signal applied to the cathode 112C then strengthens the cathode beam, making it momentarily visible on the screen as a dot, the position of which is determined by the currents flowing at that particular moment in the set of deflection coils 22A, 22B.

For purposes of developing the aforementioned suitable deflecting currents in the cathode ray deflection coils 22A, 22B, the sweep generating circuit shown in Figure 1 is applied with basic triggers originating in the synchronizer 31 and applied to lead 10. Such trigger is applied to the delay multivibrator and blocking oscillator stage 110A, the output of which is fed to the sweep generating multivibrator stage 111A. Negative gating voltage is generated in the stage 111A and fed to the expansion and time base modulator stages 112A, 123A, respectively, and from them in modulated form through the expansion and time base amplifiers 124A, 125A. The output of the amplifiers 124A, 125A in the form of essentially trapezoidal waves of appropriate amplitude is applied to the expansion deflection coil 22A and the time base deflection coil 22B, respectively, causing current pulses of substantially linear saw tooth form in the coils. Expansion and time base centering circuits 126A, 127A, are also connected to the deflection coils. The modulator stages 112A, 123A, for purposes of modulation, receive az-el antenna beam angle voltages via switches $m$ and $n$, respectively, of relay K1101.

With the relay unactuated (as shown) the elevation beam angle voltage appearing on the potentiometer resistance 134A is applied through switch $m$ to the expansion modulator 122A; and through potentiometer resistance 135A and inverter 135B and switch $n$ to the time base modulator 123A. After completion of the elevation scan relay K1101 is energized through switch 69 breaking the elevation beam angle voltage connections just described, and connecting the azimuth beam angle voltage through potentiometer 136A and switch $m$ to the expansion modulator 122A; and through potentiometer 137A, inverter 131A and switch $n$ to the time base modulator 123A.

Thus the degree of modulation of sweep current, and hence the degree of angle expansion of the display shown in Figure 6 may be separately regulated for the azimuth display by adjustment of the potentiometer 134A, and for the elevation display by adjustment of the potentiometer 136A; and the degree of modulation of the time base sweep current, and hence the apparent angle between the range marks and the time base may be separately regulated for the azimuth display by adjustment of potentiometer 137A, and for the elevation display by adjustment of the potentiometer 135A.

The centering circuits 126A, 127A in Figure 1 are individually capable of two separate adjustments, one effective when relay K1102 is actuated (azimuth display) and one when the relay is unactuated (elevation display) to determine the position of the points $O_2$, $O_1$, respectively, in Figure 6. Thus the origins of azimuth and elevation displays are separately adjustable, the centering circuits automatically responding to one or the other set of adjustments according to the energized condition of relay K1102. A schematic diagram showing a centering circuit for this purpose is shown in Figure 5.

The deflection coil 22A in Figure 5 is connected between a 700 volt positive supply and two parallel circuits, one leading to ground through tube V-1116, which is the final stage of expansion amplifier 124A and the other returning through choke coil L1101 and centering tube V-1117 to a 1,000-volt positive supply. The first of these two circuits feeds to deflection coil 22A, the periodically varying sweep producing component, while the second circuit provides a relatively constant but adjustable centering current component. The cathode resistor of centering tube V-1117 is made up of two parallel connected potentiometers 13 and 15, the movable contacts of which are connected respectively to the normally closed and normally open contacts of switch $m$ of relay K1102. A switch arm is connected through grid resistor 17 to the tube grid. The grid bias, and hence the centering current through the tube and through the coil 22A thus depends upon the position of relay switch $m$ and is determined by the setting of the potentiometer 15 when relay K1102 is actuated (azimuth display) and by the potentiometer 13 when the relay is not actuated (elevation display). The two displays are therefore separately adjustable on the indicator tube by means of the two potentiometers.

The time base deflection coil 22B is provided with centering circuit which is identical to that in Figure 5 and functions in a like manner, controlled by switch $n$ of relay K1102. In fact, by appropriate changes of the numerals and lettering Figure 5 may be considered to illustrate the time base centering circuit. The potentiometers then provide separately adjusted ordinary elevation and azimuth displays with respect to the horizontal positions.

It is noted that the preferred interrelationship of the two displays in Figure 6 is such that the series of corresponding range marks of the two patterns lie in a straight line so that the two aircraft images 38A, 39A always lie in a line just parallel to the range mark lines, one directly above the other.

The azimuth and elevation displays shown in Figure 6 are limited so that they appear as shown, such pattern clipping or limiting being produced by operation of the pattern clipper or limiter 40A shown in Figure 1. Such sweep limiter 40A forms, per se, no part of the present invention. In general, the output of sweep limiter stage 40A is a negative-going gating voltage 40B applied to the first anode 19 of the cathode ray tube 11. Such negative-going gating voltage 40B is used for darkening, i.e., blanking out, the indications which may be otherwise visible. Such blanking occurs during undesired periods of sweep as now described specifically.

The azimuth display, which is preferably the lower one, is blanked or clipped or limited, above a horizontal line LM which extends parallel to the runway axis 150A and at a sufficient distance above it to allow for expected errors in the azimuth angle of approaching aircraft. In the elevation (upper) display, a section is cut out or clipped, such section being below the horizontal runway axis $O_1G$ and to the right of a short generally vertical line KJ. This line KJ is located just to the left of and parallel to the upper limiting sweep path $O_2L$ of the lower azimuth display. The region thus eliminated from the elevation display corresponds to space below the runway level.

Besides serving to produce this desired clipping in the visual display, the negative-going gating voltage 40B developed in the limiter stage 40A is useful in the automatic tracking system shown in block form in Figure 7 for limiting the time during which video is available in such automatic system. For that purpose gating voltage 40B is applied as shown therein to the "Video Shaper" for purposes of limiting the time during which standardized video is produced in the manner described hereinafter.

As shown in Figure 1 and 7 the input to the sweep limiter 40A is: (1) a trigger derived from the basic trigger appearing on lead 10; (2) the azimuth and elevation angle coupling voltages on leads 18 and 20 respectively; and (3) the az-el relay voltage on lead 16. It is understood that this negative gating voltage 40B appears at variable times along the time axis depending upon the magnitude of either the azimuth or elevation beam angle voltage, whichever one at that particular time is effective.

The purposes of the switches 300A, 300B shown in Figure 1 are fully described in the above mentioned application of Homer G. Tasker and for the present instance may be considered to remain closed.

It is observed further in connection with Figure 1 that sweep multivibrator 111A generates a positive-going gating voltage 21 of a duration substantially equal to the time duration of the cathode beam sweep and such positive-going gating voltage is applied to the second mixer stage 23 to produce the wave form 25. This wave 25 comprises pulses of sweep frequency added to the longer azimuth and elevation gates which are developed in the first mixer stage 27 and shown also in Figure 4. This composite wave 25 is applied to the cathode ray grid 112G, bringing the tube up to the point of cut off during each sweep. By this expedient the cathode ray tube is conditioned for producing visual indication only during those times when video signals are being expected.

The range marks 40, 41, 43, 45, 47, and 49, shown in Figure 6, are developed by the range mark generator 41A (Fig. 1) in accordance with basic triggers applied to such stage from lead 10. The range marks developed in stage 41A are applied to the cathode 112C.

It is observed that the display shown in Figure 6 includes sectors defined by the so-called V-follower lines 50A, 51A and 52A, 53A, which sectors are developed using the apparatus connected to the leads in Figure 1 marked Az Servo Data No. 1, Az Servo Data No. 2, and El Servo Data No. 1 and El Servo Data No. 2, all in accordance with the teachings in the above mentioned U.S. Patent No. 2,796,603.

Also Figure 6 shows the glidepath course line 149A and runway course line 150A. These two course lines may be developed electronically by apparatus described and claimed in the copending application of Raymond G. Tasker and Burton Cutler, Serial No. 222,512, filed April 23, 1951, now U.S. Patent 2,832,953, and assigned to the same assignee; or, preferably, these lines are obtained using the cursor generator illustrated in Figures 24 and 25 herein.

*Purpose and function of apparatus*

The apparatus described herein combines the functions of:

(1) Aircraft acquisition
(2) Automatic tracking
(3) Error computation and control signal transmission The controlled aircraft is equipped with suitable radio equipment and an autopilot with automatic approach coupler. This equipment may be used as an automatic ground controlled approach system (AGCA) for the simultaneous guidance of two or more aircraft during their approach to a given runway adjacent to which radar equipment is located for scanning the approach zone.

The radar system incorporates two antennas, one for scanning the approach zone in a vertical plane, and the other antenna scans the same approach zone in a horizontal plane. Vertical scan is from minus 1° to 6° while horizontal scan is in the order of 20°. In a system of this character, an approaching aircraft is first located by conventional search radar, using for example, a plan position indicator (PPI) and is then directed by radio communication to the correct position for entry into a predetermined ideal glidepath (vertical plane) and course line (horizontal plane). The final approach along such ideal glidepath and course line is indicated upon the face of a cathode ray tube and the actual course of the aircraft is visually compared with that of an ideal approach, such ideal approach, i.e., ideal glidepath and ideal course line being developed electronically by a so-called cursor generator.

In prior art systems of this character, radio communication is used to direct the aircraft along such ideal glidepaths and course lines; but in accordance with the present invention, means are provided for developing and transmitting to the aircraft, control signals which are representative of the deviation of the aircraft from such glide-path and course line for purposes of maintaining, or tending to maintain, the flight of such aircraft along such glidepath and course line.

For accomplishing such automatic control of aircraft, the AGCA system described herein is such as to receive information from conventional GCA radar equipment relative to the range azimuth and elevation positions of the approaching aircraft and to compare these positions with an ideal predetermined glidepath. The result of this comparison, in the form of error signals, is electronically computed and automatically sent to the controlled aircraft via very high frequency radio communication. AGCA airborne equipment receives this information (correction signals) and interprets it in the form of control voltages, which are applied to the aircraft's autopilot approach coupler.

The range of this automatically controlled approach is from approximately eight miles from the given landing field to a point of release from the system, known as touchdown. This point of release, or touchdown, is at an altitude of approximately fifty feet above the given landing strip; and at such a position of altitude that the pilot may assume control for the actual landing operation during the last few seconds of the landing.

Prior to the establishment of flight control of an approaching aircraft, communication between the AGCA installation and pilot of the incoming plane, may be effected via a conventional transmitter receiving system in the VHF band in the region of 140 megacycles.

Briefly, in operation of the AGCA system, the search radar operator, using the display of the conventional search radar (PPI) tracks the aircraft to a proper position altitude of the AGCA final approach. The entry into the AGCA system is along an "on course" approach line at a distance of approximately ten miles and at an elevation of approximately 2800 feet above the air field.

In the meantime, the radar equipment being energized, is in its "search" function or condition in which a slow search sweep voltage is periodically developed for searching a radar echo from the approaching aircraft. As a matter of fact, coincidence of a radar echo from such aircraft with such slow search sweep voltage notifies the system of an approaching aircraft; and thereupon the tracking unit, illustrating in Figure 13, automatically switches from such "search" function or condition to a "track" condition and displays the range and speed of the incoming aircraft. Simultaneously, upon switching from such search to track function, the AGCA transmitter is turned "on" and a sub-carrier on a transmitted wave, containing a so-called "channel select" key, is transmitted to the approaching aircraft. At a given range, or upon directions from the ground via conventional radio transmission, the pilot of the approaching aircraft renders effective his airborne decoder (signal data converter) by actuating a switch.

Actuation of such switch starts the search drive motor of the airborne decoder, and the output of the AGCA airborne receiver is searched for an AGCA sub-carrier. At intervals of 25 seconds, the AGCA ground transmitter is automatically interrupted for a one-second period. This interruption constitutes "interrogation."

If upon the "interrogation" the airborne decoder has located the transmitted sub-carrier, the signal interruption causes the detector to send a 4500 cycle per second "confirmation" signal to the ground via the airborne transmitter. This "confirmation" signal is received by the AGCA receiver and serves to energize relay windings to apply a plus 28 volt so-called "control" signal to a common bus of the ground equipment.

At the time the range tracking unit in Figure 13, automatically switches from its "search function" to its "track function" as described above, a so-called tracking "on" signal developed in the range tracking unit is applied to the computer unit illustrated in Figures 18A and 18B, so that a computer unit is conditioned to compute the error, if any, of the aircraft from the ideal glidepath and ideal course line.

Upon development of the confirmation "control" signal resulting from "confirmation" the AGCA transmitter is turned on to transmit to the aircraft the error signals computed by the unit shown in Figures 18A and 18B, as well as certain other information. Such error signals, i.e., azimuth and elevation control signals, as well as a signal representative of the instantaneous range of the aircraft, is used to modulate the sub-carrier transmitted to the aircraft, to provide the autopilot with correction signals for "on" course approach and providing the pilot with visual display instantaneous range from touchdown information.

The data, including control signals for effecting flight of the aircraft as well as other control signals, are transmitted from the ground to the aircraft by the use of a sub-carrier on the transmitted wave.

The AGCA system as developed includes a frequency spectrum which encompasses a carrier width sufficient for the control of six aircraft simultaneously. For this purpose, the AGCA carrier wave, transmitted in the region of 109 megacycles, includes a 30 cycle reference tone, a 3800 cycle voice band, and six positions for sub-carriers, equally spaced from 5 to 15 kilocycles upon the basic carrier, there being one sub-carrier for each of the six aircraft. This condition is represented in Figure 39 which illustrates the side bands on one side of the carrier wave only.

The 30 cycle reference tone originates in the AGCA transmitter mixer, and is used as a reference signal by an airborne decoder entering AGCA control. Such reference tone serves as a comparison for a 30 cycle phase shifted tone, included in all of the sub-carriers.

The voice band from 300 cycles to approximately 3800 cycles is included upon the basic carrier. This band is used to pass frequencies over the AGCA semi-private voice line upon the establishment of control, i.e., confirmation to the ground by the aircraft. Through a holding relay in the AGCA coder described hereinafter, voice communication between the ground installation and the aircraft's pilot is automatically available for a period of one minute after a "wave-off" signal (release of ground control) is transmitted from the ground; or, communication may be held for an indefinite period by the ground operator by the actuation of a control switch.

The six sub-carriers, equally spaced, may be included in the modulation of the basic carrier at frequencies from 5 to 15 kilocycles above and below the basic carrier frequency. In general, the AGCA coder circuitry illustrated in Figure 41, serves to modulate a particular AGCA channel sub-carrier with control functions of azimuth error, elevation error and other functions enumerated below. This unit includes a sub-carrier oscillator, which develops the sub-carrier used in the particular control channel. The output of the oscillator is modulated by a square wave, generated within the coder unit, and the shifting of the frequency, amplitude, type, and symmetry of this modulation in indicated in Figure 40.

The control functions modulating each sub-carrier and the methods of modulation, are as follows:

(1) Azimuth control of the aircraft is effected by frequency modulating the 30 cycle phase shifted signal included on the particular sub-carrier.
(2) Elevation control is obtained by using amplitude modulation by variation in symmetry of a square wave as indicated in Figure 40.
(3) The pilot of the aircraft is provided with information as to his range from touchdown, using amplitude modulation by varying the frequency of the square wave as indicated in Figure 40.
(4) A relay in the aircraft may be controlled from the ground for purposes of effecting voice communication and for that purpose amplitude modulation using 30% modulation by the square wave is employed.
(5) So-called "channel selection" is provided using 70% amplitude modulation by the square wave.
(6) Warning signals are transmitted to an approaching aircraft when his spacing to a preceding plane is below a predetermined minimum spacing and for that purpose, frequency modulation using variable deviation of the 30 cycle signal on the sub-carrier is employed, in such case a deviation of 180 cycles constitutes a warning signal.
(7) Also a "wave-off" signal may be transmitted to the aircraft, the wave-off being effected upon absence of 30 cycle modulation of the sub-carrier.

The AGCA system uses standardized video, i.e., the radar echo signals are shaped by measuring incoming radar echoes and utilizing all signals above a predetermined level to produce standardized pulses, such standardized pulses being of equal width and amplitude to assure consistent tracking performance.

Inasmuch as the antenna beams, i.e., the azimuth antenna and the elevation antenna beams scan through space on a time sharing basis, there are intervals during the scanning periods when there is no video. Moreover during one antenna scanning cycle radar hits, i.e., echo signals may be derived from a plurality of aircraft in the approach zone, some of the aircraft being larger than others and of course at different ranges from touchdown.

In view of these considerations, the AGCA system is provided with so-called range gated automatic gain control in the radar receiver, so as to maintain the gain of the receiver at a substantially constant level during scanning cycles.

For this purpose, the circuitry of the range gated automatic gain control measures the amplitude of radar echos reaching the ground based equipment, and controls the gain of the intermediate frequency amplifier in the superheterodyne type radar receiver, in an inverse relationship. This circuitry includes adjustable "memory" and "learning" characteristics whereby the intermediate frequency gain control is partially dependent upon "remembered" input and whereby the rate of response to new input amplitudes may be varied.

The AGCA system incorporates certain safety features, one of such features being termed "control with warning," and results when the separation between any two tracked aircraft falls below a minimum preset value. This "control with warning" signal may be observed visually by warning lights at the ground equipment, and is also transmitted to the pilot of the overtaking aircraft. This "control with warning" signal is derived in the so-called overtake warning and wave-off unit, illustrated in Figures 29 and 30, from data supplied thereto from two range tracking units of the type illustrated in Figure 13.

A second safety feature involves so-called error "wave-off" which is initiated through the failure of an aircraft to respond to AGCA control signals and the circuitry for this is illustrated in connected with Figures 18A and 18B.

A third safety feature which is related to the first mentioned safety feature, involves an excessive overtake condition. When an approaching aircraft overtakes a preceding aircraft by more than a pre-established distance, an error wave-off signal, derived by the circuitry illustrated in Figures 29 and 30 is transmitted to the aircraft to release the autopilot from AGCA control and effects the transmission of a maximum "fly-up" signal to the aircraft.

The aforementioned wave-off signals should not be confused with the normal wave-off signal transmitted to the aircraft. In a normal approach, an automatic wave-off signal is transmitted to the aircraft indicating the return of flight control to the pilot for the final landing operation. One minute after the transmission of such normal wave-off signal, the particular control channel which causes tracking of the aircraft automatically returns to a "stand-by" condition so that it may automatically re-enter AGCA channel sequence cyclically.

It should be noted that a complete AGCA system includes, for each aircraft to be tracked in the approach zone, the following components: a range tracking unit of the character illustrated in Figure 13, a computer unit of the character illustrated in Figures 18A, 18B, a coder and sequenching unit of the character illustrated in Figure 41 with auxiliary equipment. These enumerated elements constitute a so-called control channel and means are provided in the AGCA system for placing each channel in the following conditions to perform the designated functions. These conditions and functions are:

(1) "Stand By"
(2) "Search"
(3) "Track"
(4) "Control"
(5) "Controlling With Warning"
(6) "Wave Off"

Means are provided for automatically sequenching the operation of a plurality of control channels, thus, assuming two control channels, i.e., Channel No. 1 and Channel No. 2, upon actuation the AGCA equipment in Channel No. 1 automatically goes into "search" condition, while the equipment in Channel No. 2 remains in a "stand by" condition. Channel No. 1 thus awaits the incidence of an aircraft radar echo within the glidepath approach area. The incidence of such an echo causes the equipment of Channel No. 1 to automatically change from the search condition to the track condition and also institutes a ground air data link; the equipment in Channel No. 2 still remains in a "stand by" condition.

Means are provided herein for preventing the equipment in both Channels No. 1 and No. 2 from tracking the same aircraft, although the equipment in Channels No. 1 and No. 2 may both simultaneously "control" different aircraft. While tracking aircraft in the tracked condition, the particular channel has means for displaying the instantaneous range and speed of the aircraft being tracked by that channel and transmits signals of interrogation to the aircraft.

Confirmation of the ground air data transmission link by the incoming aircraft, causes the equipment in Channel No. 1 to change from the "track" to the "control" function. Upon switching to the control function, correction signals are sent to the aircraft; and, simultaneously, the equipment in Channel No. 2 is automatically switched from its "stand by" condition to its "search" condition, awaiting the incidence of echoes from a second aircraft within the approach zone. After incidence of such echo, the equipment in Channel No. 2 automatically goes into its track condition and later, after confirmation, goes into its control condition or function.

Thereafter, the equipment in Channel No. 2 may go into its "control with warning" condition or function should the aircraft which it is tracking, approach too closely the aircraft tracked by Channel No. 1; and, should the pilot of the approaching aircraft fail to heed the warning and slow up the speed of his aircraft to prevent the approaching aircraft from falling within a predetermined minimum spacing, then the equipment in Channel No. 2 automatically goes into a "wave off" condition or function, and transmits a maximum fly-up signal to the approaching aircraft. Other wave-off signals may be transmitted by either Channels No. 1 or No. 2, depending either on whether or not the particular aircraft being tracked responds to control signals, and, a normal wave-off signal is transmitted by Channels No. 1 and No. 2 successively as the aircraft which they correspondingly tracked reaches the touchdown point.

In general, the range tracking unit illustrated in Figure 13 performs the functions of aircraft acquisition and aircraft range tracking, and displays the instantaneous speed and range of the tracked aircraft. In addition, this unit produces a tracking on signal at the time the unit is switched from a search condition to its track condition. Also developed in the tracking unit is a so-called video on signal of the character illustrated in Figure 20 for "notifying" elements in the computer unit illustrated in Figures 18A, 18B, of the time at which video is present. Further, the tracking unit develops a "3-mile pick-off" signal when the tracked aircraft is within three miles of touchdown so as to render effective the operation of the excessive error wave-off circuitry in the computer unit, Figures 18A, 18B.

The operation of the range tracking channel is such that when it is in a "search" condition, radar echoes entering the tracking unit as standardized video are compared with a variable delay gate controlled by the one-tenth cycle per second saw tooth wave illustrated in Figure 11 and developed by the circuitry shown in Figure 10.

Coincidence of the delay of the range gate with the delay of video representing an aircraft causes the tracking unit to send the confirmation "tracking on" signal to the AGCA coder and the AGCA computer. Tracking of the incoming aircraft in range commences at this point and consists of constantly revising the range of the tracking gate so that it continues to encompass the approaching aircraft.

"Range voltage" proportionate to the delay of the tracking gate in relationship to the system trigger, is displayed and applied to other portions of the circuitry. The differentiation of "range voltage" with respect to time produces a "speed voltage" which is also displayed.

During the "search" condition, the range gate of the tracking unit has a width of approximately 2.2 microseconds. Confirmation of ground control by incoming aircraft applies a control "on" signal to the tracking unit to cause such unit to automatically switch from its track function to its control function and to simultaneously cause the tracking gate to be narrowed to approximately 2.2 microseconds.

During periods of "control" the range tracking unit passes range information to the AGCA computer (Figures 18A, 18B) and in addition, a video "on" signal which notifies the computer of the time at which video is present. During the "control" condition, the area in which the tracking unit may track video is limited by an angle gate originating in the computer (Figures 18A, 18B).

The angle gate generator circuitry for this purpose, in Figures 18A, 18B, limits the region as indicated in Figure 20, within which the range tracking unit may respond to radar echoes to an area closely surrounding the tracked target. This angle gate circuitry is not operative during the "search" condition, but is rendered effective upon development of the tracking on signal, i.e., upon switching of the unit from the search condition to the track condition.

The AGCA system includes an overtake warning and wave-off unit illustrated in connection with Figures 29 and 30, such unit being common to a plurality of channels of automatic flight control and providing two of the aforementioned safety features.

The tracking unit of each control channel, i.e., the aforementioned Channels Nos. 1 and 2, generates a range gate the time delay of which is directly proportionate to the instantaneous range of a tracked aircraft. This range gate is applied to the proper individual channel in the overtake warning and wave-off unit, which creates a so-called "safety gate" of manually variable width, immediately following the tracked aircraft.

The "safety gates" following each tracked aircraft are applied to a common bus, which is constantly monitored by a coincidence detector. Coincidence of the range gate of one tracked aircraft with that of another, triggers a saw tooth generator circuitry whose output is measured for control purposes. The degree of "overtake," expressed as an output voltage for each channel, is measured by two relay control circuits. The existence of an "overtake" condition results in closing of a so-called "overtake" relay, which provides suitable warnings from a common bus. Greater degrees of "overtake" actuate the so-called "wave-off" relay, to cause the transmission of wave-off signals to the aircraft.

The AGCA system incorporates means shown in Figures 18A, 18B for generating an alternating voltage representing at the zero voltage crossover points an "ideal" glidepath and "ideal" course line, which are so adjusted to coincide with an actual physical ideal approach to a given air field. This glidepath and course line thus generated for the primary purpose of developing control signals for controlling the flight of an aircraft both in elevation and in azimuth, may be checked visually on the face of a cathode ray tube upon re-arrangement of the circuitry used in accomplishing the primary function of developing control signals.

Also the AGCA system includes a so-called artificial aircraft unit as auxiliary equipment primarily useful for alignment purposes. In general, the artificial aircraft unit illustrated in Figures 31 and 32 functions so that an electronically produced "artificial aircraft" may be manually shifted in a turn "elevation" and "azimuth" angular position, may be caused to pursue a rapid return in "range" and may be caused to "fly" either backward or forward. When used for alignment purposes, the artificial aircraft is inserted as a portion of a servo alignment loop in which a channel of automatically controlled flight tracks and controls the original aircraft. Control signal from the computer are integrated and used to control the "elevation" and "azimuth" positions of the artificial plane. Correction signals, computed by the ground equipment, may be compared with the visual position relationship of the artificial aircraft and the displayed ideal glidepath for alignment purposes.

Further, the AGCA system includes so-called clutter gating circuitry illustrated in connection with Figures 26, 27 and 28 for developing gates adjustable in width and adjustable in range in the aircraft approach area. This clutter gating circuitry supplies a control signal to the computer illustrated in Figures 18A, 18B, when a tracked aircraft is within the limits of these adjustable gates, i.e., within a clutter area, such control signal serving to attenuate computed error signals within the gated areas.

*Brief description of range and angle tracking circuits with respect to Figures 43, 44, 45, 46 and 47*

In ascertaining the position of an aircraft with respect to a predetermined glidepath, certain concepts are embodied herein which are exemplified in connection with Figures 43 and 44. In this respect, Figure 43 illustrates a theoretical approach to the solution of this problem, while Figure 44 represents the circuitry as actually described in detail herein, the arrangement in Figure 44 being preferred particularly since it conveniently allows the development of an angle gate.

In Figure 43, range tracking of the aircraft is obtained using circuitry in the range tracking unit 1700, such unit 1700 being supplied with radar video, i.e., echoes and triggering pulses which are developed in timed relationship with respect to the transmission of pulsed energy to the aircraft; and such unit 1700 develops a voltage on lead 1701 representative of the range of the aircraft as well as a so-called stretched video signal on lead 1702, such stretched video signal being transmitted to the angle tracking circuit 1703 so as to render such unit 1703 sensitive or effective only during the period of such stretched video, i.e., the time during which radar echoes are being received. This stretched video developed on lead 1702 is compared, in time, with the antenna beam angle voltage supplied over lead 1705 to the angle tracking unit 1703; and as a result of the comparison of the stretched video signal with the angle voltage, a voltage is developed on lead 1707 representative of the actual position of the aircraft or plane. This voltage on lead 1707 representative of the actual position of the aircraft, is compared with a second voltage developed in the reference generator 1708, such second voltage being applied to lead 1709, and being representative of the position of an aircraft flying "on course" along a predetermined glidepath or course line, as the case may be.

These two voltages developed on leads 1707 and 1709 are compared in a differential network including resistances 1710 and 1712, so as to develop a different voltage on 1713, such different voltage constituting the so-called error voltage and representing the deviation of the tracked aircraft from such predetermined glidepath or course line.

For this aforementioned purpose, the stretched video on lead 1702 serves to gate the angle tracking circuit 1703, so that angle voltage appears on lead 1707 only during the reception period of echoes.

Inasmuch as the radar equipment is located adjacent the the aircraft landing field and not at touchdown, certain corrections are required in accordance with principles described in connection with Figures 37 and 21, such correction being supplied by the reference generator stage 1708, which may be considered to generate an ideal angle voltage in accordance with the particular value of range voltage appearing on lead 1701.

The error voltage developed on lead 1713 serves to modulate a transmitter for transmitting correction signals to the aircraft.

In the arrangement shown in Figure 44 which is more representative of the actual circuitry described herein, the range tracking unit 1700 supplied with video and system triggers develops on lead 1701 a voltage representative of the range of the aircraft and develops on lead 1702 a stretched video signal of the character illustrated in Figure 20. The range voltage is supplied to the reference generator 1720 which feeds a voltage to the so-called course computer unit 1722 to which is supplied also either azimuth or elevation antenna beam angle voltage, as the case may be at that particular instant.

The course computer 1722 serves to develop a predetermined glidepath or course line as the case may be, such glidepath or course line being determined by the cross-over points (indicated by "×" marks), of an alternating voltage of the character represented in Figure 45. A line passing through these "×" marks in Figure 45 establishes a so-called "on course" line. The alternating voltage of the character listed in Figure 45 appears on lead 1724 in both Figures 44 and 46 and is applied to an angle tracking unit 1726 for purposes of developing an error voltage on the output lead 1728, which is representative of the deviation of the aircraft from its "on course" position.

The angle tracking circuit 1726 is gated to receive incoming information only during the period of the stretched video gate transferred over lead 1702. The angle tracking unit described in detail herein and represented in block diagram form as unit 1726 in Figure 44, is illustrated in Figure 46.

The angle tracking circuit constitutes a servo loop in which a unidirectional feedback voltage developed on lead 1728 serves as an indication of the deviation of the tracked aircraft from the predetermined glidepath or course line. The error voltage developed on lead 1728 is used to modulate a transmitter for transmitting correction signals, so that the aircraft is caused to fly, or tends to fly, along such predetermined glidepath or course line.

In this respect, while the angle tracking unit as such constitutes a servo loop, such servo loop forms a part of a second servo loop, such second servo loop as illustrated in connection with either Figures 16 or 17 constitutes the angle tracking unit supplying information to the aircraft via the ground-to-air data link, the radar link between the aircraft and the radar installation, and the radar installation in turn, supplying information to the angle tracking unit.

Returning to the servo loop illustrated in Figure 46, the alternating voltage of the character illustrated in Figure 45 is sampled at the time of the stretched video on signal developed on lead 1702. In general, at coincidence of the stretched video on signal with a crossover point of the alternating voltage illustrated in Figure 45, a zero error voltage is developed on lead 1728 indicating that the aircraft is flying on course; if, at the time of the stretched video on signal the aircraft is flying to the right of the on course line, a positive voltage is developed on lead 1728; and if, at the time of the stretched video signal the aircraft is flying to the left of the on course line, a negative voltage is developed on lead 1728.

The angle tracking unit illustrated in Figure 46 constitutes a closed electronic servo loop with a unique configuration of samplers and integrators, in which a step function 1730 is developed at the time of each crossover point in Figure 45. This step function 1730 supplied through the limited amplifier 1732 to the sampler 1733 is compared with the stretched video supplied to such sampler 1733. The stretched video signal gates the sampler 1733 so as to cause admission of a positive charge to the first integrator stage 1734 during the time that the video occurs on the high side of the step and a negative charge during the time that video occurs on the low side of the step.

The first integrator stage 1734 integrates the areas under the positive and negative portions of the video envelope, and if any asymmetry exists, the output of the integrator stage 1734 is other than zero, i.e., either positive or negative, causing the second integrator stage 1734 to act in such a way as to center the step 1730 on the stretched video signal or envelope.

The use of double integration provided by stages 1734 and 1735 results in velocity memory in angle tracking, since the output of the first integrator 1735, 1734 is a voltage representing the angular position of the aircraft, and in the absence of video signals, this voltage does not change.

Another important feature of the angle error tracking circuitry illustrated in Figure 46, is that the vertical line of the step function 1730 is automatically centered with respect to the stretched video envelope thereby assuring weighing of all radar hits which constitute the stretched video envelope, it being remembered that the stretched video envelope is of the character illustrated in Figure 20. By thus giving weight to all radar hits, the effective center of the aircraft is established with respect to the predetermined glidepath or course line.

For purposes of assuring range tracking of aircraft appearing on or immediately adjacent the position of the tracked aircraft, the video supplied to the range tracking unit 1700 (Figure 44) is angle gated, i.e., such video is allowed to have its effect on the range tracking unit 1700 only during a relatively short interval when radar hits are being expected from an aircraft being tracked.

For that purpose an angle gate generator 1740 (Figure 44) is provided for developing angle gates substantially at the time the antenna beam crosses the aircraft. The angle gate formed by the generator 1740 in Figure 44 is represented at 1743 in Figure 47 in relationship to other signals and control voltages developed in the system.

In Figure 47, pulses corresponding to the periodic transmission of energy are represented at 1745 as "main bangs." The resulting video echoes of an aircraft flying on or adjacent to the on course line are represented at 1746. A reference delay voltage 1747 is developed in the range tracking unit 1700, by means described in detail elsewhere herein, for tracking such video signal 1746, i.e., for producing range tracking.

As a result of coincidence between the video echo 1746 and delay voltage 1747, the bipolar early and late gates 1748 and 1749 respectively are developed in the range tracking unit 1700. The positive portions of the gates 1748, 1749 are effectively added to produce the range gate 1750.

The range gate 1750 is used for producing different control effects in the system as described herein. One safety feature of the present system resides in the fact that it will not supply correction signals to the aircraft being tracked, unless the video signal 1746 falls within the range gate 1750 and angle gate 1743 simultaneously.

*Ground rate and air rate systems shown in Figures 16 and 17*

Two simplified block diagrams of the AGCA system are presented in Figures 16 and 17. Figure 16 shows a system using "Ground Rate" while Figure 17 shows a system using "Air Rate." These two systems are provided by suitable switching to adapt the system for controlling aircraft having different autopilots.

Precision radar equipment 700 shown in Figure 1 scanning the approach area provides the AGCA equipment with the azimuth and elevation angular scanning data and video targets within the limits of the region scanned. The radar equipment also supplies a system trigger to the AGCA equipment.

Range tracking is accomplished by the AGCA Tracking Unit 701, shown in Figures 12 and 13, which constantly revises the delay of a range rate in such a manner that it encompasses the video envelope of a tracked aircraft. Tracking results in the generation of a range voltage ($\varphi$) directly proportional to the delay, or range, of the radar target echo with relation to the touchdown point.

A second output of the Range Tracking Unit 701, is stretched video shown in Figure 20, a gate of fixed amplitude, enduring for the time required for the radar scan to cross the tracked target, plus a fixed period of 500 micro-seconds. The extension of stretched video throughout the AGCA is known as the "Video-On" signal.

With respect to the reference computer 702, details of which are shown in Figure 18A, assuming that for the small angles scanned in the AGCA approach area, the value of the sine of the angle is approximately equal to the angle expressed in radians, it may be shown that, assuming a touchdown angular position voltage as a reference of zero volts, the correct position angle voltage for any range is found by the general equation $E_r=K(1-1/n)$, where K is an arbitrary constant, and "$n$" is a factor expressing the range of the aircraft from touchdown divided by the range from the equipment to touchdown. The function, therefore, of the reference computer, is the translation of the range voltage ($\varphi$) to a reference voltage, $f(R)$, which, when added to a suitably shifted azimuth or elevation angle voltage, as the case may be, will result in a voltage of zero when the antenna is at the angle equal to the corresponding azimuth or elevation position of an aircraft "on-course" for any given range (zero to ten miles). The input to the reference computed, therefore, is the range voltage ($\varphi$), generated in the Tracking Unit. The output of the reference computer is a general function of this input, following the equation $f(R)=K(1-1/n)$.

The function of the Course Computer 703, details of which are shown in Figure 18A, is in the inversion of elevation angle voltage, and the addition of level-shifted elevation and azimuth angle voltages to the reference voltage. The output of the course computer is a pair of composite angle and reference signals whose value at the instant that the "Video-On" signal occurs, denotes the error of the tracked aircraft from course or glidepath, i.e., error in azimuth or elevation, as the case may be. One of this pair of signals, i.e. the azimuth signal, appears on lead 704 while the other signal, i.e. the elevation signal appears on lead 705. These signals on leads 704, 705 are ninety degrees out of phase and vary cylically at approximately 2 cycles per second.

The azimuth and elevation angle tracking circuits, 707, 708 respectively, each incorporate a substantially identical closed servo loop which is shown in detail in Figure 18A and which is arranged in such a way as to measure the amount by which the input signal deviates from zero at the time of the "Video-On" signal supplied thereto over leads 709, 710 respectively. As explained more fully elsewhere, this constitutes a measure of the angular deviation of the aircraft from a predetermined course or glidepath. In the azimuth tracking circuit 707, the position error determined by the loop is compared with the composite output of the course computer at the time for the the "Video-On" signal. If the values are equal, the "Video-On" signal is bisected by a step voltage and no loop error exists. Hence the course error of the aircraft has been correctly found. If the step voltage does not bisect the "Video-On" signal, a loop error is sensed, which, acting upon the integrators, causes the error voltage output to change in such a manner as to make the step bisect the "Video-On" signal and make the output correctly described the error of the plane from course. The output of the tracking circuits 707, 708, appears on leads 712, 713 respectively as continuous voltages representing the position errors of the tracked aircraft in azimuth and elevation respectively.

Both azimuth and elevation control signals appearing on leads 712, 713 are modulated by "Course Softening" stage 715, (details of which are shown in Figure 18B), in which control signals are modified by the range voltage in such a manner as to decrease the sensitivity of the system to flight errors as the controlled aircraft approaches touchdown. "Course Softened" elevation control signals in both Figures 16 and 17 are applied directly to the Ground-Air Linkage 717, where they are transmitted to the aircraft 722 and applied as elevation correction signals to the autopilot approach coupler 723 in such aircraft. The transmitted and reflected radar signals 720, 721 respectively between the radar installation 700 and aircraft 722 complete a servo loop.

Azimuth error signals in Figure 16, originating in the azimuth angle tracking circuit 707 and appearing on lead 712, are limited, in Limiter Stage 725 (Figure 18A) in value prior to application to the "Course Softening" circuitry 715. Azimuth error voltages are also differentiated in "Rate" stage 726, producing a rate-of-error signal with regard to time for application to the "Course Softening" circuitry 715. The resulting control signal, "Course Softened" as a function at range, consists of the addition of azimuth error signals and azimuth rate-of-error signals, multiplied by range. The composite information is transmitted by the Ground-Air Link 717 to the aircraft's autopilot approach coupler 723.

When the system is set for "Ground-Computed Rate," as shown in Figure 17, circuitry of the Computer Unit shown in Figure 18B, supplies both azimuth error signals and azimuth rate-of-error signals to the aircraft. For use of the system in "Ground Rate" configuration, certain modifications or adjustments are necessary in the airborne equipment so that rate-of-error signals are not added by the autopilot approach coupled to those rate-of-error signals already transmitted from the ground equipment.

The output of the "Course Softening" circuitry 715, in both Figures 16 and 17, consisting of azimuth and elevation control voltages is applied to the ground-air data link. The ground equipment of the data link consists of the AGCA Coder Unit, the AGCA Transmitter-Mixer Unit, and the BC-640A Transmitter, all shown in Figure 7. The function of the Coder Unit is the translation of the D.-C. control voltages to a modulation of a suitable type for transmission on the carrier of the BC-640A Transmitter. Range voltage, applied as a direct function from the Tracking Unit output, is also applied to the Coder Unit for transmission of range-to-touchdown information to the controlled aircraft. The airborne equipment of the ground-air link consists of a modified receiver for reception of V.H.F. transmission of the BC-640A Transmitter, and the AGCA Decoder Unit which evaluates AGCA, Automatic Ground Controlled Approach information transmitted over the ground-air link.

It is requisite that aircraft in the AGCA system be equipped with an autopilot and a suitable approach coupler for the translation of the Decoder output to suitable autopilot control signals, and for the further translation of autopilot signals to changes of aircraft controls for the achievement of new flight situations. The controlled aircraft therefore represents a beginning and an end point for the AGCA loop of control.

The basic principles of the AGCA system when using "Air-Computed Rate" shown in Figure 17, differ from those of the system when using "Ground Rate," shown in Figure 16, in that the airborne autopilot approach coupler supplies rate-of-error signals to the autopilot by the differentiation of pure error signals transmitted by the ground equipment.

*Description of video standardizer or video shaper shown in Figures 7 and 8*

In general, the video standardizer or shaper included on the chassis of the AGCA synchronizer accepts radar video from the radar trailer and produces pulses of equal width and amplitude for tracking purposes. The video standardizer accomplishes video shaping by measuring incoming radar echoes and utilizing all signals above a predetermined level to produce standardized pulses.

The input to the video shaper is either normal video produced by the apparatus illustrated in Figure 1 and appearing on lead 22, or, in the alternative, may be video developed in the so-called artificial aircraft unit, depending upon the position of a switch in the coder unit.

As seen in Figure 8, the circuitry of the video standardizer includes amplifiers 138, 139 and blocking oscillator 140A, 140B. The video selected by switch S-6003 is capacity coupled to the control grid of amplifier tube 138. The cathode of tube 138 is returned to ground through resistance 141, while the control grid is connected to an adjustable tap on the potentiometer resistance 142, having one of its terminals grounded and the other one of its terminals connected through condenser 143 to the movable switch element of switch S-6003. Such switch element is connected to the ungrounded terminal of the resistance 144. Thus the resistance 142 serves to control the amplitude of the video applied to the tube 138.

In general, the tubes 138, 139, are conventional video amplifiers with the anode of tube 138 coupled by means of condenser 145 to the control grid of tube 139. The voltage thus developed on the anode of tube 139 is applied through coupling condenser 146 to the control grid of the trigger tube 140A. The control grid of tube 140A is connected to the adjustable tap on the potentiometer resistance 148, such resistance 148 being connected in a voltage dividing circuit which includes the voltage source 150 and serially connected resistances 151, 148, and 152. More specifically, the control grid of tube 140A is connected to the adjustable tap on resistance 148 through the serially connected resistances 154, 155. A rectifier 156 is connected in shunt with resistance 155 and the tap on resistance 148 is bypassed to ground by condenser 158.

The anode of tube 140A is connected to receive the az-el intensifying gate appearing on the leads 90, 88 and having the form illustrated in Figure 4, such connection being made through the serially connected resistance 159 and winding 160 of the blocking oscillator transformer 161. The junction point of resistance 159 and winding 160 is bypassed to ground by means of condenser 162. The cathode of tube 140A is grounded. By these connections, it is observed that the tube 140A is rendered effective only during the periods of the azimuth or elevation scanning periods, i.e., only during those periods in which radar video is expected.

The cathode of tube 140B is returned to ground through resistance 163 which forms load resistance across which the standardized video output appears on lead 36. The control grid of tube 140B is connected through the winding 164 to the adjustable tap on the potentiometer resistance 166, such resistance 166 being in a voltage dividing circuit which includes the serially connected voltage source 167, resistance 168, resistance 166, and resistance 169. Bypass condenser 171 is connected between the cathode of tube 140B and the tap on resistance 166. The anode of tube 140B is connected through the serially connected winding 170 and resistance 172 to the positive terminal of voltage source 173.

While the gating voltage, i.e., the intensity gate, applied periodically to the anode of tube 140A, serves to assure operation of the circuit only during the time which radar video is being expected, additional means are provided to prevent the transfer of video during those portions of the azimuth and elevation scanning periods corresponding to the regions in which pattern clipping is illustrated in Figure 6.

Such additional means includes a connection from the lead 174 to the junction point of resistances 154, 155, to which the az-el negative-going limited gate 40B is applied through the coupling condenser 175. This gating voltage 40B is of sufficient intensity to render the blocking oscillator stage 140A, 140B inoperative for the duration of such gating voltage 40B.

Crystal rectifier 176 connected in shunt with the grid return resistance 177 prevents overshoots in the grid circuit of tube 139, which may otherwise be produced in response to integration of the unblanking signal.

It is thus observed that, in the presence of the unblanking gate applied to the anode of tube 140A, the tap on resistance 148 provides threshold adjustment of the level necessary to fire the blocking oscillator stage 140A, 140B. All pulses above the level determined by resistance 148, and occurring during the presence of the az-el unblanking gate, thus cause the blocking oscillator stage to produce pulses of standardized amplitude and width useful for tracking purposes.

*Description of one-tenth cycle per second sawtooth generator illustrated in Figures 7, 9, 10 and 11*

This generator, a searching sweep generator, mounted on the chassis of the AGCA synchronizer unit generates a slow sweep voltage for application to the acquisition circuits of the tracking unit during the "search" function of the system. In general, this search sweep voltage is used to control the delay of the range gate, which is monitored by coincidence circuits of the different tracking units for the presence of aircraft video echoes. The characteristics of this search sweep voltage are illustrated in Figure 11.

To produce the voltage variation shown in Figure 11, the condensers 190 and 191, in Figure 9, are alternatively arranged to discharge through a discharge path which includes the tube 179 and resistance 199.

The circuitry of the searching amplifier generator illustrated in Figure 9 includes a voltage regulator tube 178 for stabilizing the screen grid voltage of tube 179, a cathode follower tube 180, an amplifier tube 181, clamp tubes 182 and 183 and a series of tubes 185, 186 connected in an Eccles-Jordan "flip-flop" circuit.

The operation of the sawtooth generator is initiated by the opening of the normally closed contacts of the thermal time delay relay 187, one of such contacts being connected to the lead 188 of positive potential and the other one of such contacts being connected (1) to the anode of tube 179, (2) to the ungrounded terminal of condenser 189, and control grid of tube 180, and (3) to fixed contacts 200, 201 of the relay 192. Thus, in the initial "cold" condition of relay 187 a positive potential of 150 volts on lead 188 is applied to the anode of tube 179; and, such voltage charges capacitor 189 and either condenser 190 or 191 depending upon whether the relay 192 is energized or deenergized. As shown, relay 192 is deenergized and in such case condenser 191 is charged through contact 201. After the contacts of relay 187 open, the precharged condenser discharges through the tube 179 at a relatively slow rate. When the voltage at the anode of tube 179, and therefore at the cathode of the cathode follower tube 180 falls to a critical value determined by the setting of the tap on the so-called minimum adjust search speed resistance 193, tube 181 is cut off thereby deenergizing the relay 194.

It is observed that the cathode of tube 180 constitutes the output terminal 30 of the generator and that such cathode is connected to the negative voltage source 202 through the serially connected resistances 204, 193 and 205. The anode of tube 180 is connected to the positive ungrounded terminal of voltage source 206. The adjustable tap on resistance 193 is connected to the control grid of tube 181 through resistance 207. The cathode of tube 181 is grounded through the manually operable switch 208. The anode of tube 181 is serially connected with the winding of relay 194 to the positive lead 188.

It is observed that in the energized condition of relay 194, the condenser 195 is connected through resistance 209 to the negative lead 210 so as to be precharged at a negative potential. Upon deenergization of relay 194, as described previously, the negatively charged condenser 195 is connected to the cathodes of the clamp tubes 182, 183 which serve to limit the negative voltage applied respectively to the anodes of tubes 185 and 186. The discharge of condenser 195 thus results in a large negative-going pulse applied to the Eccles-Jordan trigger circuitry which includes the tubes 185, 186, a so-called "flip-flop" circuit. Such large negative-going pulse causes one control grid to rise suddenly above a cut off value, initiating an amplifying function and causing the anode of that section to draw heavy current while the anode of the other section draws substantially no current. It is observed that the cathodes of the tubes 185, 186 are grounded and that the control grids of tubes 185, 186 are connected to the negative lead 210 through corresponding resistances 211, 212. Further, the control grid of tube 185 is connected to the anode of tube 186 through resistance 214; and likewise the control grid of tube 186 is connected to the anode of tube 185 through resistance 215. The anodes of tubes 185 and 186 are connected through resistance 216 to the positive terminal of source 206. The anode of tube 185 is serially connected with the winding of relay 192 to the positive terminal of voltage source 206.

Assuming tube 186 is undergoing the aforementioned cut off function of the trigger cycle, relay winding 192 is deenergized as shown to apply the accumulated charge of condenser 191 to the anode of tube 179. On alternate cycles of relay 192 condensers 190 and 191 are alternately charged during their "off duty" period.

In the "off duty" period of condenser 190, as shown in Figure 9, the condenser 190 has its ungrounded terminal connected through relay contact 218 to the adjustable tap on the so-called maximum adjust search speed potentiometer resistance 197, such resistance 197 being in a voltage dividing circuit which includes the serially connected voltage source 206, resistance 220, resistance 197, and resistance 221. It is observed, that in the "off duty" period of condenser 191 it is likewise charged with positive voltage supplied from the tap on resistance 197 but is charged in such case through the relay contact 223.

It is further observed that the condenser 189 supplies anode voltage to tube 179 during the time of relay switching, thus eliminating undesirable transients from having their effect on the az-el indicator display.

In order to stabilize the operation of tube 179, its screen grid is connected to the ungrounded terminal of the voltage regulator tube 178, such terminal being connected through resistance 224 to the source 206.

In order to control the rate at which the condensers 190, 191 discharge, i.e., to control the slope of the sawtooth waves illustrated in Figure 11, the control grid of tube 179 is connected to an adjustable tap on the resistance 196, such resistance being connected in a voltage dividing circuit which includes the serially connected voltage source 202, resistance 226 and resistance 196.

The switch 208 provides a recycling function, i.e., by opening the same, the relay 194 is deenergized to cause the previously negatively charged condenser 195 to be applied to the flip-flop circuit as described above, to initiate a new cycle.

It is noted, as alluded to above, that the following controls have the following functions, the setting of the tap on resistance 197 determines the maximum voltage at which the condensers 190, 191 are charged, and hence determines peak voltage of the sawtooth wave; the setting of the tap on resistance 196 determines the slope of the sawtooth waves; while the setting of the tap on resistance 193 determines the minimum value of the sawtooth wave.

*Description of range tracking unit illustrated in Figures 7, 12 and 13*

The range tracking unit illustrated in block diagram form and in schematic form, respectively, in Figures 12 and 13, incorporates a servo loop functioning to cause tracking of an aircraft in range, such servo loop serving to develop certain control voltages for purposes of angle tracking computation as well as for producing other control effects.

The input to the range unit includes:
(1) Video over lead 72;
(2) System triggers over lead 12;
(3) The sawtooth voltage wave illustrated in Figure 11 over lead 30, such sawtooth wave, however, being effective only during the "search" function of the equipment;
(4) An angle gating voltage supplied to the tracking unit over lead 56 from the computer unit, such angle gating voltage serving in general to limit the time during which the range tracking unit responds to incoming video. This angle gating voltage may be considered as being the result of range and angle tracking and not a means for range or angle tracking and is illustrated in Figure 20;
(5) A "control-on" signal developed in the coder unit and transferred over lead 74 is for control purposes. This control-on signal and other input voltages enumerated below as input signals are in the form of control signals for the range tracking unit described under this heading.

Briefly, the control-on signal, transferred over lead 74, is the result of "confirmation," i.e., an acknowledgment by an incoming aircraft that it is conditioned for reception of control signals which are thereafter transmitted from the ground to the aircraft for automatically controlling the flight of the same;

(6) Identification voltages transferred over lead 38, such identification voltages when applied by manually operating a switch on the control panel, serve to override the angle gates applied to lead 56, i.e., when identification voltage is present on the lead 38 the index marks developed in the range tracking unit are not limited to the short duration of the angle gate voltages;

(7) Warning and "wave off" interlocking voltages are transferred over lead 78 from the coder unit. For purposes of describing the range tracking unit, continuous 28 volts may be assumed to be present on lead 78.

(8) Index mark interlocking voltages are transferred from the coder unit over lead 76;

(9) The rejection bus 40 is connected between identical elements of different range tracking units in a multiplane landing system and the signals on this bus 40 may be considered either incoming signals or outgoing signals depending upon the relative positions of aircraft being tracked by the two interconnected range tracking units;

(10) The lead 64, during "cursor" operation serves to convey cursor signals from the computer unit to the range tracking unit.

The output signals from the range tracking unit are:

(1) Range voltage appears on lead 82 and the magnitude of such voltage serves as a measure of the range of the tracked aircraft;

(2) A "stretched video" signal is developed on lead 84 and serves to control other related units during that portion of the antenna beam scanning period when radar "hits" are being made on the incoming aircraft;

(3) A range voltage is also developed on lead 80 for control purposes only and is applied to the coder, such range voltage varying as the range voltage on lead 82, but being of smaller magnitude. This range voltage on lead 80 is used for transmitting to the incoming aircraft information as to its range from touchdown;

(4) Index marks or cursor pulses, as the case may be, appear on the output lead 42, such index marks being applied to an intensity control electrode of a cathode ray tube and constituting a pair of time spaced marks which bracket the image of the aircraft on the cathode ray tube screen for purposes of identification;

(5) A so-called "three-mile pick off" signal appears on lead 58 only when the tracked aircraft is within three miles of touchdown, such pick off signal being used for control purposes in the excess error wave off portion of the computer unit. This signal as well as the other output signals enumerated below are in the form of control signals;

(6) A so-called range gate appears on lead 44 and is applied to the overtake warning and wave off unit as well as to "gating central";

(7) A wave off signal is developed on lead 60;

(8) A "tracking on" signal is developed on lead 66 and applied to the computer unit and coder unit for purposes of conveying information to those units to the effect that the range tracking unit is changed from its "search" function to its "track" function;

(9) An alarm signal is developed on lead 62 to convey information as to loss of video.

In general, the range tracking unit includes a servo loop. The servo loop includes the multivibrator stage V2; the early-late gate generator V3 in the form of a blocking oscillator stage; the early and late gate detector stages V5 and V6, the differential integrator stage V7; the cathode follower clamp stage V8; the range integrator stage V9, V10; and the lead 35 extending from the stage V10 to the multivibrator stage V2 completes the loop. The voltage on such lead 35 is termed the "range voltage" and is a measure of the range of the tracked aircraft, when such aircraft is being tracked. The voltage on this lead 35 may be measured on the volt meter 227, i.e., the range meter 227, when the relay 243 is energized.

In order to obtain an indication of the speed of the tracked aircraft on the speed volt meter 231, such volt meter 231 is coupled to the lead 35 through a differentiating network and D.-C. amplifier which includes the tube V11. For that purpose, in the automatic position of switch 228, the lead 35 is coupled to the control grid of tube V-11A through the stationary contact 233 and differentiating network, such differentiating network including the condenser 234 and resistance 235.

The cathodes of tubes V-11A and V-11B are interconnected by means of potentiometer resistance 236 which has its adjustable tap returned to ground through resistance 237. The anodes of tubes V-11A and V-11B are interconnected by means of condenser 239 and are supplied with space current from a 300-volt source through resistances 240 and 241, respectively. The control grid of tube V-11B is grounded. The voltage developed between the anodes of tubes V-11A and V-11B, i.e., across condenser 239, is applied to opposite terminals of the speed volt meter 231. It is noted that the relay 243 is energized in the track function of the unit and is deenergized in the search function of the unit. In the track function the speed is indicated by meter 231; but such meter is disconnected in the search function to avoid damage to the meter inasmuch as searching occurs at a rate comparable to 3,000 miles per hour. It is observed that for this purpose one terminal of the meter 231 is serially connected with the adjustable resistance 245 to the anode of tube V-11A; while the other terminal of meter 231 is connectible through the relay switch 243A to the anode of tube V-11B.

The abovementioned servo loop includes two integrator circuits which include respectively the condenser 246 and condenser 247, condenser 247 being associated with the range integrator stage V9, V10. The voltage developed on condenser 246 is a measure of the velocity of the tracked aircraft and voltage derived from such condenser 246 is integrated in the stage V9, V10 and applied as aircraft range voltage to the aforementioned lead 35.

The manner in which the so-called speed voltage appearing on condenser 246 is developed, is now described in relationship to stages V-1A, V2, V3, V5, V6 and V7.

The system trigger, in the form of a positive pulse, is applied through lead 12 to the control grid of the buffer amplifier tube V-1A, and after amplification therein is applied as a negative pulse to the control grid of tube V-2B. The tubes V-2B and V-2A comprise a part of the multivibrator stage V2. It is observed that the tube V-2B, in its quiescent state, is highly conducting since a positive voltage appears at such time on its control grid. The cathodes of tubes V-2B and V-2A are interconnected so that in such quiescent state the cathode of tube V-2A is at a relatively high positive potential. The so-called range voltage appearing on lead 35 is applied through resistance 249 and through a voltage dividing network 250 to the control grid of tube V-2A.

The multivibrator stage V-2 serves to develop a negative-going gating voltage 251 on the cathode of tube V-2A, the duration of which varies in accordance with the magnitude of the voltage on lead 35. Such gating voltage is started upon appearance of the system trigger, in inverted form, to the control grid of tube V-2B. The multivibrator stage V2 is thus termed a timing modulator since it serves to develop a negative-going gate on the cathode of tube V-2B with a duration representative of the magnitude of the voltage appearing on the lead 35.

Such negative-going gating voltage 251 is differentiated by the differentiating network comprising condenser 252 and resistance 253, which are in the grid circuit of the blocking oscillator stage V3. A positive pulse corresponding to the trailing edge of the negative-going gating voltage 251 is thus applied to the control grid of the trigger tube V-3A. Such positive pulse is, of course, delayed with respect to the system trigger in an amount corresponding to the duration of the negative-going gating voltage 251 developed in stage V2. It is noted that the potentiometer resistance 254 is adjusted so that with zero voltage applied to lead 35, a delay is interposed which corresponds to the aircraft touchdown position, while resistance 256, 257, 258 allow adjustment of the scale of the delay with respect to range voltage.

The blocking oscillator stage V3 has two separate output circuits, one of which includes the transformer winding 259 for developing a so-called early gating voltage or gate 260. A late gate 261 is developed on the anode of tube V-3B. The first or "early" gate consists of a positive-going wave form 260 followed by a negative-going wave form and is applied to the suppressor grid of the early detector tube V5. The second or late gate 261 consists of a negative-going wave followed by a positive-going wave form and is applied to the suppressor grid of the late detector tube V6. These positive portions of the pulses 260, 261 produced by oscillator V3 thus appear alternately in the suppressor grids of the early-late gate detectors V5 and V6 causing them to be placed in a condition that they may conduct when positive gated video signals are coincidently applied from lead 262 to the respective control grids of tubes V5 and V6. In other words, tubes V5 and V6 are essentially coincident tubes arranged to conduct only when there is a positive signal applied both to their control grids and suppressor grids.

The manner in which the video appearing on lead 262 is gated is described in detail hereinafter but, in general, such video, when it appears, preferably has a uniform height and a uniform width, so that in effect such video may be uniformly compared with the positive portions of the wave forms 260 and 261.

The signal passed by the early-late detectors V5, V6 is applied to the grids of differential integrator circuits consisting of two triode sections V-7A and V-7B of stage V7.

It is observed that video signals corresponding with the positive-going portion of the early gate 260 are passed by tube V5. Video signals corresponding with the positive-going portion of the late gate 261 are passed by tube V6. The signal appearing on the anode of tube V5 is applied through the pulse transformer 264 to the control grid of integrator tube V-7A so as to charge condenser 246. Video signals corresponding with the positive portion of the late gate 261 is passed by tube V6 and applied by pulse transformer 265 to the control grid of the integrator tube V-7B, lowering the voltage on condenser 246. The combined effect, therefore, of the early-late gate detector circuitry is to charge condenser 246 when radar video corresponds with the early gate (indicating that the aircraft is moving forward at a rate greater than that of the range gate) and to discharge condenser 246 at the time of coincidence of video signal with the late gate (indicating that the gate is going forward at a greater rate than the aircraft). The combined output of tube V-7A and V-7B thus appearing across condenser 246 may be interpreted as a "speed" voltage for the tracked aircraft. It is noted that the range gate mentioned in the previous sentence, is defined by the positive portions of the wave forms 260, 261, such positive portions being displaced, of course, along the time axis. This range gate is formed using the mixer stage V4.

The mixer stage V4 includes the two cathode follower tubes V-4A and V-4B, each of which have their cathodes returned to ground through the common load resistance 266. The control grid of tube V-4A is coupled through the parallel connected resistance 268 and rectifier 269, and serially connected condenser 267 to one terminal of the winding 259 to thereby receive the early gate voltages. The control grid of tube V-4A is returned to ground through condenser 270.

The control grid of tube V-4B is connected through the stationary relay contact 271 and condenser 272 to the anode of tube V-3B so as to receive the late gate when the relay 273 is deenergized as shown in Figure 13. It is noted that the relay 273 serves generally to narrow the range gate and to increase the time constant of the servo loop in the "control" function of the equipment, i.e., after the incoming aircraft has confirmed or acknowledged that it is in condition for reception of transmitted control signals; or, more specifically, while angle tracking is being accomplished. For that purpose, the relay 273 is energized by the "control on" signal applied to lead 74. With relay 273 energized the control grid of V-4B is connected to a −150-volt source and is no longer receptive to the late gate; at the same time the resistance 276 is no longer short circuited by the relay switch 277 but such resistance 276 is then serially connected with the condenser 246. Thus with relay 273 energized the range gate appearing on lead 262 has a time duration commensurate only with the time duration of the early gate and is substantially independent of the time duration of the late gate. As indicated in Figure 13, the range gate developed across resistance 266 has a time duration of approximately four microseconds in both the search and track functions of the equipment; but in the control function the time duration is decreased to a value of approximately 2.2 microseconds. The manner in which the range gate thus developed on lead 275 is utilized is described in detail hereinafter.

As noted previously, a voltage representative of the speed of the aircraft is developed across condenser 246. The voltage appearing across condenser 246 produces a proportional voltage on the cathode of the cathode follower stage V8.

Stage V8 comprises tube V-8A and V-8B, which have their cathodes interconnected and, in turn, connected to a −150-volt source through serially connected resistances 279 and 280, the junction point of which is by-passed to ground by means of condenser 281.

The voltage appearing on the cathodes of tubes V-8A, V-8B is applied to the control grid of the range integrator tube V9 through the normally closed relay switch 282 of relay 283. It is noted that the relay 283 is shown in its deenergized condition which corresponds to the condition wherein the circuit is adjusted for automatic tracking. Relay 283 is energized only during the time the apparatus is conditioned for so-called cursor operation wherein the switch 284 is set to its "cursor" position, thus remains deenergized in the normal operation of the tracking loop. It is observed that the control grid of tube V9 is grounded by the normally closed relay switch 285 of relay 286. Relay 286 when deenergized as shown is in its search position; but such relay 286 is energized during the track function of the unit. Thus during the search function the control grid of tube V9 is grounded; but during the track function the voltage developed on the cathodes of tubes V-8A, V-8B is applied to the control grid of tube V9.

Thus, in automatic tracking, the speed voltage appearing on the cathodes of tubes V-8A, V-8B is applied to the control grid of the second integrator stage V9, and the integrator output appears on the cathode of cathode follower stage V-10A. For that purpose, the anode of tube V9 is conductively connected to the control grid of tube V-10A through the normally open relay switch 289 of relay 286. The cathode of tube V-10A is returned to the negative terminal of a 150-volt source through a serial circuit which includes potentiometer resistance 290 and fixed resistance 291. The resistance 290 is shunted by the neon discharge tube 292. The integrating condenser 247 has one of its terminals connected to the cathode of tube V-10A and the other one of its terminals connected through switch 282 to the control grid of tube V9. Control grid of cathode follower tube V-10B is connected to the adjustable tap on resistance 290 so as to develop a corresponding voltage on its cathode. The cathode of tube V–10B is returned to the —150-volt source through serially connected resistances 293 and 294.

A regenerative feed back path is provided between the output of tube V–10B and the input of tube V–9, such feed back path comprising the serially connected thyrite resistance 297, the fixed resistance 298 and potentiometer resistance 299, which has its tap connected to the cathode of tube V9. The purpose of the thyrite resistance 297 is to introduce non-linearity in the feed back circuit to compensate for curvature in the characteristic curves of the amplifier tube V9. The voltage thus developed on the cathode of tube V10 is the range voltage and is applied to the range voltage lead 35 in the automatic position of the manually operable switch 228. This voltage on the cathode of tube V10 consists of integrated "speed" voltage and represents the range of the tracked aircraft in terms of nautical miles on a linear scale, the scale being 15 volts per mile.

As indicated above, the voltage developed on lead 35 is applied to the control grid of tube V–2A to complete the loop with the gate width of a multivibrator output 251 being controlled by the range voltage applied through the combination of resistances 250, 256 and 258. The pulse width of the output of multivibrator V2, controlled as a direct function of the range voltage, causes, in turn, revision of the range voltage in an amount depending upon the relationship of the incoming video with the pulse derived from the trailing edge of such gating voltage 251. Aircraft approaching the radar installation cause video pulses to coincide with the positive portions of the early gates 260, charging condenser 246, causing the "speed" voltage at the cathode of tube V8 to rise, and the range voltage from tube V9 to fall. Decreasing range voltage decreases the gate width of the output of the multivibrator V2.

*Coast speed circuitry in Figure 13*

As mentioned above, the range voltage on the cathode of tube V–10 is applied to a voltage dividing circuit which includes the serially connected resistances 293A, 294. The junction point of the resistances 293A, 294 is connected through resistance 300 to the control grid of tube V–1B, the so-called 3-mile pick off tube. Tube V–1B is arranged to conduct only when the tracked aircraft is beyond 3 miles of touchdown. For that reason the tube is sensitized with range voltage as indicated above. The cathode of tube V–1B is grounded and has its anode connected to a +300-volt source through resistance 301. The anode of tube V–1B is likewise connected to a voltage dividing circuit which includes the serially connected resistance 303, potentiometer resistance 304, fixed resistance 305 and —150-volt source 306. The tap on resistance 304 is connected through the minimum coast switch 307 to the control grid of tube V–8B in the on position of such switch. In the off position of such switch 307, the control grid of tube V–8B is connected to the negative terminal of voltage source 310.

The tube V–1B is adjusted so that it becomes cut off when the range voltage corresponds to distance less than 3 miles; and when such tube V–1B cuts off, the voltage developed on the anode of tube V–1B is not only transferred in controllable amounts to the control grid of tube V–8B but is also transferred to the lead 58, which constitutes the so-called 3-mile pick off lead. The tap on resistance 304 may be adjusted to provide different minimum coasting speeds. Generally the voltage thus applied to lead 58 serves to render operative the excess error wave off circuitry in the computer unit only when the aircraft is within 3 miles of touchdown.

*Description of circuitry for developing video "on" signal in Figure 13 from range and angle gated video*

The video "on" signal is developed for control purposes. The circuitry produces for this purpose a square pulse of a high amplitude and sharp definition, the width of the pulse being equal to a time period of the entire video train within the range and angle gates, plus a 500-microsecond delay for the last pulse. Because of this additional delay of 500 microseconds, the video "on" signal is sometimes referred to as "stretched" video and is shown in Figure 20.

The range and angle gated video appearing on the anode of tube V–15B is applied through condenser 383 to the cathode of the video stretch tube V–18A. The cathode of tube V–18A is connected to the adjustable tap on resistance 384 through the resistance 385, such resistance 384 serving as a voltage dividing element since its ungrounded terminal is connected to the —150-volt source. Condenser 386 has one of its terminals grounded and the other one of its terminals connected to the tap on resistance 384, such tape being likewise connected through resistance 387 to the anode of tube V–18A. The control grid and anode of tube V–18A are interconnected and connected through resistance 388 to the control grid on resistance 384, such tap being likewise connected through resistance 389 to the —150-volt source. The anode of tube V–18B is connected to the —150-volt source through resistance 400. Condenser 401 is connected between the anode of tube V–18A and ground. The control grid of cathode follower tube V–19A is connected to the anode of tube V–18B. The cathode of tube V–19A is connected through resistance 403 and resistance 389 to the —150-volt source. The video "on" signal thus developed on the cathode of tube V–19A is applied to the video "on" lead 84 through the track cursor switch 284, such switch 284 being manually operated and maintained in the "track" position in normal operation of the unit.

In summary, the output of blocking oscillator tube V–15B is taken from the anode of that tube and applied to the cathode of video stretch tube V–18A. The condenser 386 is charged by such video signal but the charge may leak from such condenser 386 at a rate determined by the magnitudes of resistances 387 and 384, the resistance 384 being termed the stretch control resistance and the tap on the same is adjusted so that tube V–18B is cut off for a period equal to a pulse repetition interval of 500 microseconds, such pulse repetition interval being that of the radar system. The effect of this circuitry therefore is the production of a video "on" signal at the cathode of tube V–19A having a duration equal to a time period of the entire video train within the range and angle gates plus a 500-microsecond delay for the last pulse. This video "on" signal is divided into two branches of circuitry at the cathode of tube V–19A, i.e., the video "on" signal storage circuitry, which includes the tube V–23A, and the acquisition control circuitry, which includes the tube V–19B. Also the video signal is applied to the video "on" lead 84 for performing certain control functions in the computer unit.

*Description of automatic transition from "search" function to "track" function with reference to Figures 12 and 13, i.e., aircraft acquisition control*

During the search function the sawtooth wave, illustrated in Figure 11 and developed in the sawtooth generator illustrated both in Figures 9 and 10, is applied to lead 30 and through relay switch 293 and cathode follower tubes V–10A and V–10B and "auto-manual" switch 228 to the range voltage lead 35. It is noted that the relay 286 is deenergized during the search function, as is also the relay 288.

This sawtooth wave thus appearing on lead 35 serves, together with the triggers applied to terminal 12, to form the early and late gates 260 and 261 respectively, which are applied to mixer stages V–4A and V–4B to develop the range gate of approximately four microseconds' duration across resistance 266. The range gate developed on resistance 266 and appearing on lead 275 is applied to the suppressor grid of tube V14. The range gate thus applied to the control grid of tube V14 affords continuous monitoring of the approach area, and video applied to the control grid of tube V14 coincidently with the range gate on the suppressor grid, causes the coincident tube V14 to conduct for the duration of such gate (assuming, as explained in detail elsewhere, that there is no signal at that particular time on the rejection bus 40). Thus, when the range delay of the video coincides with the delay of the range gate the tube V14 conducts and a resulting pulse is applied to the control grid of tube V–15A. Tube V–15A is a trigger tube for the blocking oscillator stage V–15A and V–15B, such blocking oscillator stage being gated by the angle gate appearing on lead 56. The signal thus developed on the anode of tube V–15B causes the appearance of a "Video On" signal on the cathode of tube V–19A, as described in detail herein. Such Video On signal is applied through resistance 440 to the control grid of tube V–19B. The cathode of tube V–19B is grounded and the anode of tube V–19B is connected to the +300-volt source through serially connected resistance 442 and winding of relay 443. Thus, upon application of the Video On signal to the control grid of tube V–19B, the relay 443 is energized. To prevent spurious operation of the relay 443 as a result of noise effects, condenser 441 is connected between the control grid of tube V–19B and ground so as to impose a requirement that at least three pulses in the Video On signal are required to fully energize tube V–19B and cause operation of relay 443.

When relay 443 is thus energized, it becomes self-holding through the "wave off" ground circuit which includes the serially connected relay switches 330, 342, the normally closed manual wave off switch 445, relay contact 446, resistance 447, winding of relay 443 and the 300-volt source. Also, upon energization of relay 443 the "search-track" relays 288 and 286 are simultaneously energized since they are serially connected in a circuit which includes the aforementioned switches 330, 342, 445, relay contact 448, winding of relay 288, normally closed relay switch 287, winding of relay 286, resistance 450 and the 300-volt source. Upon this energization of relay 286, the connection between the "sweep in" terminal 30 and the range voltage lead 35 is disconnected and the sweep voltage illustrated in Figure 10 is replaced with the output of the coaster circuitry by removing a ground connection from the control grid of tube V9.

*Description of wave off circuitry in Figures 12 and 13 for effecting automatic wave off upon absence of video for predetermined time interval during tracking (no video wave off)*

The purpose of this circuitry is to cause automatic wave off in the event that no video signals are received for a predetermined period of time.

As explained previously, during tracking a video "on" signal is developed on the cathode of tube V–19A, such signal being a square pulse of high amplitude and sharp definition for control purposes. This video on signal is applied through resistance 331 to the control grid of cathode follower tube V–23A and to the storage condenser 332, thus charging such condenser positively and causing a positive voltage to appear on the condenser 333 having one of its terminals grounded and the other of its terminals connected to the cathode of tube V–23A. The cathode of tube V–23A is connected through resistance 334 to the –150-volt source and to the control grid of tube V20A through resistance 335 to thereby maintain the control grid of tube V–20A at a positive potential so long as a video signal is present to maintain condensers 332 and 333 charged. The cathode of tube V–20A is connected to one terminal of serially connected resistances 337 and 338, the other terminal of resistance 338 being grounded and the other terminal of resistance 337 being connected to the cathode of tube V–22A and to the control grid of tube V–21A through condenser 326. The control grid of tube V–22A is connected to the anode of tube V–20.

In operation of the circuit which is described, the video on signal applied to the control grid of tube V–23A is stored in condenser 332, and at the cathode of tube V–23A. Condenser 333 has a positive voltage, causing the anode voltage of tube V–20A to be maintained at a relatively low value. This anode voltage is applied to the control grid of the cathode follower tube V–22A, so as to control relay control tube V–21A. As the voltage across condensers 332 and 333 decays (as in the cessation of a video on signal), a critical potential at the control grid of tube V–20A is reached, whereupon a regenerative switching action occurs, driving the grid of tube V–21A positive so as to energize the winding of relay 340 which is connected to the cathode of tube V–21A through the wave off switch 321. The resulting surge of current through the winding of relay 340 causes actuation of the normally open relay switch 341 and normally closed relay switch 342 so as to apply a 28-volt alarm signal on the bus 62 and to open the wave off holding circuitry which includes the normally closed switch 342. Upon switch 342 opening, a wave off signal is transmitted from the ground equipment to the airborne equipment in the manner described hereinafter.

*Description of apparatus in Figures 12 and 13 for producing index marks of the character illustrated in Figure 15*

The tracking unit shown in Figure 13 serves to develop index marks of the character shown in Figure 15 which bracket the image of the aircraft on the cathode ray tube screen in the range tracking process.

As described above, during the periods of "search" and "track" conditions, relay 273 remains deenergized, and both the early and late gates 260, 261 developed by tubes V–3A and V–3B are applied to the mixer stage V–4A, V–4B. The two positive portions of these gates 260, 261 are developed on the common cathode resistance 266 and applied as a single positive-going pulse of lead 275 to trigger the blocking oscillator stage which includes tube V–16A and V–16B. The output pulses of this stage V–16A, V–16B, highly differentiated, and termed "index marks," are separated into two sets of circuitry. One output is controlled by the position of the tap on the "early amplitude" potentiometer 406, and the second, after passing through a two-microsecond delay line 407, is controlled in amplitude by adjusting the position of the tap on the "late amplitude" potentiometer 408. The input applied to the control grids of the dual mixer tubes V–17A, V–17B, then, consist of two positive-going pulses, separated in time by a delay of two microseconds. These two positive-going pulses are mixed in stage V–17A, V–17B, further differentiated, and applied to the lead 42 for application to an intensity control electrode of the cathode ray tube for display of the position of the range gate as illustrated in Figure 15.

More specifically, the lead 275 is coupled to the control grid of tube V–16A through serially connected condenser 410 and resistance 411. The grid of tube V–16A is returned to ground through serially connected resistances 412, 413, the junction point of which is connected to the negative 150-volt source through resistance 414. Resistance 413 is shunted by condenser 415. The anode of tube V–16A is connected to the positive 300-volt source through a serial circuit which includes the primary transformer winding 416, and index mark control tube V–24A. The cathode of tube V–24A is returned to ground through resistance 417 and is likewise connected to the lead 38 to which a so-called "identification voltage" of 300 volts may be applied from the control panel for purposes of extending the index marks, as indicated in Figure 15, during the time such index marks would otherwise be angle gated by means described presently. It is noted that the control grid of tube V-24A may be selectively connected by means of switch 420 to either the −150-volt source, in which case the blocking oscillator stage V-16A, V-16B is rendered ineffective for its purpose (assuming that no voltage is applied to lead 38), or, in the alternative, the control grid of tube V-24A may be connected through switch 420 to the angle gate lead 56, in which case the blocking oscillator stage V-16A, V-16B is angle gated and the index marks are shortened in angle, as indicated in Figure 15 (assuming that no voltage is applied to lead 38). The control grid of tube V-16B is connected to the −150-volt source through winding 422 and resistance 414. The anode of tube V-16B is connected to the 300-volt source through winding 423, the windings 416, 422 and 423 being, of course, coupled together and constituting a transformer. The cathode of tube V-16B is returned to ground through the potentiometer resistance 406. The tap on resistance 406 is coupled to the control grid of tube V-17B through the differentiating condenser 424. The cathode of tube V-16B is connected through the two-microsecond delay line 407 to the ungrounded terminal of resistance 408, the tap of which is coupled to the control grid of tube V-17A through differentiating condenser 425. The cathodes of tubes V-17A and V-17B are returned to ground through load resistance 426. The voltage developed on the cathodes of tubes V-17A and V-17B is coupled to the lead 42 through coupling condenser 428, such line 42 being returned to ground through resistance 429. It is noted that the control grid of tube V-17B is connected to the −150-volt source through serially connected resistances 430 and 431, the junction point of which is bypassed to ground by condenser 432.

In similar manner, the control grid of tube V-17A is also connected to the negative 150-volt source but through a serial circuit which includes the resistance 433, contacts on the manually operable track-cursor switch 284 and resistance 431. Thus during normal operation of the unit, proper bias is applied to both tubes V-17A, V-17B but during "cursor" operation, as explained elsewhere, the switch 284 serves to connect one terminal of resistance 433 directly to the −150-volt source so as to render tube V-17A nonconductive and thus ineffective to pass the late "index marks." In such case, the stage V-17A, V-17B passes only the early "index marks," such index marks being termed in cursor operation the "cursor pulse."

Thus during the search and track function of the equipment two time-spaced index marks appear on lead 42. These index marks are not angle gated during search but are angle gated during the track function. The effect of angle gating of the index marks may be removed by applying a 300-volt potential, i.e., "identification voltage" to lead 38.

It is observed that at the initiation of the search function, a 28-volt potential, originating in the coder unit, is applied over lead 76 and resistance 434 to the junction point of resistances 430 and 431. This potential constitutes an enabling bias, and permits the display of the index marks during the function of "track" and "control."

It is noted that the condenser resistance combination 425, 433, constitutes a differentiating network for the late marks; the condenser resistance combination 424, 430 constitutes a differentiating network for the early marks, and that the condenser resistance combination 428, 429 constitutes a differentiating network for both the early and late marks so that the marks are sharply defined on the cathode ray tube screen.

*Description of circuitry in Figures 12 and 13 for producing both range and angle gating of video, and description of features of rejection bus 40*

The range tracking circuit shown elsewhere and in Figures 12 and 13 is capable of performing its function even though the video supplied thereto over lead 262 is neither range gated nor angle gated but for purposes of accuracy, safety and definition, the video applied to lead 262 is both range and angle gated.

Briefly, the video either standardized by using the video shaper illustrated in Figure 8 or unstandardized video appearing on lead 72 is applied to the control grid of the range coincidence detector tube V14. The suppressor grid of such tube V14 is coupled to the lead 275. When both positive video signals and positive range gates are present on control grid and suppressor grid of tube V14 contemporaneously, tube V14 conducts and the resulting pulse of current in the transformer 341 results in application of a pulse to the control grid of tube V-15A. The anode supply for tube V-15A comprises the angle gating voltages applied to lead 56. Thus when the range gate video pulse developed on the grid of tube V-15A is coincident with the angle gate appearing on lead 56 the tube V15 conducts to cause a pulse of current to flow through the transformer 343 and a resulting range and angle gated video pulse to appear on the control grid of tube V-15B. The resulting range and angle gate video signal appearing on the cathode of tube V-15B is applied to the lead 262 for purposes of effecting range tracking in the manner described previously.

The operation of this circuit may, however, be modified by signals developed in other tracking units and appearing on the rejection bus 40. Such signals appearing on the rejection bus 40 may render this circuit ineffective when such signals are coincident with the range gates applied to the suppressor grid of tube V14.

More specifically, the video appearing on lead 72 is transferred through coupling condenser 344 to the control grid of tube V14, such control grid being connected to the −150-volt source through serially connected resistances 345 and 346. The junction point of these two resistances 345, 346 is bypassed to ground by bypass condenser 347. The cathode of tube V14 is grounded. The anode of tube V14 is connected through primary winding 349 to the positive 150-volt source. The suppressor grid of tube V14 is coupled to the range gate lead 275 through the serially connected resistance 350 and condenser 351, the junction point of resistance 350 and condenser 351 being returned to ground through the serially connected resistances 352 and 353. The junction point of resistances 352 and 353 is connected to the ungrounded terminal of condenser 347.

Also coupled to the suppressor grid of tube V14 is the rejection bus 40 for purposes of producing the aforementioned overriding control effect occurring when pulses on the rejection bus 40 appear coincidently with range gates on lead 275. This is for the purpose of preventing two tracking units from tracking the same aircraft. For this purpose, the suppressor grid of tube V14 is connected to the anodes of inverter tubes V-2A and V-2B. The cathodes of inverter tubes V-2A and V-2B are interconnected and returned to ground through resistance 355 which is shunted by condenser 356. Likewise, these cathodes are connected to the −150-volt source through resistance 359A. The control grids of inverter tubes V-2A and V-2B are connected through resistance 357 to the −150-volt source and are coupled by means of condenser 358 to the stationary contact 367 of the single pole double throw relay switch 360. This relay switch 360 is a part of the search-track relay 288. The tubes V-2A and V-2B are thus tubes for the purpose of converting positive signals on the rejection bus 40 and applying the same as a negative pulse to the suppressor grid of tube V14 during, of course, the search function of the unit shown in Figure 13.

In multi-plane tracking, it is understood that tracking units of the character shown in Figure 13 are duplicated and that the rejection bus 40 of each tracking unit is interconnected for the purpose of preventing more than one tracking unit tracking the same aircraft. In this respect it is noted that while a tracking unit is performing its search function, it is receiving information, i.e., an angle gated range gate, over the bus 40 from other units while such other units are performing their track function; and that while the present unit is in the track function, it is supplying the same type of information, i.e., an angle gated range gate, to other units performing the search function so that such other units will correspondingly not track the same aircraft.

For purposes of developing such information, i.e., an angle gated range gate, the tube V13 is connected to receive angle gates on its anode and range gates on its control grid. More specifically, tube V13 is connected as a cathode follower coincident tube and has its anode connected to the lead 56 for receiving angle gates. The control grid of tube V13 is connected to the range gate lead 275 through serially connected resistance 360 and coupling condenser 361, the junction point of which is connected to the −150-volt source through serially connected resistances 362 and 363. The cathode of tube V13 is returned to ground through load resistance 364 and is connected to the stationary terminal 366 of switch 360 through condenser 369 and also to the so-called range gated automatic gain control lead RGAGC 40A. It is noted that the tube V13 requires for its operation, a 28-volt enabling bias and that such bias is supplied upon energization of relay 370 during the track function of the equipment. In order to energize relay 370 a 28-volt range gate interlock is supplied from the coder unit to the lead 74.

When relay 370 is energized, the 28 volts are applied through the relay switch 371 and resistance 372 to the junction point of resistances 362 and 363 for the aforementioned purpose of rendering tube V13 operative.

Returning to the description of the connections to tube V14, the output of such tube is coupled through transformer 341 to the control grid of tube V-15A. For that purpose, the cathode of tube V-15A is grounded and its control grid is returned to ground through the serially connected transformer winding 375 and resistance 376, the junction point of which is connected to the −150-volt source through resistance 377. The anode of tube V-15A is connected through the primary winding 379 of the transformer 343 to the angle gate voltage lead 56. The control grid of tube V-15B is serially connected with transformer winding 380 and resistance 377 to the −150-volt source. The anode of tube V-15B is connected through transformer winding 382 to the positive 300-volt source. The cathode of tube V-15B is returned to ground through load resistance 378 and is likewise connected to the lead 262 for purposes of applying both range and angle gated video to the tracking circuit described under a different heading. A condenser 381 is connected between the cathode of tube V-15B and one terminal of resistance 377.

In order to develop the video "on" signal described under a different heading, the range and angle rated video appearing in inverted form on the anode of tube V-15B is transferred to the cathode of tube V-18A through coupling condenser 383.

Recapitulating, standardized video appearing on lead 72 is applied to the control grid of coincidence tube V14. In the absence of a rejection gate which may be on the rejection bus 40, and at the coincidence of the delay of the range gate applied over lead 275 to the suppressor grid of tube V14 with the duration of the video, a signal is passed by the coincidence detector V14 and applied to the blocking oscillator stage V-15A, V-15B. This blocking oscillator stage is angle gated by the +240-volt angle gate developed in the computer unit and appearing on lead 56. The output from the blocking oscillator stage V-15A, V-15B thus occurs only when the following conditions are fulfilled: (1) The range delay of the video coincides with the delay of the range gate; (2) during search condition there is no signal upon the rejection bus at the point determined by requirement No. 1; (3) the video occurs within the angle gate while the unit is in its track or control function.

Video meeting these three conditions appears on the cathode of tube V-15B, i.e., lead 262 has a standardized pulse and is applied simultaneously to the control grids of early and late detector tubes V5 and V6 in the range tracking circuit.

*Description of normal automatic touchdown wave off circuitry illustrated in Figure 13*

The purpose of the circuitry described under this heading is to cause transmission of wave off signals to the tracked aircraft when such aircraft reaches touchdown.

While the aircraft is being tracked, as described above, a "tracking on" signal is developed on lead 66 and such signal is applied to relay 243 to energize the same. Energization of relay 243 results in application of the range voltage appearing on lead 35 to the control grid of tube V-20B through the normally open switch of relay 243 and the serially connected resistance 312. In order to control the point at which this circuitry operates with respect to the aircraft touchdown point, the control grid of tube V-20B is connected to an adjustable tap on the potentiometer resistance 308, such resistance being connected in a voltage dividing circuit which includes the serially connected 300 volt source 309, resistance 311, and resistance 308. Tube V-20B is connected as a D.-C. amplifier with its cathode returned to ground through resistance 313. The anode of tube V-20B is supplied with space current from the +300-volt source through resistance 314. The anode of tube V-20B is likewise connected to the −150-volt source through serially connected resistances 315 and 316, resistance 315 being shunted by condenser 317. The voltage developed on the anode of tube V-20B is transferred through condenser 318 to the control grid of tube V-21B which is connected as a cathode follower, the cathode of tube V-21B being returned to ground through the winding of relay 320, assuming that the automatic wave off switch 321 is in its on position. The control grid of tube V-21B in returned to the −150-volt source through serially connected resistances 322 and 323. The junction point of resistances 322 and 323 is connected to the junction point of resistances 324 and 325, the other terminal of resistance 325 being grounded and the terminal of resistance 324 being connected to the control grid of tube V-21A and through condenser 326 to the cathode of tube V-22B. The anode of tube V-22B is supplied with space current from the 300-volt source serially connected with resistance 328.

It will be observed that the above mentioned connections provide a regenerative feed back path for effecting a regenerative switching action.

Thus, as range voltage falls when and as the tracked aircraft approaches touchdown, a critical value of the voltage on the control grid of tube V-20B is realized, whereupon a regenerative switching action occurs, driving the grid of tube V-21B positive. The resulting surge of cathode current flowing through tube V-21B energizes relay 320 to cause opening of its normally closed switch 330 to thereby open the wave off holding circuitry which is serially connected with such switch 330. Opening of switch 330 results, as explained more fully hereinafter, in the transmission of a wave off signal to the aircraft to effect a complete wave off condition of the ground and airborne equipment.

*Description of means for applying range gate to lead 44 in Figures 12 and 13*

As described above, the range gate appearing on lead 275 and developed across the common cathode load resistance 266 constitutes, in effect, the positive portions of both early and late gates 260 and 261. The range gate thus appearing on lead 275 is applied through condenser 361 to the control grid of cathode follower tube V-24B. A positive range gate is thus developed on the cathode load resistance 436 and applied through coupling condenser 437 to the range gate lead 44 for purposes of effecting certain control operations.

The computer circuitry is illustrated in Figures 18A, 18B and 19. In general, the computer performs six major functions, namely, to produce (1) angle voltage level shifting, (2) the computation of an "ideal glide path," (3) angle air tracking, (4) course softening, (5) excess air wave off, and (6) the generation of an angle gate. In general, the azimuth and elevation angle voltages applied to the terminals 18 and 20, respectively, are shifted in level as a step in the glide path computation process. Inversion of azimuth angle voltage, made possible by the two-position switch SW–3001, permits the selection of either a "left runway" or a "right runway" approach; i.e., the radar equipment may be placed either on the left or on the right of the runway.

Range voltage generated in the tracking units described in connection with Figures 12 and 13 and the range of a tracked aircraft is applied to the computer glide path reference generator which in general includes the input terminal 82 and the stages 451 (V16A), 452 (V16B), 453 (V17A) and 454 (V17B). Such reference generator includes the nonlinear thyrite resistances 456, 457 so as to impart a nonlinear characteristic to the range voltage applied to terminal 82. The modified range voltage is added to the shifted Az–E*l* voltages resulting in the generation of an alternating voltage representing, at the zero cross-over points, an "ideal" glide path which is so adjusted as to coincide with an actual physical "ideal" approach to a given air field. Such alternating voltages, for azimuth purposes, appear on the lead 459 and, for elevation purposes, appear on the lead 460. The glide path generated by this circuitry may be displayed upon the Az–E*l* monitor scope during the "search" condition of the particular channel. These alternating voltages, for azimuth purposes, appear on the lead 462 and, for elevation purposes, appear on the lead 463.

The voltage appearing on the leads 462, 463 represent, in one instance, modified range voltage added algebraically to level shifted azimuth voltage and, in the second instance, range voltage modified in a different manner added algebraically to level shifted elevation angle voltage.

In general, such alternating voltages with a periodicity of two cycles per second are applied, respectively, from their leads 462 and 463 to cathode follower stages 465 and 466, each of such cathode follower stages forming an input circuit for the azimuth servo loop 467 and elevation servo loop 468. Briefly, such servo loops produce a voltage on the leads 469, 470 of servo loops 467, 468, respectively, such voltage on leads 469 and 470 constituting a substantially continuous voltage which represents the position error of the tracked aircraft in azimuth and elevation, respectively. Such voltages appearing on leads 469 and 470 are indicated on the cross pointer meter 471 and are utilized to modulate a carrier wave which is transmitted from the ground station to the aircraft for purposes of controlling the flight of the aircraft. The alternating azimuth and elevation voltages appearing in the output circuits of the cathode follower stages 465 and 466 are used to form azimuth and elevation angle gates, such angle gates being applied to the range tracking circuitry illustrated in Figures 12 and 13. Briefly, for purposes of developing such azimuth and elevation angle gates, level shifting potentiometers 472 and 473 are provided with their taps being connected to stationary contacts of the single-pole double-throw relay switch 474 serving to alternately apply the azimuth and elevation alternating voltages to the differential amplifier stage 475 (comprising tubes V12A and V12B) in the angle gate generator 477. The output of the gate generator 477 appears alternately as an azimuth and an elevation angle gate on lead 56. Azimuth angle voltage appearing on lead 18 is applied to the control grid of cathode follower tube 478. Such azimuth angle voltage is shifted in level and appears on lead 479 where the same is mixed on the control grid of cathode follower mixer tube 480 with the modified range voltage which appears on lead 459. In the left position of switch SW–3001, the level shifted azimuth voltage is mixed directly with the modified range voltage without inversion; but, in the right position of switch SW–3001, the azimuth angle voltage is not only level shifted but also inverted before being mixed with the modified range voltage appearing on lead 459.

To achieve these results the following circuitry is associated with tube 478. The cathode of tube 478 is returned to the negative ungrounded terminal of voltage source 481 through a series circuit which includes resistances 482, 483, 484, 485 and 486. The resistance 483 constitutes a so-called "touchdown adjustment for left runway operation" and has its adjustable tap connected to the left stationary contact of switch SW–3001 through the serially connected resistance 489 and adjustable resistance 490. The movable contact of switch SW–3001 is connected to lead 479 which in turn is connected directly to the control grid of the cathode follower mixer tube 480. The resistance branch comprising resistances 482, 483 and 484 has connected in shunt therewith the serially connected resistances 492 and 493, the resistance 493 comprising a potentiometer type of resistance termed the "touchdown adjustment for right runway operation" and has its movable tap connected to the control grid of the inverter tube 494 through resistance 495. Tube 494 is useful only during right runway operation; i.e., when the radar equipment is located on the right of the runway. The anode of tube 494 (V3A) is connected through the load resistance 496 to the positive terminal of a voltage source (not shown) and is connected directly to the control grid of tube 498 (V3B). The cathode of tube 494 is returned to ground through resistance 500 and is connected to the cathode of tube 498 through resistance 502. Tube 498 constitutes a cathode follower with its cathode connected to the ungrounded terminal of voltage source 504 through serially connected resistances 506 and 507. The junction point of resistances 506 and 507 is connected on the one hand through resistance 508 to the control grid of tube 494; and on the other hand such junction point is connected through serially connected resistances 570 and 571 to the right stationary contact of switch SW–3001.

In order to stabilize the potential appearing on the cathode of the input tube 478, a voltage regulator tube 513 is serially connected between the cathode of tube 478 and the junction point of resistances 485 and 486.

Thus, the operation of the azimuth angle voltage mixing circuit described immediately above is as follows. Azimuth angle scaning voltages varying from 52 volts to 2 volts and applied to terminal 18 appear on the grid of the cathode follower tube 478 (V1A). The output from the stage 478 is derived from its cathode and shifted downward in level through circuitry including voltage regulator tube 513 (V2), which stabilizes the voltage drop across the voltage dropping resistance network. When switch SW–3001 (runway select) is set to the "left position" (for operation of the radar installation at the left side of the runway), the level shifted azimuth angle voltage is resistively mixed with the reference voltage; i.e., modified range voltage which is derived in the output circuit of the cathode follower tube V16B, and applied to the control grid of cathode follower tube V80 (V1B) over lead 459 which is serially connected with resistance 515, such resistance 515 being shunted by condenser 516. The output from the cathode follower stage 480 and appearing at the junction point of resistances 518 and 519 is applied through the serially connected resistances 520 and 521 to the azimuth angle tracking circuit; i.e., to the control grid of tube 465. Potentiometer resistance 483, the so-called "touchdown adjustment for left runway operation," is adjusted to provide zero azimuth angle voltage when the angular position of the radiated antenna beam passes through the aircraft touchdown point. At the same time the tap on potentiometer resistance 490 is adjusted to provide the proper excursion of the level shifted angle voltage which is added to the reference voltage; i.e., the modified range voltage.

In right runway operation, i.e., when the runway select switch SW–3001 is set to the "right position," level shifted azimuth angle voltage appearing on the tap of resistance 493 is applied to the inverter stage 494 (V3A). The output of stage 494 is applied to the cathode follower stage 498 (V3B) and varied by series resistance 511, the so-called "position adjust right runway," which produces the result identical to that produced by resistance 490 in left runway operation.

For purposes of producing level shifted and inverted elevation voltage for mixing with reference voltage, the elevation angle voltage is applied to terminal 20, such terminal being connected to the control grid of inverter tube 522 through resistance 524. The cathode of tube 522 is returned to ground through resistance 525 and is connected to the cathode of tube 526 through resistance 528. The tube 526 is a cathode follower and has its cathode connected to the negative ungrounded terminal of voltage source 530 through serially connected resistances 531 and 532. The junction point of resistances 531 and 532 is connected on the one hand through resistance 533 to the control grid of tube 522; and on the other hand such junction point is connected to the control grid of the cathode follower stage 534. The catohde of stage 534 is returned through serially connected resistances 536, 537 and 538 to the −150 volt source. The resistance 537 is a potentiometer resistance and serves as a touchdown adjustment, such resistance 537 having its adjustable tap connected through resistance 540 to the control grid of cathode follower mixer stage 541. Tube 541 has its cathode connected through serially connected resistances 543 and 544 to the −150 volt source. The junction point of resistances 543, 544 is connected through lead 463 and serially connected resistances 545 and 546 to the elevation angle tracking circuit; i.e., to the control grid of tube 466. The resistance 546 is shunted by condenser 548.

Thus, elevation angle voltage varying from 2 to 52 volts, depending on the angular position of the radiated antenna beam, is applied to the control grid of the inverter amplifier tube 522 the output of which is shifted downward in level in the cathode circuit of cathode follower tube 526. This level shifted elevation voltage is shifted further downward in the cathode circuit of cathode follower stage 534, and potentiometer resistance 537 is adjusted to provide a zero potential when the antenna beam passes through the elevation touchdown position. This level shifted output from cathode follower stage 534 is added to the reference voltage; i.e., modified range voltage appearing on lead 550. Such modified range voltage is applied through the two-position glide path select switch SW–3001. Switch SW–3001 allows inspection of one of two series potentiometer resistances 551 or 552. Either of these two resistances allows an adjustment of the output of the reference generator for a given input, and therefore an adjustment of the angle of the computed glide path.

The range voltage generated in the range tracking unit illustrated in Figures 12 and 13 is applied to terminal 82, such range voltage serving as a measure of the range of the aircraft being tracked. Range voltage thus appearing on terminal 82 is applied to the control grid of the cathode follower tube 451 through the tap on the so-called "range factor" of potentiometer resistance 560, one terminal of such resistance 560 being grounded. The cathode of tube 451 is connected through series resistances 562 and 563 to a −150 volt source. A condenser 564 is connected between terminal 82 and the control grid of tube 451. The junction point of resistances 562 and 563 is connected through series resistances 565 and 566 to the control grid of tube 568 (V17A), such resistances 565 and 566 being shunted by condenser 569. The control grid of tube 568 is returned to ground through the "L" thyrite resistance 456. The cathode of the cathode follower stage 568 is connected through series resistances 570, 571 and 572 to a −150 volt source. The adjustable tap on resistance 571 is connected through adjustable resistance 573 to the control grid of the cathode follower tube 575 (V17B). Condenser 577 is connected between the tap on resistance 571 and the tap on resistance 573. The control grid of cathode follower tube 575 is returned to ground through the "M" thyrite resistance 457 and is connected to the control grid of the cathode follower tube 452. The cathode of tube 452 is connected through series resistances 578 and 579 to a −150 volt source. The cathode of tube 575 is connected through series resistances 580 and 581 to a −150 volt source, and the junction point of such resistances 580 and 581 is connected to the movable contact of the glide path select switch SW–3001 for supplying modified range voltage to the control grid of tube 541 where such modified range voltage is mixed with level shifted elevation angle voltage. On the other hand, the output appearing at the junction point of resistances 578 and 579 is transferred over lead 459 and resistance 515 to the control grid of tube 480 to which is also applied level shifted azimuth angle voltage.

Thus, in operation of the reference voltage generating means described above, range voltage, as generated in the tracking unit illustrated in Figures 12 and 13, is applied to the cathode follower tube 451 through the range factor resistance 450, the tap on resistance 560 being adjusted to determine the portion of the full excursion of range voltage applied to the reference generator circuitry. This range voltage is shifted downward in level at the cathode of tube 451 and applied to the control grid of the cathode follower tube 568. The potential of the control grid of tube 568, however, is modified by the thyrite resistance 456. The characteristics of this voltage modification are such that increasing applied potentials do not produce the same relative increase in voltage drop across resistance 456. Stated in a different manner, additional increments of input voltage are not matched by equal increases in voltage at the cathode of tube 568. The output of tube 568 is applied to the control grid of cathode follower tube 575 where further modifications are imparted by the thyrite resistance 457. Thyrite resistances 456 and 457 are such that the added characteristics imposed by these two elements cause the voltage variations following the general equation $$E_r = (E_1)(1 - 1/n) \quad 4\text{-}51$$

*Theoretical considerations in establishing ideal glidepath (elevation) and ideal course (azimuth) lines with reference to Figures 21 and 22*

It has been stated that flight errors are computed from predetermined ideal glidepath (Elevation) and course (Azimuth) lines, which are functions of a single general expression involving the geometry of runway approaches. The following paragraphs are devoted to a discussion of the derivation of this general reference function, and to its application within the AGCA system.

The problems of reference voltage generation and error computation are greatly simplified by generalizing the equations for azimuth and elevation glidepaths. Referring to Figure 20, the angular position of the aircraft is shown to be equal to $\sin^{-1} a/R$. For small angles, the value of the sine of the angle is approximately equal to the angle expressed in radians, and the position angle for small angles is equal to:

$$\theta = Ka/R, \text{ where } K = \text{degrees per radian} \quad (1)$$

This is the general equation for the reference angle of the aircraft, with respect to a line extending from the radar installation parallel to the runway. If the numerator and denominator are multiplied by $(R_{td})$, the following relationship is obtained:

$$\theta = (Ka/R)(R_{td}/R_{td}) \quad (2)$$

or $$\theta = (Ka/R_{td})(R_{td}/R) \quad (3)$$

arbitrarily equating:

$$R/R_{td} = \text{``}n\text{''} \quad (4)$$

which states that the factor "$n$" is now equal to the range of the aircraft from the radar installation divided by the range of the radar installation from the point of touchdown. This states that "$n$," which may be called a range ratio factor, is equal to unity when the aircraft is at the point of touchdown. In the further development of the equation, the distance from the radar installation to touchdown is the unit "$n$," and the range to the aircraft will be expressed in terms of units, $n_1$, $n_2$, etc., representing this distance. Equation 3 now becomes:

$$\theta = (Ka/R_{td})(1/n) \quad (5)$$

but $$Ka/R_{td} = \theta_{td} \quad (6)$$

and therefore $$\theta = \theta_{td}(1/n) \quad (7)$$

Referring again to Figure 20, it is seen that as the range increases from $n_1$ to $n_2$, to $n_3$, and to $n_4$, it increases by multiples of 2, 3 and 4 times the range to touchdown. The angle $\theta$ consequently decreases to ½, ⅓, and ¼ its value at touchdown. This angular variation has the form, therefore, of the expression $1/n$, for values of "$n$" from one to ten, considering the range of the system to be ten miles. The reference angle for all values of range may now be expressed as:

$$\theta_{ref} = \theta_{td}(1/n) \quad (8)$$

This angle, $\theta_{ref}$, may be expressed as a position voltage:

$$E_p = (K_{az}\theta_{td})(1/n) \quad (9)$$

where $$K_{az} = \text{volts/degree in azimuth} \quad (10)$$

a factor which is dependent upon amplification factors and potentiometer adjustments in the control circuits. In Equation 10, position voltage will approach zero at touchdown if the term $K_{az}\theta_{td}$ is subtracted from the equation:

$$E_p = (K_{az}\theta_{td})(1/n) - (K_{az}\theta_{td}) \quad (11)$$

or $$E_p = (K_{az}\theta_{td})(1/n-1) \quad (12)$$

As "$n$" approaches infinity, $E_p$ will approach $(-K_{az}\theta_{td})$; as "$n$" approaches unity, $E_p$ approaches zero. The elevation reference angle will be developed by the same process. Offset of the radar installation from the runway is not considered, as the errors involved are negligible. Again using the glidepath parallel as a reference, it will be noted that, for the elevation case, the position angles are in the fourth quadrant instead of the first. General equations will be:

$$E_p = (-\theta_{td})(K_{el})(1/n-1) \quad (13)$$

or $$E_p = (K'_{el}\theta_{td})(1-1/n) \quad (14)$$

Comparing the general equations for azimuth and elevation:

Azimuth: $E_p = (K'_{az}\theta_{td})(1/n-1) \quad (15)$ where $K'_{az} = 2.5$ volts per degree (maximum), and $$\theta_{td} = 4-10 \quad (16)$$

Elevation: $E_p = (K'_{el}\theta_{td})(1-1/n) \quad (17)$ where $K'_{el} = 7.14$ volts per degree (maximum), and $\theta_{td} = 2-3$ degrees. It may be noted that $K'_{az}\theta_{td}$ is in the same voltage region as $K'_{el}\theta_{td}$. They are of opposite polarity because one is a function of $(1/n-1)$ and the other a function of $(1-1/n)$. If elevation position voltage is applied to an amplifier with a gain of $-1$, the elevation reference voltage will be:

$$E_p = (K'_{el}\theta_{td})(1/n-) \quad (18)$$

The equations for azimuth and elevation reference voltage for an aircraft approaching touchdown on the glidepath are now of the same form:

$$E_p = (K\theta_{td})(1/n-1) \quad (19)$$

If the factors $K'_{az}$ and $K'_{el}$ are adjusted to have the same scale of values, it is possible to generate a single reference voltage for both azimuth and elevation:

$$E_p = (K'_{az}\theta_{td})(1/n-1) \quad (20)$$
$$E_p = (K'_{el}\theta_{td})(1/n-1) \quad (21)$$
$$K'_{az}K'_{el} = \theta_{td}/\theta_{td} \quad (22)$$

The reference angle computer must generate a voltage:

$$E_{ref} = E_a(1/n-1) \quad (23)$$

where $$E_a - K'_{az}\theta_{td} = K'_{el}\theta_{td} \quad (24)$$

Since $K'_{az}$ and $K'_{el}$ are negative (refer to Figure 22):

$$E_{ref} = E_a(1-1/n) \quad (25)$$

The azimuth and elevation position voltages have positive polarity. The reference voltage is also of positive polarity as seen from Equation 25. Referring to Figure 22, the azimuth position voltage is shifted downward in level so that the position voltage for zero range will be zero volts. The elevation position voltage will be shifted downward and inverted, so that its form is as shown in Figure 22. Since both voltages will then have the same form, they may be adjusted to the same scale, as noted above. If $E_a$ (Equation 25) is adjusted to equal $(K\theta_{td})$, then the equations for error as the aircraft approaches touchdown on the runway centerline are:

$$E_p \div E_{ref} = 0 \quad (26)$$

or $$K'\theta_{td}(1/n-1) \div E_a(1-1/n) = 0 \quad (27)$$

The elevation and azimuth angle tracking circuits are substantially identical in nature and function and for that reason, the following detailed description of the elevation angle tracking circuit suffices to describe the azimuth angle tracking circuit.

The elevation angle tracking circuit includes the cathode follower tube 466 (V-20A), the amplifier tubes 600, 601 (V-31A, V-31B), the clamp tubes 604, 605 (V-21A, V-21B), the cathode follower tube 606 (V-33B), the cathode follower stage 607 (V-33A), the limiter tubes 608, 609 (V-32A, V-32B), the amplifier tubes 612, 613 (V-22A, V-22B) and the cathode follower tube 614 (V-20A).

The elevation angle tracking circuit comprises a servo loop with a feedback path provided by the lead 470. The voltage developed on lead 470 is continuous in nature and represents the position error of the tracked aircraft. The control grid of cathode follower tube 466 is connected to lead 470 through resistance 620, so that the same is sensitive to position error; and such control grid is likewise connected with resistance 546 so as to be sensitive to the algebraic sum of reference voltage and level shift, i.e., modified range voltage and level shifted elevation voltage. This voltage applied through resistance 546 is undulatory in character and its zero value, as mentioned previously, corresponds to a point on the predetermined glidepath. The cathode of tube 466 is connected to a minus 150 volt source through three parallel connected resistances and resistance 620, such parallel resistances comprising resistances 621, 622, 623. The tap on resistance 621 is connected to elevation angle gate generating means as described elsewhere herein for purpose of producing an angle gate, which in turn, is applied to the range tracking unit for forming angle gated video.

The tap on resistance 623 is connected to the control grid of the amplifier tube 600 through resistance 625. The cathodes of tubes 600 and 601 are both grounded and the anode of 600 is connected through resistance 626 to a positive 300 volt source. The anode of tube 600 is connected to the control grid of tube 601 through a network which includes the parallel connected resistance 628 and condenser 629. The control grid of tube 601 is connected through resistance 630 to the minus 150 volt source and such grid is also by-passed to ground by means of condenser 632. The anode on tube 601 is connected through resistance 632 to the positive 300 volt source and the voltage developed on such anode is transferred through resistance 635 to, on the one hand, the cathode of tube 604 (V–21A) and on the other hand, to the anode of tube 605 (V–21B). The control grids of tubes 604 and 605 are connected through resistances 640, 641 respectively to lead 642, to which in turn is applied the video-on signal from terminal 84. Such video-on signal as described elsewhere herein is developed in the tracking unit and is present during the time "radar hits" are being made on the tracked aircraft. The lead 642 is connected through resistance 644 to a minus 150 volt source to provide bias for the control grids of tubes 604 and 605. The anode of tube 604 and cathode of tube 605 are connected to the control grid of tube 606 and are returned to ground, through an integrating network which comprises a serially connected condenser 646 and resistance 647.

The tube 606 is a cathode follower and has its cathode returned to ground through resistance 649. Also, such cathode is connected to a minus 150 volt source through serially connected resistances 650 and 651. The resistance 650 is connected in shunt with condenser 652. The junction point of resistances 650, 651 is connected through resistance 654 to the control grid of tube 612.

The anode of tube 612 is connected through load resistance 656 to a positive 300 volt source and is likewise connected to the control grid of tube 613. The cathode of 612 is returned to ground with resistance 658. condenser 659 is connected between the control grid 612 and the cathode of tube 613.

The tube 613 is a cathode follower and has its cathode returned to ground through the serially connected resistances 670 and 658. Also, the cathode of tube 613 is connected to a minus 150 volt source through the serially connected resistances 672, 673, 674 and 675. The junction point of resistances 674 and 675, is connected through the single pole double throw relay switch 680 (during tracking) to the control grid of the cathode follower tube 614. The adjustable tap on resistance 673 is connected to the movable contact of the single pole double throw relay switch 681.

The cathode of tube 614 is connected through lead 470 and resistance 620 to the control grid of tube 466 to complete a feedback loop. Also, the cathode of tube 614 is connected to an adjustable tap on the resistance 682, one terminal of resistance 682 being connected to resistance 683, and the other terminal of resistance 682 being connected to lead 684, for purposes of transferring air voltage to the air indicator.

*Angle gate generator in computer in Figure 18B*

The circuitry described under this heading is used to provide a so-called angle gate which is applied to the range tracking unit shown in detail in Figure 13. In general, the purpose of this angle gate is for purposes of gating the video signals applied to the range tracking circuit in such a manner that such video signals are allowed to pass to the tracking circuit only during the time during which radar hits are being made on an aircraft being tracked, as illustrated in Figure 20.

It is noted that the ideal course of glidepath, as described elsewhere herein, is represented by the zero voltage crossover points on alternating voltages, one corresponding to azimuth, i.e., course, and the other corresponding to elevation, i.e., glidepath. These alternating voltages comprise, for azimuth purposes, the addition of level shifted azimuth angle voltage to the reference voltage, i.e., modified range voltage; and, for elevation purposes, comprise the algebraic sum of level shifted elevation angle voltage and the reference voltage, i.e., the modified range voltage.

The angle tracking servos have supplied thereto these two different alternating voltages representing at the zero voltage crossover points an ideal glidepath and course which are so adjusted to coincide with an actual physical "ideal" approach to a given airfield. The voltage on lead 469 in the case of azimuth and lead 470 in the case of elevation represents the error of the aircraft with respect to such ideal course or glidepath as described previously herein. The grid of tube 465, being connected to the junction of resistors 521 and 516, bears a voltage which is the sum of the aforementioned alternating voltage and the aforementioned error voltage. This grid voltage is therefore an alternating voltage whose zero crossover point represents the time the beam crosses the aircraft, whether or not the aircraft is on the ideal course, provided, of course, that the aircraft is being tracked. Likewise, in the elevation case, the voltage at the grid of tube 466 is an alternating voltage whose zero crossover point defines the position of the aircraft. These voltages are applied to opposite stationary contacts of the relay switch of the az-el relay switch 474 and are supplied, for azimuth purposes, from lead 840 which is connected to the adjustable tap on the potentiometer resistance 472; and for elevation purposes, such alternating voltage is supplied over lead 841 which is connected to the adjustable tap on the potentiometer resistance 621.

The movable contact of switch 474 is connected through resistance 842 to the control grid of the first tube 844 and the differential amplifier 475. Tube 846 comprises a second tube of such differential amplifier. The cathodes of tubes 844 and 846 are returned to ground through a common resistance 847. The anode of tube 844 is connected to a plus 150-volt source through resistance 848 and is connected to the control grid of tube 850. The control grid of tube 846 is grounded and its anode is connected to a plus 150-volt source through resistance 851 and such anode is also connected to the control grid of tube 853.

In general, the circuitry associated with the differential amplifier 475 is so arranged that the output of both sections 844, 846 is zero for zero input at the control grid of tube 844. For other values of input voltage, the output of one of the sections 844, 846 is positive, resulting in a waveform on the connected cathodes of tubes 855 of the character illustrated at 856. This waveform 856 is shifted in level through circuitry including the voltage regulator tube 858 and is made available in two circuit branches through adjustable tubes on the resistances 860, 861.

For this purpose, the tubes 850, 855 are cathode followers and each have their cathode connected to one terminal on tube 858, the other terminal on tube 858 being connected to a minus 150 volt series through resistances 864, 861, and 865. Resistance 860 is connected in shunt with resistance 861. The taps on resistances 860 and 861 are connected to opposite stationary contacts of the az-el relay switch 867, which has its stationary contact returned to ground through resistance 870 and which is connected to the control grid of tube 872 through resistance 873.

Tube 872 has its anode connected to the control grid of tube 875 and such anode is likewise connected to a plus 300 volt source through resistance 876. The cathode of tube 872 is connected through resistance 877 to a minus 150 volt source and to one terminal of the neon tube 878; such cathode is also connected to a stationary contact of the relay switch 879.

The tube 875 has its anode connected to a +300-volt source and its cathode returned to ground through resistance 881, such cathode being also connected to terminal 56 which constitutes the az-el angle gate terminal.

The width of the angle gate produced by this circuitry is now described. The point at which voltage waveform 856 (approaching zero from either direction) is effective in cutting off the flow of space current to tube 872 is separately determined for the azimuth and elevation functions by adjustment of the taps on resistances 861 and 860. Application of the negative waveform 856 to the control grid 872 results in a positive D.-C. gate on the cathode of cathode tube 875 of the character illustrated at 882.

It is observed that the angle gating circuitry described above is operative only after initiation of the "control" condition, i.e., after confirmation by the aircraft, at which time a ground is removed from the cathode of tube 872, i.e., upon application of the +28-volt confirmation voltage to the relay winding 885, which has associated therewith the aforementioned switch 879.

By thus providing the angle gate 882 and applying the same to the tracking unit as described elsewhere herein, gating of azimuth and elevation video targets is achieved. Such gating is desirable to prevent the tracking of undesired targets at the same range but at varying angles from the desired video.

*Automatic waveoff in response to flight errors exceeding a predetermined value for a predetermined time with respect to Figure 18*

The safety feature incorporated in the present arrangement is that a "waveoff" signal may be initiated through the failure of an aircraft to respond to transmitted control signals. This error waveoff signal, which is transmitted to the aircraft, releases the autopilot from AGCA control and a maximum "fly-up" signal is transmitted to the aircraft.

The circuitry for accomplishing this purpose whereby flight errors exceeding a predetermined value for a predetermined time actuate the "waveoff" functions of the system, is shown in detail in Figure 18. In general, circuitry is provided for the origination of this "waveoff" function by two identical channels for the azimuth and elevation control functions respectively. Since these two channels are substantially identical, a description of the azimuth channel will suffice to describe the elevation channel.

This error waveoff circuitry in Figure 18A includes tubes 890, 891, 892, 893 and 894 in the azimuth channel; and in the elevation channel the corresponding tubes are 900, 901, 902, 903 and 904 respectively. Azimuth error voltages are determined by the azimuth angle error tracking circuit appearing on lead 906, while corresponding elevation error position signals appear on the lead 907.

Azimuth error voltages ranging in value from plus 6 volts to minus 6 volts, D.-C., are transferred to the control grids of tubes 890 and 891. More specifically, lead 906 is connected through the unidirectional conducting crystal 908 to the ungrounded terminal of the so-called azimuth waveoff symmetry resistance 910, which has its tap connected through resistance 911 to the control grid of tube 891. Likewise, the lead 906 is connected through the unidirectional conducting crystal 912 to the control grid of tube 890 and to the ungrounded terminal of resistance 913.

The anode of tube 890 is connected to a plus 150 volt source and the cathodes of both tubes 890 and 891 are returned to ground through the common resistance 915.

The anode of tube 891 is connected to a plus 150 volt source through resistance 917 and is also connected to a minus 150 volt source through the serially connected resistances 920, 921 and 922. Condenser 923 is connected between the anode and control grid of tube 891 to provide a delayed action, as described hereinafter.

The tap on resistance 921 is connected through resistance 925 to the control grid of tube 892 which has its cathode returned to ground through resistance 926 and which has its anode connected on the one end, to the control grid of tube 893, and on the other end, to the plus 350 volt source through resistance 928. The cathode of tube 893 is returned to ground through series resistances 930 and 926 and is connected to the control grid of tube 894 through condenser 928. The control grid of tube 894 is connected to a minus 150 volt source through the serially connected resistances 934 and 935, the junction point of resistances 934, 935 being returned to ground through resistance 938. The cathode of tube 934 is connected to ground through the winding 940 of the waveoff relay 941.

In the circuitry thus far described, error voltages of negative polarity are cathode coupled to tube 891 through cathode follower 890. Errors of either positive or negative polarity cause the voltage at the anode of tube 891 to decrease from a maximum obtained when the voltage on lead 906 is zero. It is noted that the anode of tube 891 is coupled through a divider network to a regenerative pickoff stage, 892, 893, which serves to supply an energetic positive pulse to the control grid of the relay control cathode follower tube 894 whenever the applied grid voltage on the grid of tube 892 declines to the critical value of approximately 1.7 volts.

Negative derivative feedback is provided in the error rectifying amplifier 890, 891, giving a time delay which is an inverse function of the error magnitude. For this purpose, the condenser 923 has a value of one-tenth of a micro-farad, resistance 911 is 2.2 megohms, resistance 920 is 470,000 ohms, resistance 921 is 500,000 ohms, resistance 922 is 2.2 megohms, resistance 910 is 10,000 ohms, and resistance 917 is 470,000 ohms. With these constants, a delay of approximately ten seconds is obtained when the applied error voltage is 50 percent beyond the threshold value of plus 6 volts.

The potentiometer resistance 921, the so-called "azimuth waveoff limit" resistance, provides the azimuth threshold value by determining to what value the anode of tube 891 must fall, to operate the regenerative pickoff circuit at 892, 893.

The potentiometer resistance 910, the "azimuth waveoff symmetry" resistance, allows a balanced adjustment of errors to the left and right of the course line. The tap on this resistance 910 may be adjusted, where conditions warrant, to achieve a "waveoff" condition with a smaller error to one side of the course line than to the other. Thus, when an excessive error endures for a predetermined time, the relay winding 940 is energized to actuate the relay switches 950, 951.

The actuation of switch 950 results in the application of plus 28 volts to a stationary contact of the relay switch 953 associated with the relay winding 885.

Actuation of switch 951 results in short-circuiting the terminals 955, 956 of the waveoff bus 130. The same result may be achieved manually by operation of the manual control waveoff switch S–3004 which is connected between the terminals 955, 956.

*Course softening circuitry in Figure 18B*

The output voltage of the azimuth angle tracking circuitry appearing on the cathode of cathode follower stage V4B is directly proportional to the deviation from an "on course" position and is applied either to the rate generator 726 (Figure 16) in "ground rate" operation or to the course softening circuitry 715 (Figure 17) in "air rate" operation. The output voltage of the elevation angle tracking circuitry, directly proportional to the deviation from an "on glide-path" position, is applied directly from the cathode of cathode follower stage 614 (V20B) to course softening circuitry 715 in both "air rate" and "ground rate" operations.

As explained previously, depending upon the particular autopilot equipment carried by an incoming aircraft, a rate of control function for azimuth displacement may be either transmitted from the ground equipment for reception with no further alteration by the autopilot approach coupler, or the ground equipment may transmit azimuth correction figures of pure error only, with rate of error complements being added by the autopilot approach coupler circuitry. The "ground-air rate" switch S–3010 determines the circuitry in this respect.

When the single-pole double-throw switch S–3010 is set to the "air rate" position, the circuitry of the rate generator 726 is disconnected and azimuth error signals are applied to the course softening circuitry 715, such signals in the latter instance representing pure error only.

In such case the output of the azimuth angle tracking circuitry is taken from the cathode of the cathode follower tube V4B through resistances 740 and 741. By this means azimuth error signals are applied to the control grid of the cathode follower stage 742 which has its cathode connected to a —150 volt source through the serially connected resistances 743, 744 and 745, the resistance 744 providing a zero displacement adjustment. The tap on resistance 744 is, in the "air rate" position of switch S–3010, returned to ground through the serially connected resistances 746, 747, the junction point of resistances 746, 747 being connected through coupling condenser 748 to the control grid of tube 749. The control grid for tube 749 constitutes an element of an input circuit for the course softening circuit 715. A gain control potentiometer 750 provides means for determining the amplitude of the voltage applied to the control grid of tube 749. It is noted that such control grid is returned to ground through the serially connected resistances 751, 752, the junction point of such resistances being connected to a —150 volt source through resistance 753.

When switch S–3010 is set in its "ground rate" position, the rate generator 726 is effective and provides azimuth rate of control voltages. The rate generator stage 726 includes the inverter-differentiator tubes 755, 756, cathode follower 757, and tubes 758, 759. The control grid of tube 755 is connected to the cathode of tube V4B through series resistances 740, 760 and 761. The cathode of tube 755 is returned to ground through resistance 763. The anode of tube 755 is connected to a +300 volt source through the load resistance 765 and such anode is connected to the control grid of the cathode follower tube 756. The cathode of tube 756 is connected to a —150 volt source through the serially connected resistances 766, 767, the junction point of resistances 766, 767 being connected through resistance 768 to the junction point of resistances 760, 761. A differentiating circuit comprising the serially connected condenser 770 and resistance 771 is connected between the control grid of tube 755 and its cathode. The junction point of elements 770, 771 is connected to the cathode of tube 756. By this means a voltage is developed on the cathode of tube 756 which corresponds to the rate of variation of voltage developed on the cathode of tube V4B; i.e., a rate of error signal is developed at the cathode of tube 756.

The cathode of tube 756 is coupled through condenser 772 to the control grid of cathode follower stage 757, the cathode of which is connected to a —150 volt source through the serially connected resistances 775, 776. The resistance 775 provides a zero adjustment and for that purpose has its tap connected through resistance 777 to the control grid of tube 758. Tube 758 is essentially an amplifier tube and has its cathode returned to ground through resistance 779 to a positive 300 volt source. The anode of tube 758 is connected to the control grid of cathode follower tube 759 which has its cathode connected to a —150 volt source through serially connected resistances 780, 781. Resistance 782 interconnects the cathodes of tubes 758 and 759. The junction point of resistances 780, 781 is connected through the switch S–3010 and resistance 747 to the control grid of the course softening tube 749.

The composite information, applied to the course softening tube 749, consists of the addition of azimuth rate of error voltages applied through cathode follower tube 742 and azimuth rate of error voltages applied from the rate generator circuit which includes the cathode follower tube 759.

The course softening circuits which are presently described include as elements thereof the tube 749 for azimuth purposes and the tube 784 for elevation purposes. It is noted that the circuitry following such tubes 749 and 784 are substantially identical and for that reason a description of the azimuth course softening circuit, including the tube 749, suffices as a description for the elevation course softening circuit, including the tube 784. Briefly, in accomplishing course softening, the screen grid voltages of tubes 749 and 784 are varied automatically as a function of range voltage and, more specifically, as a function of modified range voltage; i.e., reference voltage. For that purpose, modified range voltage is applied to the junction point of screen resistances 785 and 786 associated respectively with the tubes 749 and 784. It is noted that such modified range voltage is developed on the cathode of cathode follower tube 788 which has its control grid connected to the adjustable tap on the "course softening gain control" resistance 789, one terminal of resistance 789 being grounded and the other terminal of resistance 789 being connected through resistance 790 to the movable contact of switch S–3010, whereby a different magnitude of range voltage appearing on lead 792 may be applied to the control grid of tube 788. The lead 792 extends from one terminal of the "course softening slope adjustment" resistance 793 to the cathode of tube 568 in the reference voltage generator. The other terminal of resistance 793 is connected to a stationary contact of switch S–3010 and to the junction point of resistances 795 and 796. The other terminal of resistance 795 is grounded and the other terminal of resistance 796 is connected to a +150 volt source. The tap on resistance 793 is connected to another stationary contact of switch S–3010. Thus, the potential at the cathode of the cathode follower tube 788 is dependent upon: (1) the output of the first thyrite element 456 in the reference voltage generator and, therefore, upon the target range delay voltage; (2) the setting of the tap on the "course softening slope adjustment" resistance 793 in the "ground rate" operation; and (3) the setting of the tap on resistance 750.

The cathode of tube 788 is connected to a —150 volt source through resistance 797 and is connected on the one hand through resistance 785 to the screen grid of tube 749 and on the other hand through resistance 786 to the screen grid of tube 784. Since the other circuitry associated with tube 784 is identical with the range circuitry associated with tube 749, tube 749 and its remaining associated circuitry only is described in detail.

The cathode of pentode tube 749 is grounded and the anode of such tube is connected to a +150 volt source through the voltage dropping resistance 800. A condenser 801 having one of its terminals connected to the anode of tube 749 and the other one of its terminals connected to the movable contact of the single-pole double-throw relay switch 802 is periodically charged to produce a "chopped" voltage upon vibration of the "chopper" relay 804 which has one of its terminals returned to ground through the serially connected resistance 805 and condenser 806 and which has its other terminal connected to the "tracking on" terminal 66 so that such relay 804 is vibrated during tracking of the aircraft. One stationary terminal of switch 802 is grounded and the other terminal of switch 802 is connected through the filtering circuit 808 to a full wave rectifier 809. By this means the output of the "course softening" modulator 749 is therefore converted to an A.C. wave form, the amplitude of which is controlled by the amplitude of voltage applied to the screen grid of tube 749; i.e., in direct relationship to the range of the tracked aircraft. The effect of the circuitry, then, is to lessen computed error or control signals within ranges close to touchdown, thereby preventing over control of the aircraft near touchdown. Following this modulation, the control signals are returned to a continuous or direct current status by rectification and suitable filtering means which includes the filter network 808. The output of the full wave rectifier appears on lead 811, the stage 809 being, in normal operation, short-circuited by the clutter gating relay switch 1340 which has one of its contacts connected to lead 811 and the other one of its contacts connected to resistance 821. The filter netfork 808 comprises the series resistance 812 and shunt connected condensers 813 and 814. The stage 809 for clutter gating purposes, comprises tubes 815 and 816, the anode of tube 815 being connected to the negative terminal of voltage source 817 which has its positive terminal connected to the junction point of resistance 812 with condenser 814. The cathode of tube 817 is connected to the output lead 811. The other tube 816 has its anode connected to the output lead 811 and its cathode connected to the positive terminal of voltage source 818, the negative terminal of source 818 being connected to the afore-mentioned junction point of elements 812, 814. A condenser 820 is connected between the lead 811 and ground, and such lead 811 is connected to the control grid of the cathode follower tube 821 which has its cathode connected to a —150 volt source through series resistances 823 and 824. The resistance 823 provides a zero control and has its tap connected to a stationary contact of the single-pole double-throw relay switch 825. The movable contact of switch 825 is connected to the azimuth control voltage output terminal 50. The voltage on the terminal 50 may be observed on the cross pointer type indicator 827 after, of course, the application of a control "on" signal to the relay terminal 134; i.e., after "confiirmation" by the aircraft. In similar manner the azimuth error voltages applied to the control grid of tube 784 are likewise modulated, then converted into an A.C. voltage, restored to a D.C. voltage, and applied to the elevation output control voltage terminal 48, the voltage on which is likewise measured on the indicator 827.

In order to limit the amount of azimuth control transferred from the ground to the aircraft, there is provided an azimuth control voltage limit means which includes the two diodes 828 and 829. The cathode of tube 828 is connected to adjustable tap on resistance 830 which has one of its terminals grounded and the other of its terminals connected through the resistance 831 to a +150 volt source. The anode of tube 828 is connected to the cathode of tube 829; and the anode of tube 829 is connected to an adjustable tap on resistance 832 which has one of its terminals grounded and the other one of its terminals connected through resistance 833 to a —150 volt source. The anode of tube 828 and cathode of tube 829 are both connected to limit the continuous voltage permissible on the control grid of tube 821 and thereby limit the control voltage appearing on the output terminal 50. The function of this limiting control is thus to provide that aircraft entering control at a large initial error will not be presented with an excessive error or turn signal. In other words, the rate component of control is allowed to compete with the displacement signal at any value of initial error, in order to prevent excessive overshots on entry to the course.

*Cursor generator illustrated with reference to Figures 24 and 25*

While described previously in connection with Figures 1 and 5, the glidepath course line 149A (Figure 6) and runway course line 150A, may be produced using the cursor generator described in the aforementioned copending application of Raymond B. Tasker, Serial No. 222,512, such glidepath and course line is preferably produced using the means and techniques described under this particular heading.

The cursor generator in Figures 24 and 25 includes a servo loop using a D.-C. amplifier and two thyrite elements. The amplifier includes stages 1100, 1101 and the two thyrite resistors are the thyrite resistances 1102 and 1103. The output of the amplifier 1100, 1101 is returned through circuitry containing such thyrite elements, whose characteristics are imparted to the amplifier's output. This modified output is returned to the input of the first D.-C. amplifier 1100 in opposition to the input voltage, such input voltage comprising level shifted azimuth or elevation angle voltage, as the case may be, which is selected by single pole double throw relay switch 1104.

In seeking to achieve a zero input, the D.-C. amplifier 1100, 1101 provides a delay voltage for the multivibrator stage 1107. The characteristic of such delay multivibrator 1107 is such that it will produce an output meeting the conditions for the display of an "ideal" glidepath. The output of the delay multivibrator 1107 is applied to a blocking oscillator stage 1108 which, in turn, is coupled to the terminal 42, such terminal being connected to an intensity control electrode of the cathode ray tube 11 (Figure 6).

The output of the stage 1108 constitutes a series of pulses, the individual pulses being delayed in different amounts so as to produce an ideal reference glidepath and course line for an aircraft under AGCA control.

It is noted that portions of the circuitry described under this heading, are similar to those used in glidepath computation circuitry of the AGCA computer, in that cursor pulse delay voltages are derived from level shifted azimuth and elevation angle voltage by the aforementioned electronic servo loop using the thyrite elements 1102, 1103.

The azimuth and angle elevation voltages are first level shifted and for that purpose, the azimuth angle voltage appearing on lead 1110 is applied to the control grid of tube 1111, which is returned to ground through resistance 1112. The tube 1111 is a cathode follower and has its cathode connected to a negative 150 volt source through the "touch down course" resistance 1114 and resistance 1115. The tap on resistance 1114 is connected to the control grid of the cathode follower tube 1117 which has its cathode connected to a minus 150 volt source through resistance 1120. The cathode of tube 1117 is connected through the adjustable "distant range course" resistance 1121, to a stationary contact of switch 1104 to provide to such terminal a level shifted azimuth angle voltage.

The elevation angle voltage appearing on lead 1125 is applied through resistances 1126 and 1127 to the control grid of the inverter amplifier tube 1128, which has its cathode returned to ground through resistance 1130 and which has its anode connected to a plus 300 volt source through resistance 1131.

The anode of tube 1128 is connected to the control grid of cathode follower tube 1132, which has its cathode connected to the cathode of tube 1128 through resistance 1133 to provide a regenerative connection. Also the cathode of tube 1132 is connected to a negative 150 volt source through serially connected resistance 1135, the "touch down glidepath" resistance 1136 and resistance 1137. The junction point of resistances 1136, 1137 is connected through resistance 1138 to the junction point of resistances 1126, 1127. The adjustable tap on the "touch down glidepath" resistance 1136 is connected through the adjustable "distant range glidepath" resistance 1140 to a stationary contact of switch 1104 to provide a level shifted elevation angle voltage on such contact.

The movable switch element of switch 1104 operated by periodically energizing the relay winding 1150 with az-el relay voltage serves to supply a level shifted azimuth or elevation angle voltage through resistance 1151 to the control grid of tube 1100. The control grid of tube 1100 constitutes a part of the input circuit to the servo loop which is now described in detail.

The cathode of tube 1100 is grounded and the anode of the same tube is connected to a plus 150 volt source through resistance 1152. Also, the control grid of tube 1100 is connected to a minus 150 volt source through the serially connected resistances 1154, 1155.

It is noted that the resistance 1155 is connected in the cathode circuit of the cathode follower tube 1156, so as to supply, in degenerative sense, a feedback voltage through resistance 1154 to the control grid of the input tube 1100.

The amplified voltage appearing on the anode of tube 1100 is transferred to the control grid of tube 1101 through resistance 1157 which is shunted by condenser 1158. The control grid of tube 1101 is connected to a minus 150 volt source through resistance 1160 and the cathode of such tube is grounded. Resistance 1157 may be 2.2 megohms, condenser 1158 may be 22 microfarads, and resistance 1160 may be 3.3 megohms.

The anode of the amplifier tube 1101 is connected to a plus 150 volt source through resistance 1162 and such anode is conductively connected to the control grid of the amplifying tube 1163 through resistance 1164 so that the amplified voltage appearing on the anode of tube 1101 is applied to the control grid of tube 1163.

The control grid of tube 1163 is connected to a minus 150 volt source through resistance 1166. The anode of tube 1163 is connected to a plus 300 volt source through resistance 1168. The cathode of tube 1163 is connected to ground through resistance 1170 and is also connected to the so-called "cursor range voltage" lead 1172 through resistance 1174. Also, the cathode of tube 1163 is connected to a minus 150 volt source through resistance 1175.

The amplified voltage appearing on the anode of tube 1163 is connected through the single pole double throw switch 1177 (in its "operate" position) to the control grid of the cathode follower tube 1179 which has its cathode connected to the aforementioned lead 1172 and also to a —150-volt source through resistance 1180. This lead 1172 upon which the "cursor range voltage" appears is returned to ground through resistance 1181 and the so-called "course linearity" resistance 1184. The junction point of resistances 1181, 1184 has connected thereto one terminal of an adjustable so-called "glidepath flare" resistance 1185. The other terminal may have applied thereto, if desired, voltages varying in a predetermined manner for purposes of imparting a "flare" to the electronically produced glidepath, or such other terminal may be periodically grounded through a switch of the az-el relay 1150 as indicated in Figure 25. The voltage thus developed on the lead 1172 is transferred in a degenerative sense to the control grid of the tube 1100 by the means which are now described in detail.

Lead 1172 is by-passed to ground through a one-tenth microfarad condenser 1188, which acts as a filtering condenser assuring the application of only substantially continuous voltages to the control grid of tube 1190 through the so-called "high adjust" resistance 1191 which is shunted by condenser 1193. Resistance 1191 may have a total resistance of 1 megohm and condenser 1193 may be 22 microfarads.

The "L" thyrite resistance is connected between the control grid of tube 1190 and ground so that the non-linear characteristic of the thyrite produces a desired effect on the voltage applied from lead 1172 to such control grid.

The tube 1190 is a cathode follower and has its cathode connected to a minus 150 volt source through serially connected resistances 1195 and 1196. The resistance 1195 is termed a "thyrite zero set" resistance and has its adjustable tap connected through a so-called "low adjust" resistance 1197 to the control grid of the cathode follower tube 1156. The resistance 1197 is shunted by condenser 1199. The resistance 1197 may have a value of 100,000 ohms and condenser 1199 may be 122 microfarads.

The "M" thyrite resistance 1103 is connected between the control grid of the cathode follower tube 1156 and ground so that its non-linear characteristics are imparted to the voltage applied to such control grid. The voltage thus developed on the cathode of tube 1156 is applied through resistance 1200 and 1154 to the control grid of tube 1100.

The servo loop described immediately above, which includes the feedback "course range voltage" lead 1172 operates such that the output voltage i.e. the voltage feedback to the control grid of tube 1100 seeks to balance itself against input potentials, i.e. elevation or azimuth angle voltages, as the case may be, applied through resistance 1151, thereby creating a virtual ground at the control grid of tube 1100, since the feedback path includes the thyrite resistances 1102 and 1103 which impart their characteristics upon the voltage and ultimately return to the control grid of tube 1100.

In seeking the aforementioned balance at the control grid of tube 1100, the voltage appearing on the lead 1172 varies in a predetermined manner as a function of time, and, of course, as a function of azimuth or elevation angle voltage as the case may be. Theoretical considerations involved in these functional variations of voltage on lead 1172 in relationship to the physical position of the glidepath and course line with respect to the geometry of an aircraft landing field and the disposition of radar equipment adjacent to such landing field, are more fully described in the aforementioned co-pending application of Raymond B. Tasker, et al., Serial No. 222,512.

The desired variation of voltage on lead 1172 is applied through the tap on resistance 1184 to the control grid of tube 1204, which constitutes an element of a range delay generator functioning to produce a voltage pulse on lead 1205, such pulse on lead 1205 being time spaced, i.e. delayed, with respect to the appearance of a trigger on the input lead 12, in accordance with the value of voltage appearing at trigger time, on lead 1172. The circuitry for developing such pulse on lead 1205 is now described in detail.

AGCA system triggers appearing on the input lead 12 are coupled through condenser 1209 to the control grid of tube 1210, which has its cathode grounded and its control grid connected to a minus 150 volt source through resistances 1212 and 1213, the junction point of resistances 1212, 1213 being returned to ground through resistance 1214, and the anode of tube 1210 is connected together with the anode of tube 1204 to a plus 300 volt source through voltage dropping resistance 1215.

The cathode of tube 1204 is returned to ground through serially connected resistance 1218 and the so-called "touch down adjust" resistance 1219, such resistance 1219 being shunted by resistance 1220.

The amplified trigger pulse appearing on the anode of tube 1210 is applied through condenser 1221 to the control grid of tube 1222 which has its cathode inter-connected through the cathode of tube 1204 and which has its anode connected to a plus 300 volt source through resistance 1224. The control grid of tube 1222 is connected to a plus 300 volt source through resistance 1225 so that normally, in its quiescent state tube 1222 is conducting heavily to cause the voltage on the cathode of tube 1204 to be relatively high during such quiescent period of tube 1222.

However, upon the application of a negative pulse from the anode of tube 1210, the flow of space current through tube 1222 is greatly diminished. The resulting pulse appearing on lead 1205, which is delayed in an amount depending upon the voltage of lead 1172, is applied to the pulse generator circuitry 1108. For that purpose, the cathode of tube 1204 is connected through condenser 1227 to the control grid of the trigger tube 1228 of the blocking oscillator stage 1108. This circuitry of the blocking oscillator stage is conventional and for that reason need not be described in detail, but functions to produce sharpened pulses at the cathode of the output tube 1230, such sharpened pulses being applied through condenser 1231 to the cursor output terminal 42.

Thus, the thyrite modified feedback voltage is applied as a range delay control potential causing the blocking of the oscillator blocking stage 1108 to occur at the desired range delay for the particular angular position specified.

*Channel glidepath and course display on cathode ray tube using re-arranged circuitry in Figures 13, 18A and 18B*

As explained herein, an "ideal" glidepath and course line are created electronically by adding algebraically, on the one hand, level shifted azimuth angle voltage and modified range voltage, i.e., reference voltage; and, on the other hand, the "ideal" course line is produced by adding algebraically level shifted azimuth angle voltage and modified range voltage, i.e., reference voltage. By this expedient two alternating voltages having a frequency in the order of two cycles per second but displaced many degrees in phase are developed. The zero cross-over points of these cyclically varying voltages represent the "ideal" glidepath and course line, as the case may be.

These alternating voltages, as described elsewhere herein, are used to create angle gates for gating video applied to the range tracking circuit and also for developing azimuth and elevation position error control signals for transmission to an aircraft to control its flight.

The arrangement described presently has for its purpose to allow visual observation of the ideal glidepath and ideal course line as determined by thyrite elements 570 and 457 in the reference voltage generator (Figure 18A). To accomplish this purpose circuitry in Figures 13, 18A and 18B are re-arranged electrically. Such circuitry is re-arranged upon setting of the "track-cursor" switch 284 (Figure 13) to its cursor position. When set to the "track" position such switch 284 provides a function of normal automatic tracking or searching, as the case may be. When set to the "cursor" position the following conditions are effective: (1) the video "on" signal, which normally in tracking operation appears on lead 84, is replaced by a fixed potential of approximately 60 volts which is developed using a voltage dividing network which includes resistances 1000 and 1001, such resistances being serially connected between ground and a +150 volt source with the junction point of such resistances 1000 and 1001 connected to a stationary contact of the composite switch 284; (2) a second switch 1002 of the composite switch 284 causes the application of 28 volts to the relay winding 283 to effect operation of the associated single-pole double-throw relay switches 282 and 287, and such voltage of 28 volts is applied from the lead 1003; and (3) switch 1006 causes a −150 volt source to be connected to the control grid of tube V17A through resistance 433 to thereby supply a high bias to tube V17A to assure its cutoff so that it is ineffective to pass the late index mark.

Energization of the aforementioned relay winding 283 results in a re-arrangement of the circuitry associated with the tube V9 which, as recalled, in the tracking function operates as a second integrator. With the circuitry re-arranged, tube V9 serves as a D.C. amplifier with the amplified output appearing as a "range voltage" at the cathode of tube V11B. More specifically, in such case the control grid of tube V9 is connected through relay switch 282 and resistance 1008 to the terminal 64 to which is applied cursor information which is developed in the circuitry shown in Figures 18A, 18B as described hereinafter. In general, the input to tube V9 comprises a D.C. voltage applied through the aforementioned resistance 1008 which is shunted by condenser 1009, the junction point of element 1008, 1009 being returned to ground through resistance 1010.

The anode of tube V9 is connected through relay switch 289 to the control grid of tube V10A since, in this condition, the relay winding 286 is energized. It is apparent that the amplified voltage on tube V9 appears in modified form at the cathode of tube V10B and thus on the range voltage lead 35. This voltage appearing on lead 35 is applied, as previously described, to the control grid of the delay multivibrator V2A, and index marks are generated by the tube V16, as described previously in connection with range tracking. The late index mark, however, is removed due to the bias voltage applied to the grid circuitry of tube V17A. Thus, the output of mixer tube V17B consists of the early marks only. The display as seen on the az-el indicator consists of the early index marks, occurring at such range delays and at such angles that they form a pattern plotting the computed course and glidepath lines. To achieve this result, such circuitry is provided in Figures 18A and 18B in the manner indicated in block diagram in Figure 23 for computing a servo loop in which a suitable continuous voltage is supplied to the input of tube V9A over lead 1011, and a "range voltage" is supplied over lead 1012 to the thyrite reference generator.

With respect to Figures 18A, 18B and 23, the "range voltage" appearing on lead 35 is applied over lead 1012, i.e., terminal 82, to the same reference voltage generator used in the tracking function. As in the tracking function, azimuth and elevation angle voltages are shifted in level and applied to two identical amplifier channels after mixing with the range voltage as modified by the thyrite reference generator. Such amplifier channels, however, in this instance comprise only a portion of the corresponding azimuth and elevation angle tracking circuits. More specifically, the azimuth amplifier channel comprises the stages V4A and V28A only, and similarly the elevation amplifier channel includes the stages V20A and V31A only. The amplified voltage appearing on the anode of tube V28A is applied through condenser 1013 to the lead 1014 which, in the de-energized condition of relay winding 1015, is connected to the control grid of tube V4B. Tube V4B is a cathode follower and has its cathode connected through lead 469 and resistance 1016 to the control grid of tube 465 to complete a feed-back loop. It is noted that condenser 1017 is connected between the lead 1014 and ground and that the anode of tube V28A is connected to a −150 volt source through the serially connected resistances 1018 and 1019. Resistances 1018 and 1019 are each one megohm. Condensers 1013 and 1017 have capacities respectively of 22 and 150 micro-microfarads.

The elevation circuitry is similar to the azimuth circuitry described and for that reason a detailed description of the elevation channel is not presented in this instance.

*Clutter gating illustrated with reference to Figure 26, Figure 18B and Figure 19*

The purpose of the circuitry described under this heading is to modify the azimuth and elevation control voltages which are developed in the computer unit, so as to lessen the effects upon control signals of anticipated clutter, within certain closely defined areas. It is noted that clutter gating, as described hereinafter, is effective only within the computed control signal circuitry, and is not introduced into the tracking functions.

In general, the clutter gating circuitry develops gates which are adjustable in width, and adjustable in range in the glidepath approach area. This circuitry supplies a control signal to the circuitry illustrated in Figure 18B when a track aircraft is within the limits of these adjustable gates so as to attenuate computed error signals within the gated areas.

It is noted as indicated, that Figure 26 shows in block diagram, certain elements illustrated in more schematic form in Figure 18B.

With reference to Figure 26, the circuitry represented therein generates three gates of variable widths, which may be manually set in relative position in the AGCA approach area. Coincidence of the delay of the range gate, generated in the tracking unit illustrated in Figures 12 and 13, with that of any one of these "clutter" gates, institutes preset modifications upon computed azimuth and elevation control signals. The effect of each gate therefore, when set to encompass a clutter area, is a period of diminished control signals, enduring for the time required for the passage of the controlled aircraft through the gated area.

Three identical sets of circuitry are used for the generation of three AGCA clutter gates. These three identical circuits are represented generally by the reference numerals 1300, 1301 and 1302. Since these circuits are identical, a description of the circuit 1300 suffices as description for the other circuits 1301 and 1302.

The circuit for the general reference number 1300 includes a buffer amplifier tube 1304, to which is applied the AGCA system trigger from terminal 10. The output buffer amplifier tube 1304 is applied to the multivibrator stage 1305 and then in turn to a second multivibrator stage 1306. The output of the multivibrator stage 1306 is applied to the input of a cathode follower stage 1308 and the output of the cathode stage is applied to a common lead 1309, to which is likewise applied the output of the circuits 1301 and 1302. The multivibrator stage 1305 has means associated therewith for determining the time at which the gate begins with reference to the appearance of the system trigger, while a multivibrator stage 1306 has means associated therewith for determining the length of the gate, once it has been initiated.

Since circuitry of this character for producing delayed gates of variable widths is well known in the art, it is believed that a more detailed description of the circuits is unwarranted.

These gates developed in circuits 1300, 1301, and 1302 thus appear on lead 1309, which is connected through suitable circuitry to an intensity control electrode of the cathode ray tube for the purpose of indicating, as shown in Figure 27, the regions in which the clutter gates are effective. Thus, in Figure 27, the pair of vertical lines 1312, 1313, establish the boundaries of the first gate which encompasses the clutter area 1314; the pair of vertical lines 1315, 1316, establish the effective boundary of the second gate which encompasses the clutter area 1318; and, the third pair of vertical lines 1319, 1320, indicate the boundary of the third gate which encompasses the clutter areas 1322, 1323.

The gates thus developed on lead 1309 are applied through condenser 1328 (Figure 26) to the suppressor grid of coincident tubes 1330 and 1331, such tubes having their control grids coupled to receive range gates from Channels No. 1 and No. 2 respectively. The stages 1330 and 1331 thus conduct more heavily when range gates and clutter gates are applied simultaneously to the control grids and suppressor grids thereof. The resulting voltage variations are amplified respectively in stages 1332, 1334. As a result, a positive voltage is developed in the anode circuits of stages 1332, 1334, which are applied to the grid of the relay control stages 1340, 1341, to thereby cause a relatively high current to flow through the relay windings 1338, 1339 and cause actuation of the associated relay stages 1340, 1341. Excursion of the voltage applied to the grid of stages 1340, 1341 is limited by corresponding clamping stages 1335, 1336.

Energization of either winding 1338, 1339, results in operation of the related switch contacts 1340, 1341, which are illustrated also in Figure 18B. These relay switches 1340, 1341, are in their normal position as shown in which the relay switch 1340 normally shortcircuits the effect of tubes 1815, 1816, and wherein switch 1341 normally shortcircuits the effect of tubes 1350, 1351. These tubes 1815, 1816, and 1350, 1351 with associated batteries, exert their effect on the control voltage only when the aircraft is in a clutter area and in such a manner as to produce a control effect illustrated in Figure 28.

The batteries 817, 818 (Figure 18B) are each 1½ volts so that a voltage of 1½ volts is required to be overcome before the control voltage developed on lead 1355 in the azimuth case and on the lead 1356 in the elevation case, is first required to be developed before an azimuth or elevation control signal, as the case may be, is transmitted to the aircraft.

*Overtake warning and wave-off means illustrated in connection with Figures 29, 30 and 42*

In general, the apparatus described under this heading develops so-called "safety gates" following each tracked aircraft. These safety or guardian gates are applied to a common bus which is constantly monitored by a coincidence detector. Coincidence or overlapping of the safety gate of one tracked aircraft with that of another, is measured by a saw-tooth generator circuit.

The degree of "overtake" expressed as an output voltage for each channel, is measured by two relay control circuits. The existence of an "overtake" condition results in the closing of the "overtake" relay which provides suitable warnings from a common bus. Greater degrees of "overtake" actuate the "wave-off" relay sending a "wave-off" signal via a ground aircraft radio link, to the tracked aircraft, releasing such aircraft from ground control.

In the AGCA system warnings of "overtake" conditions are automatically transmitted to aircraft under AGCA control. As indicated previously overtake warning is accomplished by the generation of a so-called "guardian gate" behind the range gate for each AGCA controlled aircraft, and by the continuous automatic monitoring of this moving gated region. The extent of entrance of a second aircraft into the gated area following a controlled aircraft is measured, and threshold controls provide actuation of suitable circuitry for the transmission of "warning" and "wave-off" signals to the overtaking aircraft.

Referring to the circuitry illustrated in Figures 29 and 30, this circuitry may conveniently be divided into three distinct groups, namely:

(1) The Channel 1 guardian gate generator and the Channel 1 interference trigger measurement circuitry.

(2) The Channel 2 guardian gate generator and the Channel 2 interference trigger measurement circuitry.

(3) The interference trigger generator circuitry, which is common to both Channels 1 and 2.

The circuitry involving groups 1 and 2 above, is identical, and for that reason a description of the circuitry and operation of that for Channel 1 suffices as a description for that of Channel 2.

The range gates developed in Channels Nos. 1 and 2 are applied respectively to the terminals 1801 and 1802, such terminals being connected through coupling condensers 1803 and 1804 respectively, to trigger tubes of corresponding delay multivibrator stages 1805 and 1806.

The multivibrator stage 1805 generates a gate, which is delayed with reference to the system trigger in an amount controlled by the range gate applied to terminal 1801. The width of this gate is controlled by adjustment of the tap on potentiometer resistance 1808 which establishes the Channel 1 guardian range to afford an adjustment of the dimension of the safety area behind the aircraft controlled by Channel No. 1.

The guardian gates developed by delay multivibrators 1805 and 1806 are represented by the gates 1809 and 1810 (Figure 42), which are shown as overlapping to develop what is termed as interference. In other words, the guardian gate 1810 falls within the guardian gate 1809 for purposes of indicating an unsafe condition. The duration of these guardian gates may be, for example, 20 microseconds in duration, but may be controlled in width by adjustment of corresponding potentiometer resistances 1808 and 1812.

The output of the delay multivibrator stage 1805 in the form of a gating voltage, is applied to two circuits, i.e., the guardian gate is applied through condenser 1815 to the control grid of the saw-tooth generator stage 1816, and is applied through coupling condenser 1817 to the control grid of the mixer amplifier tube 1818.

It is observed that likewise, the guardian gate developed in the Channel No. 2 delay multivibrator 1806 is applied through the same condenser 1817 to the control grid of the same mixer tube 1818, so that a stepped wave form of the character illustrated at 1819 in Figure 42 appears on the control grid of tube 1818 which is normally biased in a cut-off condition with the conducting threshold indicated in dotted lines in Figure 42.

Thus, as indicated in Figure 42, when there is interference between the guardian gates 1809 and 1810, tube 1818 is rendered conducting for purposes of triggering the blocking oscillator which includes the trigger tube 1820 and blocking oscillator tube 1826. Thus, the input at the control grid of tube 1818 consists of the mixed guardian gates from the outputs of delay multivibrators 1805 and 1806.

The adjustment of the tap on potentiometer resistance 1822 determines a threshold value, i.e., determines the position of the dotted line 1824 in Figure 42, to which the input must rise for a pulse to be passed by the tube 1818. This threshold level is therefore set at such a value so as to exclude the normal channel guardian gate, but to pass the combined pulses afforded by the mixing of the two generator guardian gates, when interference exists.

The trailing edge of the pulse 1828 thus passed by tube 1818 fires, or initiates, operation of the blocking oscillator and the output of such blocking oscillator stage appears at the cathode of the tube 1826.

It is noted that the interference gate developed on the anode of tube 1818 is of the form illustrated at 1828 in Figure 42. The voltage pulse developed on the cathode of tube 1826 is applied through a one microsecond delay line 1830 to the ungrounded terminal of the potentiometer resistance 1831 which establishes the Channel No. 1 interference trigger amplitude. The adjustable tap on resistance 1831 is connected through coupling condenser 1832 to the control grid of tube 1834. The voltage wave thus applied to the control grid of tube 1834 is represented at 1836 in Figure 42, it being noted that the voltage wave 1836 is delayed one microsecond with respect to the wave 1827 for a purpose which is more evident from the following description, namely, to displace the positive pulse of wave 1836 outside of the sawtooth wave 1840 developed by the saw-tooth voltage generator stage 1843.

In other words, the delay line 1830 serves to delay the wave form 1836 for a period of one microsecond moving the wave form 1836 outside of the original interference area. This is for the purpose of precluding the possibility of the interference pulse firing or initiating operation of the improved saw-tooth measuring circuitry, since the interference trigger for a given overtake condition appears only within the duration of the saw-tooth for the overtaking aircraft.

As mentioned previously, the output of the delay multivibrator stage 1805 is supplied through coupling condenser 1815 to the saw-tooth circuitry 1816 and specifically to the control grid of tube 1843. The voltage developed on the anode of tube 1843 is a saw-tooth wave of the form illustrated at 1840 in Figure 42, such sawtooth wave 1840 occurring at a delay with relationship to the system trigger in an amount controlled by the range gate of the aircraft being tracked or controlled.

The saw-tooth wave 1840 is applied to the grid circuitry of tube 1834, which is so biased that it passes current only at the coincidence of the interference trigger and the saw-tooth wave shape. For this purpose, the control grid of tube 1834 is connected through resistances 1845 and 1846 to the adjustable tap on resistance 1847, which has one of its terminals grounded and the other one of its terminals connected to a minus 150 volt source 1850.

As a result of this coincidence of the channel saw-tooth and interference trigger pulses, a voltage is developed at the cathode of tube 1834, such voltage having an amplitude determined by the degree of entry of the interference trigger under the saw-tooth wave shape as indicated at 1852 in Figure 42. This coincident condition is illustrated generally at 1855. The voltage thus developed on the cathode of tube 1834 is applied to the pulse transformer 1856 for subsequent rectification by the voltage doubling circuitry including tubes 1857 and 1858. The rectifier input pulse appears as indicated at 1860 in Figure 42.

The rectified voltage developed on the cathode of tube 1857 is applied to the control grid of the relay control tube 1861. The bias supplied to the control grid of tube 1861 is determined by the position of the tap on the potentiometer resistance 1862 which essentially determines the level to which the rectifier tube must rise before tube 1861 conducts sufficient current to close relay 1865.

Assuming the aforementioned conditions, tube 1861 conducts, and the current passed by such tube flows through two parallel circuits, including on the one hand the relay winding 1864A and on the other hand, the relay winding 1865A. Relay winding 1864A constitutes an element of the Channel No. 2 wave-off relay 1866A; while relay winding 1865A constitutes an element of the Channel No. 2 warning relay 1867A. As the degree of "overtake" increases, the degree of interference between the interference trigger and the generator saw-tooth increases, raising the control voltage supplied to tube 1861A and causing a larger flow of current into the cathode circuit of that tube.

Resistance 1870A serially connected with coil 1864A provides an adjustment as to the amount of current drawn through the relay coil 1864A and determines the degree of "overtake" condition which will cause actuation of the switches of the Channel No. 2 wave-off relay 1866A.

Smaller degrees of "overtake" result in a smaller flow of cathode current in tube 1861A, actuating the switches of relay 1867A to thereby apply a plus 28 volt signal on the "Overtake Warning Channel No. 2" line 128. Larger degrees of "overtake" result in the additional closing of relay 1866A, opening the "wave-off" ground circuit and applying a positive potential out to the system on the "alarm bus."

Figure 42 illustrates typical operation of the circuitry illustrated in Figures 29 and 30 and illustrates a condition of "overtake" occurring with the aircraft controlled by Channel No. 2 overtaking the aircraft controlled by No. 1 Channel.

The output of the delay multivibrator 1805 (Channel No. 1) is shown at 1809, and the output of delay multivibrator 1806 (Channel No. 2) is shown at 1810. Mixing of the two multivibrator outputs on the guardian gate bus is shown at 1819, with a larger pulse occurring at the coincidence of the two gates.

As illustrated in 1828 threshold control has removed the lower part of the wave form and only the area of interference is shown. The differentiated wave form at 1827 and the blocking oscillator delayed wave form at 1836 illustrate the wave form before and after the blocking oscillator and one microsecond delay imposed by the delay line 1830, placing the positive-going pulse outside of the original interference area.

The output of the Channel No. 2 saw-tooth generator is illustrated at 1875 and such saw-tooth is modulated by the delayed blocking oscillator pulse as illustrated at 1855. It is readily seen, as indicated at 1852, that as the degree of interference increases, the interference trigger moves further up on the saw-tooth, increasing the amplitude of the rectifier input pulse illustrated at 1860. Threshold settings for "warning" and "wave-off" conditions are illustrated at 1877.

In general, operation of the warning relay 1866, results in a warning signal both to the ground crew and to the pilot of the overtaking aircraft, using means for that purpose illustrated in the co-pending application, of William T. O'Neil, now U.S. Patent 2,774,064; likewise, actuation of the wave-off relay 1867 results in the development of suitable warning signals and the termination of controlled aircraft flight, as more fully described in U.S. Patent 2,795,781 of Alvin Guy Van Alstyne.

Artificial aircraft

In order to fully appreciate the concepts underlying the reduction of an "artificial aircraft" on the face of a cathode ray tube for purposes of aligning the AGCA equipment and checking its functioning, the following considerations should be carefully noted.

In order to cause an actual aircraft to fly either to the right or to the left of an ideal course line, it is necessary, due to the aerodynamics of the aircraft, to bank the aircraft, using conventional aircraft control elements for that purpose. On the other hand, in order to effect a change in elevation of the aircraft with respect to the ideal glidepath, banking of the aircraft is not resorted to. Accordingly, the motion of the aircraft with respect to the course line on the one hand and with respect to the glidepath on the other hand is expressed by different mathematical expressions. Thus, for effecting an azimuth control, a double integration is involved. Because of such double integration, it is necessary that some damping be present in the system to prevent continuous overshoots or continuous S turns having as their center the course line itself. In other words, in a beam following system of this character, either a damping or a so-called "rate of error" term is injected to insure stability in the system and to prevent oscillations or S turns about the course line. In a certain instance, the rate of error or damping term is supplied by the approach coupler in the aircraft itself, in which case the control signals transmitted from the ground to the aircraft constitute signals representing pure position error only, the rate of error term being supplied by the autopilot. In those instances where the autopilot does not supply the rate of error term, the control signals transmitted from the ground to the aircraft represent error plus rate of error components. In either case, the instantaneous rate of term of the aircraft (bank angle) is proportional to the sum of the error signal plus the rate of error signal.

To ideally simulate an aircraft two electronic integrators are used herein, the first integrator functioning to develop a heading voltage representing the orientation of the aircraft from a voltage representing the bank angle, and the second integrator functioning to change the heading voltage to a voltage representing the position of the aircraft. This circuitry including two integrators is stable, i.e., devoid of oscillations, when the control signal applied to the first integrator includes a voltage representing the rate of error. However, in those instances when the control signal applied to the first integrator does not contain a component representing the rate of error, a differentiating circuit is incorporated with the two integrators for the afore-mentioned purpose, i.e., to produce stability. Instead of a differentiating circuit which serves to differentiate the control signal with respect to time, circuitry may be used which serves to produce a measurement of the difference in heading with respect to the course line, recognizing that for small angular errors of heading with respect to the course line, the rate of error is equal to the product of the air speed and the angle in radians.

More specifically, in those instances where the control signal transmitted to the aircraft involves error alone, the circuitry representing artificial aircraft may be stabilized by any one of three methods; i.e., (1) by adding a differentiator between the two afore-mentioned integrators; (2) by providing feedback from the output of the first integrator to the input circuit of the integrator to balance out the control signal; and (3) by removing the first-mentioned integrator and using only one integrator. This third method is not considered a rigorous simulation of aircraft but does provide stable control since the nature of the simple integration is such that the rate of change of error is proportional to the error itself.

All of the above discussion is directed to the control of aircraft in azimuth, i.e., for moving the aircraft either to the right or to the left of the course line. The problem is not so involved in simulating the flight of aircraft in elevation since no banking of the aircraft is necessary. Thus, for elevation purposes, only one integrator is used and the integrator itself is inherently stable. Theoretically, there are also integrations involved in a representation of the flight of an aircraft in elevation, but as a practical matter one integration suffices to illustrate the problems involved in the behavior of the aircraft since one of these two integrations is so rapid that it may, for practical purposes, be negative.

As illustrated herein, the azimuth control signals transmitted to the artificial aircraft include both components, i.e., pure error and rate of error, and two integrators are shown and described for azimuth control of the artificial aircraft. Since the elevation control signals involve pure error only, one integrator is used for elevation control of the artificial aircraft.

The artificial aircraft circuitry illustrated in Figures 31 and 32 consists essentially of four basic circuits which serve to control the flight of an artificial aircraft in range, azimuth and elevation.

The artificial aircraft is developed from a series of gated pulses, such pulses being applied to an intensity control electrode of the cathode ray tube.

The circuitry of Figures 31 and 32 may be used two different ways, depending upon the position of the single pole double throw switches 2500, 2501 which are ganged for uni-control. In the so-called manual position of these switches 2500, 2501, the position of the artificial aircraft on the face of the cathode ray tube is controlled manually; whereas, in the other position of these switches, control signals are applied to "control" the flight of the artificial aircraft, such control signals appearing on the terminals 48, 50 and being developed in the computer unit described specifically in connection with Figures 18A, 18B. Normally, such control signals applied to terminals 48, 50 are transmitted as modulation components on a wave transmitted from the ground based radar equipment to the aircraft, for controlling the flight of same. In this case such control signals applied to terminals 48, 50 in the automatic position switches 2500, 2501 are used to control the flight of the airtificial aircraft.

The artificial aircraft unit in Figures 31, 32 is first described with the switches 2500, 2501 in their manual positions.

In general, the four basic circuits mentioned above consist of (1) a range circuit; (2) an angle gate circuit; (3) an azimuth control circuit; and (4) an elevation control circuit.

Briefly, in the range circuit, a "throttle" voltage is applied to a range integrator to cause a range voltage to progress in range at a constant rate. Provision is made for reversing or stopping this integration, and for rapid resetting to maximum range. Feedback in the range integrator is adjustable to simulate the wind component parallel to the runway, for when the selector switch is set to "stop," the artificial aircraft is "blown" backwards or forwards if the integrator feedback is set to allow a drift either way. This range voltage controls a phantastron delay circuit, which in turn initiates operation of a pulse generator, the output of which is the aircraft signal. However, the pulse generator is gated with respect to the azimuth and elevation angle voltage by a gate developed in an angle gate circuit.

The angle gate circuit used to define the angular limits of the aircraft is similar to that used in the angle tracking unit to reject unwanted video, described under a different heading. The input to this angle gate circuitry is alternately on a time sharing basis with the azimuth and elevation position voltage from the control integrators when the switches 2500, 2501 are in their automatic position; but, when the switches 2500, 2501 are in their manual positions, a manually adjustable voltage, corresponding to an azimuth and elevation voltage, is applied to the angle gate circuitry.

The azimuth and elevation control circuits are used only when the switches 2500, 2501 are in their automatic position.

Briefly, the azimuth control circuit contains a first integrator and a second integrator. The first integrator has an output which changes about a mean value of zero volts at a rate proportional to the input signal, remaining at any value within the permissible range when the control voltage is zero. Thus, the "heading" voltage simulates the change of heading of a plane when turn is applied and a new heading is maintained when the turn is removed. A zero heading voltage corresponds to a heading toward the ground based radar equipment. The integration rate is variable, to adjust the proportionality between rate of turn and turn voltage, and the feedback is adjustable to make the headings stable.

The second integrator has an output varying between 2 and 52 volts at a rate proportional to the heading voltage. The integration rate is variable to correlate the response of the plane with air speed and rate of turn, which are all intimately related in a real aircraft, but independent so far as the artificial aircraft is concerned.

Feedback in the second integrator is adjustable to simulate cross-winds, for if the correct feedback is not used, a drift occurs in the position voltage, requiring a new heading voltage to hold the course, just as in real aircraft flight.

The output of the second integrator is applied to the angle gate to control the angular position of the artificial aircraft signal. Switching provisions are made enabling the position to be controlled directly by a knob. When switched to "manual" the second integrator capacitor is grounded so that the manual position voltage charges the capacitor. When the switch is thrown to "automatic," the integration proceeds from the position established by manual control. Meanwhile, another part of the switch clamps the first integrator so that the new heading is zero. This feature enables the automatic control to be engaged with the plane in any condition of initial error and enables the operator to offset the aircraft from the course while it is still under control.

The elevation control circuitry is similar to the azimuth control circuitry. In general, an aircraft's response while flying through the approach zone is more rapid in elevation than it is in azimuth, and this is provided by adjustments of the integration rates.

The drift adjustment of the second integrator is termed the "trim tab" adjustment and equally descriptive could be termed the "pitch" adjustment. In any event, this adjustment simulates a steady tendency to fly high or low, requiring a new attitude to hold the proper rate of descent.

It is noted, that the artificial aircraft as developed herein, is controlled and its position measured on a pure angular voltage scale, independent of range. Thus, the artificial aircraft behaves as though pure rectilinear coordinants were employed throughout, as long as angular position only is considered. But, as regards linear displacements on the cathode ray tube position, the artificial aircraft behaves as though ideal course softening were used. Here the analogy ends, for it is not possible for the artificial aircraft to fly outside the limits of the scan as a real plane is capable, and zero headings of the artificial aircraft are towards the radar equipment. Nevertheless, the artificial aircraft, within the limits imposed, does simulate aircraft applied under AGCA control, for the errors resulting from the non-rigorous transformation do not alter the fundamental dynamics of the system.

Referring to the range circuitry of Figure 31, it includes a pair of potentiometer resistances 2505, 2506 which have ganged taps, the positions of which determine the speed of the aircraft. These taps are manually adjusted and maintained in such adjusted position. The speed voltage thus developed on lead 2507 is applied to the control gird of tube 2508 constituting an element of the range integrator. The voltage developed on lead 2509 represents the range of the aircraft traveling at the speed determined by the position of the taps on resistances 2505 and 2506.

The range which the aircraft acquires is modified by "wind" the intensity of such "wind" being determined by the position of the tap on the wind resistance 2510.

This range voltage appearing on lead 2509 is applied to the anode of the time delay phantastron tube 2512 which has a system of trigger pulses transferred from lead 12 to the third grid. The phantastron develops a positive wave 2513 on the lead 2514, the trailing edge of such wave 2513 being delayed in time, an amount representative of the magnitude of the range voltage appearing on lead 2509. Such wave 2513, with variable trailing edges, is differentiated by the differentiating network including condenser 2516, resistances 2517 and 2518. The differentiating wave is applied to the control grid of tube 2519 which, in its quiescent state, is conducting relatively heavy since its control grid is connected to a point on the voltage dividing network including resistances 2518 and 2522.

The negative pulse applied to the control grid of tube 2519 corresponding with the variably delayed trailing edge of the wave 2513, results in development of the positive pulse 2523 on the anode of tube 2519, such pulse being transferred through coupling condenser 2525, to the control grid of the blocking oscillator pulse generator which includes the tubes 2525 and 2526. The blocking oscillator pulses developed on the cathode of tube 2526, appear on lead 24 which is connected to an intensity control electrode of the cathode ray tube.

It is observed that with a continuous voltage applied to lead 2528, vertical lines would appear on both the azimuth and elevation displays, since such vertical lines (corresponding to range marks) are the locus of points of the same range.

In order to render visible a portion of such lines only, i.e., a relatively small portion corresponding to the width of the artificial aircraft, a gating voltage sensitive to the azimuth and elevation positions, as the case may be, of the scanning beam, is applied from the angle gate generating circuit over lead 2528 to the anode of tube 2525. Thus, the blocking oscillator stage 2525, 2526 is rendered operative to transmit intensified pulses to the lead 24 only during a small fractional part of the scanning period.

In manual operation, the time at which a positive gating voltage appears on lead 2528 is determined by manual adjustment of the taps on the azimuth manual position potentiometer resistance 2530 on the one hand in the azimuth display, and on the other hand, in the elevation display, by the position of the tap on the elevation manual position potentiometer resistance 2531.

In the automatic position of switches 2500, 2501, the time at which the positive gating voltage appears on lead 2528 is determined by the magnitude of the control voltage developed as a result of application of control voltage to terminals 48 and 50.

It is observed that the artificial aircraft may be caused to fly either forwardly or backwardly, depending upon the position of the movable element of the single pole double throw switch 2535. The speed of such forward or reverse travel, as the case may be, being determined by the position of the ganged taps on resistances 2505 and 2506.

In forward flight, a positive constant voltage is applied to the control grid of tube 2508; but, in reverse flight, a negative constant voltage is applied to the control grid of tube 2508. In order to effect a rapid reverse return movement to the aircraft, a high negative voltage is applied to the control grid of tube 2508, upon movement of the single pole double throw switch element 2537 to a position wherein it engages one terminal of resistance 2540; the other terminal of resistance 2540 being connected to a minus 150 volt source.

The range integrator, including tubes 2508 and 2540, operates in similar fashion to the wide range linear integrator described in detail in connection with the description of the range tracking unit. In general, a constant voltage applied to the control grid of tube 2508, results in a changing voltage on the cathode of tube 2540, the rate of change of such voltage on the cathode being determined by the intensity of voltage applied to the control grid of tube 2508.

For this purpose, the anode of tube 2508 is connected through resistance 2541 to a plus 300 volt source and the cathode of tube 2508 is connected to the adjustable tap on resistance 2510 which has one of its terminals grounded and the other one of its terminals connected through resistances 2543 and 2544 to the cathode of tube 2540. The integrating condenser 2547 is connected between the control grid of tube 2508 and the cathode of tube 2540.

The junction point of resistances 2543, 2544 is connected through crystal rectifier 2547 to the anode of tube 2512. The condenser 2547 has a value of one microfarad, resistance 2550 is 4.7 megohms, resistances 2543 and 2544 are each 68,000 ohms, resistance 2510 is 5,000 ohms, resistance 2541 is one megohm.

It is noted that the anode of tube 2508 is connected directly to the control grid of tube 2540 which has its anode connected directly to a plus 300 volt source.

It is appreciated that other delay means, other than the time delay phantastron 2512, may be used, and the one shown herein serves as an example for the others.

In manual operation, as mentioned previously, the position of the tap on resistance 2530 determines the azimuth position of the artificial aircraft in the azimuth display, and the tap on resistance 2531 determines the elevation position of such aircraft in the elevation display.

It is noted that in Figure 31, the switches 2500, 2501, are shown in their automatic position, but their manual position is indicated in such figure.

Resistance 2531 has one of its terminals grounded and the other one of its terminals connected through resistance 2552 to a plus 300 volt source; likewise, resistance 2530 has one of its terminals grounded and the other one of its terminals connected through resistance 2554 to a plus 300 volt source.

The tap on resistance 2531 is connected through terminals 12, 11, of switch 2500, 2501 to the control grid of tube 2557, constituting an element of the attitude to position integrator stage 2558. Under these conditions, the tube 2557 serves simply as a cathode follower stage. Likewise, the tap on resistance 2530 is connected through terminals 3, 2, of switch 2500, 2501 to the control grid of tube 2559 of the heading to position integrator stage 2561. However, under these conditions, the tube 2559 serves simply as a cathode follower.

The cathode of tube 2557 is returned to ground through the serially connected resistances 2553, 2564 and potentiometer resistance 2565; likewise, the cathode of tube 2559 is returned to ground through resistances 2564, 2565 and potentiometer resistance 2566.

The voltage developed at the junction point of resistances 2563, 2564 is representative of the elevation position of the aircraft and such voltage is applied to one stationary contact of the single pole double throw az-el relay switch 2570; the other stationary contact of switch 2570 is connected to the junction point of resistances 2564, 2565 at which is developed a voltage representative of the azimuth position of the aircraft.

The az-el position voltages are thus selected by the movable contact of the switch 2570 and applied through resistances 2572 and 2573 to the control grid of tube 2575, which constitutes an element of a differential amplifier of the character described previously in connection with the angle gate circuitry in the computer unit in Figures 18A, 18B. Thus, the azimuth and elevation position voltages are alternately applied to the control grid of tube 2575. Also applied to the control grid of tube 2575, on a time sharing basis, are the azimuth and elevation beam angle voltages which appear on leads 18, 20, respectively, such azimuth and elevation beam angle voltages being applied through the single pole double throw relay switch 2576 and resistances 2578 and 2579 to the control grid of the inverter tube 2580.

The inverted azimuth, or elevation beam angle voltage, as the case may be, developed on the anode of tube 2580, is applied to the control grid of the cathode follower tube 2581, which has its cathode connected through serially connected resistances 2583 and 2584 to a minus 150 volt source, the junction point of such resistances 2583, 2584 being connected through resistances 2585 and 2573 to the control grid of tube 2575.

The differential amplifier, including tube 2575, has the characteristic illustrated at 2590 and serves to produce the angle gate 2591 which is applied to lead 2528.

With respect to wave forms 2590 and 2591, the abscissa has antenna beam angle voltage and the ordinates correspond to intensity of control voltage.

It is observed from curve 2590, that operation is about the apex of the curve 2590, such apex being in a position corresponding to current cut-off in one of the tubes of the differential amplifier.

The tube 2575 is normally in a non-conducting state since a negative 150 voltage is applied to the control grid, it being noted that the anode of tube 2575 is connected to a plus 150 volt source through resistance 2591. The anode of tube 2575 is connected to the control grid of tube 2594.

The cathodes of tubes 2575 and 2595 are returned to ground through a common cathode resistance 2596. The control grid of tube 2595 is connected in a voltage dividing network including resistances 2598 and 2599, one terminal of resistance 2599 being grounded and one terminal of resistance 2598 being connected to a plus 150 volt source. Resistance 2591 is 150,000 ohms, resistance 2598 is 150,000 ohms, resistance 2599 is 6,800 ohms, resistance 2596 is 10,000 ohms.

The anode of tube 2595 is connected to a plus 150 volt source through resistance 2600 and is also connected to the control grid of tube 2601.

The cathodes of tubes 2601 and 2594 are connected to one terminal of the voltage regulating tube 2603 which has its other terminal connected to one terminal of each of resistances 2605 and 2606, the other terminals of resistances 2505, 2506, being connected to a minus 150 volt source through resistance 2608. The anodes of tubes 2594 and 2601 are each connected to a plus 150 volt source.

The tap on resistance 2605, the so-called elevation width adjustment resistance, is connected to a stationary contact of the single pole double throw az-el relay switch 2607, the other stationary terminal of switch 2607 being connected to the tap on the azimuth width adjustment resistance 2606. The movable contact of switch 2607 is connected through resistance 2609 to the control grid of tube 2610, such control grid being returned to ground through resistance 2611. Adjustment of the taps on resistances 2605 and 2606 establishes the width of the angle gate 2591 during the elevation and azimuth functions respectively.

The cathode of tube 2610 is connected to a minus 150 volt source through resistance 2613. The anode of tube 2610 is connected to a plus 300 volt source through resistance 2615 and such anode is connected to the control grid of tube 2620, which has its cathode returned to ground through resistance 2622 and its anode connected to a plus 300 volt source. A voltage regulator tube 2625 is connected between the cathode of tube 2610 and ground.

The angle gate thus developed on the cathode of tube 2620 is applied through the primary winding of the blocking oscillator transformer 2627 to the anode of tube 2525 to thereby gate the operation of the same.

With the circuitry thus far described, it is clear that the speed of the artificial aircraft as viewed on the face of the cathode ray tube is determined by the setting of the taps on resistance 2505 with switch 2535 in its position for forward movement of the artificial aircraft; and, the speed of the aircraft moving in reverse with the switch 2535 in reverse position, is determined by the setting of the tap on resistance 2506.

The position of the aircraft in the azimuth display is determined by the setting of the tap on resistance 2530; and, in the elevation display, the position of the artificial aircraft is determined by the adjustment of the tap on resistance 2531. An operator thus may control both the speed and the position of the artificial aircraft manually for general alignment and test purposes.

In order to test and align the computer circuitry specifically and the AGCA apparatus generally, control voltages as developed in the computer unit illustrated in Figures 18A, 18B, are fed into an artificial aircraft circuitry in the manner described in detail hereinafter; and for that purpose, the switch 2500, 2501 is placed in its automatic position, in which case, the tubes 2557, 2559 operating as described above, as simple cathode followers, are connected as elements of different integrator circuits 2558, 2561. Thus, tube 2557 becomes a component of the "attitude to position" integrator 2558 and tube 2559 becomes a component of the "heading to position" integrator 2561.

The integrator stage 2558 is rendered sensitive to voltages developed in the inverter stage 2640, the input terminal of which is connected to the lead 48 upon which is impressed an elevation control voltage developed in the computer illustrated in Figures 18A, 18B. Similarly, the integrator stage 2561 is applied with control voltages developed in a "turn to heading" integrator stage 2642, the input terminal of which is connected to terminal 50 upon which is impressed azimuth control voltages as developed in the computer illustrated in Figures 18A, 18B.

The terminal 50 is connected through resistances 2644 and 2645 to the control grid of tube 2646, which has its cathode connected to an adjust tap on the aileron neutralizer resistance 2648 which has one of its terminals grounded and the other one of its terminals connected through resistance 2649 to the cathode of tube 2650.

The anode of tube 2646 is connected to a plus 300 volt source through resistance 2652 and such anode is connected to the control grid of tube 2650. The anode of tube 2650 is connected to a 300 volt source. An integrating condenser 2654 interconnects the control grid of tube 2646 with the cathode of tube 2650.

The voltage applied to terminal 50 is substantially a continuous one but varies from plus values to minus values, depending upon intensity correction signal transmitted to the aircraft for causing such aircraft to fly along the ideal course line. This voltage integrated in the integrator stage 2642 results in the production of a voltage at the cathode of tube 2650 representative of the instantaneous heading or orientation of the aircraft. Effecting such integration, the condenser 2654 is one-half microfared, resistance 2649 is 100,000 ohms, resistance 2648 is 2,500 ohms, resistance 2652 is 1 megohm, resistance 2645 is 1 megohm, and resistance 2644 is 220,000 ohms. The cathode of tube 2650 is coupled to the control grid of tube 2660 through resistances 2662, 2663, the right switch 2665, the left switch 2666 and resistance 2667.

It is noted that the junction point of resistances 2662 and 2663 is connected to a terminal of switch 2500, 2501; and that the control grid of tube 2646 is also connected to a terminal of the same switch, each of the aforementioned terminals being interconnected when such switch 2500, 2501 is in its manual position. This is for the general purpose of assuring reliability and continuity of operation when the switch 2500, 2501 is moved from its manual position to its automatic position, i.e., it establishes the operating point of the integrator stage 2642 at the beginning of the transition period.

The "right" switch 2665 comprises a single pole double throw switch with a stationary contact connected through resistance 2670 to a minus 150 volt source. Likewise, the "left" switch 2666 comprises a single pole double throw switch with a stationary contact thereof connected through resistance 2672 to a plus 150 volt source. The right and left switches 2665 and 2666 may thus be operated from their positions shown in Figure 31 to cause either a right or left deflection of the artificial aircraft.

Tube 2660 has its anode connected through resistance 2665 to a plus 300 volt source and has its cathode connected to an adjustable tap on the "cross-wind" resistance 2566 and one terminal of resistance 2566 being grounded and the other terminal of such resistance being connected through resistances 2565 and 2564 to the cathode of tube 2559. An integrator condenser 2677 is connected between the cathode of tube 2559 and the control grid of tube 2660.

Resistance 2675 is 1 megohm, condenser 2677 is 2 microfarads, resistance 2564 is 68,000 ohms, resistance 2565 is 22,000 ohms, and resistance 2566 is 2,500 ohms.

The control grid of tube 2660 is connected to one terminal of the switch 2500, 2501 so that such control grid is grounded in the manual position, such switch 2500, 2501 establishing a definite beginning point of integration when the switch 2500, 2501 is moved from its manual position to its automatic position.

Thus, while the input to the integrator stage 2561 constitutes a heading or orientation voltage, the voltage developed on the cathode of tube 2561 is representative of azimuth position and is applied through the aforementioned single pole double throw relay switch 2570 to the angle gate generating circuitry described in detail hereinabove.

The elevation control voltage applied to the aforementioned lead 48 is applied through resistance 2680 to the control grid of the inverter tube 2681, which has its anode connected through resistance 2682 to a plus 300 volt source and its cathode connected to an adjustable tap on resistance 2684, which is termed the inverter zero adjust resistance. The anode of tube 2681 is connected to the control grid of tube 2683 and the cathode of tube 2683 is returned to ground through the serially connected resistances 2685 and 2684. The anode of tube 2683 is connected to a plus 300 volt source so that the tube 2683 serves essentially as a cathode follower.

It is noted that a feedback path exists between the cathode of tube 2683 and the control grid of tube 2681, such feedback path including resistances 2690 and 2691. The cathode of tube 2683 is coupled to the control grid of tube 2695 through resistances 2690, 2696, the up-switch 2697, the down-switch 2698, and resistance 2699. The junction point of resistances 2690 and 2696 is connected to a minus 150 volt source through resistance 2700.

Resistance 2680 is 100,000 ohms, resistance 2691 is 1 megohm, resistance 2690 is 150,000 ohms, resistance 2685 is 100,000 ohms, resistance 2684 is 2,500 ohms, resistance 2682 is 1 megohm, resistance 2700 is 150,000 ohms.

The up-switch 2697 is a single pole double throw switch with a stationary contact thereof connected through resistance 2702 to a minus 150 volt source. Likewise, the down-switch 2688 is a single pole double throw switch with a stationary contact thereof connected through resistance 2704 to a plus 150 volt source. The up-and-down switches 2697, 2698 are used essentially for test purposes for deflecting the plane up or down.

Thus, while a control voltage is applied to the input terminal of the inverter stage 2640 essentially as a continuous voltage varying from plus to negative in value depending upon the intensity of the control signal transmitted to the aircraft, the output of the stage 2640 applied to the control grid of the tube 2695 has a voltage representative of the vertical heading or orientation of the aircraft. By integration of the integrator network 2558, of which tube 2695 forms a component, an elevation position voltage is developed on the anode of tube 2557, such elevation position voltage being representative of the position in elevation of the aircraft.

Tube 2695 has its anode connected through resistance 2705 to a plus 300 volt source and such anode is connected through third circuit contacts of switch 2500, 2501 to the control grid of tube 2557. The cathode of tube 2695 is connected to an adjustable tap on the "trim tab" resistance 2565 which has one of its terminals grounded and the other one of its terminals connected through resistances 2564 and 2563 to the cathode of tube 2557. An integrating condenser 2708 is connected between the control grid of tube 2695 and the cathode of tube 2557.

It is noted that the control grid of tube 2695 is connected to a terminal of switch 2500A, such terminal being grounded in the manual position of such switch but being disconnected in the automatic position of such switch.

Thus, in either the manual or the automatic switches 2500, 2501, a voltage continuous in nature is applied to the angle gating circuitry for forming an angle gate of the character illustrated at 2591, such angle gate being used for gating the blocking oscillator stage 2667 at predetermined times, depending upon the magnitude of such substantially continuous voltage.

While such continuous voltage, in manual operation, is obtained from a simple voltage dividing network, such substantially continuous voltage in automatic operation results from an integration process in which azimuth or elevation control voltages, as developed in the computer unit, are supplied to corresponding integrating networks.

In automatic operation during the azimuth function, a control voltage developed in the computer, which is a "turn" voltage equivalent to the error plus rate of error of the aircraft from the ideal course line, is integrated in the first integrator stage 2642 to obtain a voltage representative of the instantaneous heading or orientation of the aircraft in the horizontal or azimuthal plane. Such heading voltage is integrated in the second integrator stage 2561 to produce a voltage representative of the position of the aircraft in such azimuthal plane. Such voltage representing the azimuthal plane is used to develop a gating voltage of the character illustrated at 2591, for purposes of intensifying the cathode ray beam at that instant which corresponds to the position of the aircraft.

Likewise, in automatic operation, during the elevation function, a control voltage representing pure error only is applied to the elevation control. The elevation control involves an inverter for inverting the control signals before applying the same to a single integrator stage.

It is noted that the two integrators involved in the azimuth function and the single integrator involved in the elevation function may be adjusted so that, with a zero input voltage applied to the same, the output voltage is constant; and with a positive input voltage, the output of the integrator decreases uniformly although such positive input voltage is a constant non-varying voltage; and, similarly, when the input voltage is a negative constant voltage, the output of the integrator increases uniformly. The effect of a positive and negative input voltage may be produced by adjustment of the tap on potentiometer resistance 2648 (aileron neutralization), the tap on resistance 2566 (cross wind), and the tap on resistance 2565 (trim tab). The taps on either one of these three potentiometer resistances may be adjusted to provide a zero input voltage or a positive or a negative input voltage so that the aileron neutralization may be either to the right or to the left, the cross wind may be either from the right or from the left, the trim tab adjustment may be either up or down, and the adjustment of the tap on potentiometer resistance 2510 may serve to simulate either a head wind or a tail wind.

*The AGCA coder unit in Figures 37 and 38 and means therein useful in producing the type of modulation illustrated in Figure 40.*

Figure 40 illustrates the manner in which one of the subcarriers illustrated in Figure 39 is modulated to convey certain information from the ground based radar equipment to the aircraft. Means useful in effecting such modulation are illustrated in Figures 37 and 38, such figures now being described in detail. In general, the circuitry illustrated in Figures 37 and 38 includes three negative feedback amplifiers the output of which serves to modulate the particular AGCA subcarrier being used. These three feedback loops include: (1) the azimuth control circuitry, which supplies a phase shifted FM signal for the frequency modulation of the subcarrier; (2) the elevation control circuit, which provides symmetry variation of a square wave for amplitude modulation of the subcarrier; and (3) the range control circuitry, which provides the variation of the frequency of the square wave for purposes of amplitude modulation of the subcarrier.

In addition to these three negative feedback amplifiers, the coder unit circuitry illustrated in Figures 37 and 38 also provides for the modulation of transmitted control signals for the operational functions of "control," "warning," "channel select" and "voice key." In general, these four functions are provided in the following manner: (1) "control" information is imparted by frequency modulation of the subcarrier oscillator to such a degree as to cause a deviation of 90°; (2) "warning" information is imparted by frequency modulation of the subcarrier oscillator to such a degree as to cause a deviation of 180°; (3) "channel select" information is obtained, using a square wave, in such a manner as to impart a 70% amplitude modulation of the output of the subcarrier oscillator; (4) "voice key" information is obtained, using a square wave, in such a manner as to impart a 30% amplitude modulation of the output of the subcarrier oscillator. During the period of "ground control" but in the absence of a "voice key" signal, the output of the subcarrier oscillator is 47% modulated by a square wave.

The circuitry for the above purposes includes a subcarrier oscillator. This subcarrier oscillator includes tubes 3000, 3001, 3002 and 3003. The frequency of oscillation is controlled by capacitors 3005, 3006 and such frequency is adjusted to be, for example, 8 kc. The frequency of oscillations may be adjusted to different values to correspond to different subcarriers illustrated in Figure 39. The output of the subcarrier oscillator appearing at the junction points of resistances 3007, 3008 is applied to the control grid of tube 3009 for modulation purposes.

It is observed that the circuitry of the subcarrier oscillator is somewhat unique in that it includes paths for both regenerative and degenerative feedback. The regenerative feedback path which provides the return of a signal in phase of the input signal extends from the anode of tube 3003, through condenser 3010 and resistance 3011, to the control grid of tube 3000. A second feedback path, for the return of a signal approximately 180° out of phase with the input signal, i.e., a degenerative signal, extends from the cathode of tube 3003, through resistance 3012 and condenser 3013, to the control grid of tube 3000. An RC network including resistances 3014 and 3012 and condensers 3005 and 3006 is in this degenerative feedback circuit and constitutes a very high impedance at the desired frequency of oscillation and a low impedance to all other frequencies.

Frequency modulation of the oscillator circuitry described is provided by the application of a signal to the control grid of modulator tube 3015 which causes a variation of that output impedance appearing in parallel or shunt with resistance 3014. The appearance of a signal across this resistance 3014 causes a change in the transmission characteristics of the regenerative feedback circuit, shifting the rejection frequency. The frequency of the subcarrier oscillator is changed in accordance with the phase shifted 30 cycle signal from the azimuth control loop which is described hereinafter.

For effecting frequency modulation of the subcarrier so as to provide information with respect to the azimuth position of the aircraft, the azimuth control voltage developed in the computer unit as described hereinabove is applied to the lead or terminal 50. This azimuth control voltage is unidirectional in character, becoming either positive or negative or even zero, depending on the position of the aircraft with respect to the predetermined glidepath. The azimuth control voltage thus appearing on terminal 50 is applied through resistance 3016 to the control grid of tube 3017. It is observed that a second input voltage is applied to the control grid of tube 3017 through resistance 3018 which comprises a part of a negative feedback loop, used for stabilization purposes. The voltage developed on the anode of tube 3017 is applied through adjustable resistances 3019 and 3020 to the control grid of tube 3021. The voltage applied to the control grid of tube 3021 is adjusted by adjustment of resistance 3019 to establish the loop voltage level. Thus control voltage is further amplified by the D.C. amplifier tubes or stages 3021 and 3022. The cathode follower tube 3023 provides coupling of the amplified control voltage to the control grid of the delay multivibrator which includes the tubes 3025 and 3026.

This multivibrator is triggered by a differentiated voltage derived from the output of the zero phase 30 cycle squaring amplifier stage 3024. This tube or stage 3024 serves to amplify the 30 cycle signal of zero phase which is applied to the control grid of tube 3024 through condenser 3028. This condenser 3028 has one of its terminals connected to terminal or lead 121. This 30 cycle signal of zero phase is developed in the transmitter mixer unit which is described hereinafter. The voltage developed on the anode of tube 3024 is differentiated by condensers 3029 and 3030 and resistances 3031, 3032 and 3033. The positive going pulse thus developed on the control grid of tube 3025 triggers or initiates operation of such multivibrator stage. The voltage developed on the anode of the multivibrator tube 3026 is applied through condensers 3034 and 3035 to the control grid of the second multivibrator stage which includes the tubes 3037 and 3038. This voltage thus applied to the control grid of tube 3036 triggers the multivibrator stage 3038, 3038; and the output of such stage 3036, 3038 developed on the anode of tube 3037 comprises a square wave, shifting in phase in an amount dependent upon the output wave developed on the anode of tube 3026. During the operating functions of "search," "track" and "wave off" this multivibrator stage 3036, 3038 is rendered operative by a +28 volt disabling potential which is applied at the junction of resistance 3040 and condenser 3041. This disabling potential is applied through switches associated with the confirm or control relay K4 and track relay K3. During other operational functions, the output of the multivibrator stage 3036, 3038 is applied to the LC circuit consisting of inductance 3042 and condenser 3043 and a voltage of the character illustrated at 3044 appears on lead 3045. This signal is a 30 cycle sine wave, with a phase determined by the azimuth control voltage. The voltage thus developed on the lead 3045 constitutes the output of the azimuth conrol loop and such voltage or signal is applied to the control grid of the 30 cycle FM modulator tube 3015 through a path which includes an adjustable tap on the "warning" device potentiometer resistance 3046 and a normally closed switch of the warning relay K6.

As mentioned previously, the azimuth control circuitry incorporates a feedback circuit. This feedback circuit inclures a two-stage amplifier circuit which includes the tubes 3047 and 3048. It is observed that the control grid of tube 3047 is connected to the lead 3045. The voltage developed on the anode of tube 3048 is applied through transformer 3049 to the phase detecting diode 3050. A 30 cycle signal lagging the aforementioned 30 cycle zero phase signal by 90° is also developed in the transmitter mixer unit described hereinafter and such 30 cycle signal with a 90° lag, hereinafter referred to as a 30 cycle 90° signal, is applied to the terminal of lead 121A, which terminal or lead is connected to the control grid of tube 3051 through condenser 3052 and resistance 3053 for amplification by such tube 3051. The voltage developed on the anode of tube 3051 is applied through transformer 3054 to the phase detecting diode 3055. Thus, there are applied to the phase detecting network 3050, 3055 two signals, i.e., (1) an output signal from the azimuth control loop which comprises a 30 cycle signal at a phase angle of zero degrees plus or minus the phase shift in the azimuth control circuitry caused by the application of azimuth control voltage to the delay multivibrator stage 3025, 3026; and (2) the aforementioned amplified signal of 30 cycles having a phase shift of 90°. The phase of these two signals is compared, using the two diodes 3050, 3055, and a voltage is developed which represents the phase shift in the azimuth control loop. This voltage, appearing at the junction point of resistances 3061, 3062, is applied to a filter network comprising resistance 3056 and condensers 3057, 3058. This filter network provides a low impedance to D.C. voltages and a very high impedance to alternating current voltages. The potentiometer resistance 3059, which has one of its terminals connected to the cathode of the cathode follower tube 3060, serves as an adjustment of the zero setting of the feedback loop.

By the means described above, it is clear that a 30 cycle frequency modulated subcarrier is developed on the anode of tube 3009, such 30 cycle signal being modulated in frequency in a degree dependent upon the azimuth control voltage. The voltage appearing on the anode of tube 3009 is applied through condenser 3063 to the control grid of the cathode follower tube 3064 so that a signal of the character represented at 3065 is developed on the cathode of tube 3064.

This aforementioned 30 cycle frequency modulated wave is amplitude modulated, using a square wave which is generated in the range control circuitry, described presently. The range control circuitry comprises a negative feedback loop wherein a square wave is generated and controlled in frequency by the applied range voltage. The range control voltage varies between zero and 5 volts, representing a range of from zero to 10 miles from touchdown of the controlled aircraft. In general, the output of the square wave generator is counted, the result integrated, and applied as a negative feedback voltage to the loop input circuit for stabilization purposes.

The range voltage, generated in the tracking unit, as described hereinabove, and representative of the range of the aircraft, is applied to the input terminal or lead 78 which is connected to the control grid of tube 3066 through resistances 3067 and 3068. A second input voltage is applied to the control grid of tube 3066 through resistance 3070 which is in a feedback loop extending from the frequency counter and integrator circuitry described hereinafter. The output of the amplifier 3066, and therefore the loop voltage level, is adjusted by adjusting the tap on the "range zero" resistance 3071. The voltage developed on the anode of tube 3066, as identified by resistance 3071, is amplified in the two-stage amplifier circuit which includes the tubes 3073 and 3074. The voltage developed on the anode of tube 3074 is applied as a frequency control voltage to a neon tube relaxation oscillator stage which includes the neon tube 3075. The output of this stage varies from 60 cycles per second, corresponding to a distance of zero miles, to 35 cycles per second, corresponding to a distance of 10 miles. The cathode follower tube 3076 serves to couple the output of such variable frequency relaxation oscillator to the input of the symmetry modulator tube 3077. Specifically, the cathode of tube 3076 is connected to the control grid of tube 3077 via condenser 3078 and resistance 3079. The voltage developed on the anode of tube 3077 is indicated at 3080 and is applied to the control grid of tube 3081. The tubes 3081 and 3083 comprise a two-stage squaring amplifier wherein distortion of the sawtooth wave shape occurs. A wave, of the shape indicated at 3084, is developed on the anode of tube 3083. The negative limiter 3085 establishes a reference point in the output circuit of tube 3083. Positive limiting is accomplished by tube 3086, while a lower limit is established by the diode 3087. The voltage applied to tube 3087 is a positive potential, applied over lead 3088 and selected by the channel sequencing relays. The magnitude of such positive potential is determined by adjustment of the tap on the voice adjustment resistance 3089, by adjustment of the tap on resistance 3090 which is the "channel selector adjust" resistance, and by adjustment of the tap on resistance 3091 which is the "control adjust" resistance. The voltages appearing on the taps of resistances 3089, 3090 and 3091 are individually selected depending upon the energized condition of the channel sequencing relays, described hereinafter.

Elevation control voltage appearing on the lead 48 is applied to the control grid of the amplifier tube 3100. The voltage developed on the anode of tube 3100 is applied through the adjustable resistance 3101 to the control grid of the elevation control amplifier tube 3103. The resistance 3101 provides a symmetry adjustment. The voltage appearing on the anode of tube 3103 is amplified by tube 3104 and the amplified output is applied to the control grid of the symmetry modulator tube 3105. The resistance 3101 serves generally as a level control and its adjustment determines the sensitivity of a loop. The tube 3105 is a cathode follower and serves to develop a voltage across the resistance 3106 which has one of its terminals grounded and the other one of its terminals connected to the cathodes of tubes 3105 and 3077. Symmetry modulation is accomplished as a result of the variation of the space current flowing through the cathode follower tube 3105 and therefore the bias voltage applied to the symmetry modulator tube 3077. The voltage developed on the anode of tube 3077 is as indicated at 3080 and consists generally of the variable frequency output of the relaxation oscillator, symmetry modulated as a function of the elevation control voltage. Following subsequent amplification by tube 3081 and tube 3083, and coupling through tube 3107, the variable symmetry signal appearing on lead 3109 is detected by a symmetry detector comprising crystal rectifiers 3110 and 3111. The detected output is stored in condenser 3114 and applied to the control grid of the cathode follower tube 3115. A portion of this negative loop output voltage is fed back to the control grid of tube 3100 for loop stabilization purposes.

It is noted that the output of the combined elevation control circuitry and the range information circuitry which is applied to the control grid of cathode follower tube 3107 is limited to a positive value of 23 volts by the crystal rectifier 3116 and is applied to the cathode follower 3107. The square wave is differentiated and the signals applied by diode 3117 to the frequency counter tube 3118. The output of the frequency counter 3118, derived from the screen grid of such tube, is integrated by resistance 3119 and condenser 3120, and the integrated value is applied to the control grid of the cathode follower tube 3122. The output voltage appearing on the tap of resistance 3124 is applied to the input network at the loop of the control grid of amplifier tube 3066, thus completing the feedback circuit.

It is observed that the portion of the amplitude of the 30 cycle phase shifted signal applied to frequency modulator tube 3015 is controlled by selection of the voltage appearing on the taps of either potentiometer resistance 3046 or 3125. The resistance 3046 serves as a warning deviation control, while the resistance 3125 serves as a control deviation. The taps on these resistances are selected by relays in the sequencing system described hereinafter. The tap on resistance 3125 is adjusted so as to produce a deviation of 90 cycles, while the tap on resistance 3046 is adjusted to produce a deviation of 180 cycles.

The frequency and amplitude modulated output developed on the cathode of tube 3064 is applied to the subcarrier filter 3126, which is tuned for band bias characteristics at the subcarrier frequency. This LC circuit 3126 allows side band addition, in that the output consists of a symmetrical modulation, the "lower half" being supplied by the characteristics of such LC circuit 3126. The output of the subcarrier filter 3126 appears as indicated at 3128 and is applied to the control grid of the amplifier tube 3129. The amplified voltage appearing on the anode of tube 3129 is applied to the control grid of the cathode follower tube 3130 which has its cathode connected to the output lead 3131. Such lead 3131 is coupled to the transmitter mixer stage described hereinafter for purposes of modulating the carrier which is transmitted to the aircraft. It is thus observed, that the variable frequency, variable symmetry square wave which comprises the output of the combined range and elevation control circuits, respectively, is applied to the control grid of the cathode follower tube 3135. As mentioned previously, negative limiting is accomplished at this point by the negative limiter diode 3087 in three degrees for accomplished amplitude variations corresponding to "channel select control" and "voice key." The voltage developed on the cathode of tube 3135 is applied to the isolation diode 3137 and its output is mixed with the frequency modulated subcarrier at the control grid of the amplitude modulating tube 3064. The output appearing at the cathode of tube 3064 is therefore a function of the addition of the frequency modulated subcarrier and the variable frequency, variable symmetry square wave of three selectable amplitudes. It is observed that the so-called "calibrate" switch 3140 allows the zero adjustment of each one of the negative feed-back amplifiers discussed above, by comparison of output signals with known input signals. The following functions are effective: (1) when set to its normal position as shown, the calibrate switch 3140 provides the functions of normal operation of the coder unit described above; (2) when switch 3140 is set to the first "calibrate" position, the following functions are accomplished, namely, the input to the meter driving stage 3115 is grounded, and the circuit is adjusted for a zero meter reading by adjustment of the tap on the so-called "elevation zero" adjust resistance 3142; and, simultaneously, the azimuth control voltage is grounded and the circuitry is adjusted for a zero meter reading by adjustment of the tap on the so-called "azimuth zero" resistance 3059; (3) when the switch 3140 is set to the second "calibrate" position, the following functions are accomplished, namely, the input to the azimuth control (phase shift) loop is grounded, and the cross pointer meter is connected to the output of the phase shift detector circuitry. The phase shift within the loop is adjusted by the adjustment on the tap of the potentiometer resistance 3091. Also, the input to the elevation control (symmetry change) loop is grounded and the cross pointer meter is connected to the output of the symmetry detector circuitry. The symmetry change within the loop is adjusted to a zero value by adjustment of the tap on the elevation level control resistance 3101; (4) when the switch 3140 is set to its third "calibrate" position, the following functions are accomplished, namely, both the azimuth and elevation cross pointer needles are connected to the output of the frequency counter while a 60 cycle sine wave is injected at the input. Since a frequency of 60 cycles is used to indicate a zero range, the counter circuitry may be adjusted for a zero output with the known frequency input by adjustment of the tap on the "range zero" resistance 3124; and (5) when the "calibrate" switch 3140 is set to its fourth "calibrate" position, the following functions are accomplished, namely, the input to the range control (variable frequency of the square wave) is connected to ground. With the cross pointer needles connected to the output of the frequency counter, the level of the range control loop may be adjusted to a zero reference value by adjustment of the tap on the range level resistance 3071.

*Description of transmitter mixer unit illustrated in connection with Figures 49 and 50*

In general, the circuitry of the AGCA transmitter mixer accomplishes three functions, namely, (1) provides a "confirmation tone" for operating a control relay in accordance with signals received from the aircraft; (2) provides 30 cycle oscillations and phase shifting circuitry for such oscillations, and (3) provides circuitry for the simultaneous mixing of the AGCA subcarriers, the AGCA voice signals, and the AGCA 30 cycle reference signal.

In general, the 4500 cycle "confirmation tone" derived from the output of the BC 639A receiver, designated as such in Figure 7, is applied to the input circuit of the AGCA mixer, where it is amplified and rectified to control the confirmation relay. Operation of the confirmation relay results in application of a +28 volt confirmation signal to a common bus of the AGCA equipment.

As indicated above, the AGCA transmitter mixer also includes a 30 cycle reference oscillation and relay phase shifting circuitry. The output of the 30 cycle oscillation is applied directly to the AGCA coder, as described above. The same 30 cycle signal, shifted in phase 90°, is also applied to the AGCA coder, as also described above.

Further, as also indicated, audio originating at the AGCA microphone is resistively mixed with the subcarriers for the different channels and the 30 cycle zero phase reference signal originating in the transmitter mixer unit. The output of the transmitter mixer is applied directly to the BC 640A modulator.

More specifically, the 4500 cycle "confirmation tone" received by the BC 639A receiver from the airborne transmitter is applied to the lead 3150 which is connected to the input transformer 3151, a secondary winding of which is coupled between the control grid and cathode of the amplifying tube 3152. A filter network 3153 consisting of inductances 3154 and condensers 3155 is used for this purpose. This filter circuit has band bias characteristics in the region of 4500 cycles. Peak limiting is provided by rectifiers 3155 and 3156. The audio tone is amplified by tube 3152 and tube 3158. The inductance 3159 and condensers 3160, 3161 and 3162 constitute a peaking circuit for feedback of the 4500 cycle signal. The amount of 4500 cycle signal fed back is controlled by adjustment of the tap on resistance 3165 which is termed a "confirmation tone gain" control. The output of cathode follower tube 3164 is applied to the control grid of tube 3166, a cathode follower, and is amplified by tube 3168. Limiting is accomplished by crystal rectifier 3170, and a positive D.C. potential is applied to the control grid of tube 3171. Application of a 4500 cycle tone to the primary winding of transformer 3151 thus causes a positive D.C. voltage to be applied to the control grid of tube 3171, causing it to conduct and to energize the relay winding 3172. Actuation of this relay 3172 causes a +28 volt "control on" signal to be applied to the "control on" common bus 120. As indicated above, the transmitter unit includes a 30 cycle oscillator and shunt phase shifting circuitry. For this purpose, a 30 cycle reference signal is generated by oscillator circuitry which includes tubes 3173, 3174 and 3175. The tube 3176 serves to stabilize the suppressor grid voltage of tube 3173. The 30 cycle zero phase reference signal generated by tube 3173 is applied to the control grid of tube 3174, where it is amplified, and a variable amount controlled by the positioning of the tap on potentiometer resistance 3177, the so-called "30 cycle zero level" resistance, is applied to the control grid of the cathode follower tube 3179. The ouput of tube 3179 is resistively mixed, and applied to the control grid of tube 3180. A second output developed on the cathode of tube 3174 passes through a 90° phase shifting circuit and is applied to the control grid of tube 3175. The output of tube 3175 is applied to the control grid of amplifier tube 3181 through the potentiometer resistance 3182 which is termed the "30 cycle 90° level" resistance. Amplification is accomplished by tube 3181 and the output, derived from the anode from such tube is applied over lead 121A to the coder unit, as described above.

Also, the 90° phase shifted 30 cycle reference signal is returned from the cathode of tube 3175 through a phase shifting network to the control grid of tube 3173. The frequency of the oscillating network is determined by the adjustment of the tap on potentiometer resistances 3177 and 3183, such taps being ganged for unicontrol. The 30 cycle zero reference signal is developed on lead 121 which is connected to the cathode of the cathode follower tube 3184, the control grid of which is connected through the tap on resistance 3185 to the anode of tube 3174. The transmitter mixer unit, as indicated above, serves to resistively mix four separate signals and to apply the same to the control grid of the mixer amplifier tube 3180. These four signals are: (1) the subcarrier of Control Channel No. 1, (2) the subcarrier of Control Channel No. 2 which originates in the coder of Channel No. 2, (3) the 30 cycle reference signal, and (4) the AGCA microphone audio signal. For this purpose, a subcarrier originating in the coder of Control Channel No. 1 is applied over lead 3190 which is connected to an outside terminal of the potentiometer resistance 3191, i.e., the so-called "subcarrier No. 1 level" control. The tap on this resistance 3191 is connected to the control grid of the cathode follower tube 3192. The voltage thus developed on the cathode of tube 3192 is applied to the common mixing bus 3194 which is capacitively coupled to the control of tube 3180.

The subcarrier originating in the coder of Control Channel No. 2 is applied to the lead 3195 which is connected to the potentiometer resistance 3196 serving to control the level of the signal applied to the cathode follower tube 3197. The voltage developed in the cathode of the follower tube 3197 is applied to the common bus 3194.

The 30 cycle reference tone, i.e., the 30 cycle signal of 0° phase is applied to the potentiometer resistance 3198, the adjustable tap of which is connected to the control grid of tube 3197 for adjusting the level of such reference tone. The cathode of tube 3197 is connected to the common mixing bus 3194.

The audible signals developed by the microphone 3199 are applied through the adjustable tap on potentiometer resistance 3200 to the control grid of the amplifying tube 3201. The output of tube 3201 is amplified by tube 3202 and applied to the voice filter 3203. The output of this voice filter 3203 is controlled in level by adjustment of the tap on resistance 3204 and applied to the control grid of the cathode follower tube 3205 which has its cathode connected to the common mixing bus 3194.

The composite signal on the control grid of tube 3180 therefore consists of the four signals mentioned above, and such four signals are amplified by tube 3180 and applied through the tap of the potentiometer resistance 3207 to the control grid of tube 3208, the cathode of which is connected to the lead 3210 for purposes of applying these four mixed signals to the BC 640A modulator 3211, as indicated in Figure 7. The modulator 3211 is conventional as well as the transmitter 3212, and a detailed discussion of the same is considered unnecessary herein.

*Channel sequencing operation illustrated in connection with Figures 37 and 53*

As indicated previously, a plurality of channels are used in controlling the flight of a corresponding aircraft. Means are provided for preventing two channels from controlling the same aircraft and further the channels are controlled in a sequential manner.

Briefly, upon initial energization of the AGCA equipment, Channel No. 1 automatically goes into a search condition awaiting the incidence of an aircraft radar echo within the grid path approach area. The incidence of such an echo causes the equipment to change from a search condition to a track condition and also institutes a ground-air data transmission link. While tracking the aircraft, the AGCA system displays the incidence range and the speed of the aircraft being tracked in the particular channel, and transmits signals of interrogation to the aircraft. Confirmation of the ground-air data transmission link by the incoming aircraft causes the equipment to change from a track to a control function. Upon switching to the control function, correction signals are sent to the aircraft by Control Channel No. 1, and Control Channel No. 2 automatically is switched from a stand-by condition to a search condition.

In general, the seven functions, namely (1) by-pass, (2) stand-by, (3) search, (4) track, (5) control, (6) control with warning, and (7) wave-off, are controlled by a set of nine relays, located on the chassis of the AGCA coder and channel sequencing unit. For purposes of simplification, two control channels are illustrated although it is obvious that more than two control channels may be employed in the techniques described herein. The two control channels are operated in a revolving sequence, whereby Channel No. 2 remains in a stand-by condition until Channel No. 1 has gone into its control condition. The actuating voltage for channel sequencing is a +28 volt potential originating in the overtake warning and wave-off unit, as illustrated in connection with Figure 55, and alternately passed through relay contacts as operational functions are added to the system.

In the by-pass condition, a channel is taken completely out of service in the automatic sequence group, and signals normally applied to such channel are by-passed through relay K–104 or K–204 to the other channel. During the condition of by-pass, achieved by setting the by-pass-operate switch S–1001 on the front panel of the coder unit to "by-pass," the following conditions are effective:

(a) The loop actuating voltage of 28 volts on both loops 1 and 2 in Figure 55 are by-passed through the channel by means of interlock relay K–104 or K–204, as the case may be;

(b) The artificial aircraft signal is routed in and out of the coder unit by means of contacts on the aforementioned switch S–1001;

(c) A 28 volt sub-carrier bias voltage is applied through coder relay K–1;

(d) A 30 cycle FM bias is applied through parallel contacts of relays K–3 and K–4;

(e) The red "by-pass" lamp is energized indicating an "on" condition; and (f) All channel sequencing relays are de-energized.

During the stand-by condition, i.e., upon interruption of the 28 volt supply voltage applied to terminal No. 10 of TB–1001 in Figure 37, the sequencing relays are ready to receive the +28 volt loop actuating voltage to initiate the search function. The following conditions are effective:

(a) Loop 1 is closed through relays K–1, K–3 and K–4 in parallel;

(b) Loop 2 is also closed through K–1 and K–2, returning to ground;

(c) A 30 cycle FM bias and sub-carrier bias are applied;

(d) Video is switched out at jack 1102 via relays K–1 and K–3; and (e) All relays are de-energized and a voltage is applied only to terminal No. 5 of TB–1001 for energizing the standby lamp to indicate the stand-by condition.

A channel can go into the search condition only after the other channel is in either a control or stand-by condition. Channel No. 1 goes into search condition automatically upon initial energization of the equipment, i.e., upon operating the stand-by switch to its "on" position with the by-pass-operate switch in its "operate" position. In such case, Channel No. 2 then immediately goes into a search condition and, during such search condition, the following conditions are effective:

(a) Relay K–1 is actuated;

(b) Video is switched through contacts 2 and 3 of relay K–1 and is available in jack J–1002;

(c) A 28 volt potential is made available through contacts 5 and 6 of relay K–1 to the tracking unit, intensifying the index marks;

(d) Loop 1 is opened at contacts 8 and 10 of relay K–1 preventing other channels from receiving the +28 volt search signals while this particular relay is energized;

(e) A 28 volt holding voltage maintains relay K–1 in energized condition through its contacts 13 and 14;

(f) A +28 volt signal is applied to the coil of the 1 minute delay relay K–8 through contact 16 and the frame of relay K–1. This prevents a momentary "no confirm warning" from occurring when the channel goes into its track condition;

(g) The sub-carrier bias and 30 cycle FM bias is still applied; and (h) The white "search" light is on indicating the search condition.

In the track condition, the tracking unit receives radar video and provides range and speed information concerning the tracked aircraft. At the same time, the channel automatically transmits signals of interrogation to the aircraft and prepares for a "no confirm warning" for the information of the ground operator. During the track condition, relays K–2 and K–3 are energized; relay K-8 is held up for a period of one minute and relay K-7 initiates a 25 second "on" 2 second "off" alternate function. The track function of the channel is initiated by the tracking "on" +28 volt signal from the tracking unit, energizing relay K-3. The following functions are then effective:

(a) Relay K-1 is no longer energized;

(b) Relay K-2 is energized through contacts of relay K-3;

(c) Sub-carrier bias is alternately turned on and off through relay K-7;

(d) "Channel select" 70 percent square wave modulation is applied through contacts 4 and 6 of relay K-4;

(e) The 30 cycle FM bias is still applied through contacts 1 and 3 of relay K-4;

(f) Video is applied to jack J-1002 through relay K-3;

(g) The channel sequencing loop 1 remains open but loop 2 is closed through contacts 13 and 14 of relay K-2;

(h) Coils of relays K-4 and K-5 are grounded through contact 16 and the frame of relay K-2, preparatory to the confirm signal and AGCA voice modulation. If, after one minute, a confirmation signal is not received, relay K-8 is de-energized, initiating the "no confirm warning" at the Communications and Control Unit (Figure 41). A resetting of the "no confirm" receipt switch energizes relay K-4. If a "confirm" signal is received, relay K-4 is energized and is maintained in energized condition through its contacts 13 and 14; and (i) The blue "track" light is energized indicating the track condition.

During periods of control condition, the aircraft accepted into the AGCA system may be guided by "control" signal originating in the controlling channel. During such control function or condition, relays K-2, K-3 and K-4 are energized and the following conditions are effective:

(a) A 28 volt "control on" signal is applied to the computer and tracking unit through relay K-4;

(b) A 30 cycle FM signal is added to the sub-carrier;

(c) A 50 percent square wave modulation is applied to the sub-carrier through contacts 5 and 6 of relay K-4;

(d) Cross-pointer meter flags disappear on the initiation of this function;

(e) Relay K-8 serving to introduce a one minute delay is energized through relays K-1 and K-4, preparatory to maintaining a "wave-off voice key" condition;

(f) Loop 1 is closed through relays K-1 and K-4, initiating a search condition in the next channel.

(g) "Voice on" may be modulated at the control panel of the Communications and Control Unit (Figure 41) by the use of switch S-7503 and the microphone relay switch energizing relay K-5. The 30 percent square wave modulation through contacts 2 and 3 of relay K-5, and contacts 5 and 6 of relay K-4 make "AGCA voice" available in the controlled aircraft; and (h) The green "control" light is on, indicating the control condition.

The warning condition is initiated by a 28 volt signal on the warning bus, originating in the overtake warning and wave-off unit. In such case, the following functions are effective:

(a) Relay K-6 is closed, causing a deviation of 90 cycles in the sub-carrier FM modulation, energizing the amber "warning" light, and applying a +28 volt potential to relay K-9.

(b) At the time of the +28 volt warning signal, relay K-9 is momentarily energized, applying +28 volts to the warning bus and energizing the "warning" buzzer in the Communications and Control Unit (Figure 41). The reset switch S-7507 serves to energize relay K-7502, turning the buzzer "off" and leaving the "warning" lamp on. Thereafter, if the overtake condition ceases, relay K-6 is deenergized and the "warning" lights are deenergized.

(c) All other conditions operative during the control condition mentioned above continue to exist.

During the "wave-off" condition, which may be caused by excessive overtake, excessive error by the controlled aircraft reaching touch-down, or by manual operation, the "wave-off" condition results in cessation of aircraft control and the transmission of a "wave-off" signal. In such case, the following conditions are effective:

(a) Relay K-3 is de-energized, interrupting video at contacts 5 and 6 and removing the "tracking" signal;

(b) A +28 volt bias is applied to the 30 cycle FM modulator;

(c) Loop 1 is closed through relays K-3 and K-4;

(d) The control signal is interrupted at relay K-3;

(e) The 1 minute delay relay K-8 is held on by the stored charge on condenser C-45; a 28 volt holding voltage is applied to relays K-3, K-4 and K-1;

(f) Relay K-2 is held on by the application of 28 volts through relay K-8;

(g) Loop 2 is closed through relay K-2;

(h) Relay K-4 is held on by 28 volts through contacts 13 and 14 and through relay K-2;

(i) "Voice key" modulation bias is available at relay K-6 through contacts 2 and 3;

(j) The red "wave-off" light is energized indicating the wave-off condition;

(k) After the one minute delay, relay K-8 is de-energized releasing all other relays, unless the channel "voice" button on the Communications and Control Unit panel (Figure 41) has been depressed. In such case: (1) "voice key" bias is applied to the coder square wave modulator through contacts 2 and 3 of relay K-5; (2) a +28 volt potential remains on coil relay K-2 through contacts 5 and 6 of relay K-5. Under the conditions expressed in sub-paragraph (k) above, when the "voice" button on the Communications and Control Unit panel (Figure 41) is released, or relay K-8 is de-energized after a normal one minute delay, the following conditions exist: (1) relay K-2 is de-energized to in turn cause the release of relay K-4; (2) the +28 volt sub-carrier bias is applied through contacts 4 and 6 of relay K-2; (3) the "voice key" bias is removed from the square wave modulator and "70 percent" channel select modulation is applied through contacts 4 and 6 of relay K-4 to the modulator stage.

(m) Loop 2 is closed through relay K-2; and (n) Loop 1 is closed through relay K-3.

It is noted that the steps (k) through (n) above result in returning the sequencing operaions to a stand-by condition.

As described above, in connection with the operation of the tracking unit in connection with Figure 13, a tracking on signal is developed and such tracking on signal is used to notify the other components in the control channel that an aircraft has been acquired within the range gate. A tracking on signal causes the +28 volt potential to be available at terminal 11 of terminal board TB-2001 of Channel No. 6. This 28 volt signal is applied to relay K-3 in the channel coder unit, which in turn causes energization of relay K-2 and places relay K-4 in a condition that it may be closed by the "confirmation" signal. The tracking on signal also causes the application of a +28 volt potential on the "tracking on" light, and, by interrupting the voltage on the coil of relay K-1, turns the "search" light out. The +28 volt signal from the tracking unit is also applied to the channel coder unit, where it actuates the "tracking on" relay K-3001, chopper relays K-3002 and K3003, and control relay K-3009. The AGCA confirmation signal, a 4500 cycle tone as mentioned previously, and described now in detail with reference to Figure 54, originates within the air-borne decoder, as described hereinafter, has an automatic acknowledgment by the acceptance of ground control. This tone is used to modulate the air-borne transmitter and the modulated signal is received and de-modulated by the ground-based BC-639A receiver. The 4500 cycle tone is amplified and rectified within the AGCA transmitter mixer and appears at terminal 7 of terminal board TB–402 as the "+28 volt confirmation signal." Audio from the BC–639A receiver including the 4500 cycle tone, is available at terminal 2 of terminal board TB–402. Within the interbay wiring, the "confirm signal" is applied to the self-holding relay K–4 in the coder unit which is readied for the receipt of the "confirm signal" by the closing of "track" relay K–2 at the initiation of the track function.

The closing of relay K–4 causes an extension of the "confirm signal" known as the "control on" signal to appear at terminal 7 of terminal board TB–1002 for application within the bay wiring of the channel tracking unit. Receipt of the +28 volt control on signal at the tracking unit results in the closing of relay K–2009, narrowing the range gate to approximately one-half of its previous width and increasing the time constant of the first integrated stage, as mentioned more specifically in connection with the portion of the tracking unit illustrated in Figure 13. The +28 volt "confirm signal" generated on the transmitter mixer may be replaced by a "manual confirm signal" originating within the Communications and Control Unit (Figure 41). This function is accomplished by closing of the "manual confirm" switch applying a +28 volt signal to the confirm bus which fulfills all the functions of the signal from the transmitter.

As described above, and now more specifically with reference to Figure 55, a "warning signal" informing the ground operator of an "overtake" condition which originates in the overtake warning and wave-off unit, results in the application of a +28 volt D.C. signal upon a common line for the particular channel concerned. This warning signal energizes relay K–6 in the coder unit turning on the amber warning light. Relay K–9 is momentarily energized sounding the warning buzzer by closing relay K–7506. If the overtake condition ceases to exist, the 28 volt signal is removed from the common line and the conditions noted above will cease to exist. During the "overtake" condition, the "warning" buzzer may be reset on the panel of the Communications and Control Unit resulting from the loss of video for a period of approximately five seconds. The existence of any one of these conditions serves to apply a +28 volt signal to the warning and wave-off alarm bus, sounding the "warning" buzzer in the Communications and Control Unit.

It is observed in connection with Figure 57 and as mentioned previously, that the tracking relay holding circuit or bus, i.e., the wave-off ground circuit, is operative during the condition of "wave-off." This bus serves as a return for the coils of relays K–2003 and K–2004 in the tracking unit. The ground return may be opened at any of the points indicated in Figure 57, releasing relays K–2001, K–2003 and K–2004 as shown, and causing the cessation of the +28 volt tracking on signal to the coder unit. Relay K–3 is therefore de-energized interrupting its consequent functions. The relay holding circuit is inoperative until the appearing of a "video on" signal at the grid of tube V–2019 in the tracking unit closes the self-holding relay K–2001. Following actuation, it may be opened by relay K–2007 at the time of normal touchdown wave-off.

*Airborne equipment including decoder with reference to Figs. 51A, 51B, 51C, 52A and 52B*

The function of the airborne Decoder is the translation of sub-carrier control signals to D.-C. voltages of the proper level for application to the auto-pilot approach coupler of the aircraft and approach indicators on the aircraft. The circuitry of the Decoder shown in the above figures may be divided into the following major items:

(1) The local oscillator 4000, search drive motor 4001, and D.-C. servo amplifier 4002 for the selection of AGCA sub-carriers within the R.-F. carrier, and their consequent retention during periods of "Control."
(2) A 30 kc. I.-F. amplifier 4003, for the bandpass amplification of a signal consisting of the difference of the AGCA sub-carrier and the local oscillator signal.
(3) An FM discriminator 4006 and squaring amplifier 4007 for presentation of the transmitted variable-phase, 30-cycle signal to the azimuth phase-shift detection circuitry 4008.
(4) A low-pass filter 4009 and a squaring amplifier 4010, for the reception of the 30-cycle, zero-phase reference signal from the output of the airborne receiver, and its subsequent presentation to the phase-shift detection circuitry 4008.
(5) An FM deviation detector 4012 and control circuitry for the functions of "Control" and "Warning," achieved by the actuation of suitable control relay 4014 and warning relay 4015.
(6) A percentage-of-modulation detector 4020 and suitable control circuitry for the operation of the Channel Selector Relay 4021 and Voice Key relay 4022.
(7) A symmetry detector 4025 for the detection of Elevation information.
(8) A variable frequency multivibrator 4026 and symmetry detector 4027 for the detection of "Range" information.

*Sub-carrier selection in aircraft.*—The output of the airborne receiver 3999 is applied to a sub-carrier filter 4030, having bandpass characteristics at the frequencies of the sub-carriers (5 to 15 kc.), and also constituting a rejection filter at 30 kc. The output of the subcarrier filter 4030 is mixed at the grid of amplifier 4032 with the output from local oscillator 4000.

The oscillator 4000 includes a resonant circuit which is tunable from a range of 35 kc. to 45 kc. The frequency of oscillation of the sub-carrier oscillator is varied by a powdered-iron slug, moved in and out of inductor 4035 by an electro-mechanical action supplied by frequency servo motor 4001.

The output of the sub-carrier filter and the local oscillator signal are mixed and the difference frequency (30 kc.) is applied to the grid of tube 4032 which is the first tube in a five-stage 30-kc. I.-F. amplifier 4003. The selective amplifier includes tube 4032, tube 4040, tube 4041, tube 4042 and tube 4043. Tube 4044 supplies an automatic gain control function. Feedback for oscillator 4000 is afforded through diode section 4045.

The output from the 30-cycle I.-F. amplifier 4003 is taken from amplifier 4043 and applied to a four-stage limiting amplifier 4047, including tubes 4048, 4049, 4050 and 4051. The output of the limiting amplifier 4047 then consists of a 30-kc. signal, frequency-modulated by a 30-cycle signal. The output from the limiting amplifier is applied to an FM discriminator 4006.

The FM discriminator 4006 is tuned for peak response characteristics for frequencies of 30 kc.±250 cycles. The output of the discriminator section tuned to the higher frequency is applied to cathode follower 4055, while the output of the section tuned to the lower frequency is applied to cathode follower 4056. If the frequency of the local oscillator 4000 varies in such a manner as to raise the frequency of the signal applied to the I.-F. amplifier 4003, a potential will be developed at the output of the cathode follower 4055. If the frequency of the local oscillator declines, the nature of the discriminator response curve will cause a rise in the potential at the output of 4056.

*Frequency servo.*—A two-channel D.-C. servo amplifier consisting of tubes 4060, 4061 and 4062 and 4063, 4064 and 4065 supplies rectified input for dual-pentode power amplifier 4067. Error voltages, representing an increase in the local oscillator frequency, are taken from cathode follower 4055, while voltages indicating a decline in oscillator frequency are applied from follower 4056. These error voltages are amplified, rectified, and applied to tube 4067 for controlling the search drive motor 4001.

After a sub-carrier is located by the Decoder, as described hereinafter, the anodes of tube 4067 draw current through the contacts of "Channel Select" relay 4070, and are so connected that errors in oscillator frequency will be corrected by the proper rotation of the frequency servo drive motor 4001, with a consequent change of the variable inductance of 4035.

*Azimuth control.*—The output of the airborne receiver, as mentioned previously, is passed by a 5–15 kc. bandpass filter 4030, mixed with the local oscillator signal from oscillator 4000, and applied to the 30-kc. I.-F. amplifier 4003. The output of the I.-F. amplifier 4003 is applied to the grid of tube 4048, the first tube of a four-stage limiting amplifier 4047. The amplifier 4047 distorts the wave-shape and establishes lower and upper limits. The output of tube 4051 appears as a 30-kc. signal containing the following information:

(1) A 30-cycle, variable phase signal (azimuth control), applied by frequency-modulation.

(2) FM deviation of the 30-kc. signal of either 90 or 180 cycles ("Control" and "Warning" information, respectively).

(3) The difference frequencies of the local oscillator and the sub-carrier (approximately 30 kc.) for application to the frequency servo, as described previously.

The signal at the output of tube 4051 is applied directly to the FM discriminator 4006 for the detection of a change in the local oscillator frequency, and for separation of the 30-cycle phase-shifted signal.

The circuitry of the FM discriminator 4006 is so arranged that the output of cathode follower 4056 is that of a simple slope detector, with the FM signal varying about a chosen center frequency. The output of tube 4056 is applied to a 30-cycle pass filter 4090, and the output of the filter 4090 is applied to amplifier stage 4091, the output of which consists of:

(1) A 30-cycle signal whose variable phase is the azimuth control function, and (2) Whose amplitude imparts "Control" and "Warning" information. This composite signal is applied to both the 30-cycle (variable phase) squaring amplifier 4007, and to amplitude (deviation) detector 4012.

*30-cycle zero phase signal.*—The 30-cycle zero phase signal which is transmitted to all Decoders appears at the output of the airborne receiver 3999, and is applied to a low-pass filter 4009. The output of the 30-cycle filter 4009 is applied to a four-stage squaring amplifier 4010 consisting of tubes 4095, 4096, 4097 and 4098. The output of the squaring amplifier is cathode-coupled to the phase-shift detector 4008 through cathode follower 4099.

*Phase shift detector.*—The two inputs to the phase detector 4008 comprising tubes 4008A and 4008B (the 30-cycle, zero phase signal and the 30-cycle variable-phase signal) are integrated and applied to tubes 4008A and 4008B, respectively. Control signals (negative) requiring a left turn cause a leading phase angle, 30-cycle signal to be generated in the ground-base Coder Unit, which is expressed as a positive voltage with respect to the cathode of tube 4008B at the cathode of tube 4008A. Control signals (positive) requiring a right turn cause a lagging phase angle signal to be generated in the ground-based Coder Unit, which is expressed as a negative voltage (with respect to the cathode potential at tube 4008B) at the cathode of tube 4008A. The cathode of tube 4008B is held at a reference value by the 30-cycle, variable phase signal, and the potential at the cathode of tube 4008B (30-cycle zero-phase plus 30-cycle variable phase) is compared with it, the difference being the azimuth control signal for application to the autopilot approach coupler 4100.

*"Control" and "Warning" actuation.*—An FM deviation is expressed as a change in the amplitude of the signal at the grid of amplifier 4090, and the signal is amplified by that tube and by amplifier 4012 comprising tubes 4012A and 4012B. The anode potentials of tubes 4012A and 4012B are detected and applied to dual-pentode relay control tube 4103 comprising tubes 4103A and 4103B. The bias of tube 4103A is adjusted so that 90-cycle deviation will lower the plate potential of tube 4090A and thereby increase the potential applied to the grid of tube 4103A above a critical value. The relay 4014 will therefore close, initiating the "Control" function. A further increase in the FM deviation to 180 cycles will raise the input signal to tube 4090 still further. The bias of tube 4103B is so adjusted that it will just conduct at this new increased input, closing energizing relay 4015 and providing "Warning" information.

*"Channel Select" and "Voice Key."*—The output from the 30-kc. I.-F. amplifier 4003 is referenced to ground, taken from cathode follower tube 4043, and applied to percentage modulation detector 4020 through peak detector 4110. A second output from tube 4114 is demodulated by crystal rectifiers 4115, 4116 and applied to the modulation peak detectors 4117, 5118 and 4119. The inputs to the percentage of modulation detector 4020 then consist of a reference voltage and the three potentials developed by the functions of 70 percent modulation ("Channel Select"); 47 percent modulation ("Control"); and 30 percent modulation ("Voice Key"), as detailed hereinbefore. The application of 70 percent modulation causes the voltage at the grid of tube 4125A to be positive with respect to the grid of tube 4125B, which raises the bias of amplifier 4125B to a cut-off value. The plate potential of tube 4125B and, therefore, that supplied to the grid of tube 4126B, rises sharply, causing the closing of "Channel Select" relay 4021. Potentiometer resistance 4130, Fig. 52B, however, provides an adjustment by which 47 percent modulation applied to tube 4020B will not actuate relay 4021 and during this "Control" function no relays are actuated by the percentage-of-modulation circuitry. However, if the percentage of modulation falls to 30 percent (application of "Voice Key" signal), the potential at the grid of tube 4125A will drop sharply and therefore the plate current drawn by tube 4126B will increase. This energizes "Voice" relay 4022, which disconnects the aircraft's interphone amplifier from the communication receiver and connects it instead to the output of the voice filter 4135. This voice filter 4135, which constitutes a bandpass for frequencies from 300 to 3000 cycles, is connected directly to the audio output of the airborne receiver. Frequencies in this voice range of the R.-F. carrier are therefore not heard except upon the application of "Voice Key," since no other path is provided for the voice band.

*Elevation control.*—A second output, referenced to ground, is taken from the 30-kc. I.-F amplifier 4003 through cathode follower 4114. The signal, consisting of a variable frequency, variable symmetry, square wave, is demodulated by crystal rectifiers 4115 and 4116, and applied to amplifier 4135. The output of tube 4135 is limited in both positive and negative values, and applied to cathode follower 4136. The output from tube 4136 is limited by limiter 4137 about a positive voltage at the grid of amplifier tube 4138. The output of tube 4138 is applied to cathode follower 4139, and then to a symmetry detector 4025. The input to the symmetry detector 4025 then consists of a square wave of a variable symmetry, and of a frequency varied from 60 to 35 c.p.s. The symmetry of the square wave, a function of the elevation control signal, is detected by the symmetry detector 4025 at the input to cathode follower 4140A. The elevation control signal is taken from the cathodes of tubes 4140A and 4140B and consists of a difference of potential of the two cathodes. That of tube 4140B is held at a reference value by an applied D.-C. control grid voltage, while that of tube 4140A is varied as a function of the symmetry of the square wave. Potentiometer 4142 "Elevation Zero Adjust" provides a zero signal adjustment. During the time that "Control" relay 4150 is energized, an enabling plate potential is applied to the plates of tubes 4140A and 4140B which, in the absence of other input signals, results in the application of a maximum "Fly-Up" signal to the autopilot approach coupler.

*Range control.*—The output of tube 4138 consisting of the variable frequency, variable symmetry square wave, is also applied to the range control circuitry. The output from tube 4138 is differentiated in differentiator network 4160 and applied as a trigger to fire variable frequency-multivibrator 4026. The frequency of the output of 4026 is therefore dependent upon the frequency of square wave which is varied in the ground-based Coder Unit from 35 c.p.s. (ten miles) to 60 c.p.s. (zero miles). The output of tube 4026 is applied through a symmetry detector 4027 at the input to tube 4170. The cathode potential of tube 4170 is compared to that of cathode follower 4171 for range control information. Increasing frequency of the square wave (decreasing range) causes the potential at the cathode of tube 4170 to rise. At a square wave frequency of 60 c.p.s., the potential at the cathodes of the two sections of tubes 4170 and 4171 will be equal, and no voltage drop will appear across them. At a range of ten miles (35 c.p.s.) the cathode of tube 4170 increases in potential (with relation to the cathode of tube 4171) great enough to cause a 200 microampere flow through the range meter 4180, giving a "10 Mile" indication.

*Sequence of decoder operation.*—After the airborne equipment has been energized by local "Search Actuate" switch 4200 (Fig. 52A), the Decoder will begin a normal cycle of activity.

Application of the +28 volt potential by the switch 4200 energizes relay 4202 and starts time delay relay 4204 heating. Relay 4202 is self-holding through relay 4206 and time delay relay 4207, and so remains energized.

Search drive motor 4001 is actuated by a +28 volt potential through relay 4070, and the output of the receiver is searched for a sub-carrier. If a sub-carrier is located (70 percent modulated by the square wave "Channel Select" signal) modulation detector 4020 passes the information to relay control tube 4126A, 4126B through differential amplifier 4125. Relay 4215 closes due to the plate current drawn by tube 4126B, and "Channel Select" relay 4070 is energized by the application of a ground through relay 4215. At this time, the voltage to "Search Actuate" relay 4202 and to the time delay element is removed, and a ground is applied, closing self-holding relay 4150.

Relay 4070, in closing, replaces the +28-volt D.-C. potential on the frequency servo drive motor with the output of the D.-C. servo from power amplifier 4067.

At the interruption of the sub-carrier at the ground equipment, "Channel Select" relays 4215 and 4070 will open (due to cessation of 70 percent modulation) and a ground will be applied to the coil of "Confirmation" relay 4206. Capacitor 4225, which has been charged to a potential of +28 volts, will close relay 4206, applying a +28 volt signal to the "Confirm Tone" oscillator circuitry and closing relay 4226.

Relay 4226 supplies a "Transmitter-On" ground for the airborne transmitter. The period of the closing of relay 4206 (and 4226) is governed by the decay time of the charge on capacitor 4225 and endures a normal period of about two seconds.

Recognition of the "Confirm Tone" by the ground equipment is demonstrated by the addition of a 30-cycle FM component to the sub-carrier with a deviation of approximately 90 cycles. Reception of this signal through the FM discriminator 4006 and the 30-cycle filter 4090 causes FM deviation detector 4012 to notify power amplifier 4103 of the presence of the "Control" signal. Plate current drawn by tube 4103A closes "Red-Green" relay 4252 (Fig. 52B), turning off the red "Wave-Off" light at the airborne control panel and turning on the green "Control" light. Since the amplitude modulation percentage is reduced to 47 percent at the time of "Control," channel select relays 4215 and 4070 remain de-energized, and "Search Actuate" relay 4202 is denergized. "Red-Green" relay 4252, in closing, applies a +28-volt enabling potential to the control circuitry for azimuth, and range through the contacts of energized relay 4150, causing display of control signals on cross-pointer meters, and their application to the autopilot approach coupler.

If a sub-carrier is not located as assumed above, the output of the airborne receiver will continue to be searched by the frequency servo drive motor. The thermal element of relay 4204, however, will continue to heat, and after one minute, the normally open contacts will close. This applies a +28-volt potential to the thermal element of time delay relay 4207. After another time delay period of one minute, the contacts of relay 4207 will open, opening the holding circuit for "Seach Actuate" relay 4201 (and the thermal elements) and returning the airborne Decoder to its original status at the start of the cycle.

*"Warning."*—An increase in the deviation of the 30-cycle FM signal on the sub-carrier will be detected by deviation detector 4012B and applied to the power amplifier 4103B. Plate current drawn by tube 4103B will close "Green-Amber" relay 4253, turning off a green "Control" panel lamp and turning on an amber "Warning" lamp.

*"Wave-Off."*—Interruption of 30-cycle frequency modulation upon the sub-carrier from the ground equipment, for any reason whatsoever, results in a "Wave-Off" condition of the airborne equipment. Cessation of the FM signal is detected by FM deviation detector 4012, causing tube 4103A to cease drawing plate current through "Red-Green" relay 4014, turning on a red "Wave-Off" lamp, and removing the +28-volt enabling potential from the azimuth and range control loops. A maximum "Fly-Up" signal is applied to the autopilot approach coupler, however, since "Control" relay 4150 remains energized.

*Autopilot.*—As described above, azimuth and elevation signals originating at the ground equipment are demodulated by the airborne receiver and are translated by the airborne Decoder for application to the controlled aircraft's autopilot. Coupling from the Decoder to the autopilot is accomplished by the employment of a Flight Path Computer, which supplies two major functions:

(1) The translation of the bipolar D.-C. control signal from the airborne Decoder, as described, to 400-cycle signals of the correct amplitude and phase characteristics for the control of the autopilot.

(2) The modification of these control signals from the Decoder in such a manner that the controlled aircraft will fly a satisfactory course to the runway with only a very limited amount of bracketing.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. In a system of the character described, ground-based apparatus including search means which is normally effective, tracking means which is normally ineffective, control means which is normally ineffective to develop error signals representative of the deviation of the aircraft from a predetermined flight path, means deriving control signals in accordance with said error signals, first ground-based means normally effective for transmitting signals of interrogation to an aircraft, means scanning an approach zone for aircraft to develop a radar echo signal from an aircraft in said approach zone, means automatically operated upon development of said radar echo signal for rendering said search means ineffective and for rendering said tracking means effective, and for rendering said transmitting means effective to transmit interrogation signals to said aircraft, means in said aircraft for receiving said interrogation signals and for transmitting a confirmation signal, land-based means for receiving said confirmation signal and for rendering said control means effective and second land-based means for transmitting said control signals to said aircraft, and means on said aircraft for receiving said control signals and for causing said aircraft to fly along said predetermined flight path.

2. In a system of the character described, a first channel and a second channel each comprising: search means which is normally effective only in said first channel, tracking means which is normally ineffective, control means which is normally ineffective to develop signals representative of the deviation of an aircraft from a predetermined flight path, means normally ineffective for transmitting signals of interrogation to an aircraft, means scanning an approach zone for aircraft to develop a radar echo signal of an aircraft in said approach zone, means automatically operated upon development of said radar echo signal for rendering said search means in said first control channel ineffective and for rendering said tracking means in said first channel effective, and for rendering said transmitting means in said first channel effective to transmit interrogation signals to said aircraft, means in said aircraft for receiving said interrogation signals and for transmitting a confirmation signal, land-based means for receiving said confirmation signal and for rendering said control means effective, and second land-based transmitting means for transmitting said signals to said aircraft, means on said aircraft for receiving said signals and for causing said aircraft to fly along said predetermined flight path, and means interconnected between said first channel and said second channel for rendering only the search means of said first channel normally effective in the absence of any radar echo, means interconnected between said first and second channels for automatically operating the search means of said second channel when said control means of said second channel is rendered effective.

3. In a system of the character described, means for scanning the approach zone for aircraft and for producing signals representative of the deviation of a first aircraft from a predetermined flight path, means transmitting said signals to said first aircraft, means on said aircraft for causing said aircraft to fly along said predetermined flight path, means for developing signals representative of the deviation of a second aircraft from said flight path and for transmitting the same to said second aircraft, means on said second aircraft for causing said second aircraft to tend to fly along said flight path, and means rendering the last-mentioned means ineffective when the spacing between said first and second aircraft is below a predetermined minimum spacing.

4. In a system of the character described, first means for scanning the approach zone for aircraft and for producing signals representative of the deviation of the aircraft from a predetermined flight path, means transmitting said signals to said aircraft, means on said aircraft for causing said aircraft to fly along said predetermined flight path, and means automatically transmitting to said aircraft indications regarding the position of said aircraft with respect to a second aircraft in said approach zone.

5. In a system of the character described, means for scanning the approach zone for aircraft and for producing signals representative of the deviation of the aircraft from a predetermined flight path, means transmitting said signals to said aircraft, means on said aircraft and responsive to said signals for causing said aircraft to fly along said predetermined flight path, and means effective after operation of the last mentioned means for rendering the last-mentioned means ineffective when said last-mentioned means fails to respond to the transmitted signals.

6. In a system of the character described wherein it is desired to automatically control the flight of aircraft while the same flies along a predetermined flight path in an approach zone, for such aircraft and wherein said approach zone contains reflecting objects in a certain region thereof, which objects produce unwanted signals that appear together with signals reflected from said aircraft, electromagnetic means scanning said approach zone for aircraft and producing error signals representative of the deviation of an aircraft from said predetermined flight path, means deriving control signals in accordance with said error signals, means transmitting said control signals to said aircraft, means on the aircraft for receiving said control signals and causing said aircraft to fly along said predetermined flight path, and means operative simultaneously with said deriving means for substantially reducing the intensity of said control signals transmitted to said aircraft when said aircraft is in said certain region.

7. In a system of the character described wherein it is desired to automatically control the flight of aircraft while the same flies along a predetermined flight path in an approach zone for such aircraft, electromagnetic means scanning said approach zone for aircraft and producing error signals representative of the deviation of the aircraft from said predetermined flight path, means deriving control signals in accordance with said error signals, means transmitting said control signals to said aircraft, means on said aircraft responsive to said control signals and causing said aircraft to fly along a predetermined flight path, and means operative simultaneously with said deriving means for changing the relative intensity of said control signals in accordance with the particular position of the aircraft in said approach zone.

8. In a system of the character described wherein it is desired to automatically control the flight of aircraft while the same flies along a predetermined flight path in an approach zone leading to a landing area for said aircraft, means scanning said approach zone for aircraft and producing error signals representative of the deviation of the aircraft from said predetermined flight path, means deriving control signals in accordance with said error signals, means on said aircraft receptive to said control signals and causing said aircraft to fly along said predetermined flight path, and means effective after operation of the last mentioned means for rendering the last mentioned means on said aircraft ineffective when the aircraft is a predetermined distance from said landing area.

9. In a system of the character described wherein it is desired to automatically control the flight of aircraft while the same flies along a predetermined flight path in an approach zone for said aircraft, means scanning said approach zone for aircraft and for producing an error signal representative of the deviation of the aircraft from said predetermined flight path, means transmitting said error signal to said aircraft, means on said aircraft receptive to said error signal and causing said aircraft to fly along said predetermined flight path, and means effective after operation of the last mentioned means on said aircraft for rendering the same ineffective when said error signals exceeds a predetermined magnitude.

References Cited in the file of this patent

UNITED STATES PATENTS

| | | |
|---|---|---|
| 2,459,482 | Bond | Jan. 18, 1949 |
| 2,480,068 | Wolff | Aug. 23, 1949 |
| 2,490,268 | Herbst | Dec. 6, 1949 |
| 2,636,166 | Herbst | Apr. 21, 1953 |
| 2,745,095 | Stoddard | May 8, 1956 |
| 2,782,411 | McNaney | Feb. 19, 1957 |